United States Patent
Saeki

(10) Patent No.: US 9,536,295 B2
(45) Date of Patent: Jan. 3, 2017

(54) THREE-DIMENSIONAL IMAGE PROCESSING APPARATUS, THREE-DIMENSIONAL IMAGE PROCESSING METHOD, THREE-DIMENSIONAL IMAGE PROCESSING PROGRAM, COMPUTER-READABLE RECORDING MEDIUM, AND RECORDING DEVICE

(71) Applicant: Keyence Corporation, Osaka (JP)

(72) Inventor: Kazuhito Saeki, Osaka (JP)

(73) Assignee: Keyence Corporation, Osaka (JP)

( * ) Notice: Subject to any disclaimer, the term of this patent is extended or adjusted under 35 U.S.C. 154(b) by 260 days.

(21) Appl. No.: 14/321,847

(22) Filed: Jul. 2, 2014

(65) Prior Publication Data

US 2015/0022638 A1 Jan. 22, 2015

(30) Foreign Application Priority Data

Jul. 16, 2013 (JP) .................................. 2013-148064

(51) Int. Cl.
*G06T 7/00* (2006.01)

(52) U.S. Cl.
CPC ............ *G06T 7/0004* (2013.01); *G06T 7/0057* (2013.01); *G06T 2207/30164* (2013.01)

(58) Field of Classification Search
CPC .................. G06T 7/0004; G06T 7/0057; G06T 2207/30164

See application file for complete search history.

(56) References Cited

U.S. PATENT DOCUMENTS

| 7,813,591 B2 * | 10/2010 | Paley | A61B 5/4547 345/418 |
| 8,265,425 B2 * | 9/2012 | Ng-Thow-Hing | G06T 7/0042 382/199 |
| 2004/0151365 A1 * | 8/2004 | An Chang | G06K 9/2036 382/154 |

(Continued)

FOREIGN PATENT DOCUMENTS

JP 2012-021909 2/2012

*Primary Examiner* — Thai Tran
*Assistant Examiner* — Christopher T Braniff
(74) *Attorney, Agent, or Firm* — Kilyk & Bowersox, P.L.L.C.

(57) ABSTRACT

A head section includes: a light projecting part for projecting incident light as structured illumination of a predetermined projection pattern; the image capturing part for acquiring reflected light that is projected by the light projecting part and reflected on an inspection target, to capture a plurality of pattern projected images; a distance image generating part capable of generating a distance image based on the plurality of pattern projected images captured in the image capturing part; a head-side storage part for holding the distance image generated in the distance image generating part; and a head-side communication part for transmitting the distance image held in the storage part to the controller section. The controller section includes: a controller-side communication part for communicating with the head-side communication part; and an inspection executing part for executing predetermined inspection processing on the distance image received in the controller-side communication part.

21 Claims, 152 Drawing Sheets

(56) References Cited

U.S. PATENT DOCUMENTS

| | | | | |
|---|---|---|---|---|
| 2008/0055591 A1* | 3/2008 | Walton | ............... | G01N 21/8901 356/237.1 |
| 2012/0133920 A1* | 5/2012 | Skunes | .............. | G01N 21/8806 356/23 |
| 2012/0154576 A1* | 6/2012 | Weston | .................. | G01B 11/25 348/136 |
| 2012/0176478 A1* | 7/2012 | Wang | ................. | G01B 11/2536 348/47 |

* cited by examiner

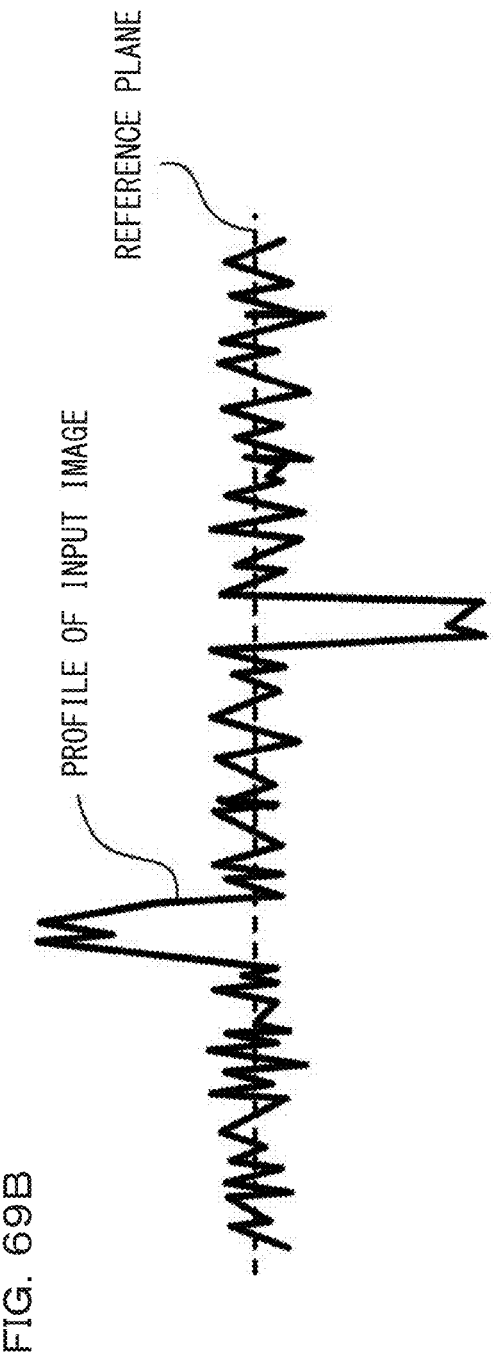
FIG. 69A
FIG. 69B

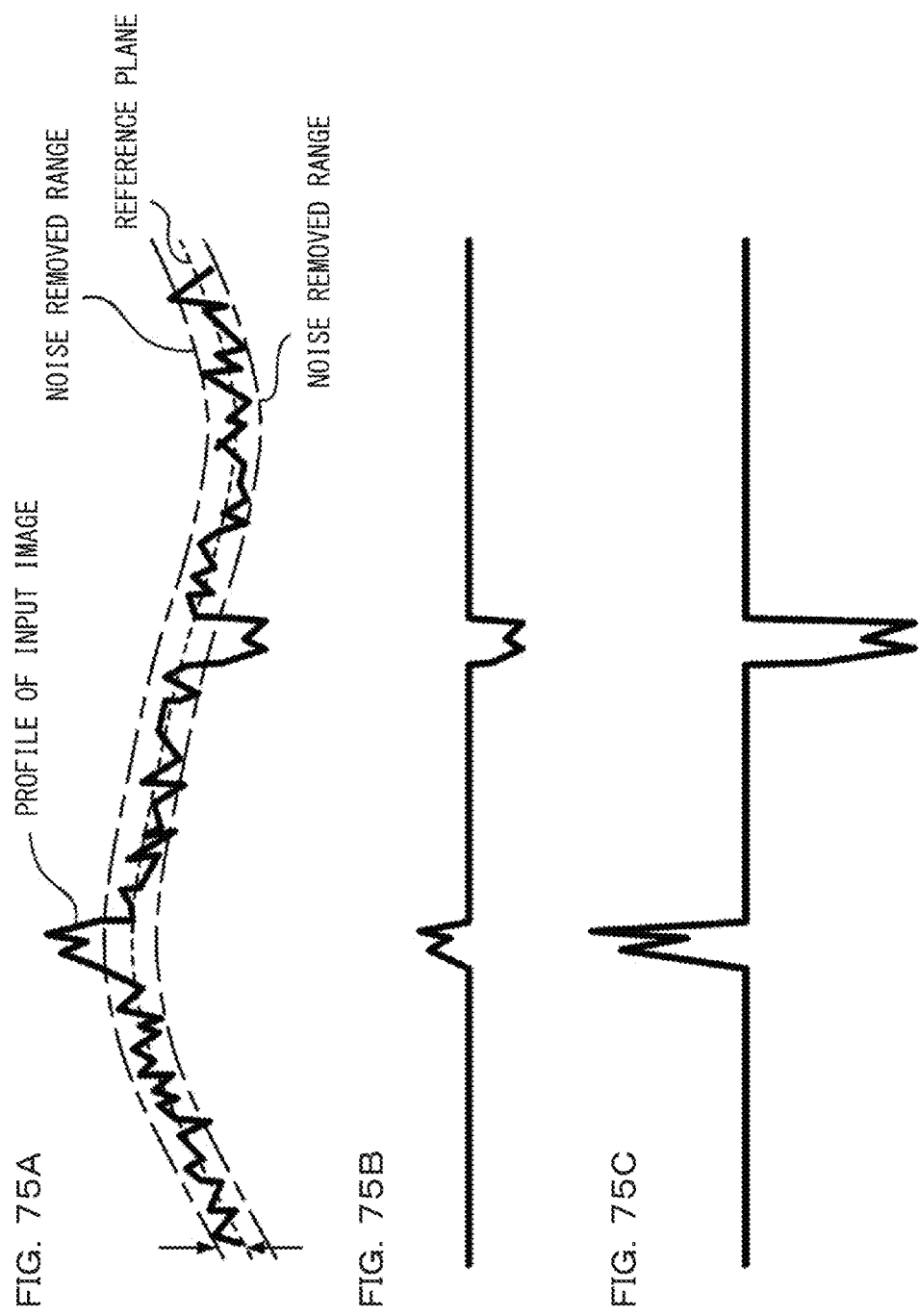

FIG. 76A
FIG. 76B
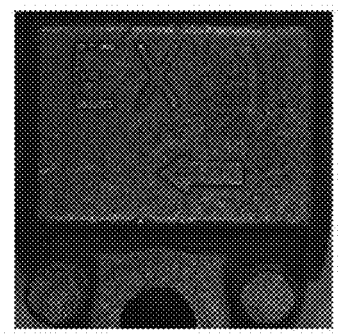
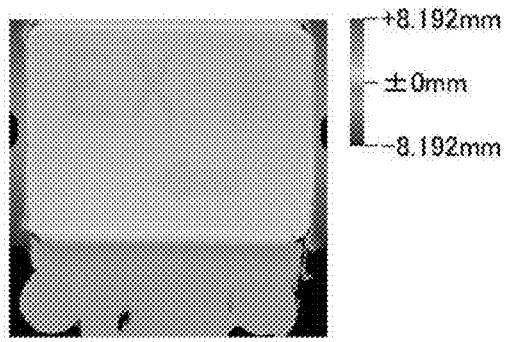
+8.192mm
±0mm
-8.192mm
FIG. 76D
FIG. 76C
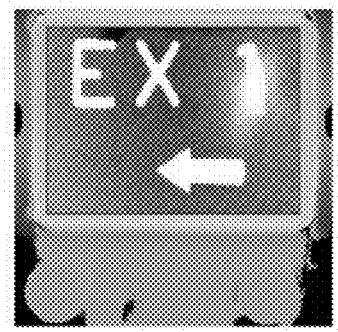
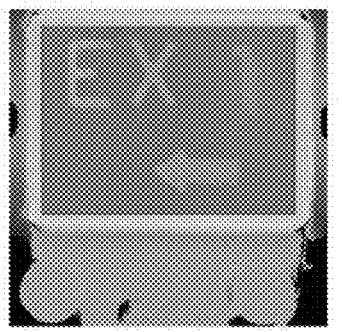
GAIN: 1000 [TONES/mm]
REMOVE NOISE: 0.000 [mm]
GAIN: 100 [TONES/mm]
REMOVE NOISE: 0.000 [mm]
FIG. 76E
FIG. 76F
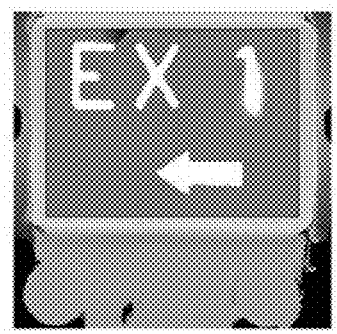
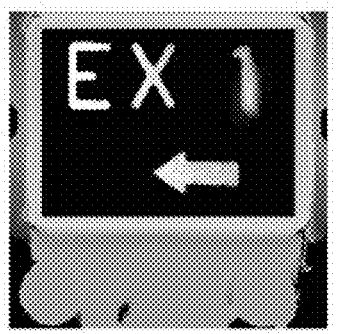
GAIN: 1000 [TONES/mm]
REMOVE NOISE: 0.080 [mm]
GAIN: 1000 [TONES/mm]
REMOVE NOISE: 0.080 [mm]
EXTRACTED HEIGHT: HIGH SIDE FIG. 98A
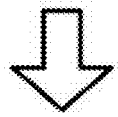
FIG. 98B
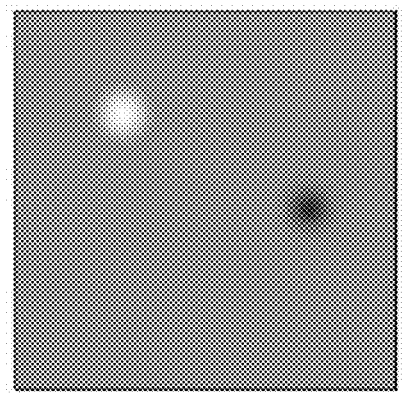
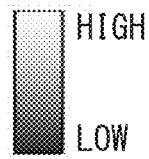

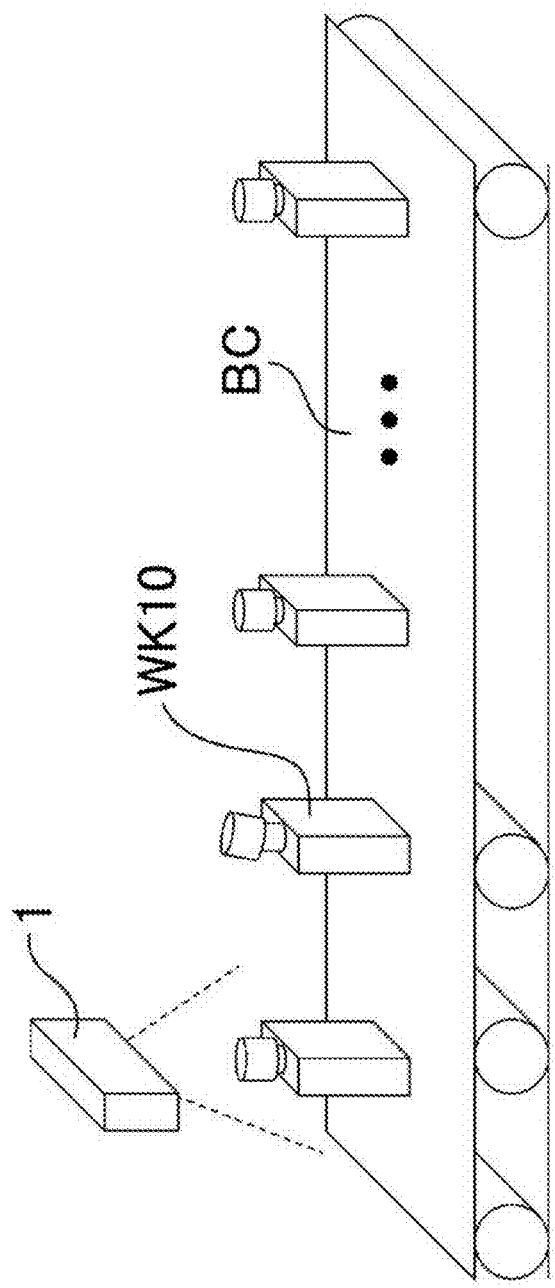
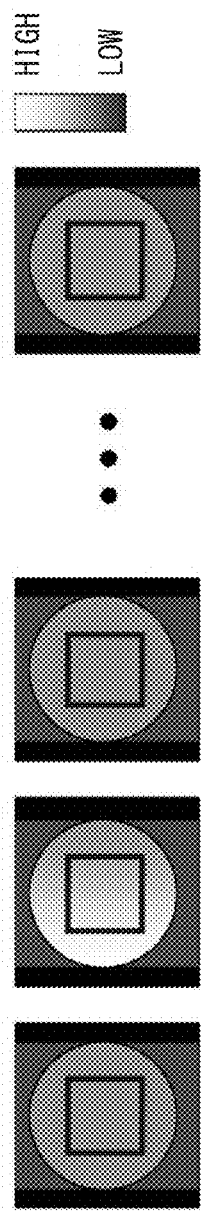
FIG. 138A
FIG. 138B

FIG. 145A
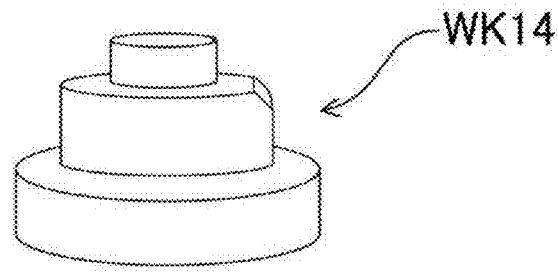
WK14
⇩ CREATE DISTANCE IMAGE
FIG. 145B
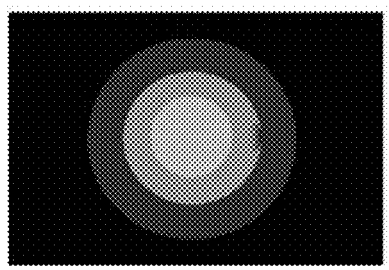
⇩ HEIGHT MEASUREMENT TOOL       ⇘ AREA INSPECTION TOOL
                                   AREA INSPECTION REGION
FIG. 145C                                              FIG. 145D
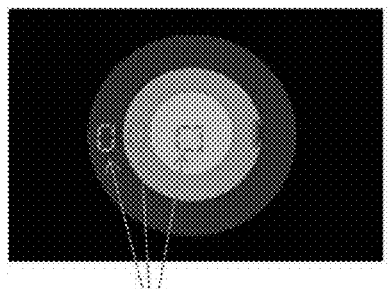                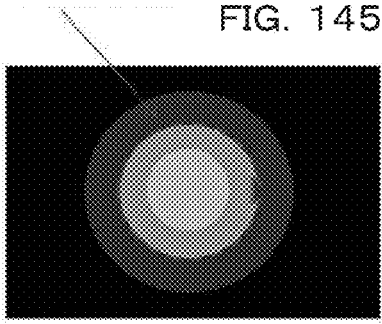
HEIGHT MEASUREMENT REGION
⇩
FIG. 145E
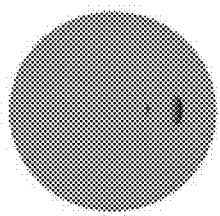

FIG. 154

SELECT IMAGE VARIABLE

SORT  DISPLAY SEQUENCE - ASCENDING SEQUENCE ▽

CAMERA 1                    : &Cam1Img
CAMERA 2                    : &Cam2Img
CAMERA 3                    : &Cam3Img
CAMERA 4                    : &Cam4Img
CAMERA 1 (AFTER COMPUTING)  : &Cam1GrayImg FOCUS POSITION  CAMERA 1  : &Cam1Img
SELECT                      &Cam1Img

OK      CANCEL

390

THREE-DIMENSIONAL IMAGE PROCESSING APPARATUS, THREE-DIMENSIONAL IMAGE PROCESSING METHOD, THREE-DIMENSIONAL IMAGE PROCESSING PROGRAM, COMPUTER-READABLE RECORDING MEDIUM, AND RECORDING DEVICE

CROSS-REFERENCE TO RELATED APPLICATIONS

The present application claims foreign priority based on Japanese Patent Application No. 2013-148064, filed Jul. 16, 2013, the contents of which is incorporated herein by reference.

BACKGROUND OF THE INVENTION

1. Field of the Invention

The present invention relates to a three-dimensional image processing apparatus, a three-dimensional image processing method, a three-dimensional image processing program, a computer-readable recording medium, and a recording device.

2. Description of Related Art

In a large number of production sites such as factories, there have been introduced image processing apparatuses that realize automatic and fast performance of inspections, which have relied on viewing of humans. The image processing apparatus captures an image of a workpiece that comes flowing through a production line such as a belt conveyor by use of a camera, and executes measurement processing such as edge detection and area calculation for a predetermined region by use of the obtained image data. Then, based on a processing result of the measurement processing, the apparatus performs inspections such as detection of a crack on the workpiece and positional detection of alignment marks, and outputs determination signals for determining the presence or absence of a crack on the workpiece and positional displacement. In such a manner, the image processing apparatus may be used as one of FA (Factory Automation) sensors.

An image which is taken as a measurement processing target by the image processing apparatus that is used as the FA sensor is principally a brightness image not including height information. For this reason, speaking of the foregoing detection of a crack on the workpiece, the apparatus is good at stably detecting a two-dimensional shape of a cracked portion, but having difficulties in stably detecting a three-dimensional shape of, for example, a depression of a flaw which is not apt to appear in a brightness image. For example, it is thought that a type or a direction of illumination that illuminates the workpiece during the inspection is devised and a shade caused by a depression of a flaw is detected to indirectly detect a three-dimensional shape, but a clear shade is not necessarily always detected in the brightness image. In order to prevent an erroneous determination which is to erroneously detect a defective product as a non-defective product at the time of an unclear shade being detected, for example, if a determination threshold is biased to the safe side, the apparatus might determine a large number of non-defective products as defective products, to cause deterioration in production yield.

Accordingly, there is considered a visual inspection which uses not only a brightness image that takes, as a pixel value, a shade value in accordance with a light reception amount of the camera but also a distance image that takes, as a pixel value, a shade value in accordance with a distance from the camera to the workpiece to two-dimensionally express a height (e.g. see Unexamined Japanese Patent Publication No. 2012-21909).

An example of the three-dimensional image processing apparatus is shown in a schematic view of FIG. 160. This three-dimensional image processing apparatus is configured of a head section provided with an image capturing part such as a light reception element, and a controller section which is connected to the head section and is sent image data captured in the head section, to generate a distance image from the acquired image data.

Here, the principle of triangulation will be described based on FIG. 160. In the head section, an angle α between an optical axis of incident light emitted from a light projecting section 110 and an optical axis of reflected light that is incident on a light receiving section 120 (optical axis of the light receiving section 120) is previously set. Here, when the workpiece is not mounted on a workpiece mounting place, incident light emitted from the light projecting section 110 is reflected by a point O on the workpiece mounting surface and is incident on the light receiving section 120. On the other hand, when the workpiece is mounted on the workpiece mounting place, the incident light emitted from the light projecting section 110 is reflected by a point A on the surface of the workpiece and is incident as reflected light on the light receiving section 120. Then, a distance d in an X-direction between the point O and the point A is measured, and based on this distance d, a height h of the point A on the surface of the workpiece is calculated.

Heights of all points on the surface of the workpiece are calculated applying the foregoing the measurement principle of triangulation, thereby to measure a three-dimensional shape of the workpiece. In a pattern projecting method, in order that all the points on the surface of the workpiece are irradiated with incident light, the incident light is emitted from the light projecting section 110 in accordance with a predetermined structured pattern, reflected light as the light reflected on the surface of the workpiece is received, and based on a plurality of received pattern images, the three-dimensional shape of the workpiece is efficiently measured.

As such a pattern projecting method, there are known a phase shift method, a spatial coding method, a multi-slit method and the like. By the three-dimensional measurement processing performed using the pattern projecting method, a projection pattern is changed to repeat image-capturing a plurality of times in the head section, and the images are transmitted to the controller section. In the controller section, computing is performed based on the pattern projected images transmitted from the head section, and a distance image having height information of the workpiece can be obtained.

Generating such a distance image requires a plurality of pattern projected images. Hence it is necessary that, after capturing of a large number of pattern projected images in the head section, these images be once transferred to the controller section side, and computational processing be performed using the plurality of pattern projected images on the controller section side. However, when a large number of image data are transmitted from the head section to the controller section side, a load of data communication increases. Particularly, improving the accuracy requires high-resolution pattern projected image data and also leads to an increase in number of pieces of pattern projected image data. Moreover, in the case of combining a plurality of methods such as the phase shift method and the spatial coding method for the purpose of improving the accuracy in height information, the number of captured images further increases and an amount of data to be transmitted from the head section to the controller section also increases. This makes the time required for data transfer longer and thus makes real-time processing difficult to perform. Besides, high-speed communication is necessary for making communication of a large amount of data performed in a short period of time, thus causing a problem of severe specification requirements in terms of hardware and cost increase.

SUMMARY OF THE INVENTION

The present invention is for solving the conventional problems as described above. A principal object of the present invention is to provide a three-dimensional image processing apparatus, a head section for a three-dimensional image processing apparatus, and a three-dimensional image processing method, each of which alleviates a load of data transfer from a camera head section to a body section.

For achieving the above object, a three-dimensional image processing apparatus according to one embodiment of the present invention is a three-dimensional image processing apparatus, which includes a head section and a controller section, and is capable of acquiring a distance image that includes height information of an inspection target and also performing image processing based on the distance image. The head section can include: a light projecting part for projecting incident light as structured illumination of a predetermined projection pattern from an oblique direction with respect to an optical axis of a below-described image capturing part; the image capturing part for acquiring reflected light that is projected by the light projecting part and reflected on an inspection target, to capture a plurality of pattern projected images; a distance image generating part capable of generating a distance image based on the plurality of pattern projected images captured in the image capturing part; a head-side storage part for holding the distance image generated in the distance image generating part; and a head-side communication part for transmitting the distance image held in the storage part to the controller section. The controller section can include: a controller-side communication part for communicating with the head-side communication part; and an inspection executing part for executing predetermined inspection processing on the distance image received in the controller-side communication part. With the above configuration, a distance image can be generated on the head section side and hence, as compared with a conventional method for receiving a pattern projected image on the controller section side from the head section to generate a distance image, it is possible to significantly reduce an amount of transferred data to be transmitted from the head section to the controller section side, so as to reduce a load of communication and realize high-speed processing.

Further, in a three-dimensional image processing apparatus according to another embodiment, it can be configured such that the head section further includes a filter processing section for performing predetermined filter processing on each of the plurality of pattern projected images captured in the image capturing part, and the distance image generating part generates a distance image based on each of pattern projected images subjected to the filter processing in the filter processing section. With the above configuration, it is possible to perform common filter processing on the head section side, so as to complete generation of a distance image only in the head section.

Further, in a three-dimensional image processing apparatus according to another embodiment, the filter processing section is capable of executing at least any of a median filter, a Gaussian filter and an average filter.

Further, in a three-dimensional image processing apparatus according to another embodiment, the controller section can further include an image post-processing section for performing predetermined post-processing on the distance image generated in the head section. With the above configuration, it is possible to perform post-processing suitable for image processing, such as inspection, on the controller section side, and disperse a load of processing by sharing of necessary image processing between the head section and the controller section.

Further, in a three-dimensional image processing apparatus according to another embodiment, it can be configured such that the image post-processing section includes a tone conversion part for tone-converting the distance image to a low-tone distance image in accordance with a set tone conversion condition, the controller section includes a tone conversion condition setting part for setting a conversion parameter that constitutes a tone conversion condition at the time of performing a tone conversion to convert the distance image received in the controller-side communication part to a low-tone distance image, and the tone converting part tone-converts the distance image to a low-tone distance image in accordance with the tone conversion condition set in the tone conversion condition setting part and the inspection executing part executes inspection processing on the tone-converted low-tone distance image.

Further, in a three-dimensional image processing apparatus according to another embodiment, it can be configured such that the tone-converting part is capable of converting the conversion parameter based on height information of an input image.

Further, in a three-dimensional image processing apparatus according to another embodiment, the controller section can be a general-purpose personal computer installed with a controlling program.

Further, in a three-dimensional image processing apparatus according to another embodiment, the controller section is capable of receiving a trigger input and transferring a setting parameter.

Further, a three-dimensional image processing apparatus according to another embodiment can further include: a display part for displaying an image; and an abnormal point highlight part capable of highlighting and displaying an abnormal point at which height information cannot be measured on the image displayed on the display part. With the above configuration, the user can also confirm a non-measurable portion on the workpiece from the display part, and can thus determine by viewing as to whether a necessary portion is measurable, and an adjustment operation is also facilitated.

Further, in a three-dimensional image processing apparatus according to another embodiment, the brightness image can be a shade image obtained by capturing the inspection target with the light projecting part set to a full-illumination pattern.

Further, in a three-dimensional image processing apparatus according to another embodiment, the brightness image can be generated by synthesizing a plurality of pattern projected images from which the distance image is generated.

Further, in a three-dimensional image processing apparatus according to another embodiment, it can be configured such that the distance image generating part is capable of generating a three-dimensional shade image that includes height information, in addition to the distance image. With the above configuration, a low-tone distance image can be generated on the head section side and then transferred to the controller side, and hence an amount of transferred data can further be reduced, leading to alleviation of the load.

Further, in a three-dimensional image processing apparatus according to another embodiment, the light projecting part can include: a first projector; and a second projector arranged capable of projecting incident light to the inspection target from a position different from that of the first projector.

Further, in a three-dimensional image processing apparatus according to another embodiment, the head section can further include a post-processing part for specifying image processing that is performed after generation of the distance image.

Further, in a three-dimensional image processing apparatus according to another embodiment, the controller section includes an image searching part for performing image searching by means of a model, and the inspection executing part can perform predetermined inspection processing on the distance image based on positional correction data for the inspection target, acquired in the image searching part based on the brightness image. With the above configuration, after positioning by means of the brightness image, processing such as inspection by use of the distance image can be performed.

Further, in a three-dimensional image processing apparatus according to another embodiment, the controller section includes an image searching part for performing image searching by means of a model, and the inspection executing part can perform predetermined inspection processing on the brightness image based on positional correction data for the inspection target, acquired in the image searching part based on the distance image. With the above configuration, even in a case where positioning by means of the brightness image is difficult, such as the case of a white inspection target being placed on a white background, it is possible to realize accurate positioning based on the distance image.

Further, in a three-dimensional image processing apparatus according to another embodiment, the controller section can include a spatial coding switching part capable of switching on/off of spatial coding processing for capturing a pattern projected image based on a spatial coding method to acquire height information. With the above configuration, it is possible to generate a distance image by combining pieces of phase shift processing in addition to spatial coding processing, so as to realize highly accurate height measurement and inspection, and also make the processing time short without deterioration in accuracy at the time of measuring an inspection target with relatively a small difference in a height direction.

Further, a head section for a three-dimensional image processing apparatus according to another embodiment is a head section, which is connectable to a controller section for performing image processing in a three-dimensional image processing apparatus capable of acquiring a distance image that includes height information of an inspection target or a brightness image in which the inspection target is captured and also performing image processing based on the distance image or the brightness image. The head section includes: a light projecting part for projecting incident light as structured illumination of a predetermined projection pattern from an oblique direction with respect to an optical axis of a below-described image capturing part; the image capturing part for acquiring reflected light that is projected by the light projecting part and reflected on an inspection target, to capture a plurality of pattern projected images; a distance image generating part capable of generating a distance image based on the plurality of pattern projected images captured in the image capturing part; and a head-side communication part for transmitting the distance image generated in the distance image generating part to the controller section. It can be configured such that the distance image generated in the distance image generating part can be transmitted to the controller side via the head-side communication part. With the above configuration, a three-dimensional image can be generated on the head section side and hence, as compared with a conventional method for generating a distance image on the controller section side, it is possible to reduce an amount of transferred data to be transmitted from the head section to the controller section side, so as to realize high-speed processing with a low load.

Further, a three-dimensional image processing method according to another embodiment is a three-dimensional image processing method using a three-dimensional image processing apparatus which includes a head section and a controller section, and is capable of acquiring a distance image that includes height information of an inspection target and also performing image processing based on the distance image. The method can include the steps of; projecting, from an oblique direction, incident light as structured illumination of a predetermined projection pattern from the head section to an inspection target and acquiring reflected light reflected on the inspection target, to capture a plurality of pattern projected images; generating a distance image based on the plurality of captured pattern projected images; transmitting the generated distance image to the controller section; and executing predetermined inspection processing on the distance image received in the controller section. With the above configuration, a three-dimensional image can be generated on the head section side, and hence, as compared with a conventional method for receiving a pattern projected image on the controller section side from the head section to generate a distance image, it is possible to significantly reduce an amount of transferred data to be transmitted from the head section to the controller section side, so as to reduce a load of communication and realize high-speed processing.

Further, a three-dimensional image processing program according to another embodiment is a three-dimensional image processing program, which is capable of acquiring a distance image that includes height information of an inspection target and also performing image processing based on the distance image by use of a three-dimensional image processing apparatus including a head section and a controller section. The program can allow a computer to realize: a distance image generating function capable of generating a distance image based on a plurality of pattern projected images captured by projecting incident light as structured illumination of a predetermined projection pattern from an oblique direction with respect to an optical axis of an image capturing part included in the head section and acquiring reflected light reflected on an inspection target; a function of transmitting the distance image generated by the distance image generating function to the controller section; and an inspection executing function for executing predetermined inspection processing on the distance image received in the controller section.

Further, a computer-readable recording medium or a storage device according to another embodiment is one in which the three-dimensional image processing program is to be stored. The recording medium includes a magnetic disk, an optical disk, a magneto-optical disk, a semiconductor memory, and other program-storable medium, such as a CD-ROM, a CD-R, a CD-RW, a flexible disk, a magnetic tape, an MO, a DVD-ROM, a DVD-RAM, a DVD-R, a DVD+R, a DVD-RW, a DVD+RW, a Blu-ray (registered trademark), and an HD-DVD (AOD). Further, the program includes one in the form of being distributed by downloading through a network such as the Internet, in addition to one stored into the above recording medium and distributed. Moreover, the storage device includes general-purpose or a special-purpose device mounted with the program in the form of software, firmware or the like, in an executable state. Furthermore, each processing and each function included in the program may be executed by program software that is executable by the computer, and processing of each section may be realized by predetermined hardware such as a gate array (FPGA, ASIC) or in the form of program software being mixed with a partial hardware module that realizes some element of hardware.

BRIEF DESCRIPTION OF THE DRAWINGS

FIG. 69A is an image diagram showing a profile of an input image, and

FIG. 69B is an image diagram showing a profile of a low-tone distance image obtained by tone-converting the input image of FIG. 69A;

FIG. 75A is an image diagram showing a profile of an input image, FIG. 75B is an image diagram showing the input image of FIG. 75A with a reference plane taken as a reference, and FIG. 75C is an image diagram showing a profile of a low-tone distance image obtained by tone-converting FIG. 75B;

FIG. 76A is an image view showing a brightness image, FIG. 76B is an image view showing a high-tone distance image, FIG. 76C is an image view showing a low-tone distance image obtained by tone-converting FIG. 76B, FIG. 76D is an image view showing a low-tone distance image with gain increased more than FIG. 76C, FIG. 76E is an image view showing a low-tone distance image with noise removed more than FIG. 76D, and FIG. 76F is an image view showing a low-tone distance image obtained by setting "Extracted height" on the high side in FIG. 76E;

FIG. 98A is a perspective view showing an example of a workpiece for which a method for setting a reference plane by means of a free curved surface reference is effective, and FIG. 98B is an image view of a low-tone distance image obtained by tone-converting a distance image captured in FIG. 98A;

FIG. 120 is a flowchart showing a flow of processing at the time of operation in the head section of the three-dimensional image processing apparatus according to the fourth embodiment;

FIG. 121 is a flowchart showing a tone converting method according to the first embodiment;

FIG. 122 is a flowchart showing a flow of processing at the time of operation in the controller section of the three-dimensional image processing apparatus according to the third embodiment;

FIG. 123 is an image view showing an initial screen of a three-dimensional image processing program;

FIG. 124 is an image view showing a state where a search target region is set on a brightness image;

FIG. 125 is an image view showing a state where a plurality of inspection target regions are set on a distance image;

FIG. 126 is an image view showing a state where the distance image of FIG. 125 is enlarged;

FIG. 127 is an image view showing a state where height measurement is executed by the three-dimensional image processing program;

FIG. 128 is a data flow diagram for generating a distance image by combining a phase shift method and a spatial coding method;

FIG. 129 is a data flow diagram for generating a distance image only by the phase shift method without using the spatial coding method;

FIG. 130 is a data flow diagram showing a procedure for setting "OFF" XY equal pitching to obtain a Z-image;

FIG. 131 is a diagram showing an example where point cloud data is outputted;

Figure 132:
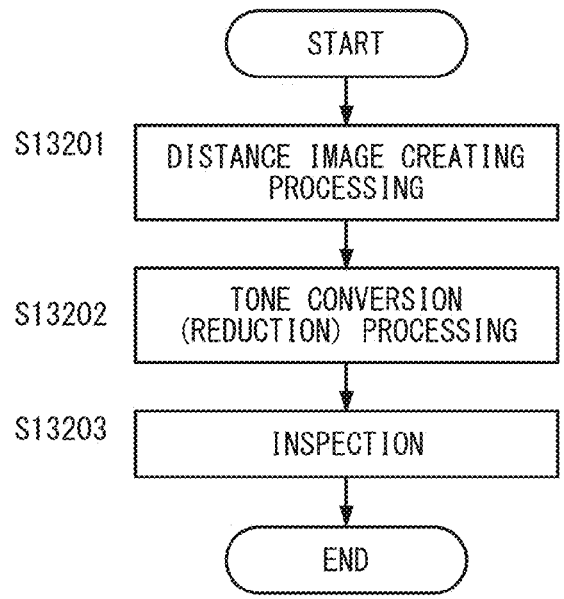
Figure 133:
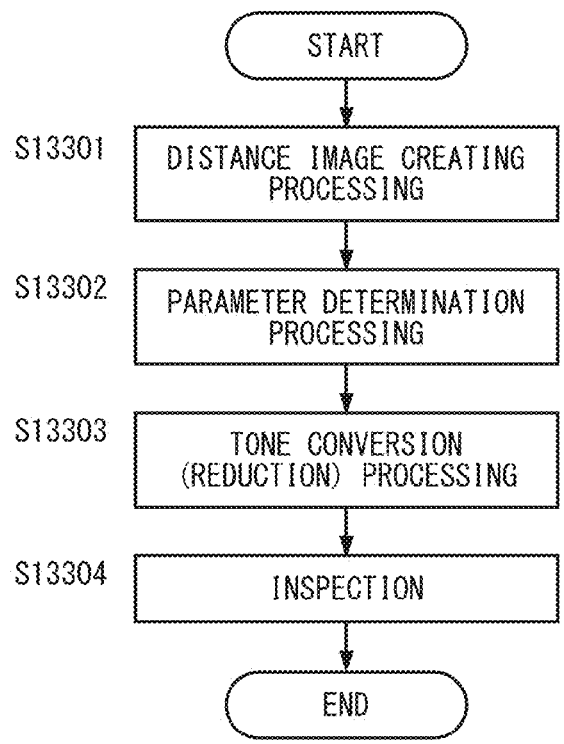
Figure 134:
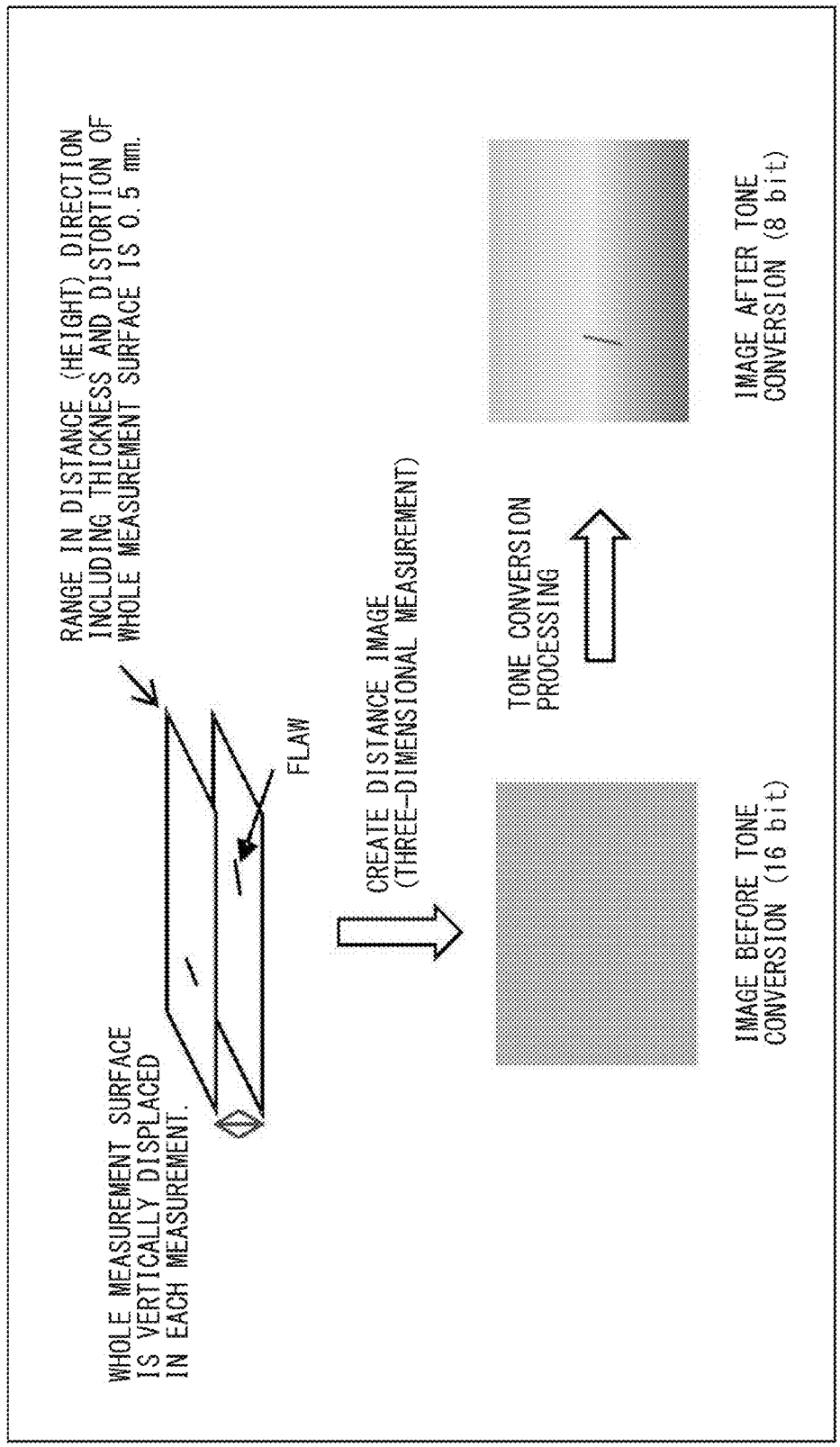
Figure 135:
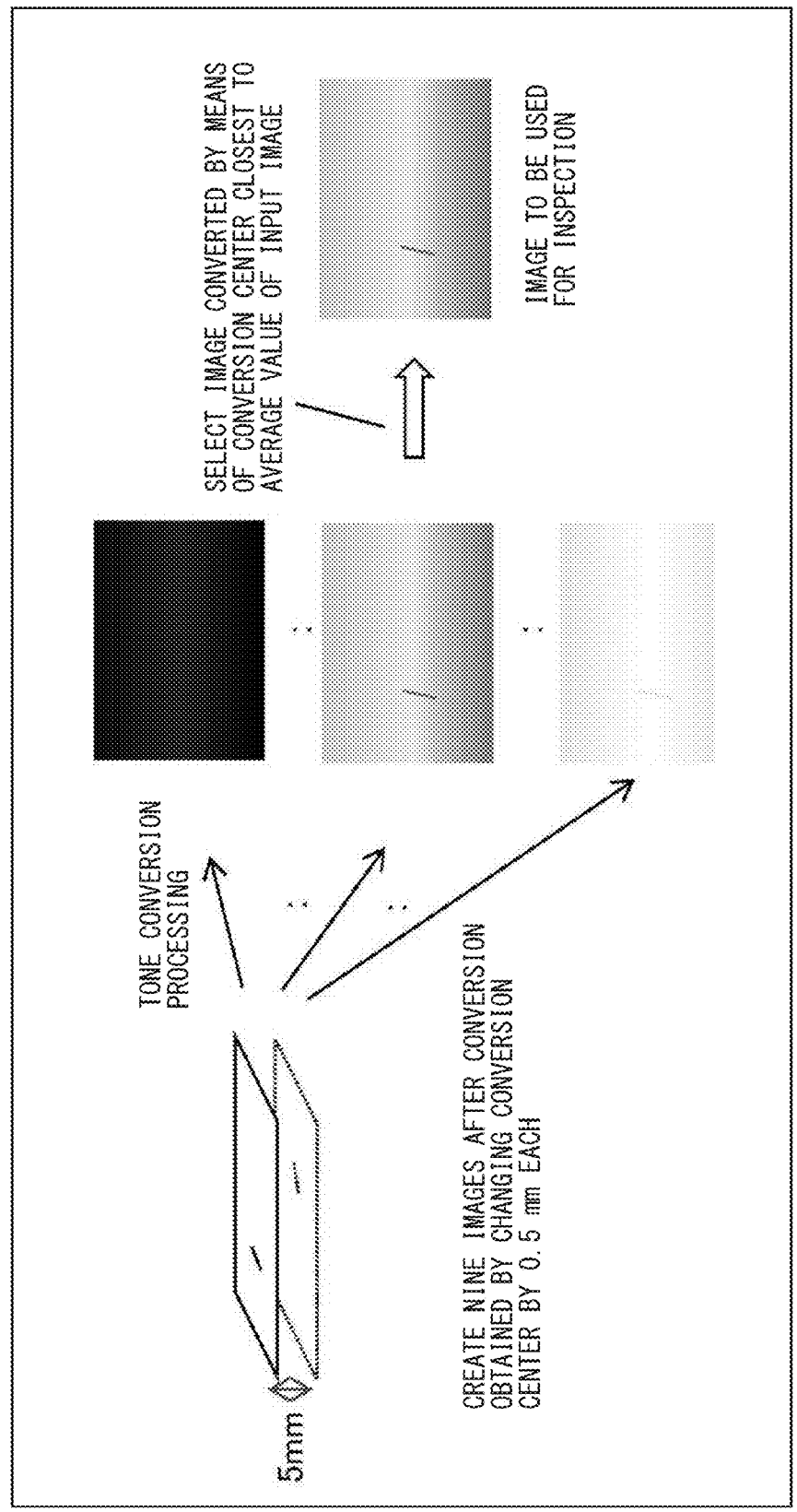
Figure 136:
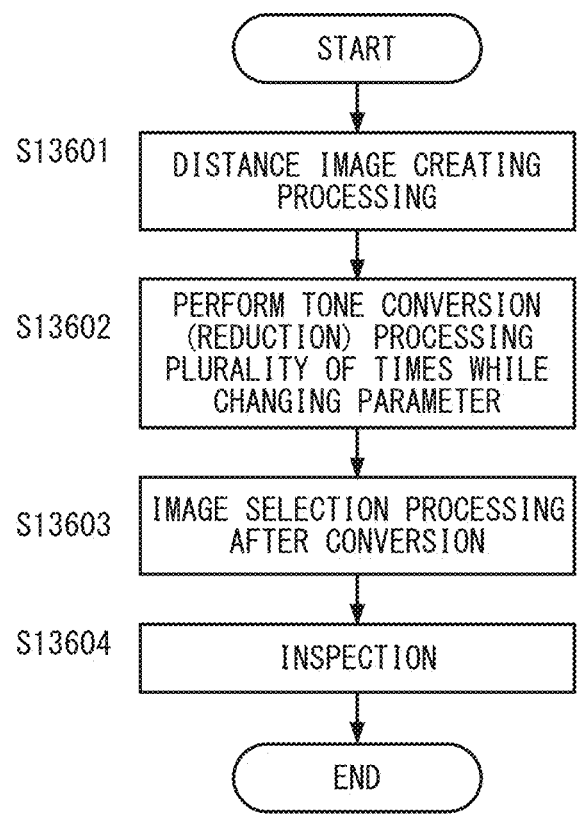
Figure 137:
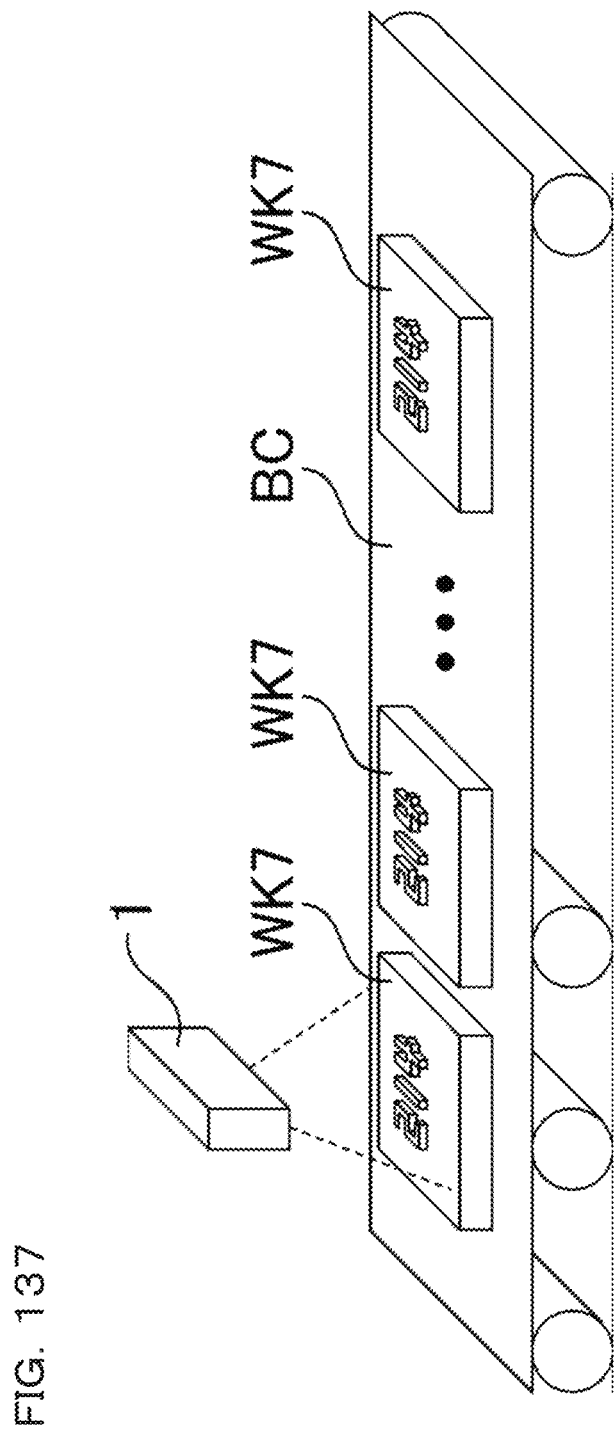
Figure 139:
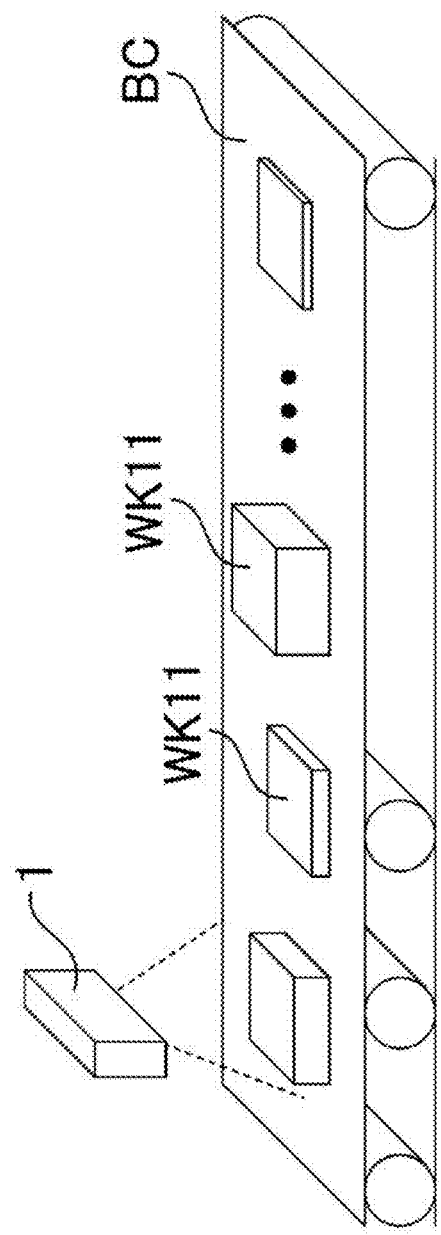
Figure 140:
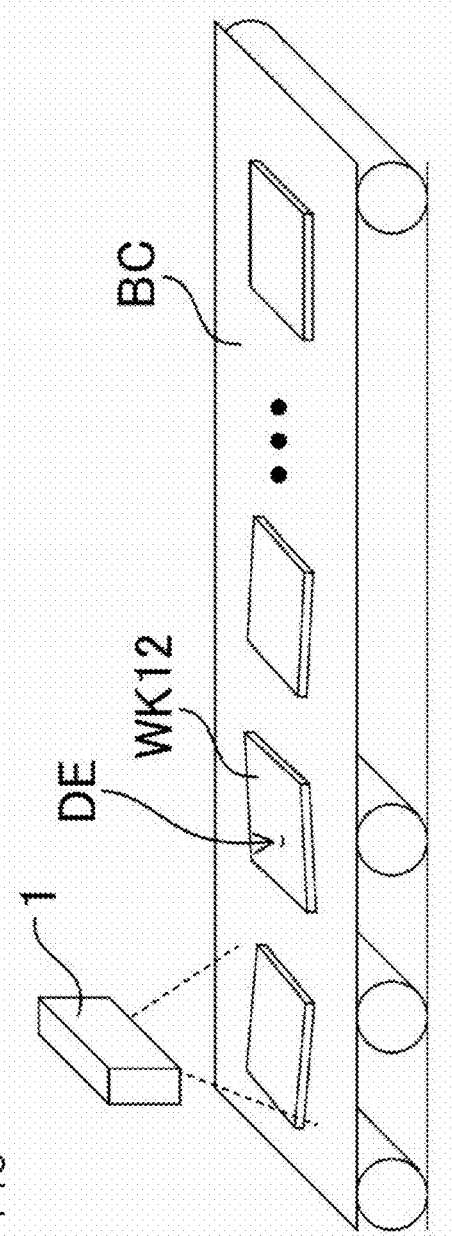
Figure 141:
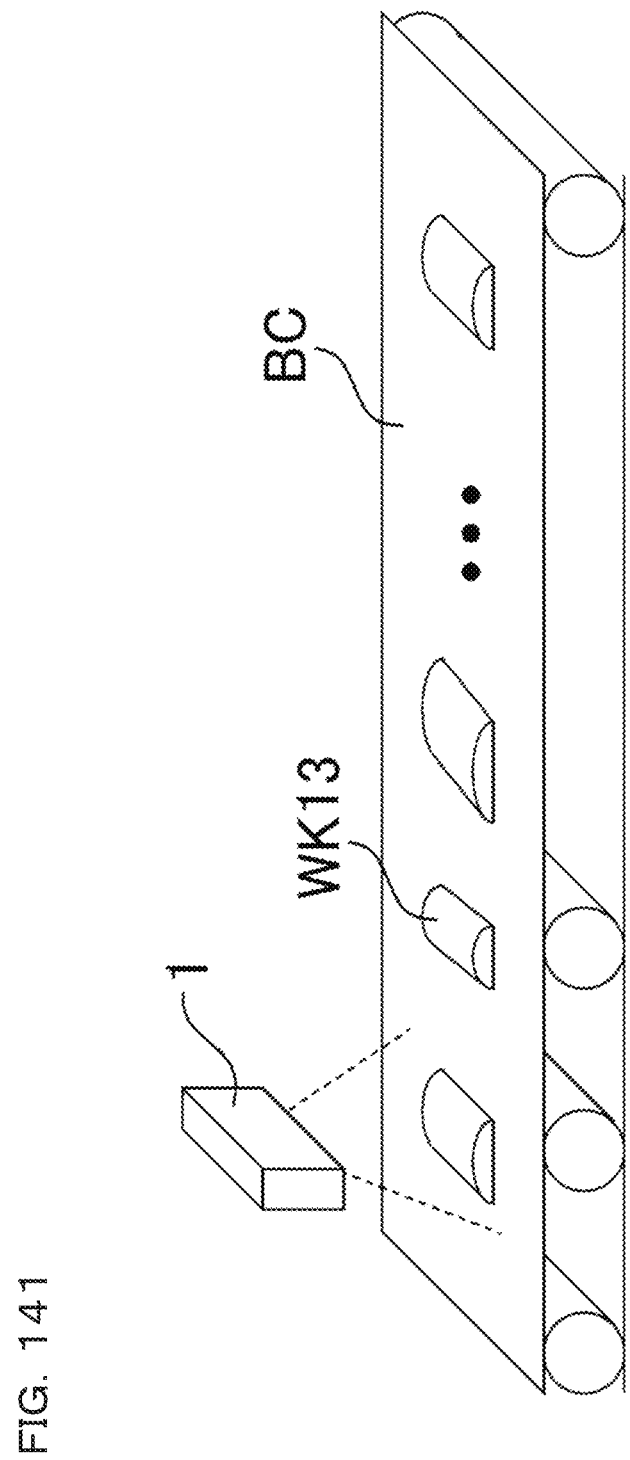
Figure 142:
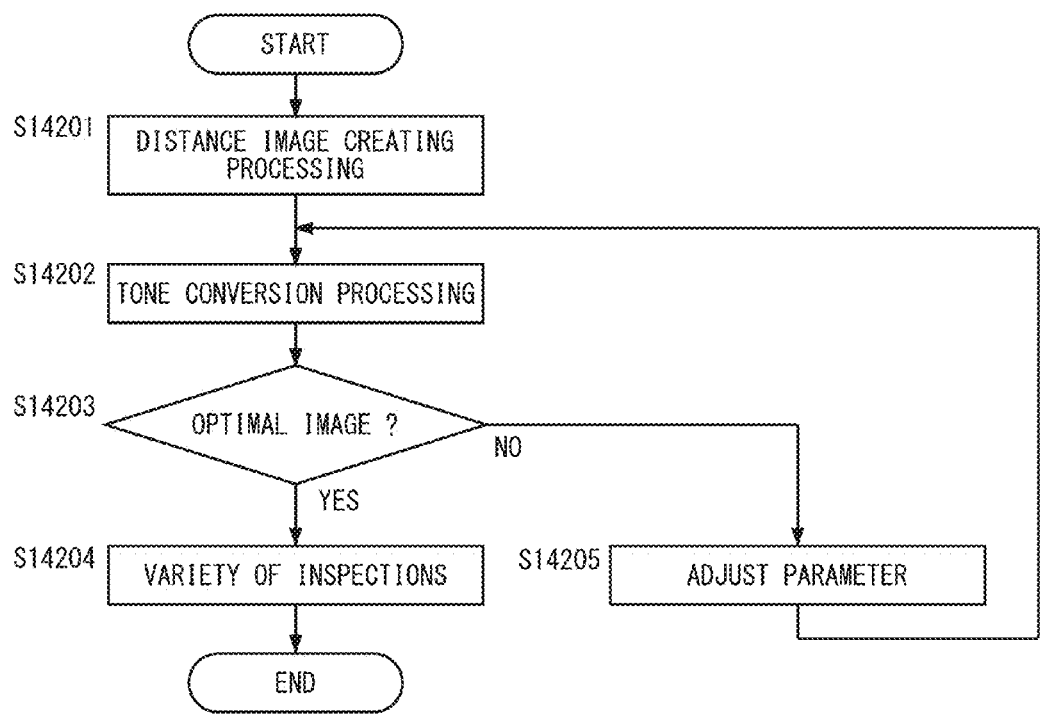
Figure 143:
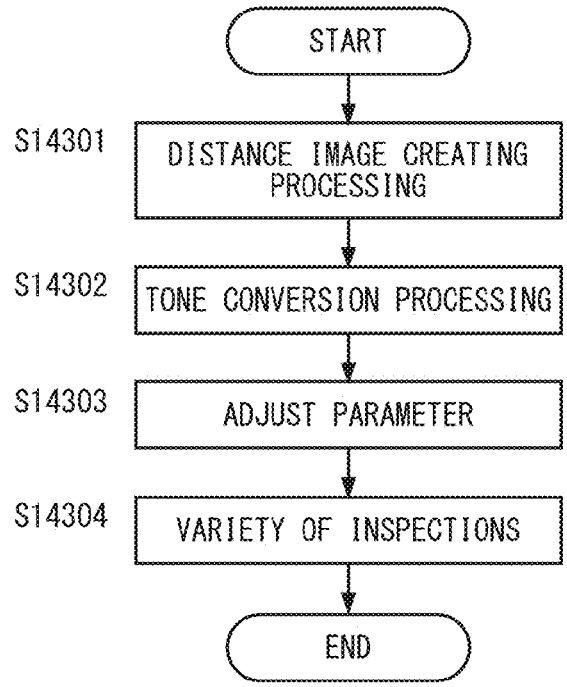
Figure 144:
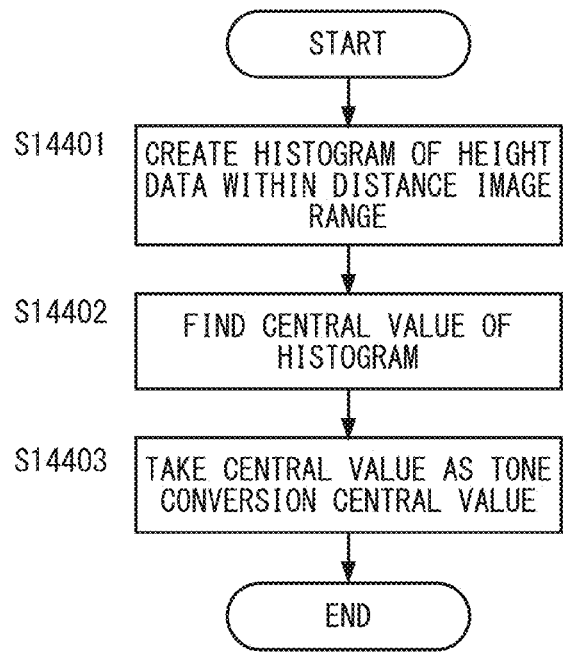
Figure 146:
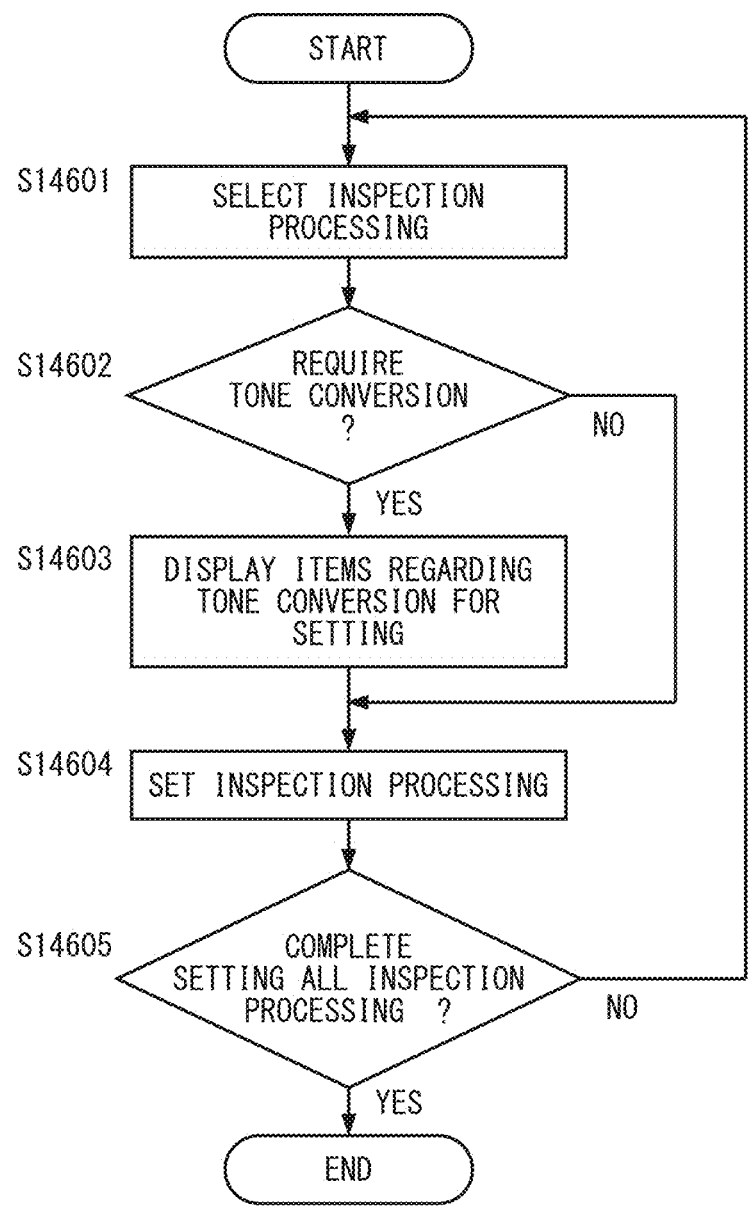
Figure 147:
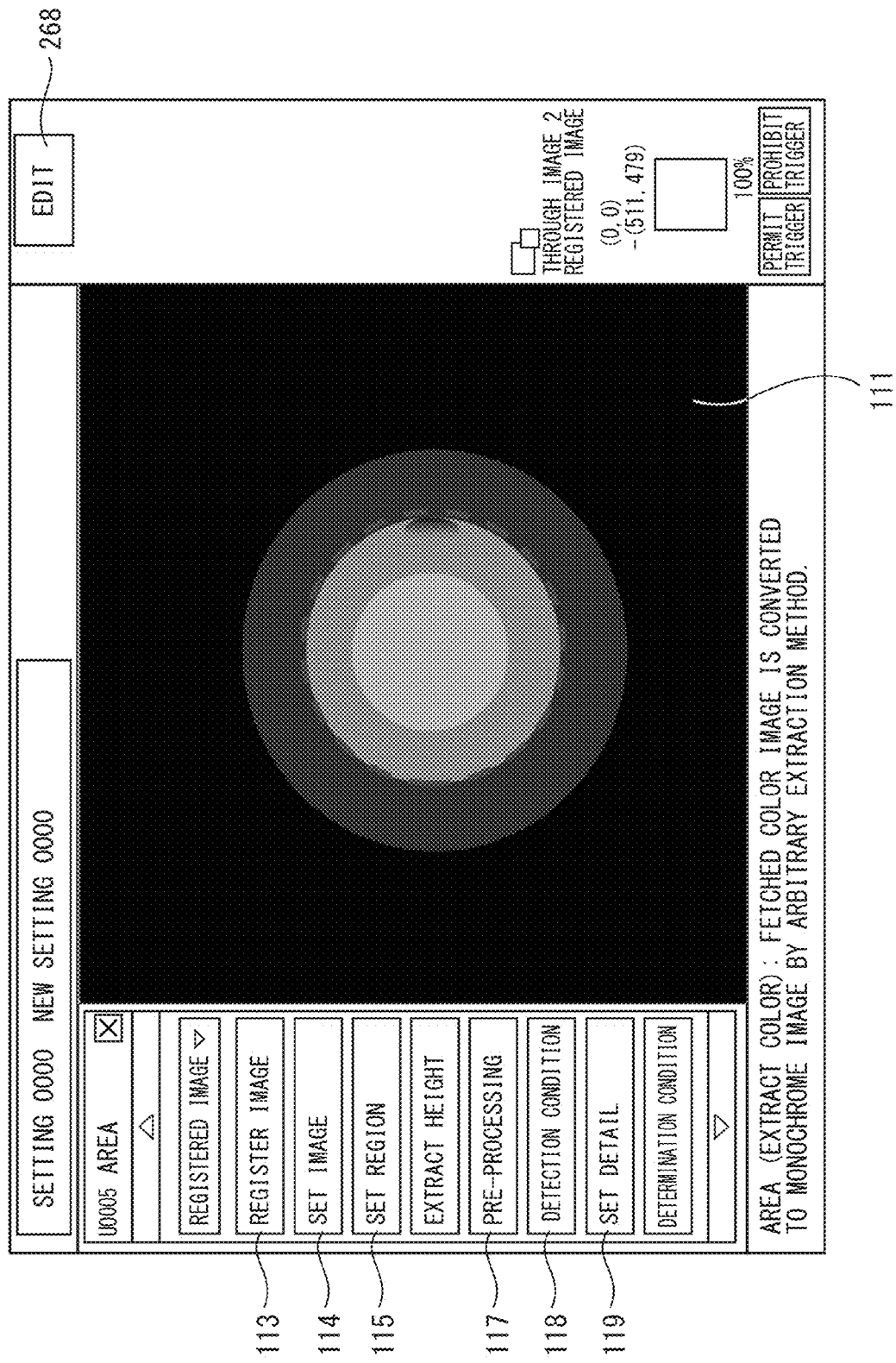
Figure 148:
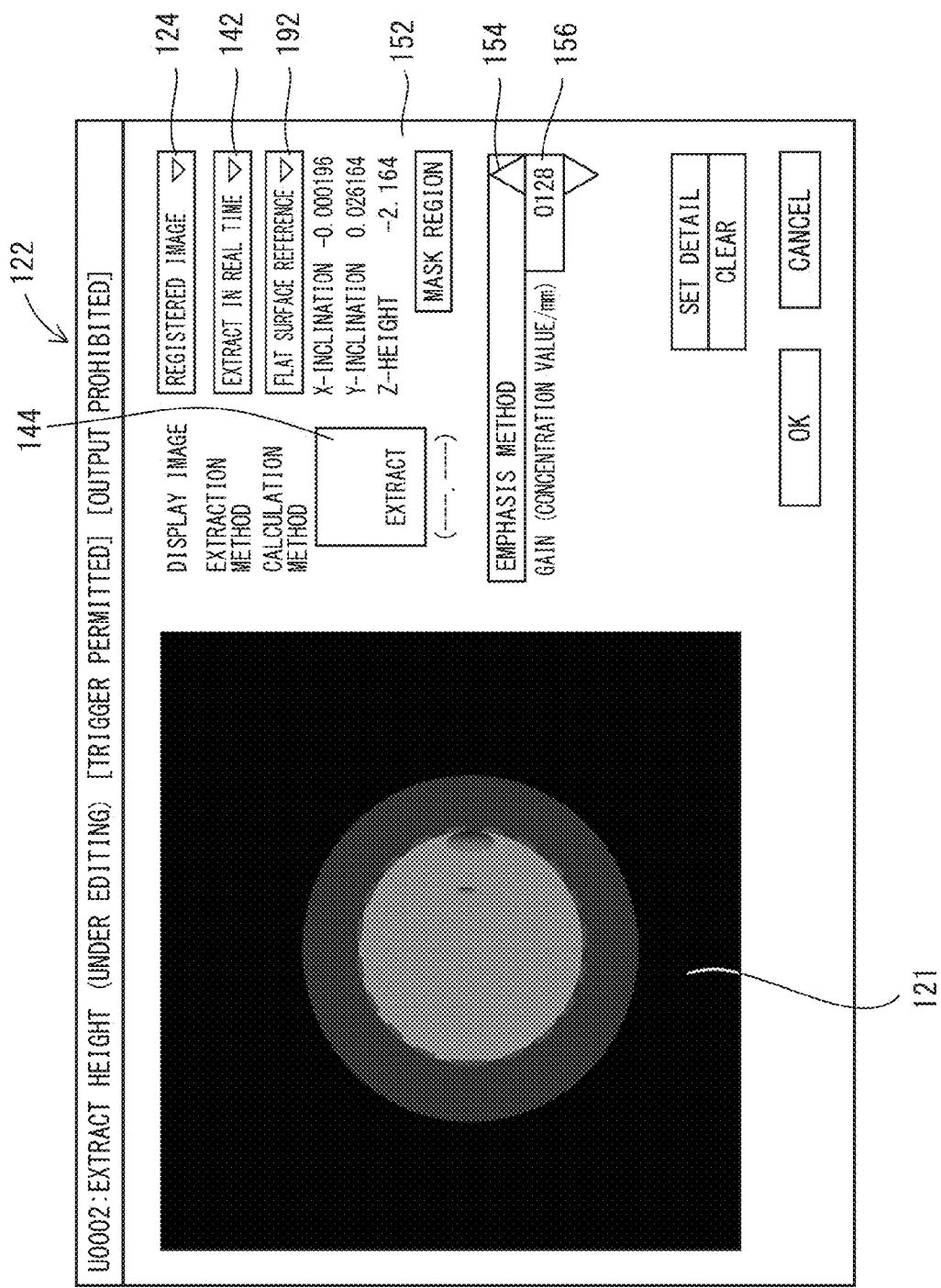
Figure 149:
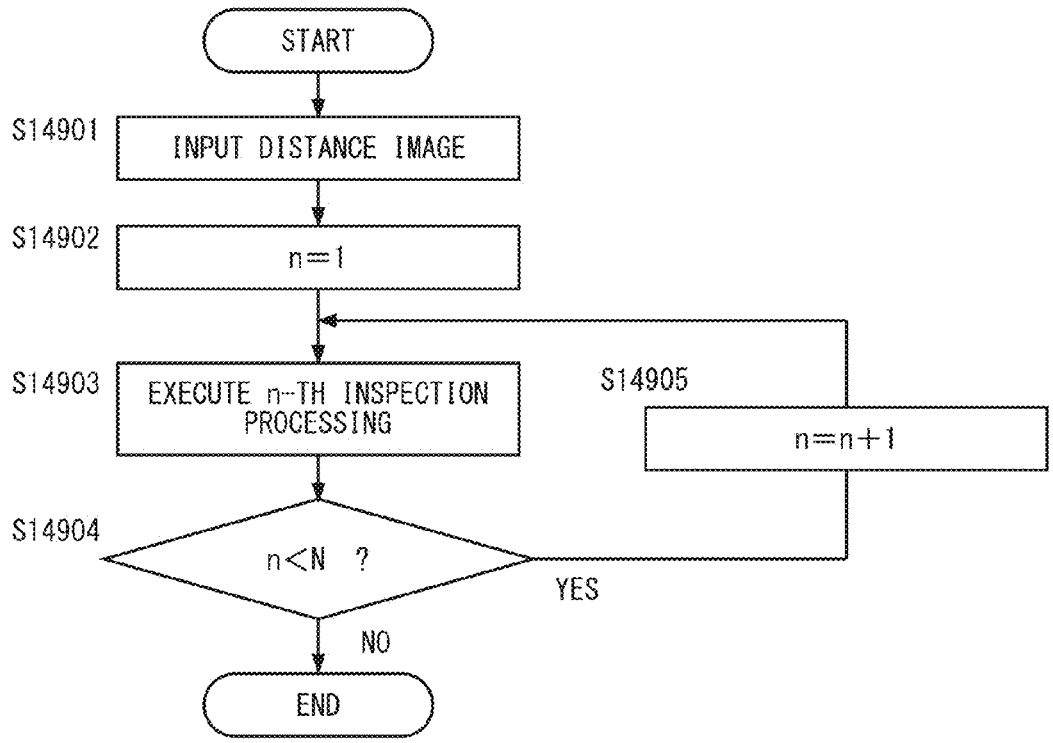
Figure 150:
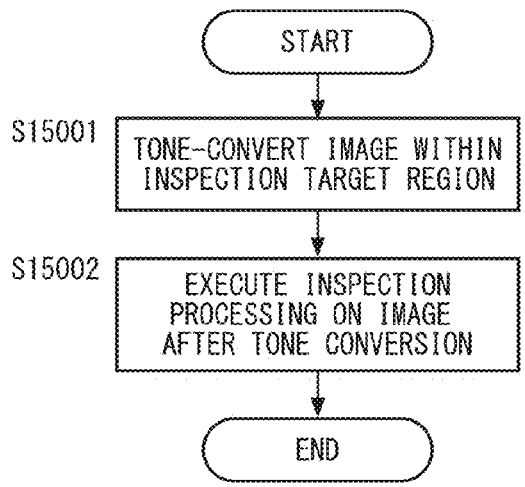
Figure 151:
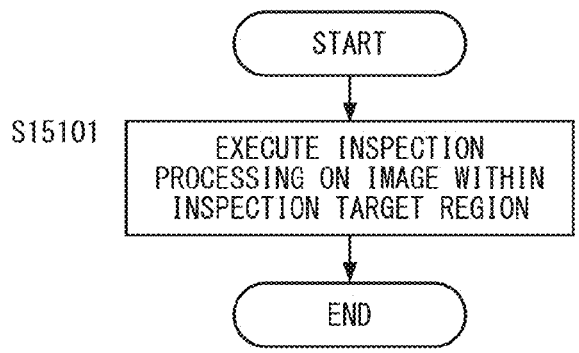
Figure 152:
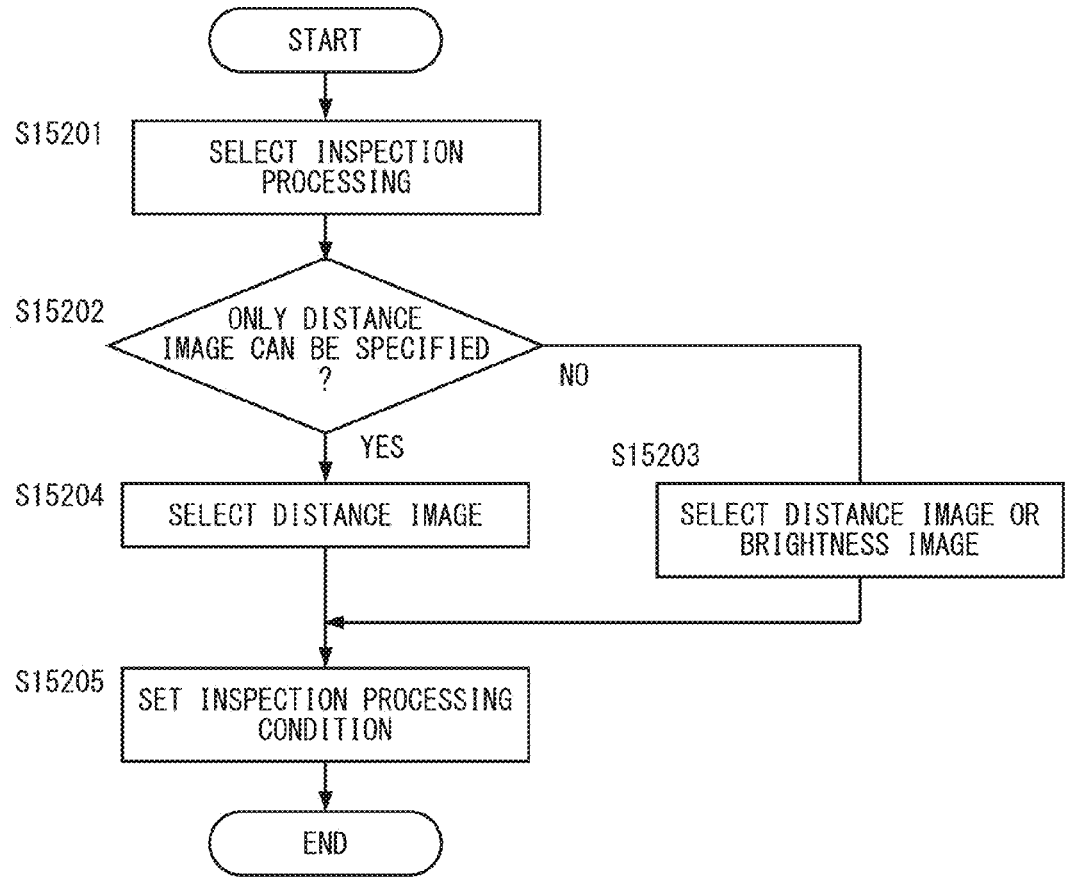
Figure 153:
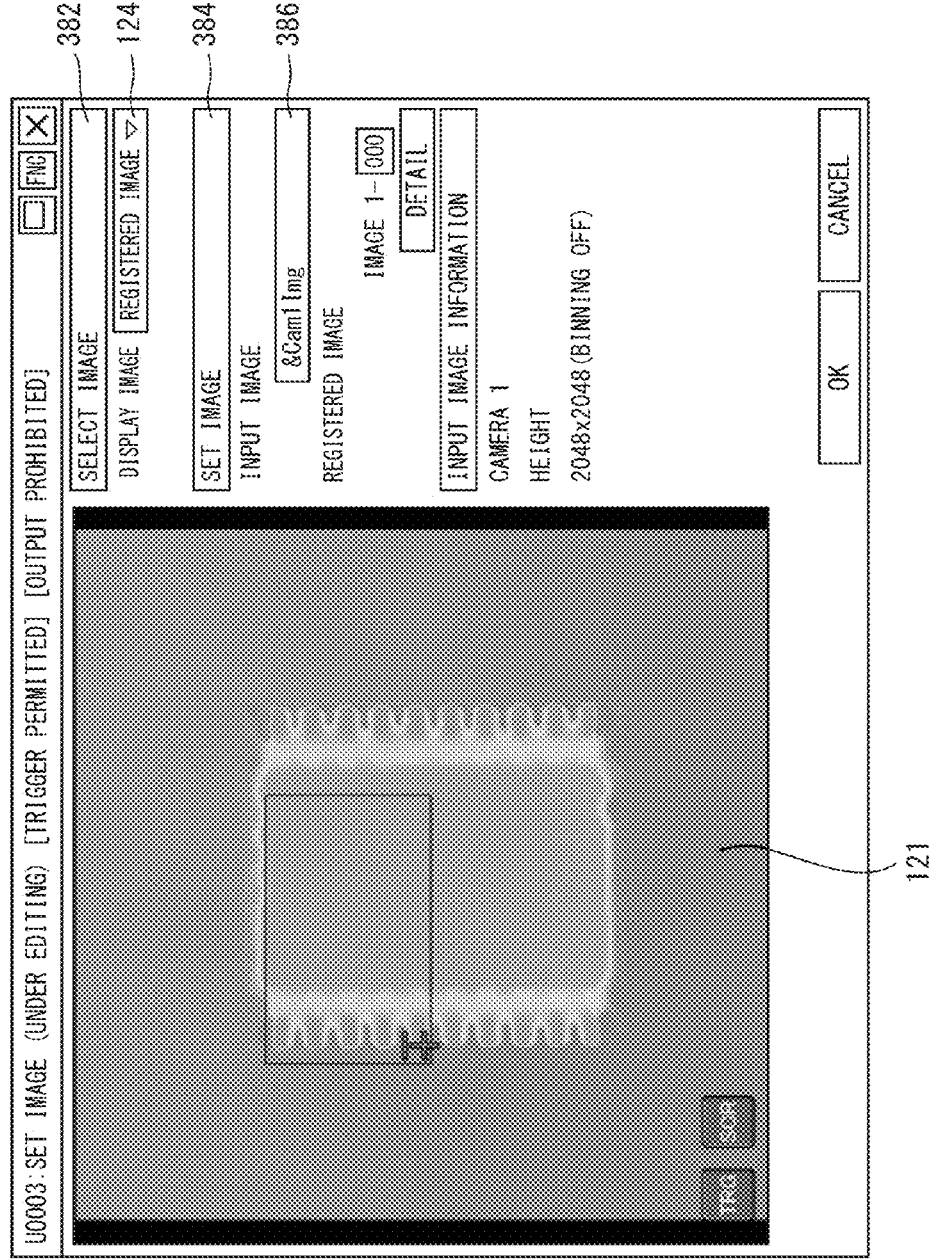
Figure 155:
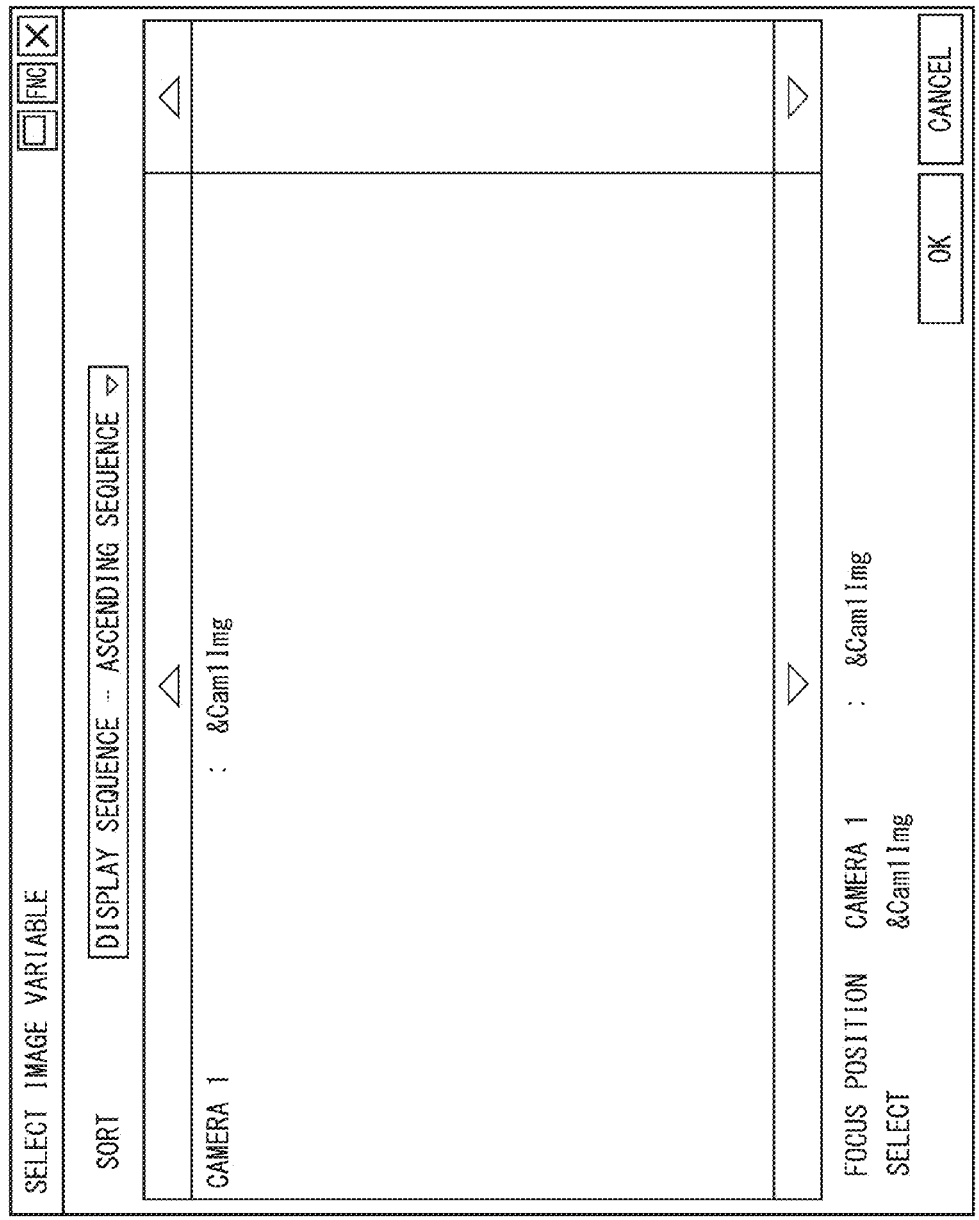
Figure 156:
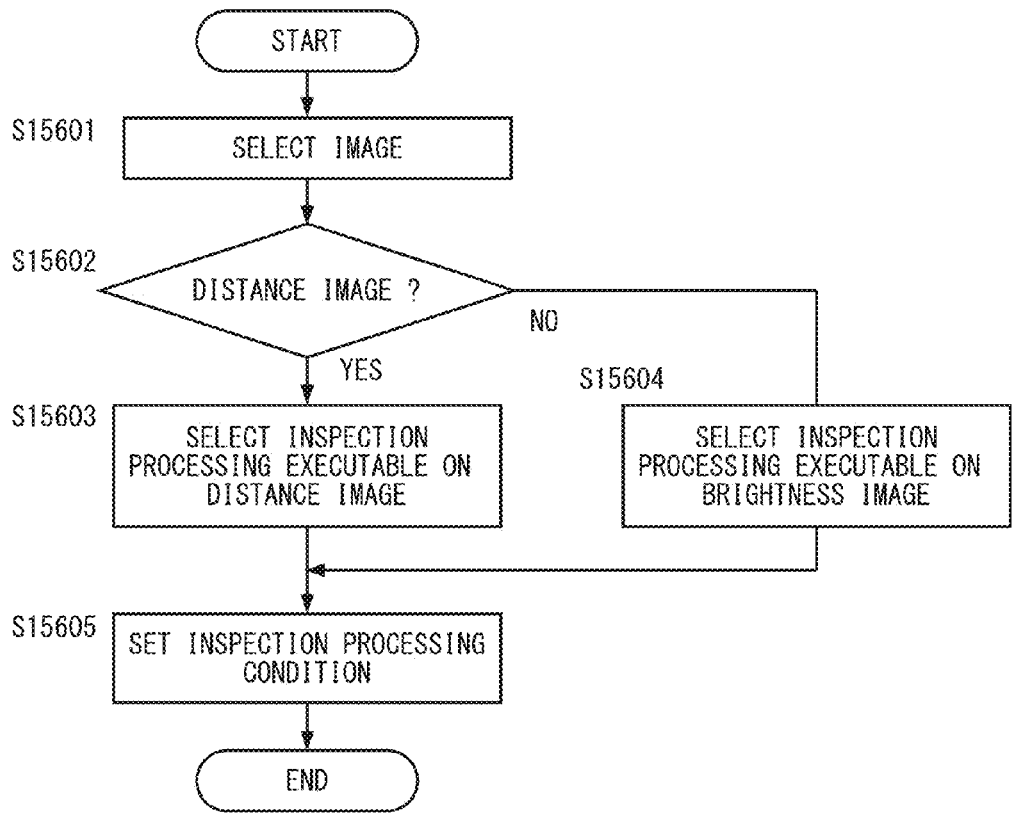
Figure 157:
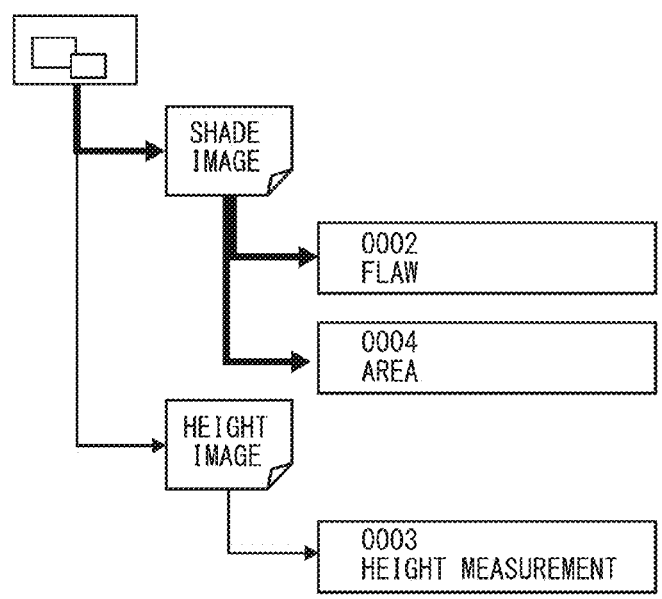
Figure 158:
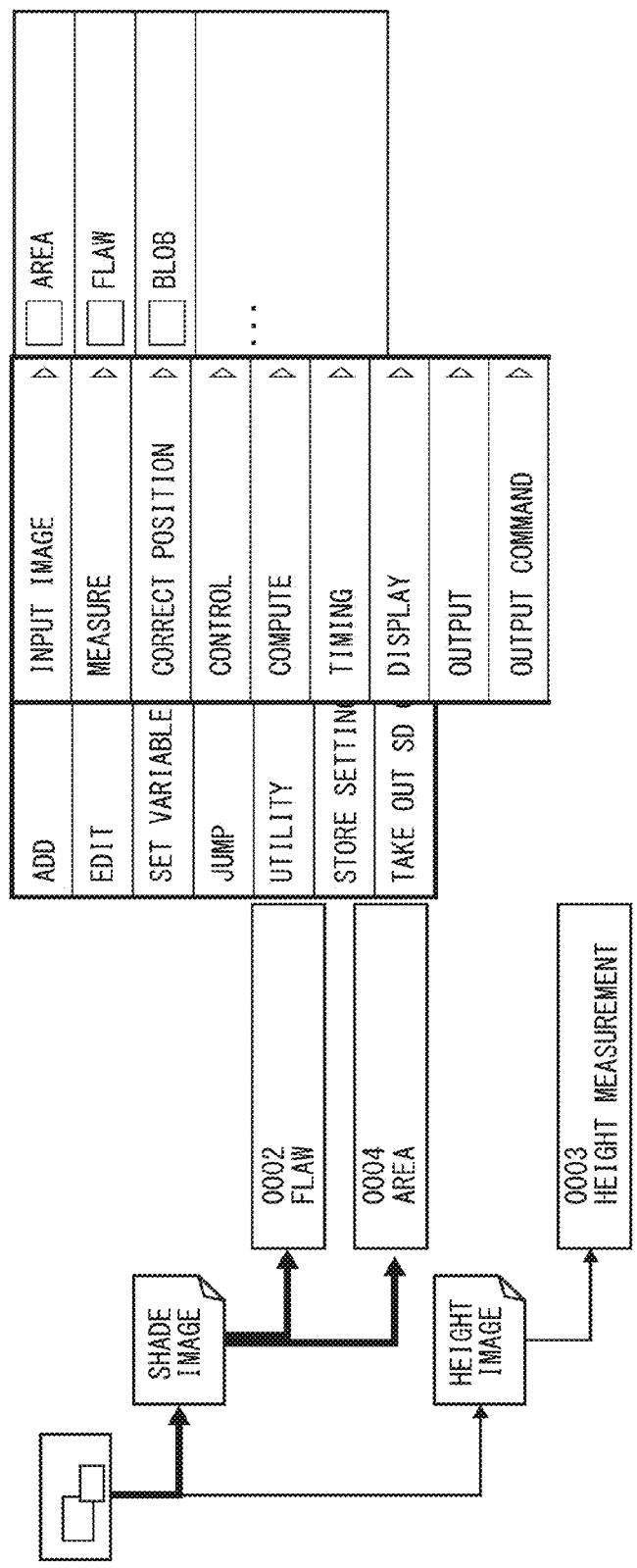
Figure 159:
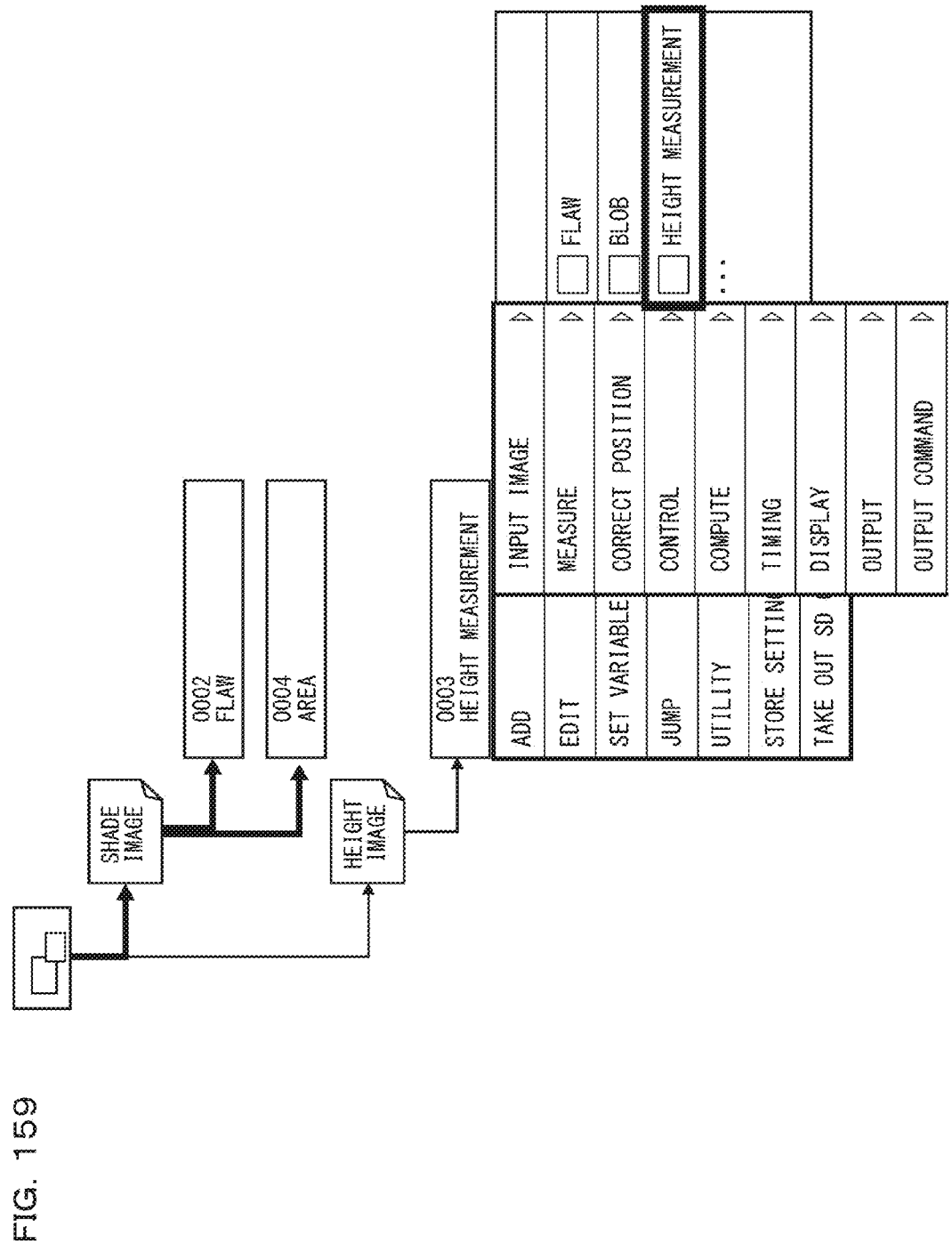
Figure 160:
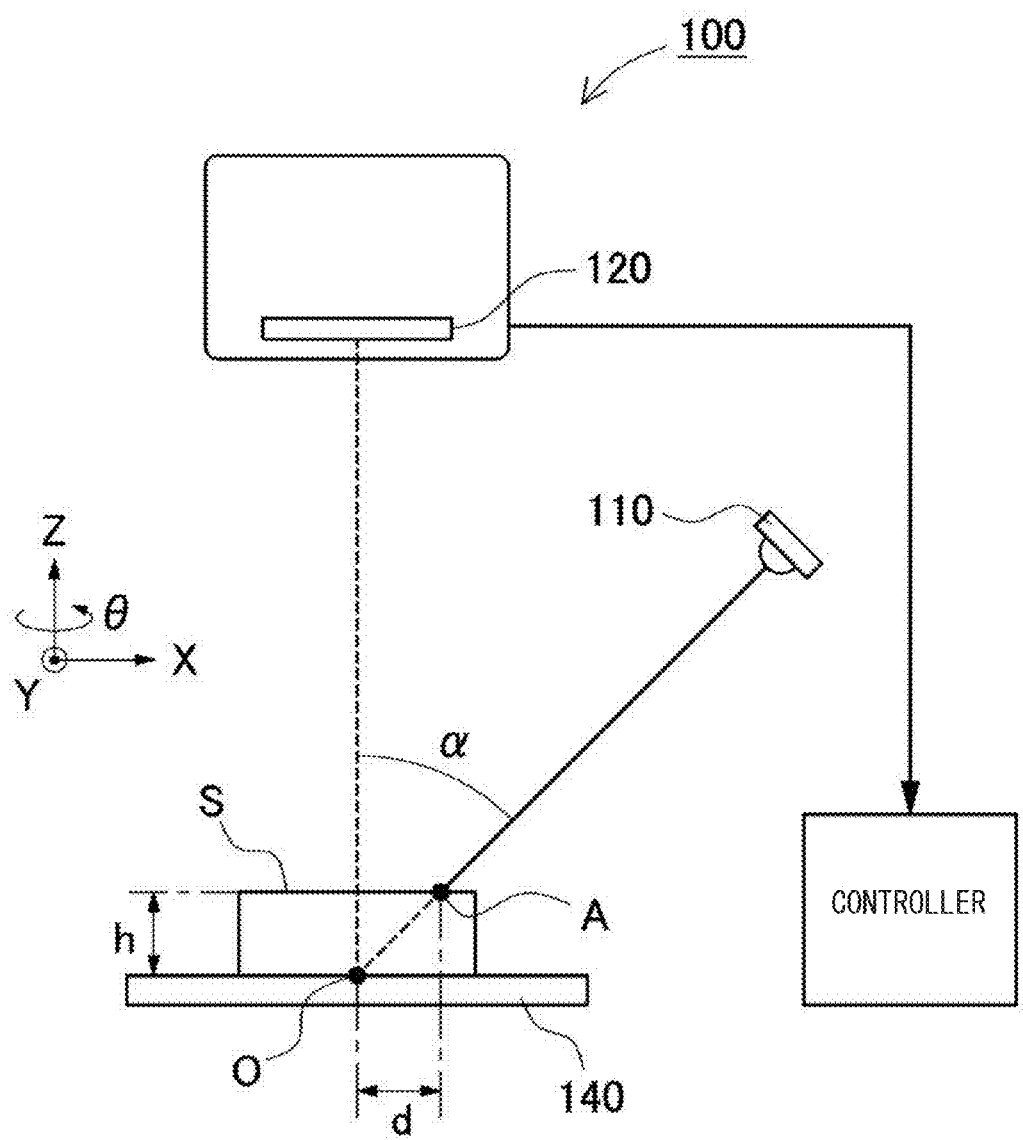

FIG. 132 is a flowchart showing a procedure for the static conversion at the time of operation;

FIG. 133 is a flowchart showing a procedure for an actives conversion at the time of operation;

FIG. 134 is a perspective view showing a workpiece as an inspection target;

FIG. 135 is a schematic view showing a method for previously preparing a plurality of tone conversion parameter sets;

FIG. 136 is a flowchart showing a procedure for the method of FIG. 135;

FIG. 137 is a perspective view showing an example of a workpiece whose height hardly varies;

FIG. 138A is a perspective view showing an example of a workpiece whose height variation is to be detected, and FIG. 138B is an image view of a low-tone distance image obtained by tone-converting a distance image captured in FIG. 138A;

FIG. 139 is a perspective view showing an example of a workpiece for which specification of a reference plane by means of the active conversion (average height reference) is effective;

FIG. 140 is a perspective view showing an example of a workpiece for which specification of a reference plane by means of the active conversion (flat surface reference) is effective;

FIG. 141 is a perspective view showing an example of a workpiece for which specification of a reference plane by means of the active conversion (free curved surface reference) is effective;

FIG. 142 is a flowchart showing a procedure for repeating an adjustment of a tone conversion parameter until an appropriate image is obtained;

FIG. 143 is a flowchart showing a procedure obtained by omitting a determination as to whether or not the image is appropriate in FIG. 142;

FIG. 144 is a flowchart showing a specific procedure for a tone conversion parameter adjustment;

FIG. 145A is an image view showing an external appearance of a workpiece, FIG. 145B is an image view showing a distance image obtained from the workpiece of FIG. 145A, FIG. 145C is an image view showing a state where an inspection target region is set to the distance image of FIG. 145B for height inspection processing, FIG. 145D is an image view showing a state where an inspection target region is set to the distance image of FIG. 145B for image inspection processing, and FIG. 145E is an image view of a low-tone distance image obtained by tone-converting a distance image of FIG. 145D;

FIG. 146 is a flowchart showing a procedure at the time of setting;

FIG. 147 is an image view showing a screen for setting the "Area" processing unit to the workpiece of FIG. 145A;

FIG. 148 is an image view showing a screen for setting a condition of height extraction in FIG. 147;

FIG. 149 is a flowchart showing a procedure at the time of operation;

FIG. 150 is a flowchart showing a procedure in the case of performing tone conversion by inspection processing of FIG. 149;

FIG. 151 is a flowchart showing a procedure in the case of not performing the tone conversion by the inspection processing of FIG. 149;

FIG. 152 is a flowchart showing a procedure for setting an inspection processing condition;

FIG. 153 is an image view showing an image setting screen;

FIG. 154 is an image view showing a state where an image variable selection screen is called on which a brightness image or a distance image is selectable;

FIG. 155 is an image view showing a state where an image variable selection screen is called on which only the distance image is selectable;

FIG. 156 is a flowchart showing a procedure for selecting inspection processing after allowing an image to be selected, and then setting an inspection processing condition;

FIG. 157 is a schematic view showing a state where the brightness image and the distance image are acquired;

FIG. 158 is a schematic view showing an inspection processing tool that is settable in the case of selecting the brightness image in FIG. 157;

FIG. 159 is a schematic view showing an inspection processing tool that is settable in the case of selecting the distance image in FIG. 157; and FIG. 160 is a schematic view showing a situation where a distance image is captured by the triangulation system.

DETAILED DESCRIPTION OF PREFERRED EMBODIMENTS

Hereinafter, embodiments of the present invention will be described based on the drawings. However, the embodiments shown hereinafter are ones illustrating a three-dimensional image processing apparatus, a three-dimensional image processing method, a three-dimensional image processing program, a computer-readable recording medium and a recording device for the purpose of embodying technical ideas of the present invention, and the present invention does not specify, to the following, the three-dimensional image processing apparatus, the three-dimensional image processing method, the three-dimensional image processing program, the computer-readable recording medium and the recording device. Further, the present specification is not to specify members shown in the claims to members of the embodiments. Especially, sizes, materials, shapes, relative disposition and the like of constituent components described in the embodiments are not intended to restrict the scope of the present invention thereto, but are mere explanatory examples. It is to be noted that sizes, positional relations and the like of members shown in each drawing may be exaggerated for clarifying a description. Further, in the following description, the same name and symbol denote the same member or members of the same quality, and a detailed description thereof will be omitted as appropriate. Moreover, each element constituting the present invention may have a mode where a plurality of elements are configured of the same member and the one member may serve as the plurality of elements, or conversely, a function of one member can be shared and realized by a plurality of members.

Further, when a "distance image (height image) is referred to in the present specification, it is used in the meaning of being an image including height information, and for example, it is used in the meaning of including in the distance image a three-dimensional synthesized image obtained by pasting an optical brightness image to the distance image as texture information. Moreover, a displayed form of the distance image in the present specification is not restricted to one displayed in a two-dimensional form, but includes one displayed in a three-dimensional form.

(First Embodiment)

Figure 1:
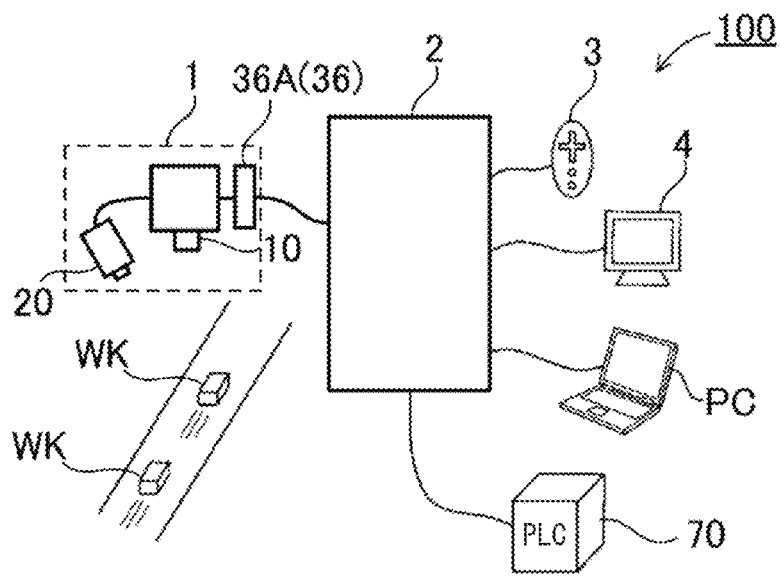
FIG. 1 is a view showing a system constitutional example of a three-dimensional image processing system including an image processing apparatus according to an embodiment of the present invention.

FIG. 1 shows a configuration of a three-dimensional image processing apparatus according to a first embodiment of the present invention. This three-dimensional image processing apparatus 100 is provided with a head section 1 and a controller section 2. The head section 1 is provided with a light projecting part 20 for illuminating an inspection target (workpiece) W, an image capturing part 10 for capturing an image of the workpiece W, and a head-side communication part 36 for connecting with the controller section 2.

On the other hand, the controller section 2 executes measurement processing such as edge detection and area calculation based on the captured image. Moreover, the controller section 2 can be detachably connected with a display part 4 such as a liquid crystal panel, an input part 3 such as a console for a user performing a variety of operations on the display part 4, a PLC (Programmable Logic Controller), and the like.

The above three-dimensional image processing apparatus 100 projects measurement light to the workpiece W by the light projecting part 20 of the head section 1, and reflected light which has been incident and reflected on the workpiece W is captured as a pattern projected image in the image capturing part 10. Further, a distance image is generated based on the pattern projected image, and this distance image is further converted to a low-tone distance image obtained by replacing height information in each pixel with brightness. The controller section 2 executes measurement processing such as edge detection and area calculation based on the converted low-tone distance image.

It is to be noted that the workpiece W as an inspection target is, for example, an article which is sequentially carried on a production line, and is moving or standing still. Further, the moving workpiece includes one that rotates, in addition to one that moves by means of, for example, a conveyor.

(Light Projecting Part 20)

The light projecting part 20 is used as illumination that illuminates the workpiece W for generating the distance image. Therefore, the light projecting part 20 can, for example, be a light projector that projects linear laser light to the workpiece, a pattern projector for projecting a sinusoidal fringe pattern to the workpiece, or the like, in accordance with a light cutting method or a pattern projecting method for acquiring the distance image. Further, in addition to the light projecting part, a general illumination apparatus for performing bright field illumination or dark field illumination may be separately provided. Alternatively, it is also possible to allow the light projecting part 20 to have a function as the general illumination apparatus.

The controller section 2 executes image processing by use of distance image data acquired from the head section 1, and outputs a determination signal as a signal indicating a determination result for the defectiveness/non-defectiveness of the workpiece, or the like, to a control device such as an externally connected PLC 70.

The image capturing part 10 captures an image of the workpiece based on a control signal that is inputted from the PLC 70, such as an image capturing trigger signal that specifies timing for fetching image data from the image capturing part 10.

The display part 4 is a display apparatus for displaying image data obtained by capturing the image of the workpiece and a result of measurement processing by use of the image data. Generally, the user can confirm an operating state of the controller section 2 by viewing the display part 4. The input part 3 is an input apparatus for moving a focused position or selecting a menu item on the display part 4. It should be noted that in the case of using a touch panel for the display part 4, it can serve as both the display part and the input part.

Further, the controller section 2 can also be connected to a personal computer PC for generating a control program of the controller section 2. Moreover, the personal computer PC can be installed with a three-dimensional image processing program for performing a setting concerning three-dimensional image processing, to perform a variety of settings for processing that is performed in the controller section 2. Alternatively, by means of software that operates on this personal computer PC, it is possible to generate a processing sequence program for prescribing a processing sequence for image processing. In the controller section 2, each image processing is sequentially executed along the processing sequence. The personal computer PC and the controller section 2 are connected with each other via a communication network, and the processing sequence program generated on the personal computer PC is transferred to the controller section 2 along with, for example, layout information for prescribing a display mode of the display part 4, or the like. Further, in contrast, the processing sequence program, layout information and the like can be fetched from the controller section 2 and edited on the personal computer PC. It is to be noted that this processing sequence program may be made generable not only on the personal computer PC but also in the controller section 2.

(Modified Example)

It is to be noted that, although the dedicated hardware is constructed as the controller section 2 in the above example, the present invention is not restricted to this configuration. For example, as in a three-dimensional image processing apparatus 100' according to a modified example shown in FIG. 2, one formed by installing a dedicated inspection program or the three-dimensional image processing program into a general-purpose personal computer, a work station or the like can be functioned as a controller 2' and used as connected to the head section 1. This three-dimensional image processing apparatus performs a necessary setting for the image processing and the like by means of the three-dimensional image processing program, and thereafter performs the image processing on the low-tone distance image in accordance with the pattern projected image captured in the head section 1, to perform a necessary inspection.

(Head-Side Communication Part 36)

Figure 2:
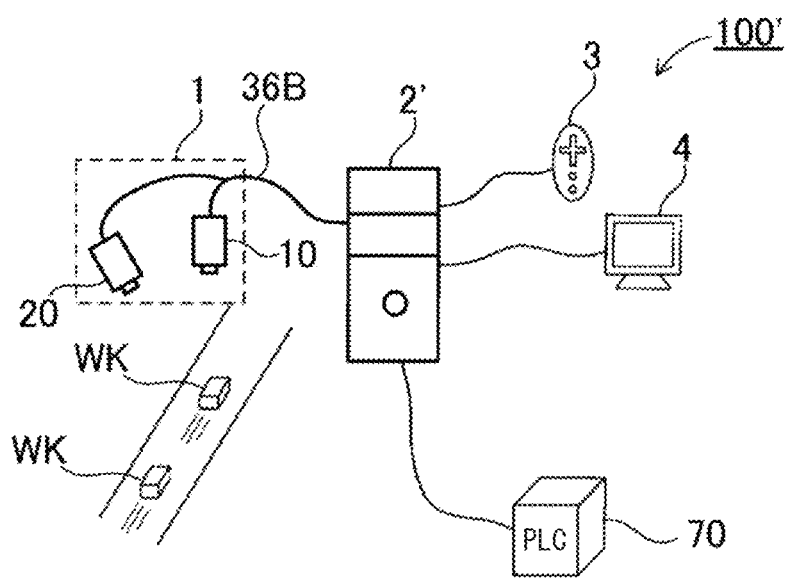
FIG. 2 is a view showing a system constitutional example of a three-dimensional image processing system according to a modified example of the present invention.

Further, in accordance therewith, such an interface as to be connected to either the dedicated controller 2 or the personal computer that functions as the controller section 2 can also be provided as the head-side communication part 36 on the head section 1 side. For example, the head section 1 is provided with, as the head-side communication part 36, a controller connecting interface 36A for connecting with the controller section 2 as shown in FIG. 1, or a PC connecting interface 36B for connecting with the personal computer as shown in FIG. 2. Further, if such an interface is formed in a unit type so as to be replaceable, other configurations of the head section are made common to a certain extent, and the common head section can thereby be connected with either the controller section or the personal computer. Alternatively, there can be provided one head-side communication part provided with an interface connectable with either the dedicated controller 2 or the controller section 2. Further, as such an interface, an existing communication standard such as Ethernet (product name), a USB or RS-232C may be used. Moreover, a prescribed or general-use communication system is not necessarily applied, but a dedicated communication system may be applied.

(PC Connection Mode)

Further, the three-dimensional image processing program can be provided with a PC connection mode for performing a setting in the case of using the personal computer as the controller section 2' connected to the head section 1. That is, by changing settable items and setting contents depending on whether the controller section is dedicated hardware or the personal computer, it is possible in either case to appropriately perform a setting regarding three-dimensional image processing. Further, a viewer program provided with a purpose of confirming an operation of the head section 1 and with a simple measurement function may be installed into the personal computer that functions as the controller section 2' so that an operation and a function of the connected head section can be confirmed.

It is to be noted that the "distance image" obtained by using the image capturing part 10 and the light projecting part 20 shown in FIG. 1 refers to an image in which a shade value of each pixel changes in accordance with a distance from the image capturing part 10, which captures the image of the workpiece W, to the workpiece W. In other words, the "distance image" can be said to be an image in which a shade value is decided based on the distance from the image capturing part 10 to the workpiece W. It can also be said to be a multi-level image having a shade value in accordance with the distance to the workpiece W. It can also be said to be a multi-level image having a shade value in accordance with a height of the workpiece W. Further, it also be said to be a multi-level image obtained by converting the distance from the image capturing part 10 to a shade value with respect to each pixel of a brightness image.

As a technique for generating the distance image, there are roughly divided two systems: one is a passive system (passive measurement system) for generating the distance image by use of an image captured on an illumination condition for obtaining a normal image; and the other one is an active system (active measurement system) for generating the distance image by actively performing irradiation with light for measurement in a height direction. A representative technique of the passive system is a stereo measurement method. In this technique, the distance image can be generated only by preparing two image capturing parts 10 and disposing these two cameras in a predetermined positional relation, and hence it is possible to generate the distance image through use of a general image processing system for generating a brightness image, so as to suppress system construction cost. However, in the stereo measurement method, it is necessary to decide which point in an image obtained by the one camera corresponds to a point in an image obtained by the other camera, thus causing a problem of taking time in so-called corresponding-point decision processing. Further, since a measured position is not for each of all pixels but only for the corresponding point, also in this respect, this method is not appropriate for acceleration of a visual inspection.

On the other hand, representative techniques of the active system are the light cutting method and the pattern projecting method. The light cutting method is that in the foregoing stereo measurement method, the one camera is replaced with a light projector, linear laser light is projected to the workpiece, and the three-dimensional shape of the workpiece is reproduced from a distorted condition of an image of the linear light in accordance with a shape of the object surface. In the light cutting method, deciding the corresponding point is unnecessary, thereby to allow stable measurement. However, since the measurement with respect to only one line is possible per one measurement, when measured values of all the pixels are intended to be obtained, the target or the camera needs scanning. As opposed to this, the pattern projecting method is that a shape, a phase or the like of a predetermined pattern projected to the workpiece is shifted to capture a plurality of images and the captured plurality of images are analyzed, to reproduce the three-dimensional shape of the workpiece. There are several sorts of pattern projecting methods, and representative ones among them include: a phase shift method in which a phase of a sinusoidal wave fringe pattern is shifted to capture a plurality of (at least three or more) images and a phase of a sinusoidal wave with respect to each pixel from the plurality of images is found, to find three-dimensional coordinates on the surface of the workpiece through use of the found phase; a moire topography method in which the three-dimensional shape is reproduced through use of a sort of waving phenomenon of a spatial frequency when two regular patterns are synthesized; a spatial coding method in which a pattern to be projected to the workpiece is itself made different in each image-capturing, for example, each of fringe patterns, whose fringe width with a monochrome duty ratio of 50% gets thinner to one-half, to one-quarter, to one-eighth, . . . of a screen, is sequentially projected, and a pattern projected image with each pattern is shot, to find an absolute phase of the height of the workpiece; and a multi-slit method in which a patterned illumination of a plurality of thin lines (multi-slit) is projected to the workpiece and the pattern is moved at a pitch narrower than a slit cycle, to perform a plurality of times of shooting.

In the three-dimensional image processing apparatus 100 according to the present embodiment, the distance image is generated by the phase shift method and the spatial coding method described above. This allows generation of the distance image without relatively moving the workpiece or the head. The present invention is not restricted to generating the distance image by the phase shift method and the spatial coding method, but the distance image may be generated by another method. Further, in addition to the foregoing methods, any technique may be adopted which can be thought of for generating the distance image, such as an optical radar method (time-of-flight), a focal point method, a confocal method or a white light interferometry.

A disposition layout of the image capturing part 10 and the light projecting part 20 in FIG. 1 is made so as to hold the light projecting part 20 obliquely and the image capturing part 10 vertically such that light is projected to the workpiece W from an oblique direction and reflected light from the workpiece W is received in almost a vertical direction. By making the light projecting direction and the image capturing direction disagree and inclined with each other, it is possible to capture a pattern projected image that has captured a shade caused by the unevenness of the surface shape of the workpiece W.

(Second Embodiment)

Figure 3:
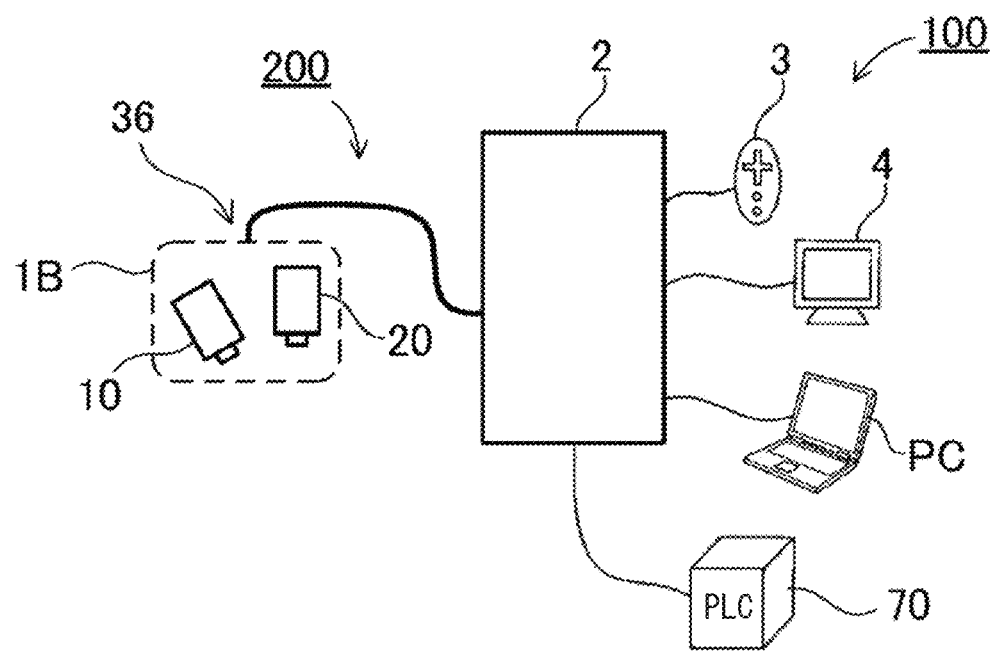
FIG. 3 is a schematic view showing a hardware configuration of a three-dimensional image processing apparatus according to a second embodiment of the present invention.

However, the present invention is not restricted to this disposition example, and for example, as in a three-dimensional image processing apparatus 200 according to a second embodiment shown in FIG. 3, a disposition example may be adopted where the image capturing part 10 side is held obliquely with respect to the workpiece W and the light projecting part 20 side is held vertically. Also by a head section 1B as thus disposed, similarly, it is possible to incline the light projecting direction and the image capturing direction with each other, so as to capture a pattern projected image that has captured the shade of the workpiece W.

(Third Embodiment)

Further, one of or both the light projecting part and the image capturing part can be disposed in a plurality of number. For example, as in a three-dimensional image processing apparatus 300 shown in FIG. 4A as a third embodiment, while the image capturing part 10 is held vertically with respect to the workpiece W, two light projecting parts 20 are disposed on both sides with the image capturing part 10 placed at the center, which can thus be configured as a head section 1C that projects light from right and left. As thus described, by capturing pattern projected images while projecting light in different directions, it is possible to reduce a situation where the height measurement is inaccurate or impossible due to occurrence of the state of being unable to capture some part of the pattern projected image, such as the state of the workpiece W itself hiding a shade pattern by light projection from one direction. Especially when the light projecting part 20 is disposed so as to receive light projection from directions opposed to each other with respect to the workpiece (e.g., right and left directions or front and rear directions), it is possible to significantly reduce the possibility that the image cannot be captured due to being blocked by the workpiece itself.

(Fourth Embodiment)

The configuration has been described in the above example where the one image capturing part and the two light projecting parts are used, but in contrast, there can also be formed a configuration where two image capturing parts and one light projecting part are used. FIG. 4B shows such an example as a three-dimensional image processing apparatus 400 according to a fourth embodiment. In a head section 1D shown in this example, the light projecting part 20 is held vertically with respect to the workpiece W, and the image capturing parts 10 are disposed on the right and left to the light projecting part 20 in the drawing obliquely with respect to the workpiece W. Also in this configuration, it is possible to capture images of the workpiece W in different angles of inclination, so as to suppress a situation where some part of the pattern projected image becomes difficult to capture, as in the third embodiment. Moreover, it is possible by this method to simultaneously capture two pattern projected images by one light projection, so as to also obtain an advantage of being able to reduce the processing time.

On the other hand, there are differences in image-captured region, field of view, and the like between images of the same workpiece captured by the two image capturing parts from different angles, and hence it is necessary to perform an operation for making correspondence between positions of pixels of one image and those of another, which can lead to occurrence of an error. As opposed to this, according to the foregoing third embodiment, with the image capturing part made common, images with the same field of view can be captured when measurement light is projected from either light projecting part, thereby eliminating the need for such an integration operation as above, and it is possible to obtain an advantage of being able to avoid occurrence of an error associated with the integration operation, so as to simplify the processing.

It is to be noted that, although the embodiments have been described above where the image capturing part 10 and the light projecting part 20 are integrally configured in each head section, the present invention is not restricted to this configuration. For example, the head section can be one where the image capturing part 10 and the light projecting part 20 are made up of separate members. Further, it is also possible to provide the image capturing parts and the light projecting parts in number of three or more.

(Block Diagram)

Figure 5:
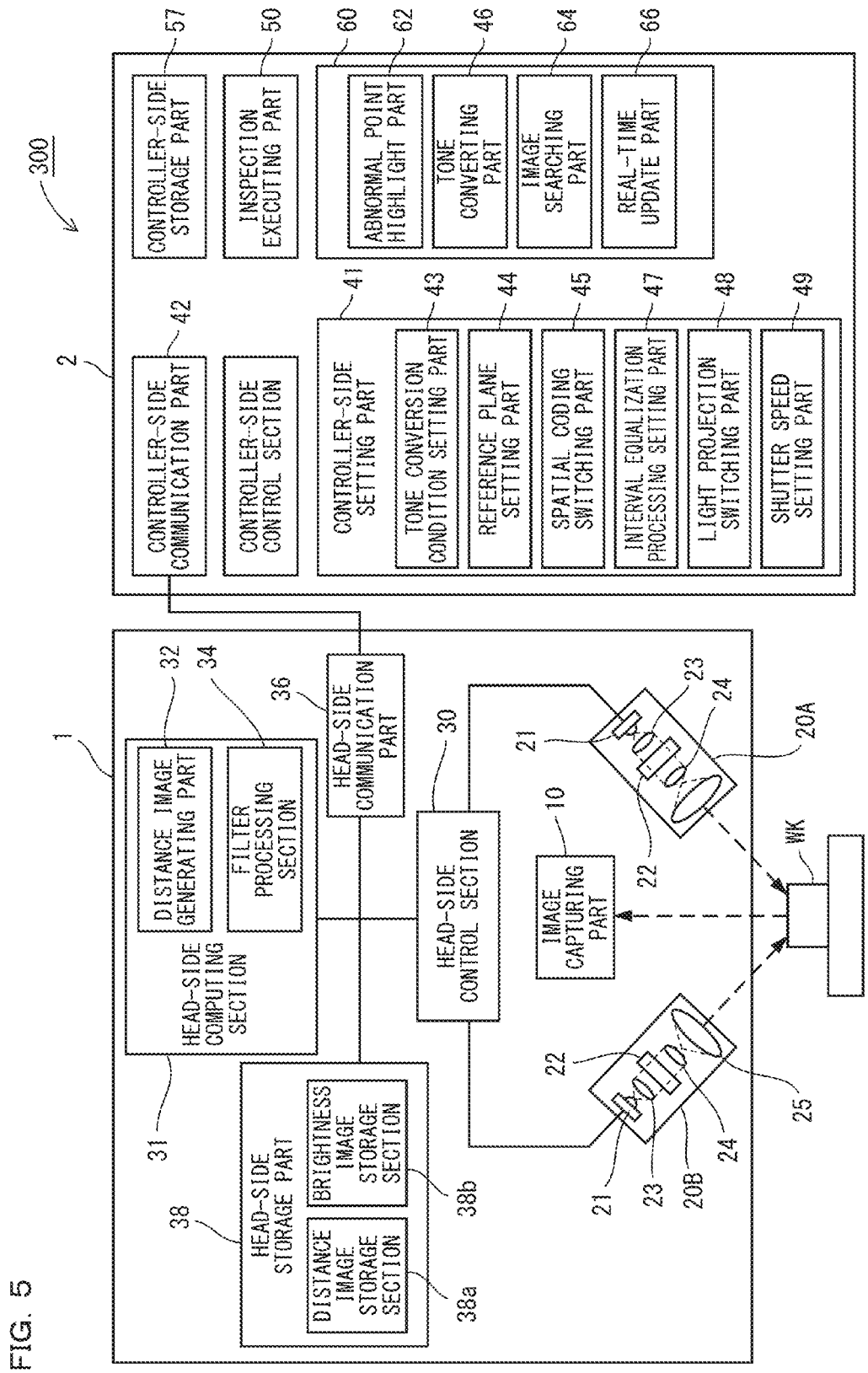
FIG. 5 is a block diagram showing a three-dimensional image processing apparatus according to the third embodiment of the present invention.

Next, FIG. 5 shows a block diagram showing the configuration of the three-dimensional image processing apparatus 300 according to the third embodiment of the present invention. As shown in FIG. 5, the three-dimensional image processing apparatus 300 is provided with the head section 1 and the controller section 2.

(Head section 1)

This head section 1 is provided with the light projecting part 20, the image capturing part 10, a head-side control section 30, a head-side computing section 31, a storage part 38, the head-side communication part 36, and the like. The light projecting part 20 includes a measurement light source 21, a pattern generating section 22 and a plurality of lenses 23, 24, 25. The image capturing part 10 includes a camera and a plurality of lenses, though not shown.

(Light Projecting Part 20)

The light projecting part 20 is a member for projecting incident light as structured illumination of a predetermined projection pattern from the oblique direction with respect to an optical axis of the image capturing part. A projector can be used as this light projecting part 20, and it includes a lens as an optical member, the pattern generating section 22, and the like. The light projecting part 20 is disposed obliquely above the position of the workpiece that stops or moves. It is to be noted that the head section 1 can include a plurality of light projecting parts 20. In the example of FIG. 5, the head section 1 includes two light projecting parts 20. Here, there are disposed a first projector 20A capable of irradiating the workpiece with measuring illumination light from a first direction (right side in FIG. 5) and a second projector 20B capable of irradiating the workpiece with measuring illumination light from a second direction (left side in FIG. 5). The first projector 20A and the second projector 20B are disposed symmetrically, with the optical axis of the image capturing part 10 placed therebetween. Measurement light is projected to the workpiece alternately from the first projector 20A and the second projector 20B, and pattern images of the respective reflected light are captured in the image capturing part 10.

As the measurement light source 21 of each of the first projector 20A and the second projector 20B, for example, a halogen lamp that emits white light, a white LED (light emitting diode) that emits white light, or the like can be used. Measurement light emitted from the measurement light source 21 is appropriately collected by the lens, and is then incident on the pattern generating section 22.

Further, on top of the light projecting part that emits the measurement light for acquiring the pattern projected image to generate the distance image, an observing illumination light source for capturing a normal optical image (brightness image) can also be provided. As the observing illumination light source, in addition to the LED, a semiconductor laser (LD), a halogen lamp, an HID (High Intensity Discharge), or the like can be used. Especially in the case of using an element capable of capturing a color image as the image capturing element, a white light source can be used as the observing illumination light source.

The measurement light emitted from the measurement light source 21 is appropriately collected by the lens 113, and is then incident on the pattern generating section 22. The pattern generating section 22 can realize illumination of an arbitrary pattern. For example, it can invert the pattern in accordance with colors of the workpiece and the background, such as black on a white background or white on a black background, so as to express an appropriate pattern easy to see or easy to measure. As such a pattern generating section 22, for example, a DMD (Digital Micro-mirror Device) can be used. The DMD can express an arbitrary pattern by switching on/off a minute mirror with respect to each pixel. This allows easy irradiation with the pattern with black and white inverted. Using the DMD as the pattern generating section 22 allows easy generation of the arbitrary pattern and eliminates the need for preparing a mechanical pattern mask and performing an operation for replacing the mask, thus leading to an advantage of being able to reduce the size of the apparatus and perform rapid measurement. Further, since the pattern generating section 22 configured with the DMD can be used in a similar manner to normal illumination by performing irradiation with a full-illumination pattern being turned on for all the pixels, it can also be used for capturing the brightness image. Moreover, the pattern generating section 22 can also be a LCD (Liquid Crystal Display), a LCOS (Liquid Crystal on Silicon: reflective liquid crystal display element), or a mask. The measurement light having been incident on the pattern generating section 22 is converted to light with a previously set pattern and a previously set intensity (brightness), and then emitted. The measurement light emitted from the pattern generating section 22 is converted to light having a larger diameter than an observable and measurable field of view of the image capturing part 10 by means of the plurality of lenses, and thereafter the workpiece is irradiated with the converted light.

(Image Capturing Part 10)

The image capturing part 10 is provided with a camera for acquiring reflected light that is projected by the light projecting part 20 and reflected on the workpiece WK, to capture a plurality of pattern projected images. As such a camera, a CCD, a CMOS or the like can be used. In this example, there is used a monochrome CCD camera that can obtain a high resolution. In addition, it goes without saying that a camera capable of capturing a color image can also be used. Further, the image capturing part can also capture a normal brightness image in addition to the pattern projected image.

The head-side control section 30 is a member for controlling the image capturing part 10, as well as the first projector 20A and the second projector 20B which are the light projecting part 20. The head-side control section 30, for example, creates a light projection pattern for the light projecting part 20 projecting the measurement light to the workpiece to obtain the pattern projected image. The head-side control section 30 makes the image capturing part 10 capture a phase shift image while making the light projecting part 20 project a projection pattern for phase shifting, and further, makes the image capturing part 10 capture a spatial code image while making the light projecting part 20 project a projection pattern for spatial coding. In such a manner, the head-side control section 30 functions as a light projection controlling part for controlling the light projecting part such that the phase shift image and the spatial code image can be captured in the image capturing part 10.

The head-side computing section 31 includes a filter processing section 34 and a distance image generating part 32. The distance image generating part 32 generates the distance image based on the plurality of pattern projected images captured in the image capturing part 10.

A head-side storage part 38 is a member for holding a variety of settings, images and the like, and a storage element such as a semiconductor memory or a hard disk can be used. For example, it includes a brightness image storage section 38b for holding the pattern projected image captured in the image capturing part 10, and a distance image storage section 38a for holding the distance image generated in the distance image generating part 32.

The head-side communication part 36 is a member for communicating with the controller section 2. Here, it is connected with a controller-side communication part 42 of the controller section 2. For example, the distance image generated in the distance image generating part 32 is transmitted to the controller section 2.

(Distance Image Generating Part 32)

The distance image generating part 32 is a part for generating the distance image where the shade value of each pixel changes in accordance with the distance from the image capturing part 10, which captures the image of the workpiece WK, to the workpiece WK. For example, in the case of generating the distance image by the phase shift method, the head-side control section 30 controls the light projecting part 20 so as to project a sinusoidal fringe pattern to the workpiece while shifting its phase, and the head-side control section 30 controls the image capturing part 10 so as to capture a plurality of images with the phase of the sinusoidal fringe pattern shifted in accordance with the above shifting. Then, the head-side control section 30 finds a sinusoidal phase with respect to each pixel from the plurality of images, to generate the distance image through use of the found phases.

Further, in the case of generating the distance image by use of the spatial coding method, a space that is irradiated with light is divided into a large number of small spaces each having a substantially fan-like cross section, and these small spaces are provided with a series of spatial code numbers. For this reason, even when the height of the workpiece is large, in other words, even when the height difference is large, the height can be computed from the spatial code numbers so long as the workpiece is within the space irradiated with light. Hence it is possible to measure the whole shape of even the workpiece having a large height.

Generating the distance image on the head section side and transmitting it to the controller section in such a manner can lead to reduction in amount of data to be transmitted from the head section to the controller section, thereby avoiding a delay in the processing which can occur due to transmission of a large amount of data.

It is to be noted that, although the distance image generating processing is to be performed on the head section 1 side in the present embodiment, for example, the distance image generating processing can be performed on the controller section 2 side. Further, the tone conversion from the distance image to the low-tone distance image can be performed not only in the controller section but also on the head section side. In this case, the head-side computing section 31 realizes a function of the tone conversion part.

(Controller Section 2)

Further, the controller section 2 is provided with the controller-side communication part 42, a controller-side control section, a controller-side computing section, a controller-side storage part, an inspection executing part 50, and a controller-side setting part 41. The controller-side communication part 42 is connected with the head-side communication part 36 of the head section 1 and performs data communication. The controller-side control section is a member for controlling each member. The controller-side computing section realizes a function of an image processing section 60. The image processing section 60 realizes functions of an image searching part 64, the tone converting part 46, and the like.

(Tone Converting Part)

Based on the distance image, the tone converting part 46 tone-converts the high-tone distance image to the low-tone distance image (its procedure will be detailed later). Herewith, the distance image having the height information generated in the head section is expressed as a two-dimensional shade image that can also be handled by existing equipment, and this can contribute to the measurement processing and the inspection processing. Further, there can also be obtained an advantage of being able to disperse a load by making the distance image generating processing and the tone conversion processing shared by the head section and the controller section. It is to be noted that in addition to the distance image, the low-tone distance image may also be generated on the head section side. Such processing can be performed in the head-side computing section. This can further alleviate the load on the controller section side, to allow an efficient operation.

Further, the tone converting part does not tone-convert the whole of the distance image, but preferably selects only a necessary portion thereof and tone-converts it. Specifically, it tone-converts only a portion corresponding to an inspection target region previously set by an inspection target region setting part (detailed later). In such a manner, the processing for converting the multi-tone distance image to the low-tone distance image is restricted only to the inspection target region, thereby allowing alleviation of the load necessary for the tone conversion. Moreover, this also contributes to reduction in processing time. That is, improving the reduction in processing time can lead to preferable use in an application with limited processing time, such as an inspection in a FA application, thereby to realize real-time processing.

The controller-side storage part is a member for holding a variety of settings and images, and the semiconductor storage element, the hard disk, or the like can be used.

The controller-side setting part 41 is a member for performing a variety of settings to the controller section, and accepts an operation from the user via the input part 3 such as a console connected to the controller section, to instruct a necessary condition and the like to the controller side. For example, it realizes functions of a tone conversion condition setting part 43, a reference plane setting part 44, a spatial coding switching part 45, an interval equalization processing setting part 47, a light projection switching part 48, a shutter speed setting part 49, and the like.

Based on the distance image received in the controller-side communication part 42, the reference plane setting part 44 sets a reference plane for performing the tone conversion to convert the distance image to the two-dimensional low-tone distance image as a tone conversion parameter for constituting a tone conversion condition at the time of performing the tone conversion. Taking the reference plane set in the reference plane setting part 44 as a reference, the tone converting part 46 tone-converts the distance image to a low-tone distance image that has a lower number of tones than the number of tones of the distance image and is obtained by replacing the height information with the shade value of the image.

The inspection executing part 50 executes predetermined inspection processing on the low-tone distance image tone-converted in the tone converting part 46.

(Hardware Configuration)

Figure 6:
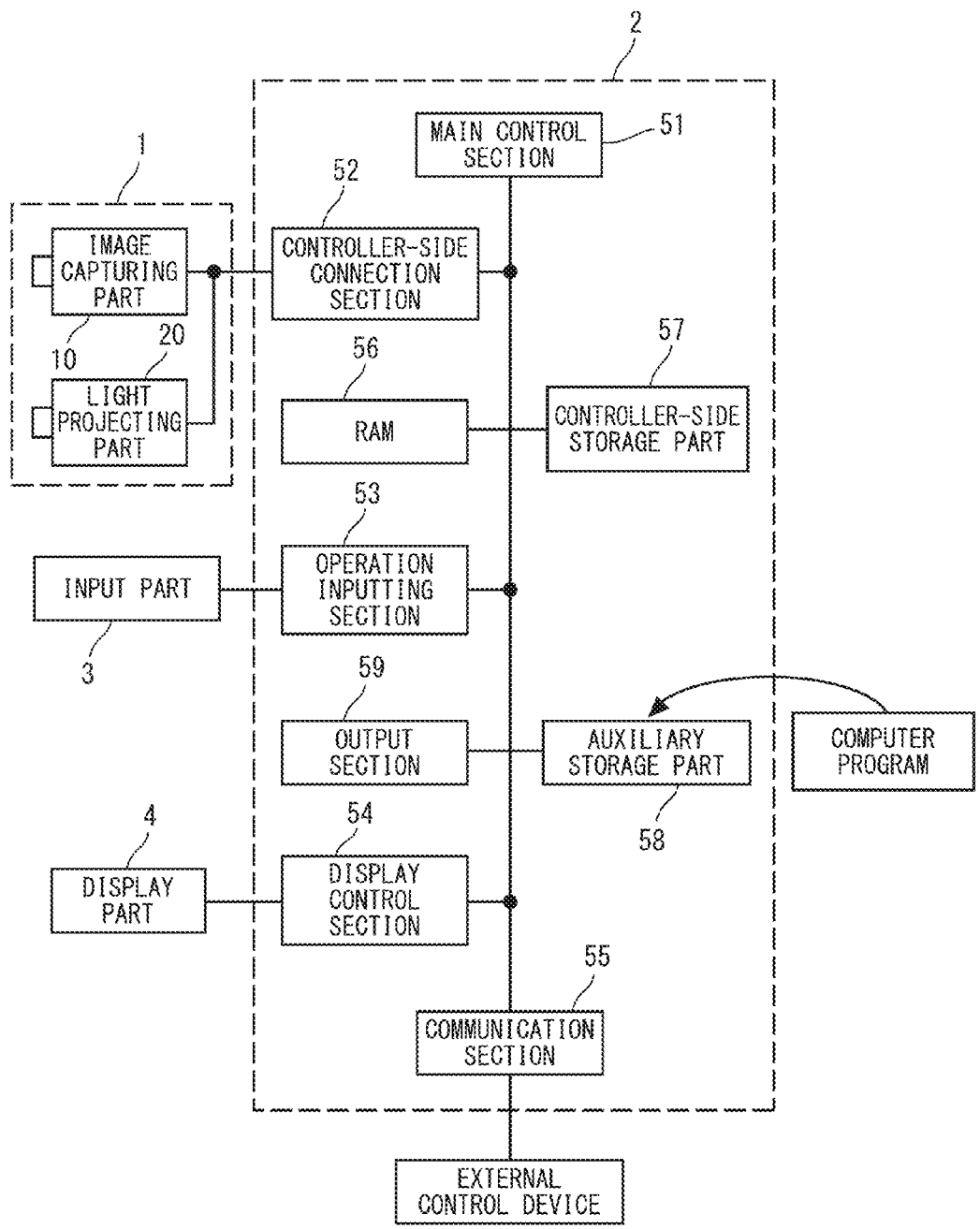
FIG. 6 is a block diagram showing a controller section of FIG. 5.

Next, a constitutional example of hardware of the controller section 2 is shown in a block diagram of FIG. 6. The controller section 2 shown in this drawing has a main control section 51 for performing control of each section of the hardware while performing numerical value calculation and information processing based on a variety of programs. The main control section 51, for example, has a CPU as a central processing part, a working memory such as a RAM that functions as a working area for the main control section 51 at the time of executing a variety of programs, a program memory such as a ROM, a flash ROM or an EEPROM where a start-up program, an initialization program and the like are stored.

Further, the controller section 2 is provided with: a controller-side connection section 52 for connecting with the head section 1 that includes the image capturing part 10, the light projecting part 20 and the like, controlling the light projecting part 20 so as to project light with a sinusoidal fringe pattern to the workpiece while shifting its phase, and fetching image data obtained by the image capturing in the image capturing part 10; an operation inputting section 53 which is inputted with an operation signal from the input part 3; a display controlling section 54 configured of a display DSP that allows the display part 4, such as the liquid crystal panel, to display an image, and the like; a communication section 55 communicably connected to the external PLC 70, the personal computer PC and the like; a RAM 56 for holding temporary data; a controller-side storage part 57 for storing a setting content; an auxiliary storage part 58 for holding data set by means of the three-dimensional image processing program installed in the personal computer PC; an image processing section 60 configured of a computing DSP that executes the measurement processing such as the edge detection and the area calculation, and the like; an output section 59 for outputting a result of performing a predetermined inspection based on a result of the processing in the image processing section 60, or the like; and some other section. Each of the above hardware is communicably connected via an electric communication path (wiring) such as a bus.

In the program memory in the main control section 51, there is stored a control program for controlling each of the controller-side connection section 52, the operation inputting section 53, the display controlling section 54, the communication section 55 and the image processing section 60 by a command of the CPU, or the like. Further, the foregoing processing sequence program, namely the processing sequence program generated in the personal computer PC and transmitted from the personal computer PC, is stored into the program memory.

The communication section 55 functions as an interface (I/F) that receives an image capturing trigger signal from the PLC 70 at the time when a trigger is inputted in a sensor (photoelectronic sensor, etc.) connected to the external PLC 70. Further, it also functions as an interface (I/F) that receives the three-dimensional image processing program transmitted from the personal computer PC, layout information that prescribes a display mode of the display part 4, and the like.

When the CPU of the main control section 51 receives the image capturing trigger signal from the PLC 70 via the communication section 55, it transmits an image capturing command to the controller-side connection section 52. Further, based on the processing sequence program, it transmits to the image processing section 60 a command to instruct image processing to be executed. It should be noted that such a configuration can be formed where, as the apparatus for generating the image capturing trigger signal, not the PLC 70 but a trigger inputting sensor such as a photoelectronic sensor may be directly connected to the communication section 55.

The operation inputting section 53 functions as an interface (I/F) for receiving an operation signal from the input part 3 based on a user's operation. A content of the user's operation by use of the input part 3 is displayed on the display part 4. For example, in the case of using the console as the input part 3, each component such as a cross key for vertically and horizontally moving a cursor that is displayed on the display part 4, a decision button or a cancel button can be disposed. By operating each of these components, the user can, on the display part 4, create a flowchart that prescribes a processing sequence for image processing, edit a parameter value of each image processing, set a reference region, and edit a reference registered image.

The controller-side connection section 52 fetches image data. Specifically, for example, when receiving the image capturing command for the image capturing part 10 from the CPU, the controller-side connection section 52 transmits an image data fetching signal to the image capturing part 10. Then, after image capturing has been performed in the image capturing part 10, it fetches image data obtained by the image capturing. The fetched image data is once stored in a buffer (cache), and substituted in a previously prepared image variable. It should be noted that, differently from a normal variable dealing with a numerical value, the "image variable" refers to a variable allocated as an input image of a corresponding image processing unit, to be set as a reference destination of measurement processing or image display.

The image processing section 60 executes the measurement processing on the image data. Specifically, first, the controller-side connection section 52 reads the image data from a frame buffer while referring to the foregoing image variable, and internally transmits it to a memory in the image processing section 60. Then, the image processing section 60 reads the image data stored in the memory and executes the measurement processing. Further, the image processing section 60 includes the tone converting part 46, an abnormal point highlight part 62, the image searching part 64, and the like.

Based on a display command transmitted from the CPU, the display controlling section 54 transmits to the display part 4 a control signal for displaying a predetermined image (video). For example, it transmits the control signal to the display part 4 in order to display image data before or after the measurement processing. Further, the display controlling section 54 also transmits a control signal for allowing the content of the user's operation by use of the input part 3 to be displayed on the display part 4.

The head section 1 and the controller section 2 made up of such hardware as above are configured to be able to realize each part or function of FIG. 5 by way of a variety of programs in forms of software. In this example, there is adopted the mode of installing the three-dimensional image processing program into the computer of FIG. 1 to perform a setting necessary for the three-dimensional image processing.

(Tone Conversion)

The above three-dimensional image processing apparatus acquires a distance image of the workpiece, performs image processing on this distance image, and inspects its result. The three-dimensional image processing apparatus according to the present embodiment can execute two sorts of inspections: image inspection processing for performing computing by use of information of an area, an edge or the like by means of existing hardware, on top of height inspection processing for performing computing by use of height information as it is as a pixel value of the distance image. Here, for sustaining the accuracy in height inspection processing, it is necessary to generate a multi-tone distance image. On the other hand, the image inspection processing cannot be executed on such a multi-tone distance image by means of the existing hardware. Therefore, in order to perform the image inspection processing by use of the existing hardware, the multi-tone distance image is subjected to the tone conversion, to generate a low-tone distance image.

However, when height information of the multi-tone distance image is converted as it is to the low-tone distance image, the accuracy of the height information is lost, which is problematic. Many of general images used in the FA application or the like are images each expressing a shade value by 8 tones in monochrome. As opposed to this, the high-tone image such as a 16-tone image is used as the distance image. For this reason, at the time of tone-converting the multi-tone distance image to the low-tone distance image, a considerable amount of height information is lost, which affects the accuracy in inspection. Having said that, increasing the number of tones of the image handled in the existing image processing for enhancing the accuracy results in a steep rise of introduction cost and an increased processing load, making its use more difficult.

Accordingly, at the time of the tone conversion as thus described, it is necessary to set such a condition for the tone conversion as to sustain necessary height information. Hereinafter, a method and a sequence therefor will be described in detail.

(Height Inspection or Image Inspection)

Figure 7:
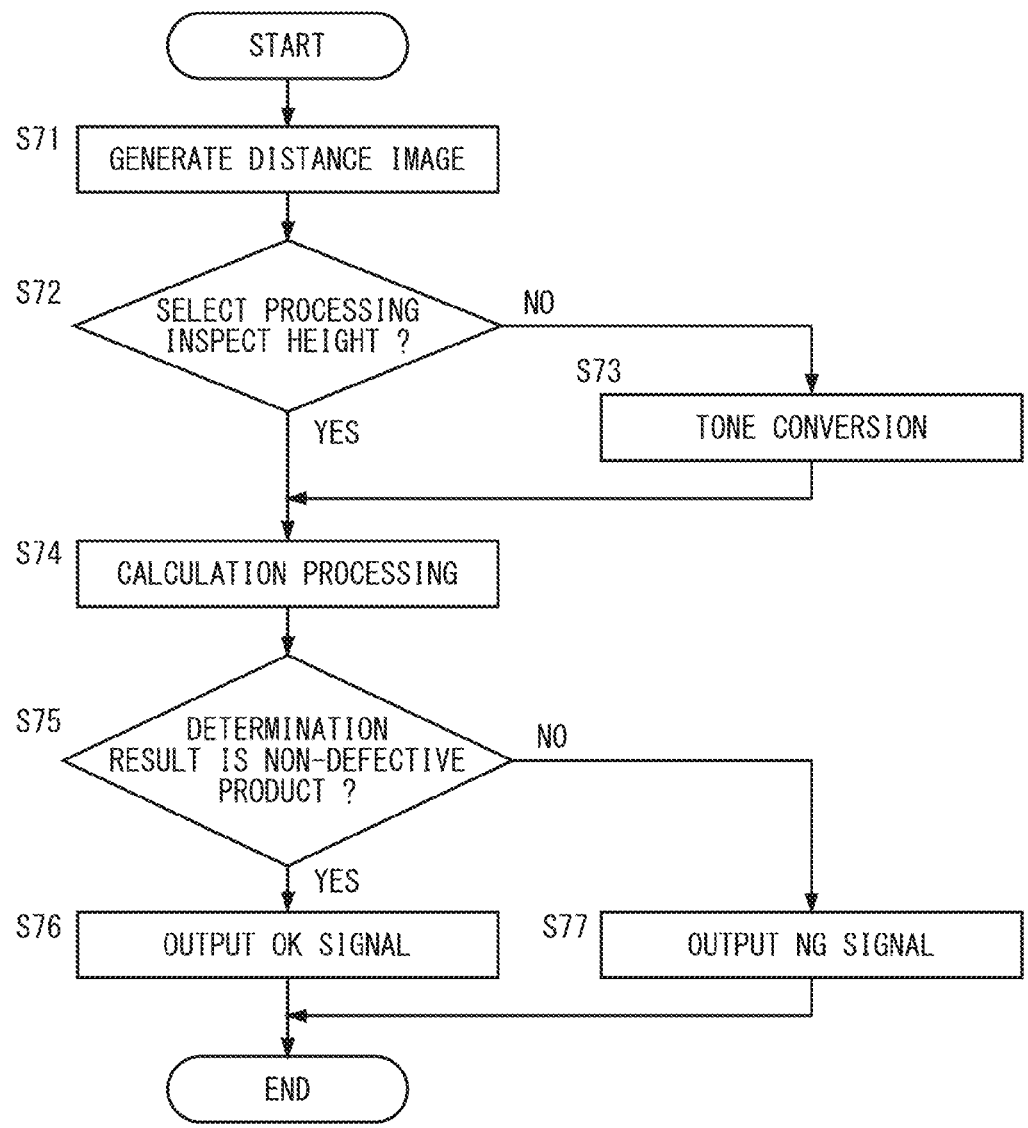
FIG. 7 is a flowchart showing a processing operation of the image processing apparatus according to the present embodiment.

First, a description will be given of a processing operation of performing the height inspection processing by use of the three-dimensional image processing apparatus based on a flowchart of FIG. 7. This three-dimensional image processing apparatus is provided with, as tools for performing calculation processing, a height inspection processing tool for performing the height inspection on the distance image, and a variety of image inspection processing tools for performing the image inspection on the existing brightness image. Here, the height inspection processing will be described.

First, a distance image is generated (Step S71). Specifically, the distance image generating part 32 generates the distance image by use of the image capturing part 10 and the light projecting part 20. Subsequently, desired calculation processing is selected (Step S72). Here, a tool necessary for the calculation processing is selected.

In the case of selecting the inspection processing tool, the processing goes to Step S73, and the tone conversion processing is performed on the high-tone distance image obtained in Step S71 above, to convert it to a low-tone distance image. This makes it possible for even an inspection processing tool in the existing image processing apparatus to handle a low-tone distance image. It is to be noted that the tone conversion processing is not performed in the whole region of the high-tone distance image, but is preferably performed only within an inspection target region having been set for the image inspection processing.

Meanwhile, in the case of selecting the height search tool, since height information in the multi-tone distance image is used as it is, the processing goes to Step S74 without performing the tone conversion.

Further, the inspection executing part 50 performs a variety of calculation processing (Step S74), and then determines whether or not the workpiece is a non-defective product based on a result of the calculation (Step S75). When it is determined by the inspection executing part 50 that the workpiece is a non-defective product (Step S75: YES), a determination signal outputting part 160 outputs an OK signal as a determination signal to the PLC 70 (Step S76), and when it is determined by the inspection executing part 50 that the workpiece is not a non-defective product, namely a defective product (Step S75: NO), the determination signal outputting part 160 outputs an NG signal as a determination signal to the PLC 70 (Step S77).

(Setting Mode)

Next, based on a flowchart of FIG. 8, a description will be given of an example of a procedure in a setting mode for performing a variety of settings on the three-dimensional image processing apparatus prior to execution of the processing for the height inspection and the image inspection. First, in Step S81, an image for setting (setting image) is selected. Here, it is possible to call an image obtained by previously inputting an image to be a target for the inspection processing and registering it as a registered image, or also possible to acquire a new input image and perform the setting thereon. Here, as a replacement image showing an input image that is successively inputted at the time of operation, an input image obtained by capturing the image of the workpiece is registered as the registered image. Further, a registered image having been previously registered may be called. In next Step S82, a tone converting method is selected. Here, the user is prompted to select either a static conversion or an active conversion. Next, in Step S83, a tone conversion parameter is adjusted. Here, when the static conversion is selected in Step S82, the tone conversion parameter is adjusted with respect to the image acquired in Step S81. A method for adjusting the tone conversion parameter will be described later. It should be noted that the above described procedure is one example, and a different procedure can also be applied. For example, the image may be acquired after selection of the tone converting method.

(Details of Setting Procedure)

Next, the procedure at the time of setting will be described in detail. In the three-dimensional image processing apparatus, a necessary setting is previously performed in the setting mode prior to an operation mode. A variety of setting parts for performing such a setting can, for example, be provided on the controller section 2 side. For example, in the example of FIG. 1, the console as one form of the input part 3 connected to the controller section 2 can be used. In place of this or in addition to this, a function of such a setting part can be realized by the three-dimensional image processing program installed in the personal computer connected to the controller section 2 as described above. Hereinafter, a description will be given of a detail of a procedure for performing each setting by use of the three-dimensional image processing program installed in the personal computer shown in FIG. 1 based on each of user interface (GUI: Graphical User Interface) screens of the three-dimensional image processing program shown in FIGS. 9 to 113. It is to be noted that in examples of these GUIs, the distance image is displayed as "Height image", and the brightness image is displayed as "Shade image".

(Registration Process for Distance Image and Brightness Image)

First, the distance image and the brightness image are registered. Here, a setting for an "Image capturing" processing unit 263 is performed from an initial screen 260 of the three-dimensional image processing program shown in FIG. 9. Specifically, a button 263 of the "Image capturing" processing unit is pressed. Thereby, the screen is switched to an image capturing setting menu 269 of FIG. 10.

(Three-Dimensional Image Processing Program)

Figure 10:
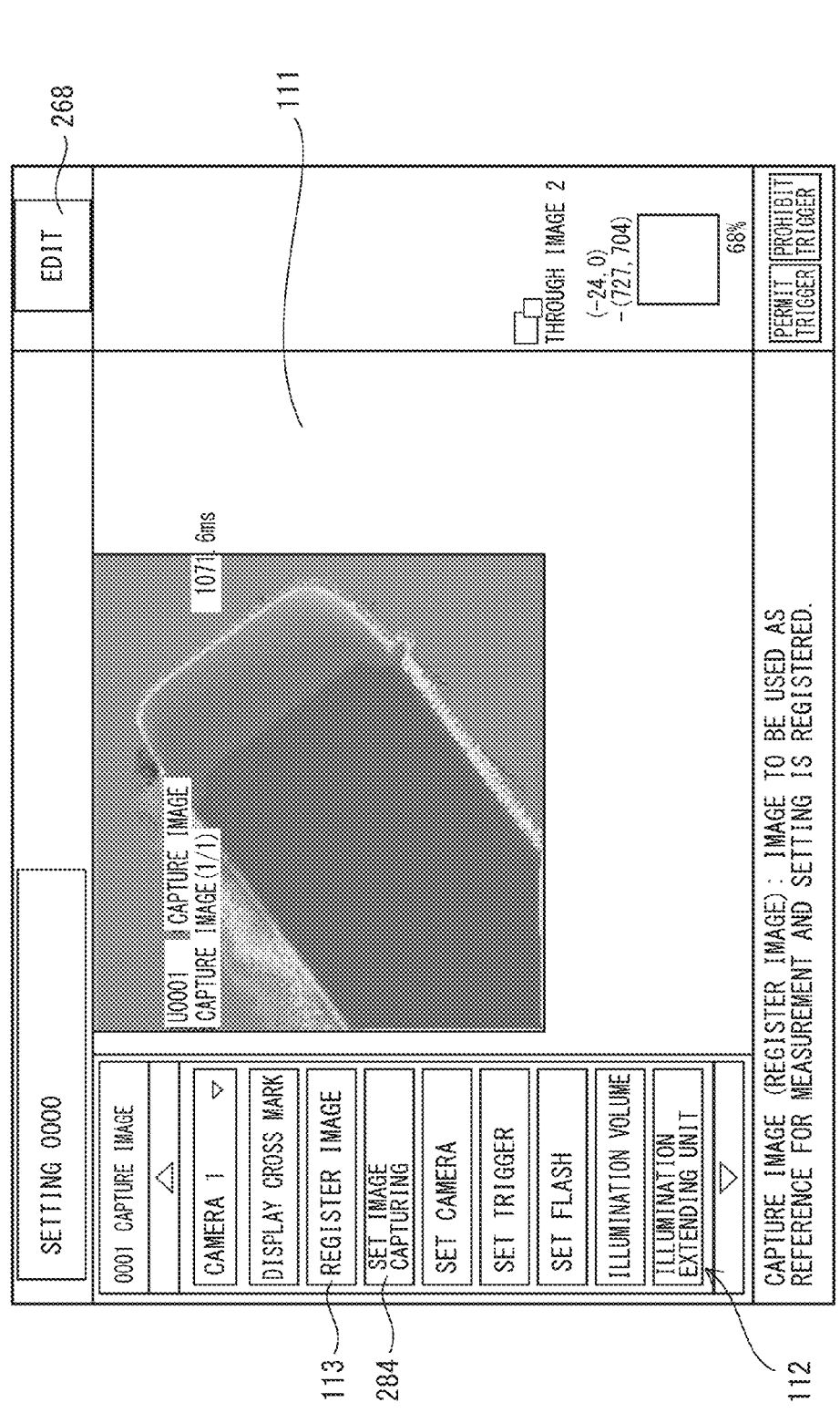
FIG. 10 is an image view showing a state where "Resister image" is selected in an image capturing setting menu.

In a GUI screen example of FIG. 10, a first image display region 111 for displaying an image is provided on the right side of the screen, and a setting item button region 112 where a plurality of buttons that represent a plurality of setting items are disposed is provided on the left side of the screen. The setting item button region 112 is provided with a "Register image" button 113, a "Set image capturing" button 284, a "Set camera" button, a "Set trigger" button, a "Set flash" button, an "Illumination volume" button, an "Illumination extending unit" button, a "Save" button", and the like. The user can select a desired setting item button from the setting item button region 112, so as to perform a setting for a necessary setting item.

Figure 11:
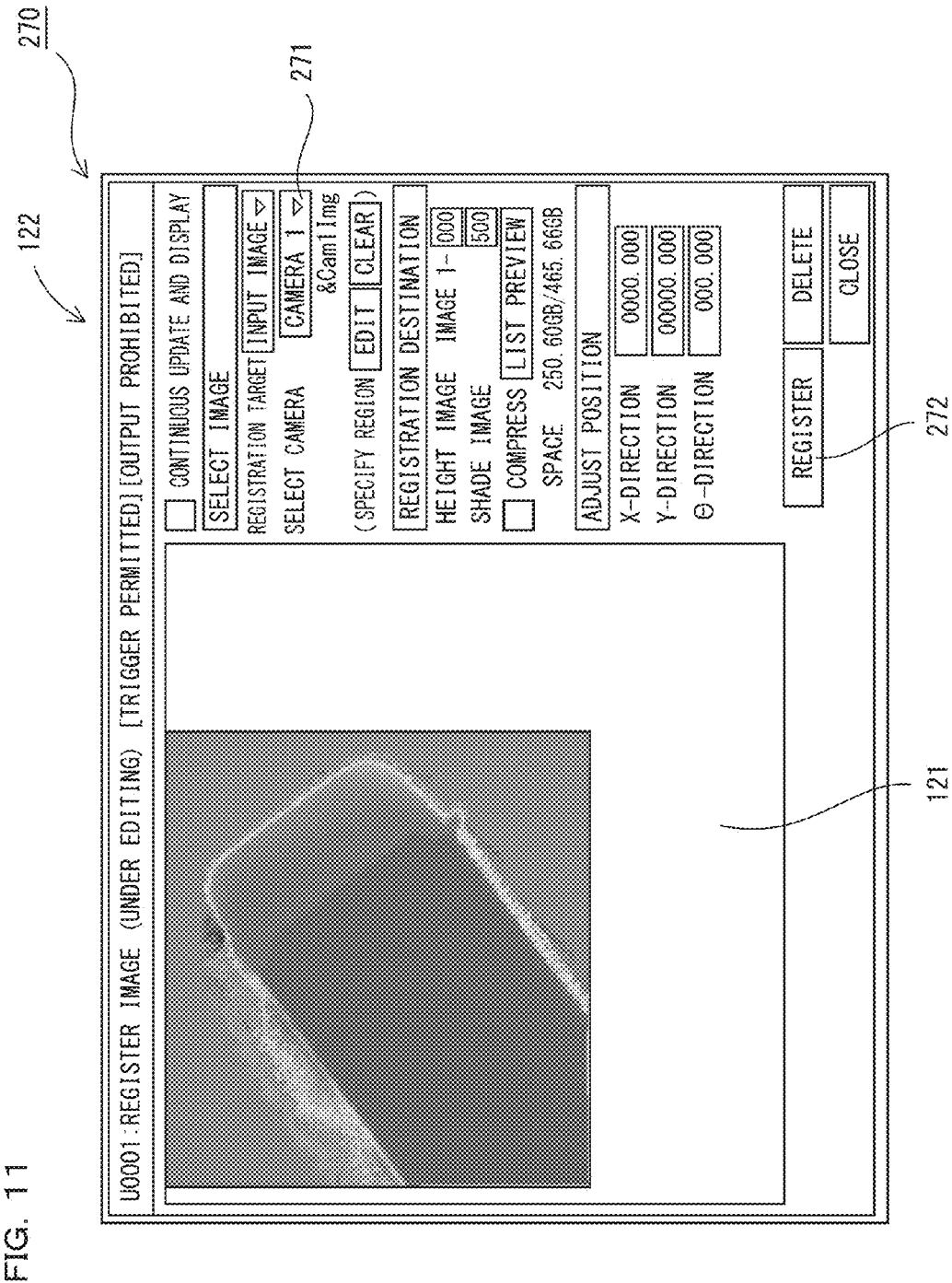
FIG. 11 is an image view showing a screen example of an image registration screen.

In the image capturing setting menu 269 of FIG. 10, when the "Register image" button 113 provided in the setting item button region 112 is pressed, the screen is switched to an image register screen 270 of FIG. 11. From this screen, it is possible to perform a variety of settings for a registration target, selection of the camera, a registration destination, and the like. Here, after the image has been adjusted to a desired image by means of the variety of buttons provided in the operation region, registration, namely storage of image data, is performed. Here, the distance image is displayed on a second image display region 121, and further, an image variable allocated to this image is displayed in an operation region 122. In the example of FIG. 11, "Camera 1" has been selected in a "Select camera" field 271 for selecting the image capturing part, and as a distance image captured by this "Camera 1", an image variable "&Cam1Img" is displayed under the "Select camera" field 271.

Figure 12:
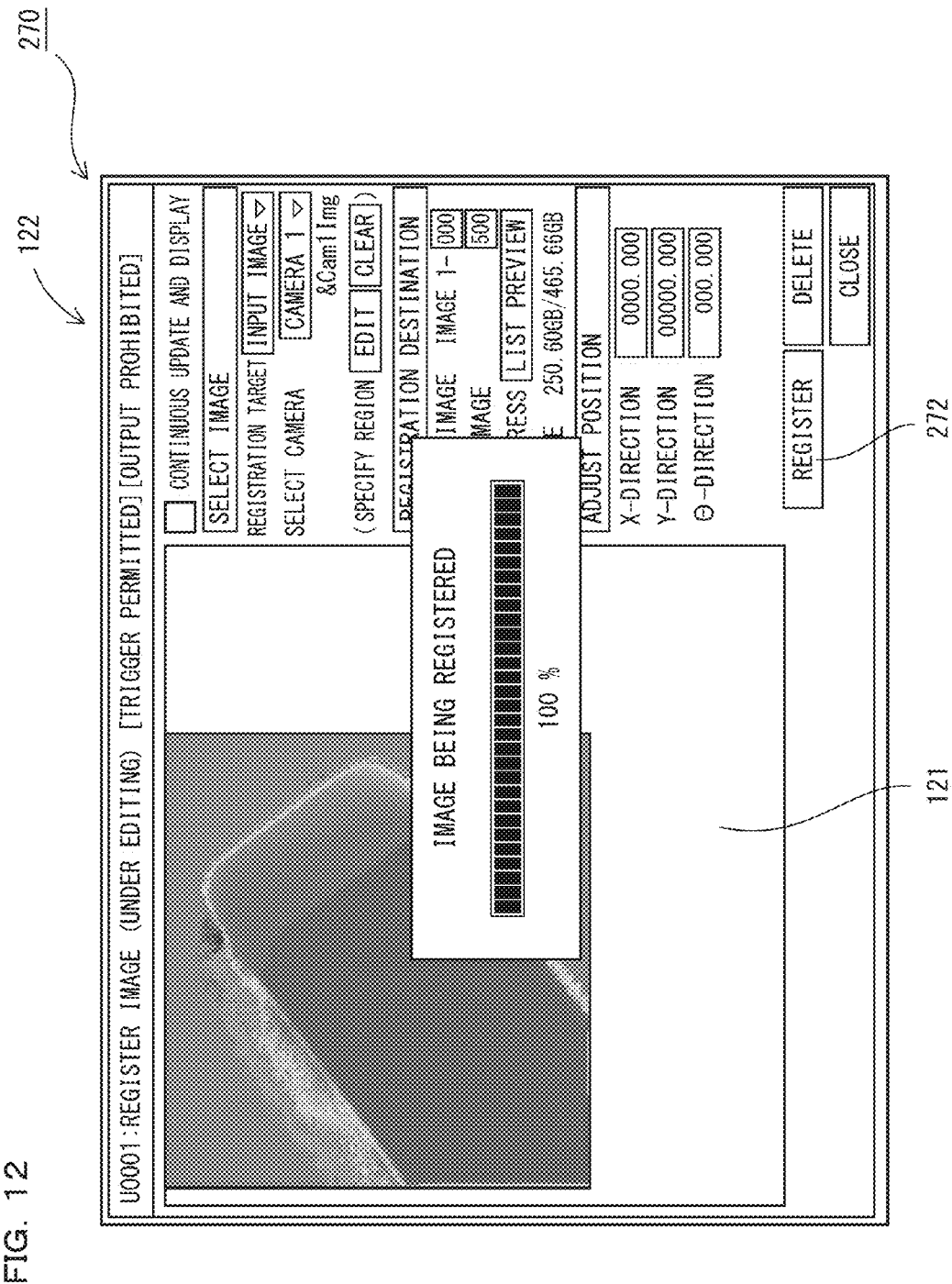
FIG. 12 is an image view showing a screen example during registration of a distance image.
Figure 13:
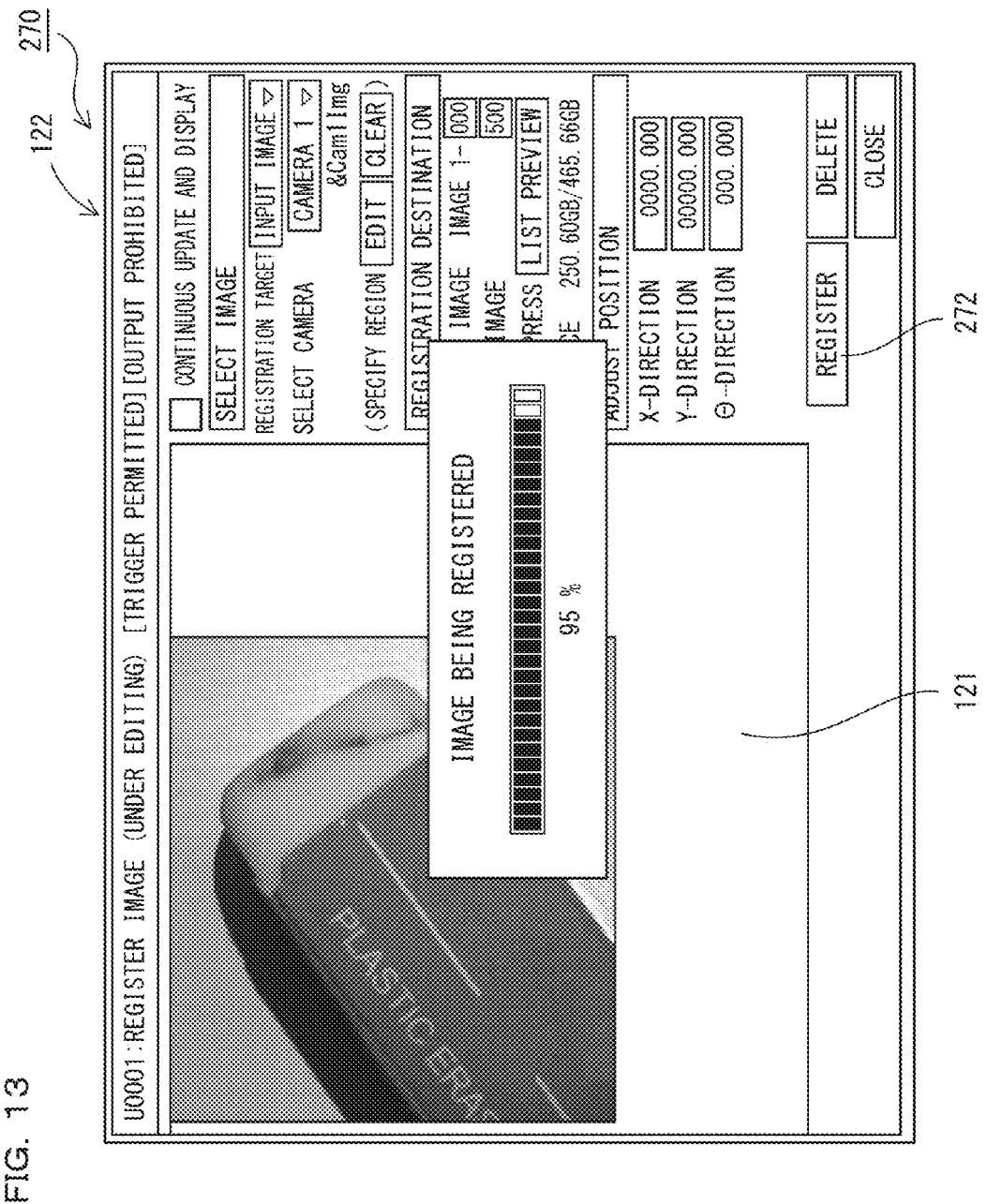
FIG. 13 is an image view showing a screen example during registration of a brightness image.

When a "Register" button 272 provided in a lower stage of the operation region is pressed after completion of the setting, as shown in FIG. 12, the distance image being displayed on the second image display region 121 is started being registered, and its state of progress is graphically displayed. Along therewith, the brightness image is also registered as shown in FIG. 13. In this example, the distance image is first stored in the distance image storage section 38*a*, and the brightness image is then stored in the brightness image storage section 38*b*. Further, the image variable "&Cam1Img" of the distance image and an image variable "&Cam1GrayImg" of the brightness image are also recorded. Each of these image variables is individually added the image, and can thus be used as an index at the time of calling a registered image. However, this example is one example, and the registration procedure for each of the images may be reversed, or the images may be simultaneously registered. As thus described, simultaneously storing the distance image and the brightness image as the registered images allows the user to omit the labor of registering each of the images. However, a configuration can also be formed where the distance image and the brightness image are individually registered as the registered images.

(Phase Shift Method)

Here, a description will be given of the phase shift method as one of the methods for measuring displacement and the three-dimensional shape of the workpiece in a contactless manner. The phase shift method is also referred to as a grating pattern projecting method, a fringe scanning method, and the like. In this method, a light beam, having a grating pattern obtained by varying an illumination intensity distribution in a sinusoidal form, is projected to the workpiece. Furthermore, light is projected with three or more grating patterns having different sinusoidal phases, and each brightness value at a height measurement point is captured with respect to each of the patterns from an angle different from the light beam projected direction, to calculate a phase value of the grating pattern by means of each of the brightness values. The light is projected to the measurement point in accordance with the height of the measurement point, to change the phase of the grating pattern, and there is observed a light beam with a different phase from a phase observed by a light beam reflected at a position set as a reference. Therefore, in this method, the phase of the light beam at the measurement point is calculated and substituted in a geometrical relation expression of an optical apparatus through use of the principle of triangulation, thereby to measure the height of the measurement point (thus, the object) and find the three-dimensional shape. According to the phase shift method, the height of the workpiece can be measured at high resolution by making a grating pattern cycle small, but it is possible to measure only a workpiece with a small height (workpiece with a small height difference) whose measurable height range is within 2π in a shift amount of the phase.
(Spatial Coding Method)

Therefore, the spatial coding method is also used. According to the spatial coding method, a space that is irradiated with light is divided into a large number of small spaces each having a substantially fan-like cross section, and these small spaces are provided with a series of spatial code numbers. For this reason, even when the height of the workpiece is large, namely, even when its height difference is large, the height can be computed from the spatial code number so long as the workpiece is within the space irradiated with light. Hence it is possible to measure the whole shape of even the workpiece having a large height. As thus described, according to the spatial coding method, it is possible to measure the whole shape of even a workpiece having a large height and a wide permissive-height range (dynamic range).

Next, a description will be given of a setting example for capturing the distance image in the image capturing part based on FIGS. 14 to 42. Prior to the foregoing image registration, when the "Set image capturing" button 284 is pressed from the image capturing setting menu 269 of FIG. 10, the screen is changed to an image capturing setting screen 280 of FIG. 14. In the image capturing setting screen 280, a basic setting regarding the image capturing can be performed. For example, when a "Set effective image capturing" button is pressed, an image capturing effective setting screen of FIG. 15 is displayed, and the image capturing part, namely the camera, connected to the three-dimensional image processing apparatus can be selected. For example, in place of or in addition to the monochrome CCD camera or a color CCD camera which captures a normal brightness image, a camera capable of acquiring height information can be connected as the image capturing part, thereby to allow fetching of the distance image into the three-dimensional image processing apparatus. Further, at the time of connecting a plurality of image capturing parts to the three-dimensional image processing apparatus, one or more image capturing parts can be selected out of those as the image capturing part to be used.

Figure 14:
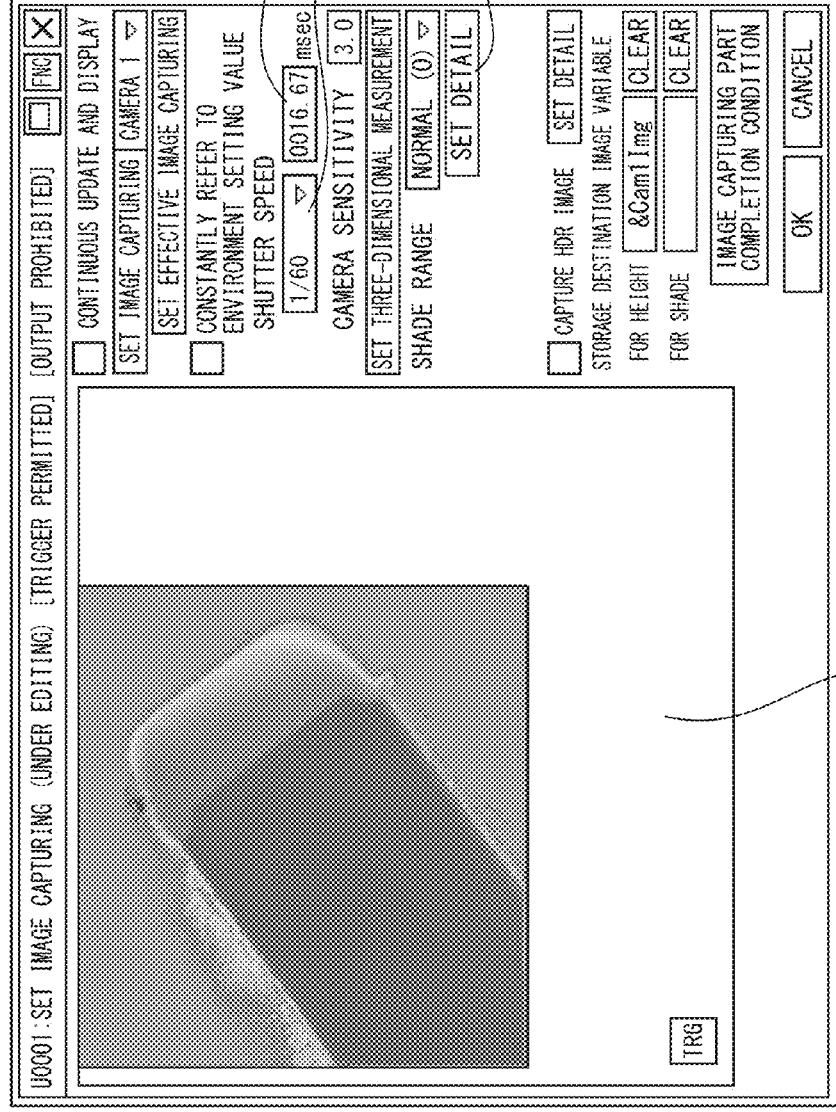
FIG. 14 is an image view showing an image capturing setting screen.
Figure 15:
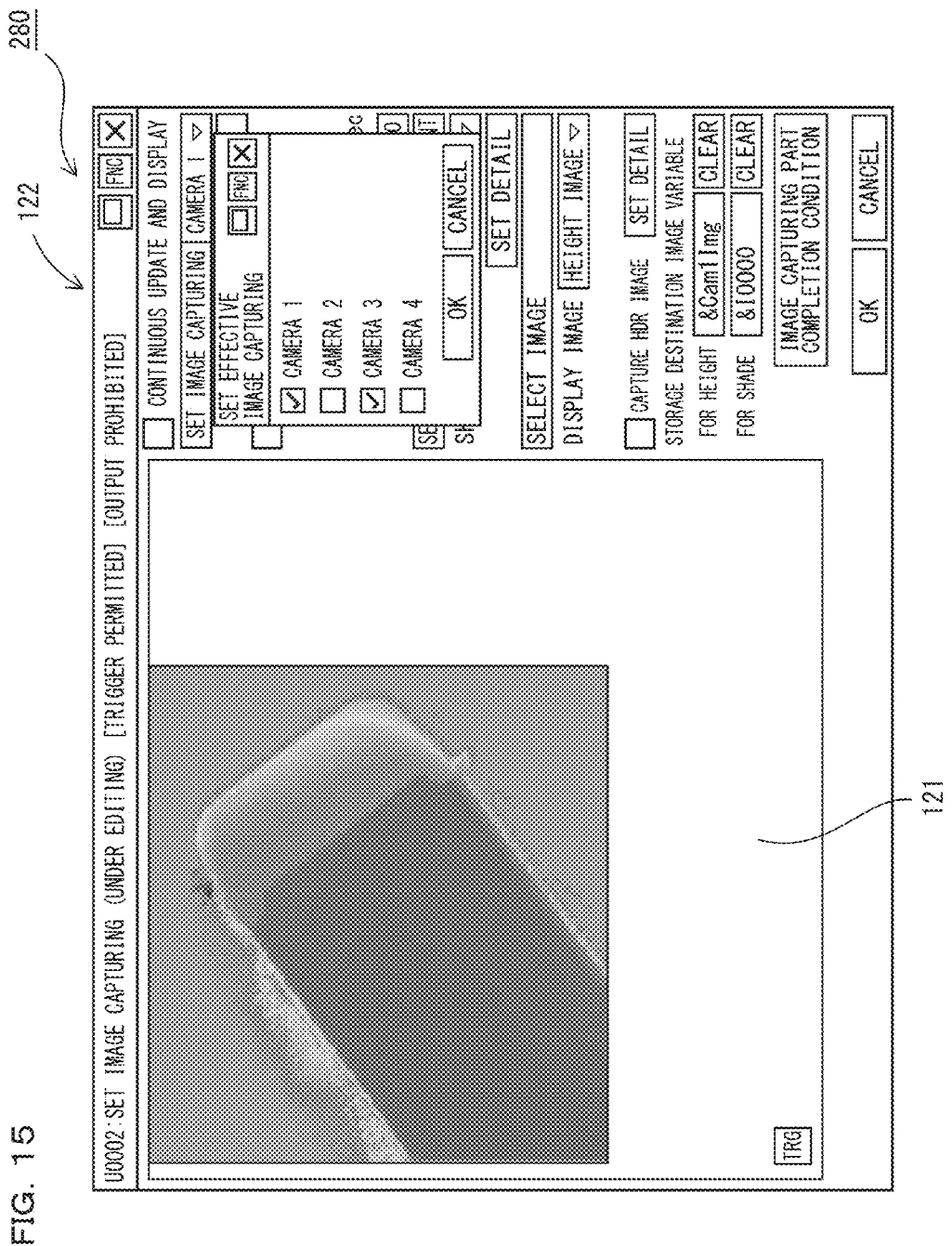
FIG. 15 is an image view showing an image capturing effective setting screen.
Figure 16:
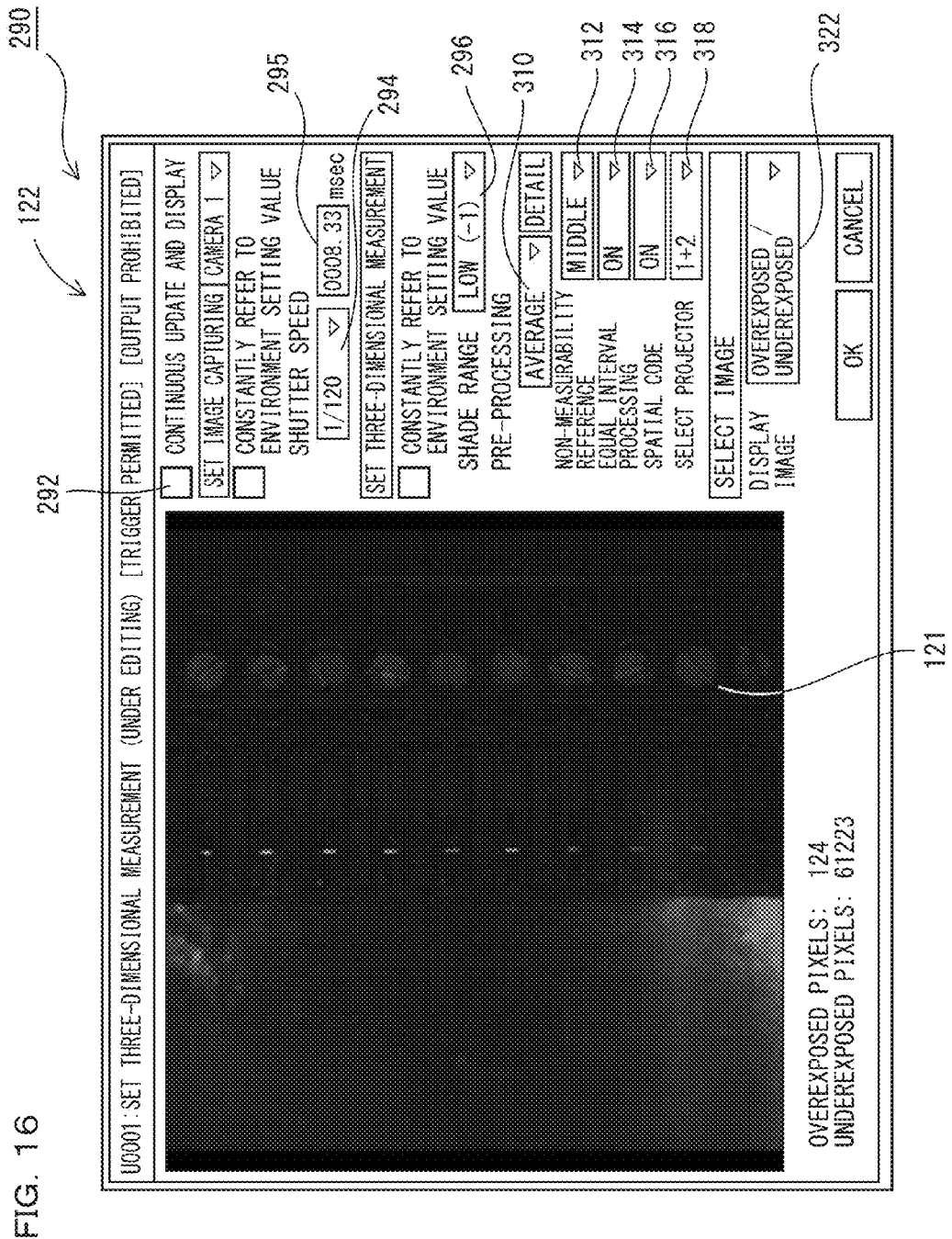
FIG. 16 is an image view showing a three-dimensional measurement setting screen.
Figure 17:
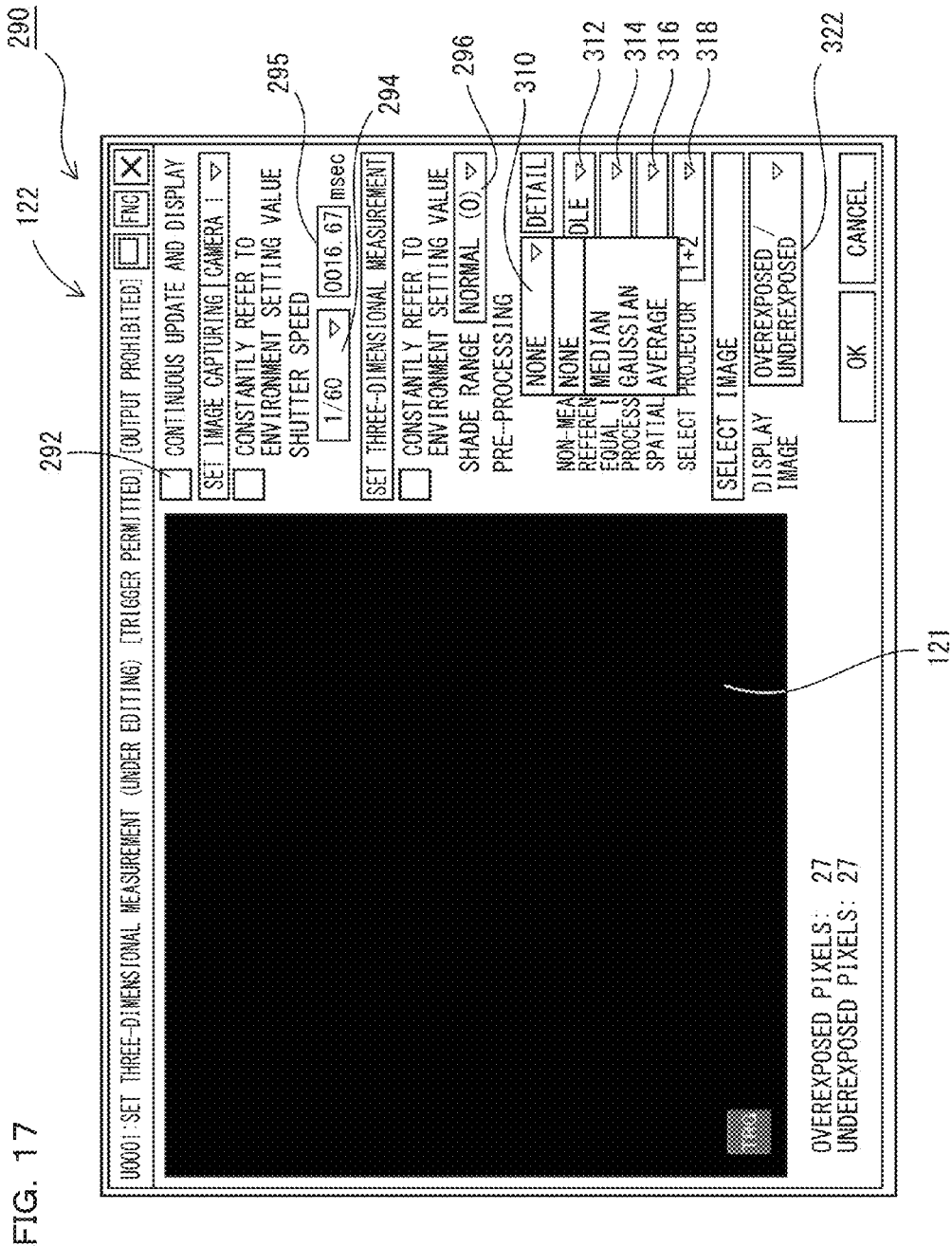
FIG. 17 is an image view showing sorts of selectable pre-processing.

Moreover, when a "Detail setting" button 282 provided in the operation region is pressed from the image capturing setting screen 280 of FIG. 14, the screen is changed to a three-dimensional measurement setting screen 290 shown in FIG. 16. It is to be noted that in FIG. 16, a different workpiece is displayed for convenience of description. The three-dimensional measurement setting screen 290 of FIG. 16 is provided with a "Continuously update and display" field 292 corresponding to a real-time update part, a shutter speed setting field 294 corresponding to the shutter speed setting part 49, a shade range setting field 296, a pre-processing setting field 310, a non-measurability reference setting field 312, an equal interval processing setting field 314, a spatial code setting field 316, a projector selection setting field 318, a "Display image" selection field 322, and the like.
(Real-Time Update Part)

Here, the real-time update part is provided which updates the setting for the image being displayed on the second image display region 121 to a setting after change in the case of the setting being changed in the operation region. The real-time update part can be switched on and off. In the screen example of FIG. 16, by switching on the "Continuous update and display" field 292 provided in the upper stage of the operation region as one form of the real-time update part, a real-time update function can be operated.

In the example of FIG. 16, as items settable in the operation region, there can be cited a shutter speed, a shade range, pre-processing, a non-measurability reference, equal interval processing, a spatial code, selection of the projector, a display image, and the like. Hereinafter, those will be sequentially described.
(Shutter Speed Setting Part 49)

As one mode of the shutter speed setting part 49 for adjusting a shutter speed at the time of image capturing by the image capturing part, the shutter speed setting field 294 is provided in the example of FIG. 16. The user can specify the shutter speed from the shutter speed setting field 294. Here, from a drop-down box, there is selected a previously set shutter speed such as $\frac{1}{15}$, $\frac{1}{30}$, $\frac{1}{60}$, $\frac{1}{120}$, $\frac{1}{240}$, $\frac{1}{500}$, $\frac{1}{1000}$, . . . , $\frac{1}{20000}$. The number of seconds corresponding to the selected numerical value is displayed in a numerical value display field 295 on the right side. Further, it is also possible to directly specify an arbitrary shutter speed by means of a numerical value. For example, when "Input numerical value" is selected as an option of the drop-down box, a gray-out of the numerical value display field 295 is removed to allow direct input of a numerical value. In such a manner, the exposure time for the camera (image capturing element) as the image capturing part is adjusted based on the numerical value specified in the shutter speed setting field 294. It should be noted that at the time of adjustment of the shutter speed, displaying the shade image as the brightness image rather than the distance image on the second image display region 121 can facilitate the confirmation operation. Further, an image obtained by changing the shutter speed in the shutter speed setting field 294 is promptly reflected to the second image display region 121 by the above real-time update function, thus allowing the user to visually confirm whether or not the current setting is appropriate and easily perform the adjustment operation.
(Shade Range Setting Field 296)

In the shade range setting field 296, a dynamic range of the brightness image as the shade image is adjusted. Here, any one of "Low (−1)", "Normal (0)" and "High (1)" is selected from a drop-down box, thereby to increase or decrease the dynamic range.
(Pre-Processing Setting Field 310)

In the pre-processing setting field 310, common filter processing, which is performed before generation of the distance image in the head section, is prescribed. As the common filter processing, for example, filters such as an averaging filter, a median filter and a Gaussian filter are possibly performed. Here, as filter processing on the pattern projected image, in the example of FIG. 17, any of "None", "Median", "Gaussian" and "Average" is selected from a drop-down box. It should be noted that, in addition to the pre-processing that is performed prior to generation of the distance image, the filter processing can also be performed on the distance image obtained on the head section 1 side.
(Non-Measurability Reference Setting Field 312)

In the non-measurability reference setting field 312, a noise component cutting level is set. That is, the height measurement is not performed only in an amount set in the non-measurability reference setting field 312. In the measurement of the three-dimensional height information by use of the pattern projected image, accurate height information cannot be measured without a certain light amount. On the other hand, in a case where multi-reflection has occurred or some other case, the light is too bright and its amount needs to be reduced. As thus described, a noise component cut amount is selected in accordance with the captured pattern projected image. Specifically, there is decided a threshold for taking data as ineffective data due to noise with respect to data for computing the height information of each pixel.

Figure 18:
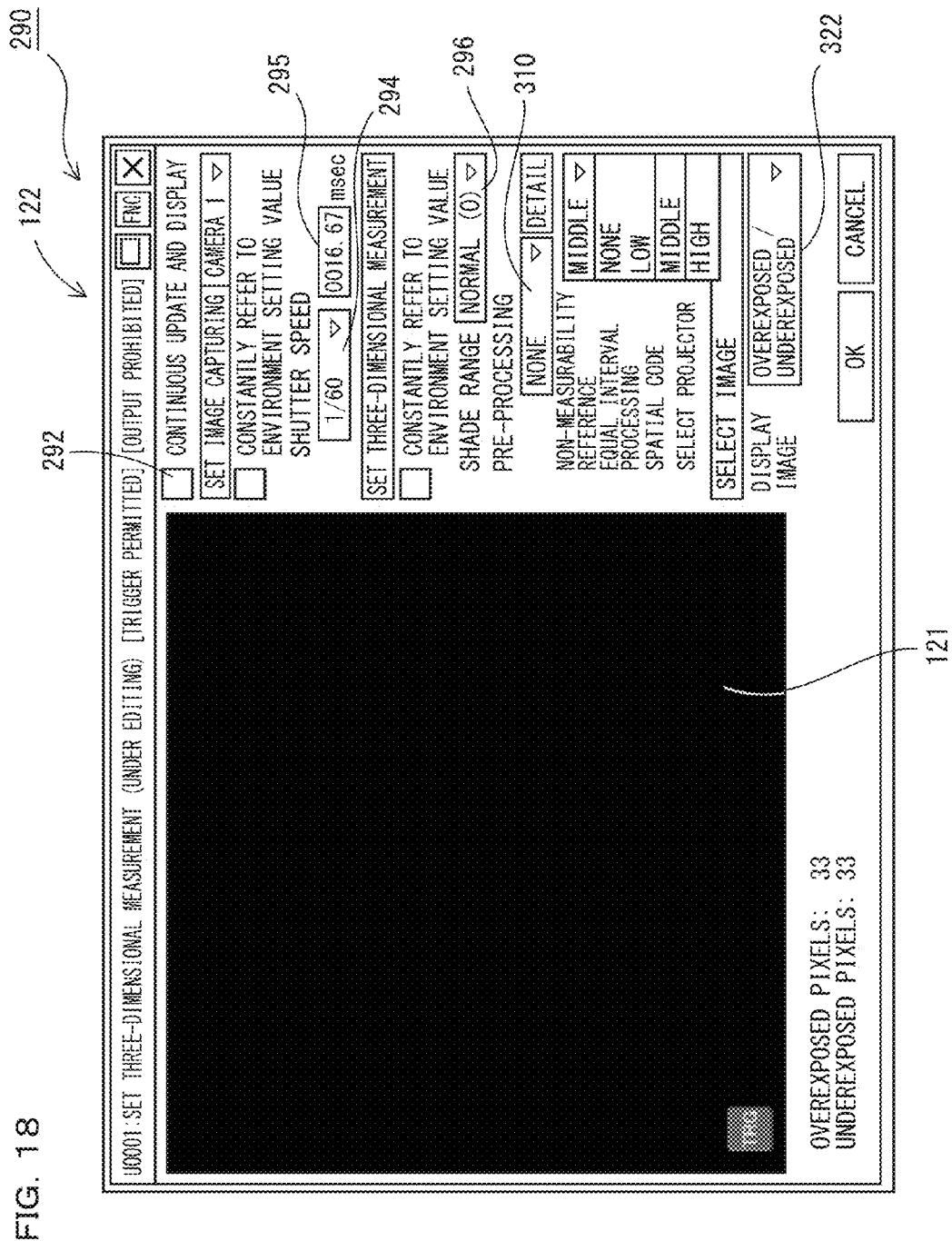
FIG. 18 is an image view showing options that are settable in a non-measurability reference setting field.
Figure 19:
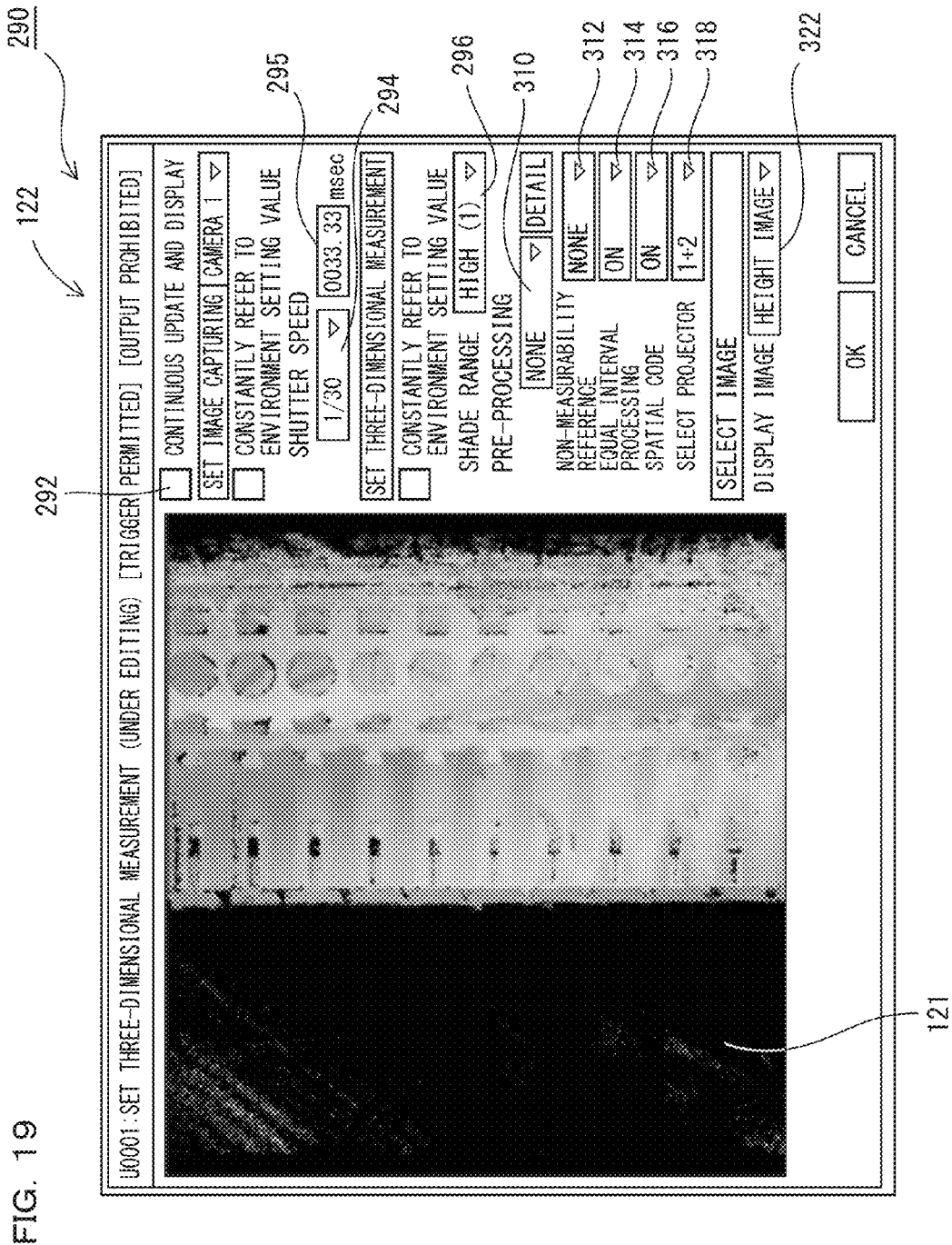
FIG. 19 is an image view showing an example where "None" is selected in the non-measurability reference setting field.

Here, as shown in FIG. 18, any of "High", "Middle", "Low" and "Non" is selected from a drop-down box. In addition, when "None" is selected, the noise component is not cut, and heights of all the pixels are measured. For example, in the example shown in FIG. 19, "None" is selected in the non-measurability reference setting field 312, and height data at every point including noise data is calculated. Although it is difficult to tell from this screen, an incorrect height has been measured due to the noise data in a corner portion of the workpiece, and the like.

Figure 20:
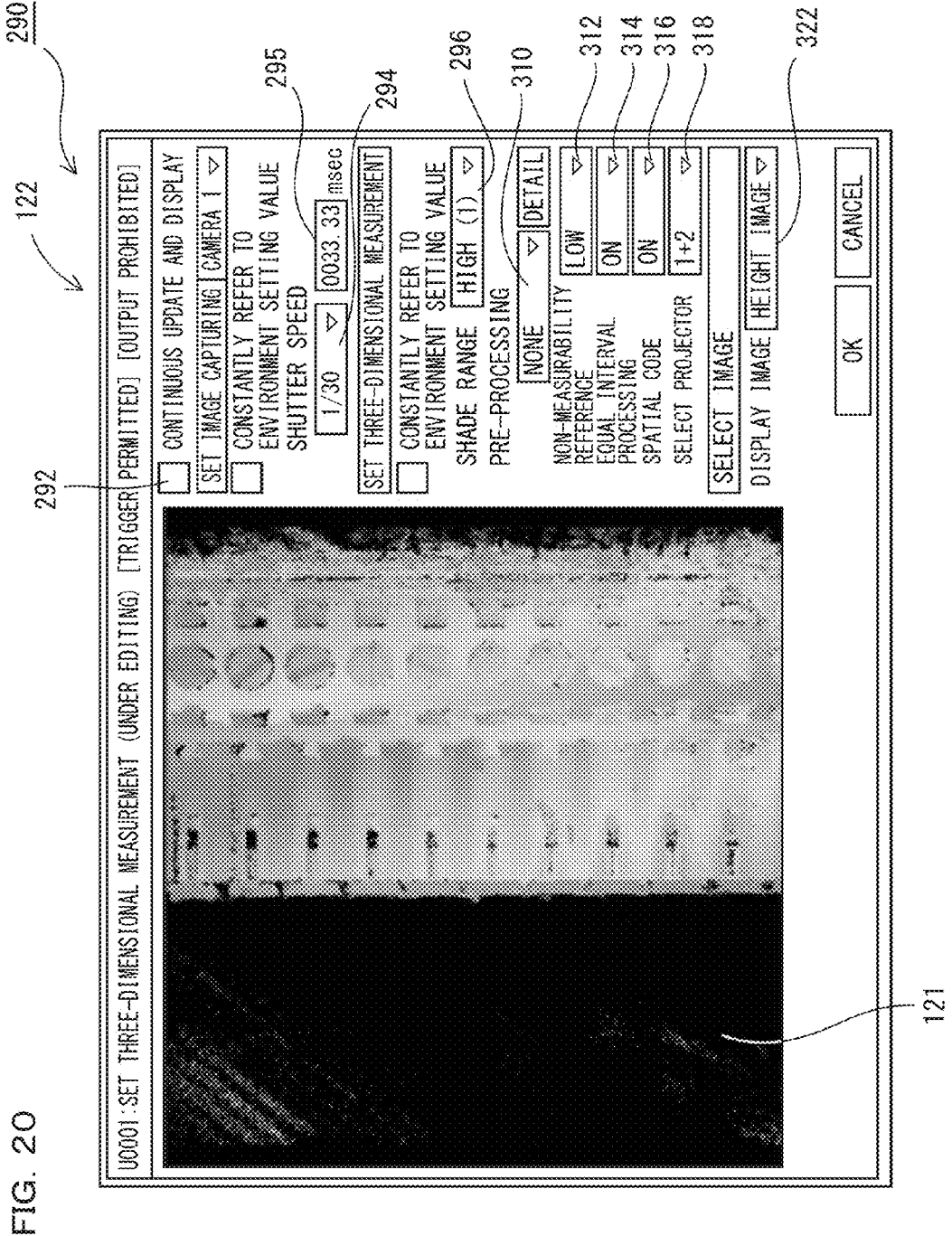
FIG. 20 is an image view showing an example where "Low" is selected in the non-measurability reference setting field.

On the other hand, in the example shown in FIG. 20, "Low" is selected in the non-measurability reference setting field 312, and the number of points where the height information is incorrect based on the noise data is reduced. Further, in the example shown in FIG. 21, "Middle" is selected in the non-measurability reference setting field 312, and the number of points where the height information is incorrect is further reduced.

Figure 21:
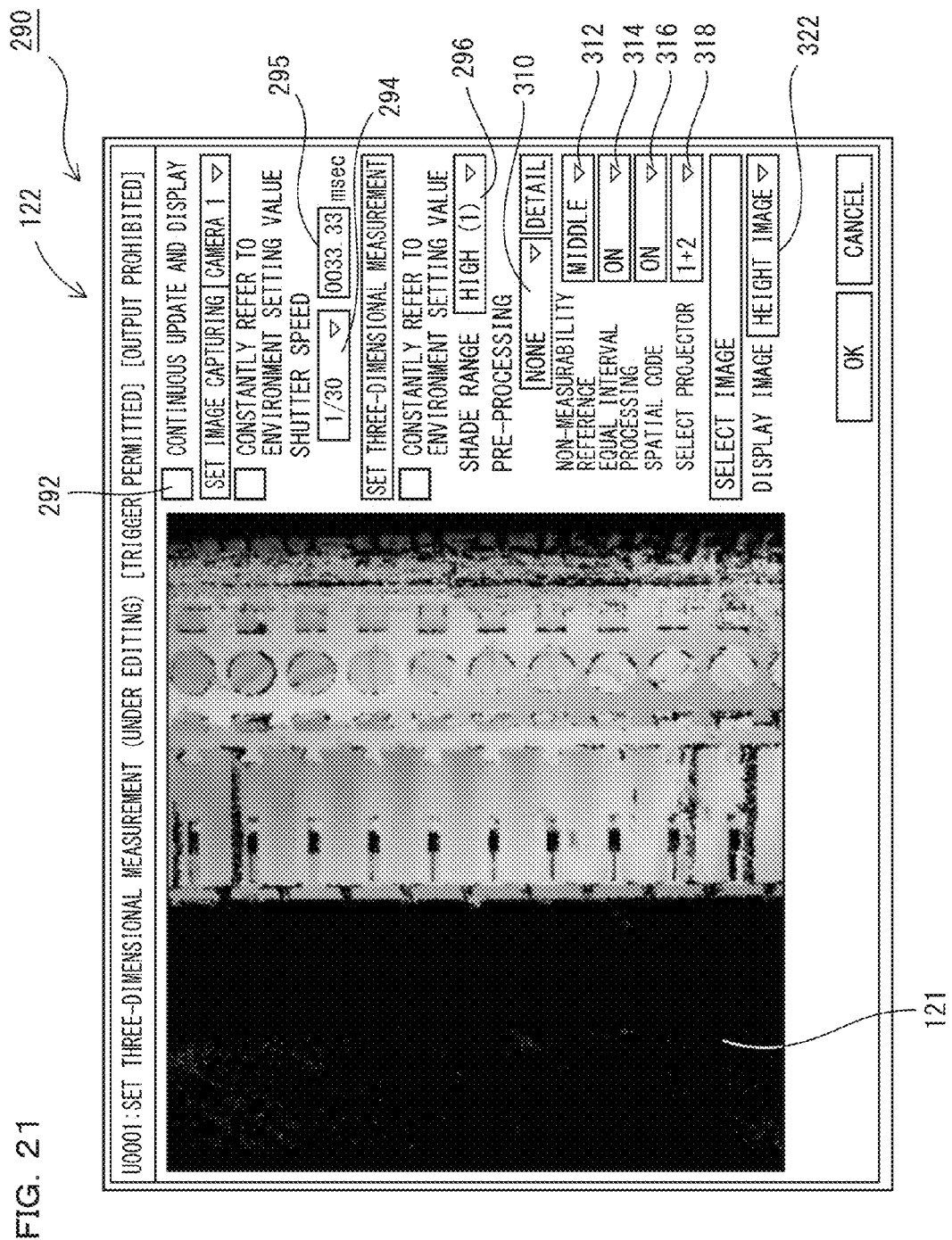
FIG. 21 is an image view showing an example where "Middle" is selected in the non-measurability reference setting field.
Figure 22:
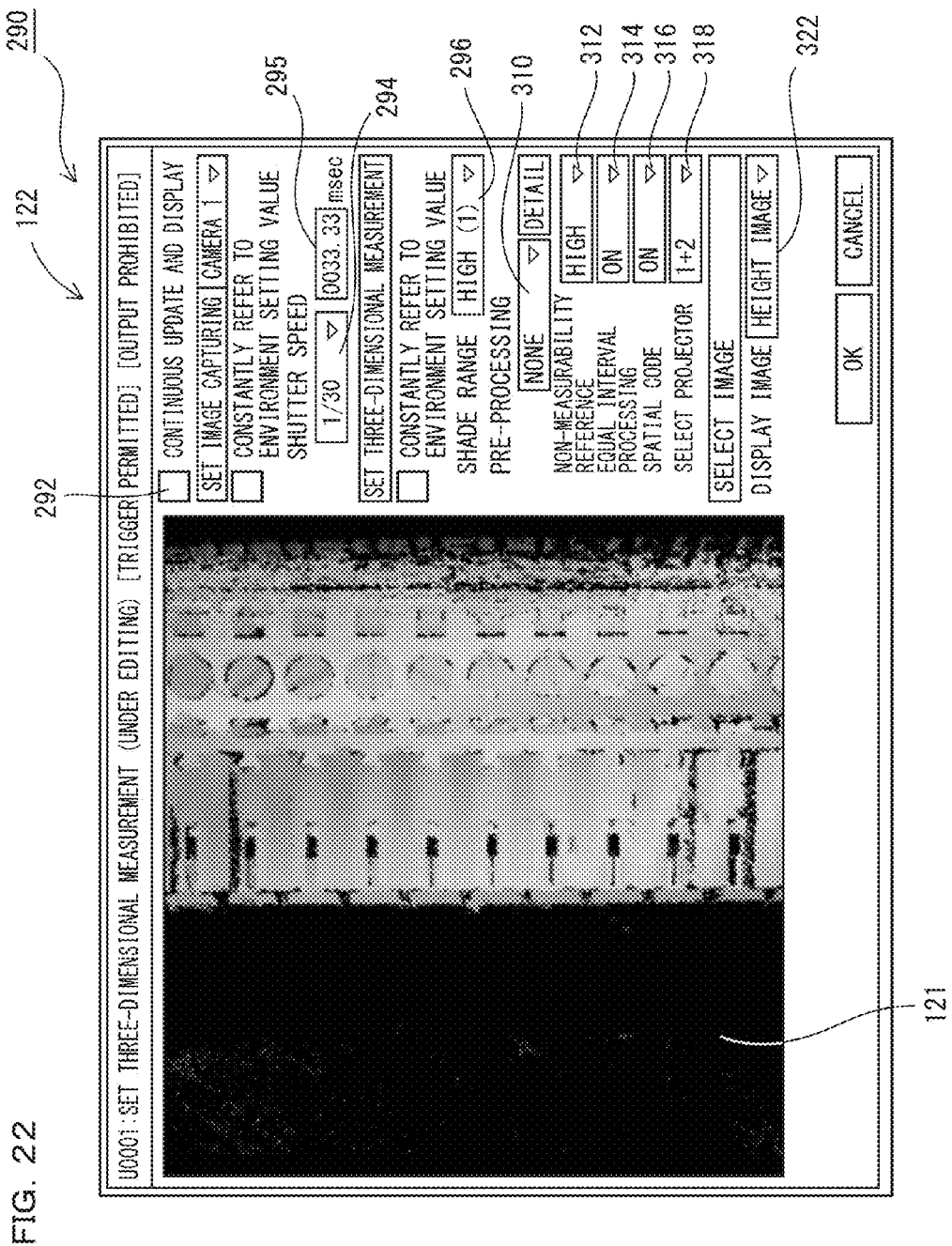
FIG. 22 is an image view showing an example where "High" is selected in the non-measurability reference setting field.

On the other hand, it can also be confirmed from FIG. 21 that the number of black points indicating the non-measurability increases especially in a lower left region of the workpiece, leading to an increase in number of positions which are regarded as noise and whose heights thus cannot be measured. Moreover, the example shown in FIG. 22 shows a state where "High" is selected in the non-measurability reference setting field 312, and it can be confirmed that as a result of excessive removal of the noise component, even the data to be essentially left is lost. As thus described, when the non-measurability reference indicating the threshold for noise removal is set too low, the height is calculated based on the noise. In contrast, when it is set too high, the place to be essentially left is also regarded as ineffective. For this reason, by using the above real-time update function, the user can adjust the setting for the non-measurability reference and also confirm an image after adjustment on the second image display region, so as to adjust the value to an appropriate value with direct reference to a result of the setting.

(Equal Interval Processing Setting Field 314)

Figure 23:
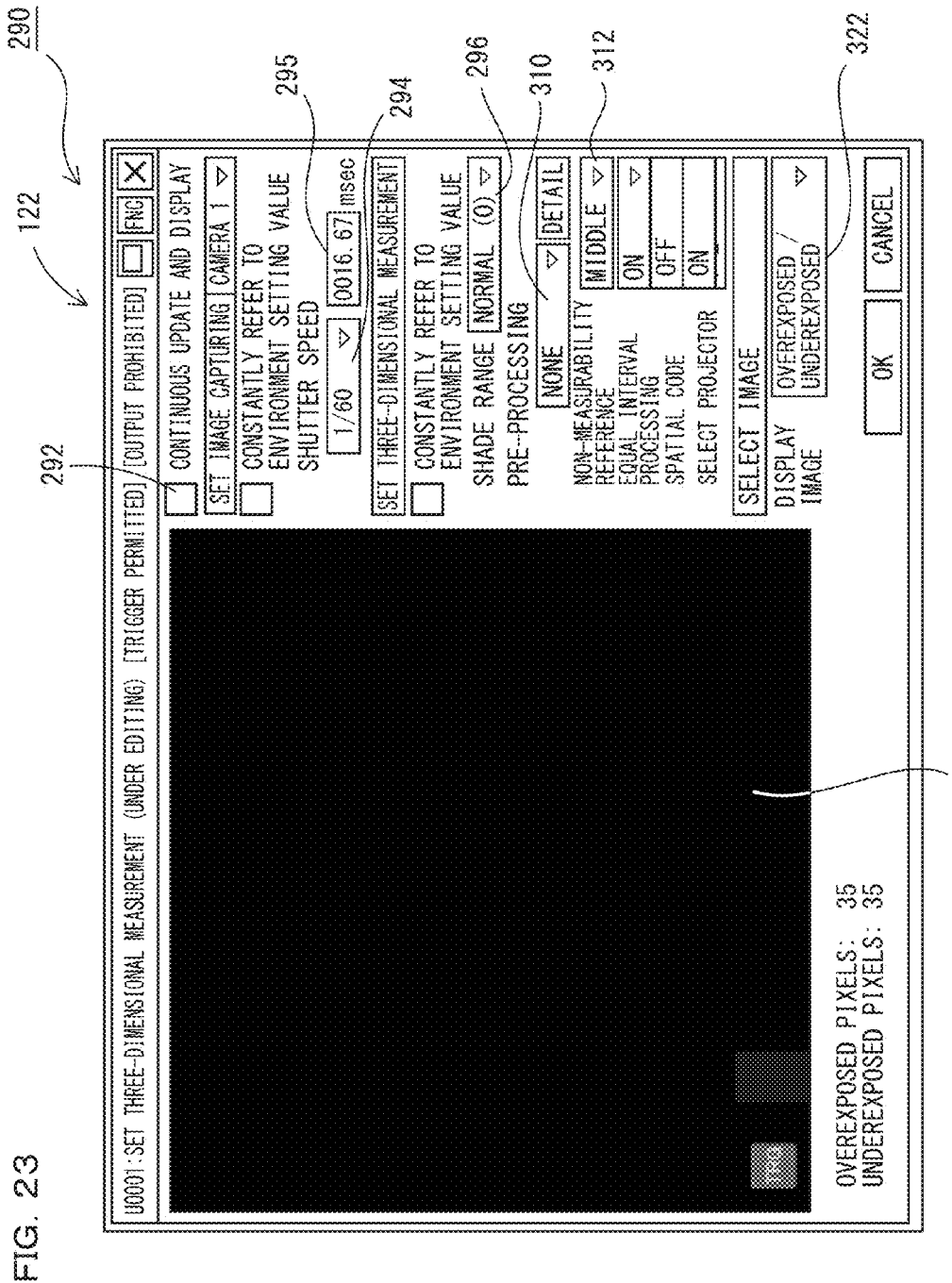
FIG. 23 is an image view showing options that are settable in an equal interval processing setting field.
Figure 24:
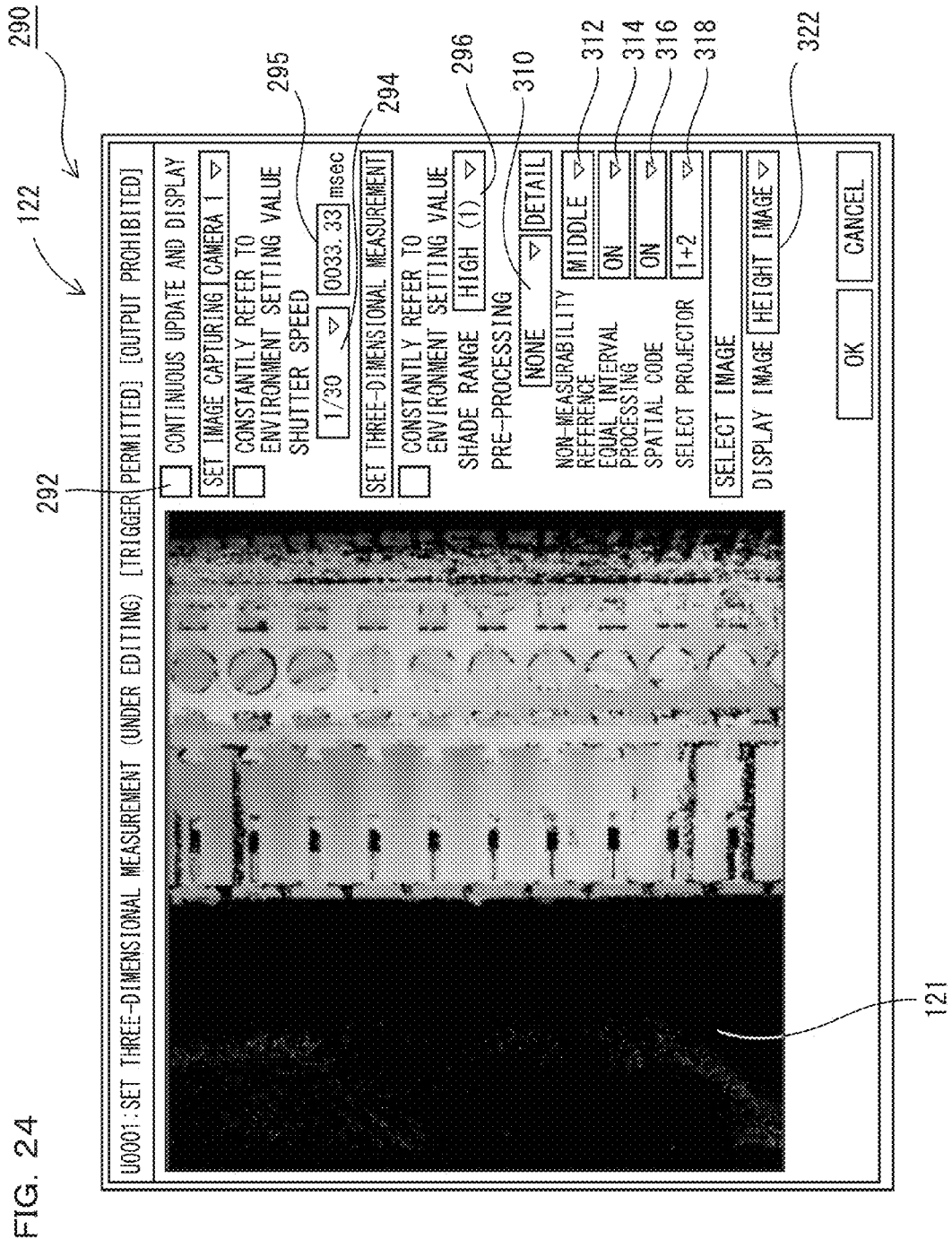
FIG. 24 is an image view showing an example where the equal interval processing is switched "ON" and "Height image" is selected in a "Display image" selection field.
Figure 25:
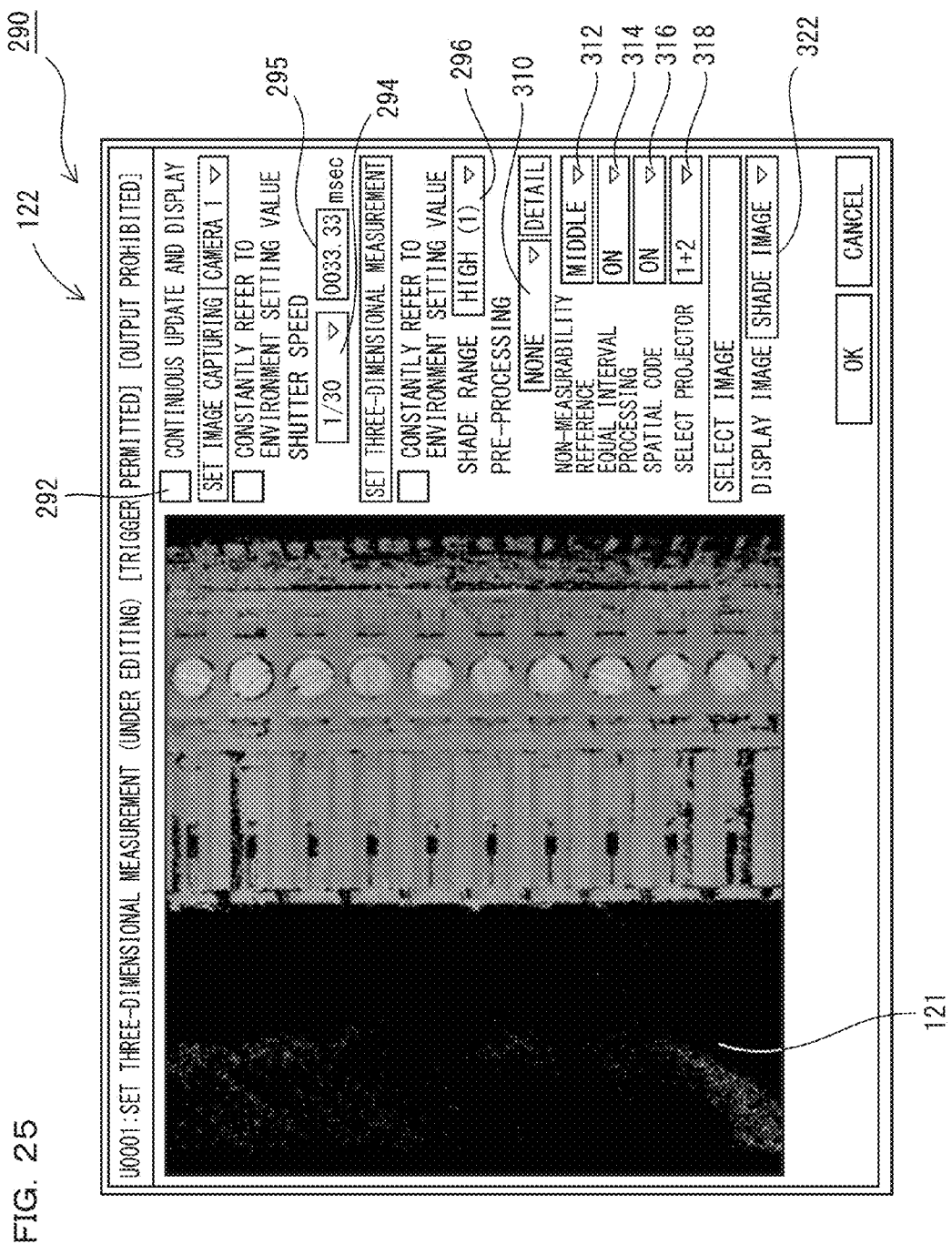
FIG. 25 is an image view showing an example where the equal interval processing is switched "ON" and "Shade image" is selected in the "Display image" selection field.

In the equal interval processing setting field 314, an error due to an angle of view is corrected. The equal interval processing setting field 314 functions as the interval equalization processing setting part 47. In the equal interval processing setting field 314, the on/off can be selected as shown in FIG. 23. By switching on the equal interval processing, distance images arrayed at equal pitches in XY-directions are acquired. Here, equal-pitched images at equal intervals in the XY-directions regardless of heights (Z-coordinates) are displayed on the second image display region 121. For example, in such a use as to inspect a size on the XY-plane, the equal interval processing needs to be switched on. It should be noted that the portion with its data disappeared after correction is taken as ineffective. FIGS. 24 and 25 show a state where the equal interval processing is switched on. FIG. 24 shows an example where "Height image", namely a distance image, is selected in the "Display image" selection field 322 and it is displayed on the second image display region 121, and FIG. 25 shows an example where "Shade image" is selected and a brightness image is displayed.

Figure 26:
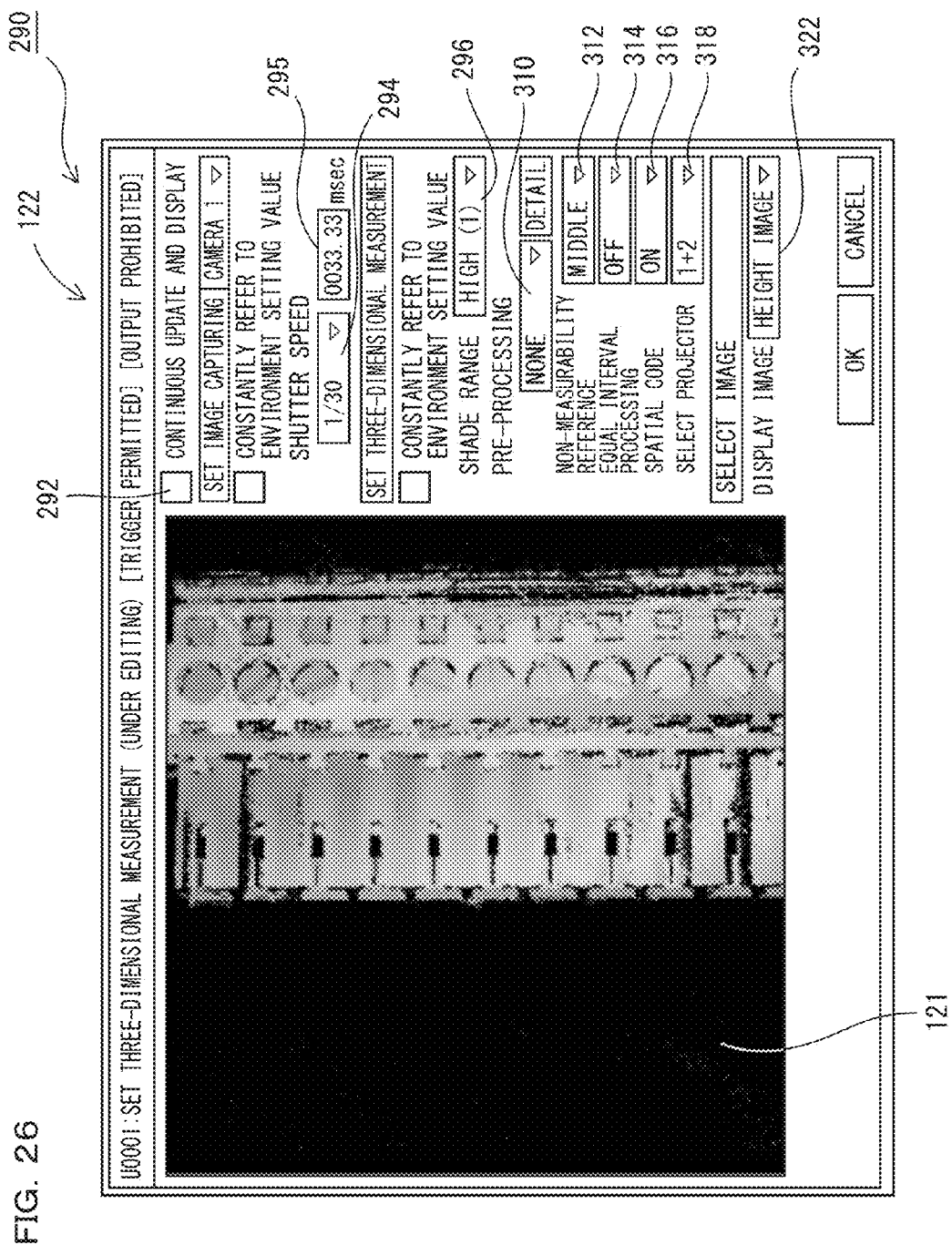
FIG. 26 is an image view showing an example where the equal interval processing is switched "OFF" and a distance image is displayed.
Figure 27:
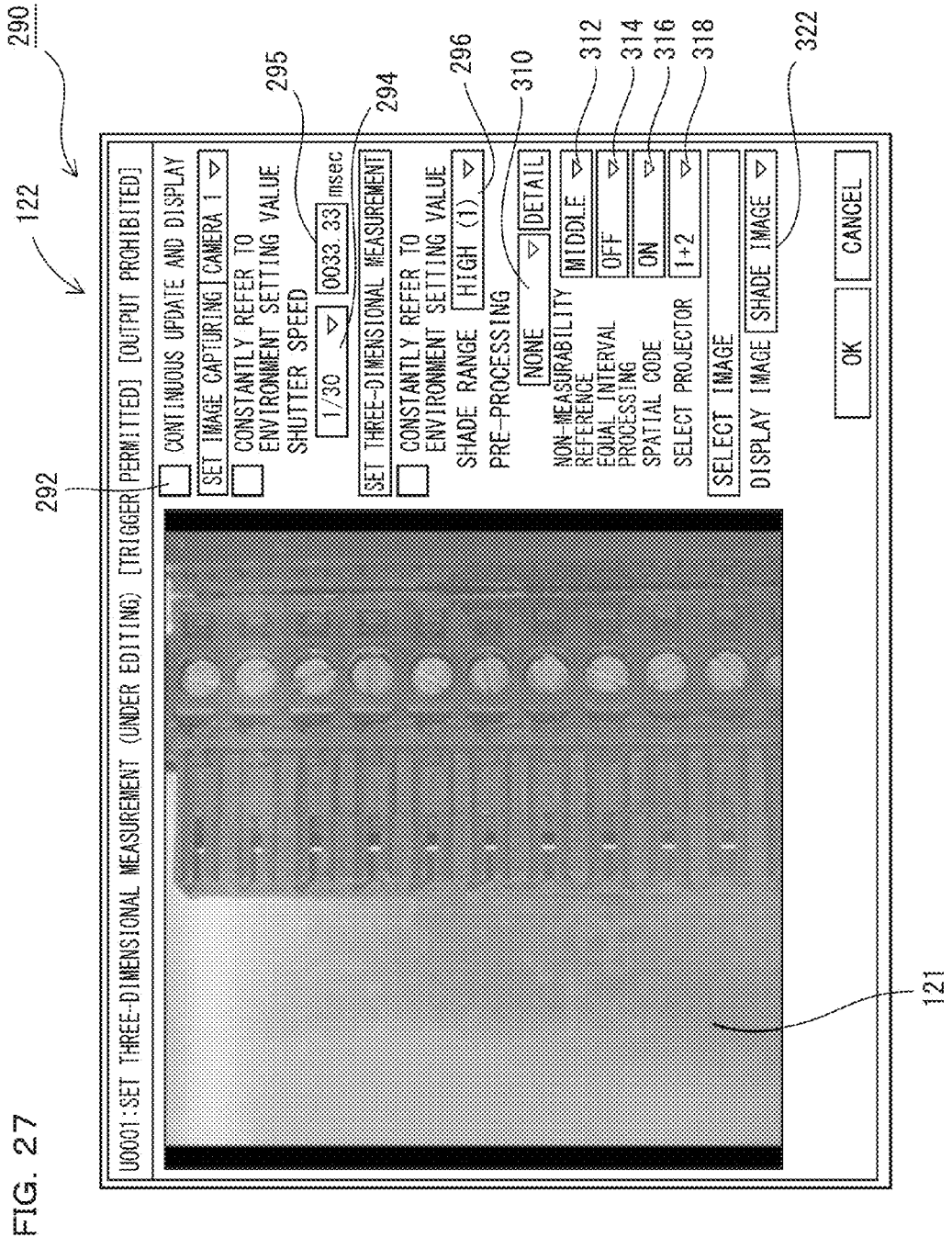
FIG. 27 is an image view showing an example where the equal interval processing is switched "OFF" and a brightness image is displayed.

On the other hand, when the equal interval processing is switched off, the image becomes an image (Z-image) as viewed with eyes as shown in FIG. 26, and distortion occurs in the XY-directions more in a place as getting closer to the end of the screen. However, the time that is required until the image is displayed may be short due to the equal interval processing not being performed. It should be noted that FIG. 27 shows an example where "Shade image" is selected in the display image field and the brightness image is displayed on the second image display region 121.

(Spatial Code Setting Field 316)

Figure 28:
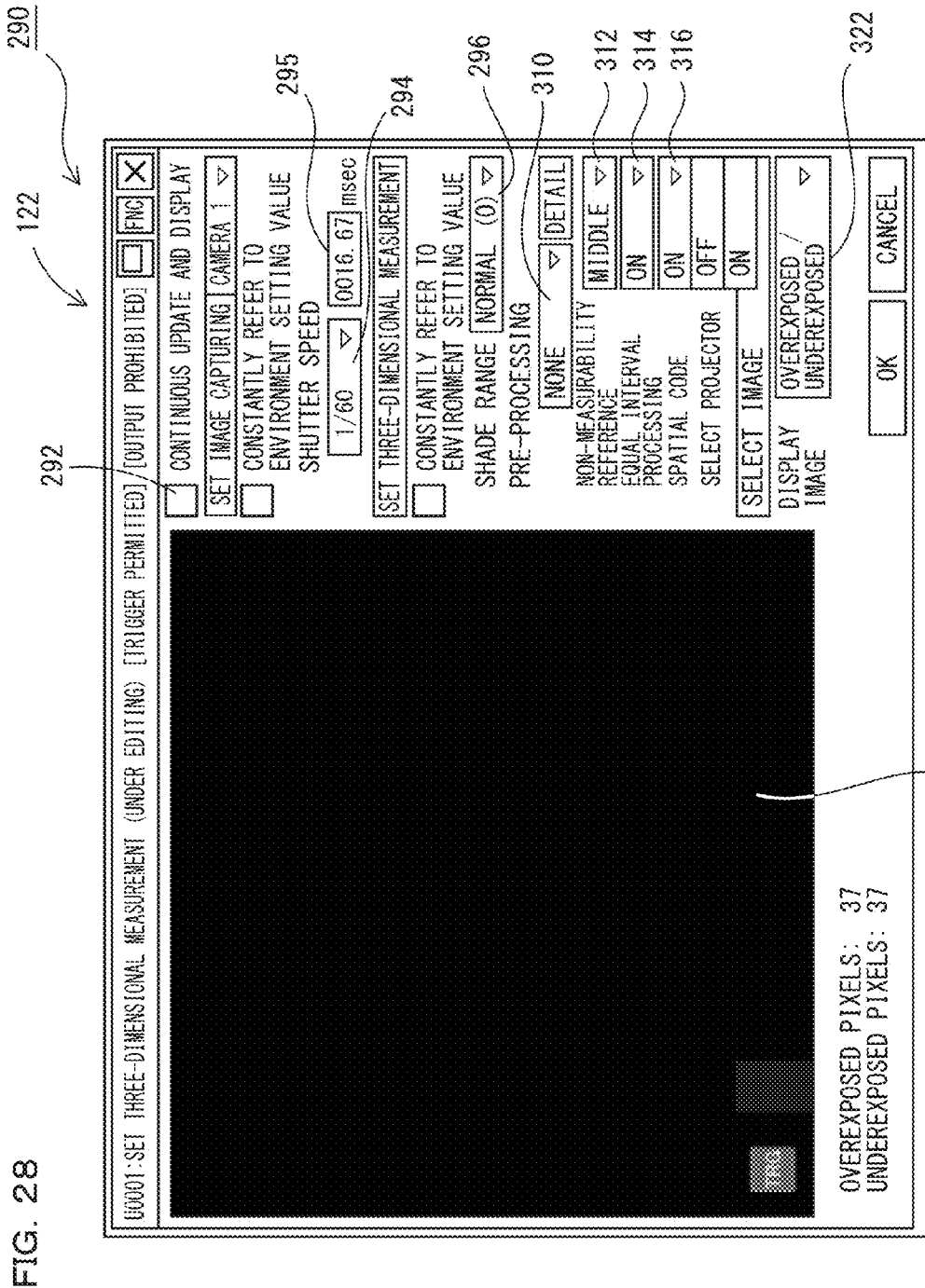
FIG. 28 is an image view showing options that are settable in a spatial code setting field.
Figure 29:
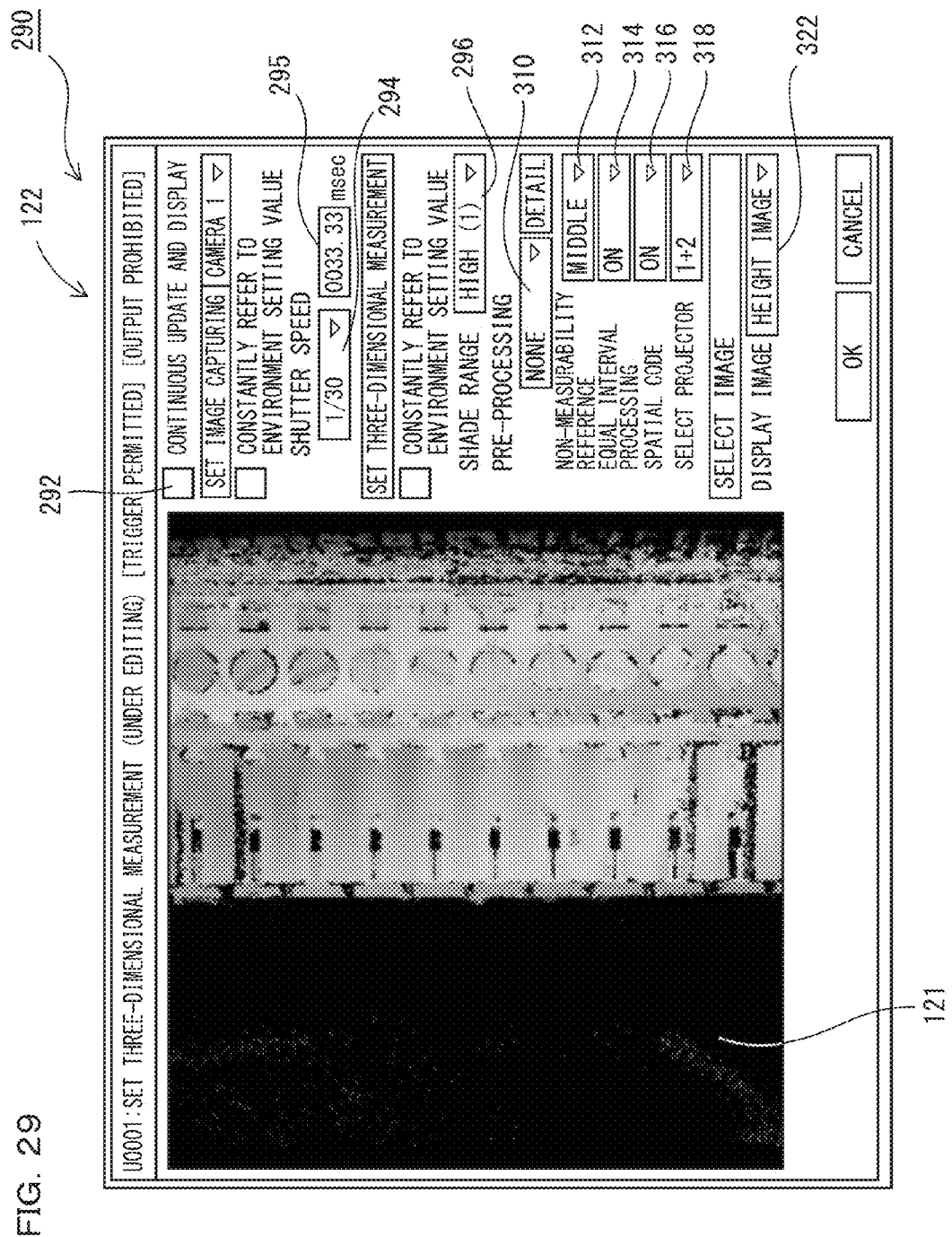
FIG. 29 is an image view showing a state where "Height image" is selected in the "Display image" selection field and a distance image is displayed on a second image display region.
Figure 30:
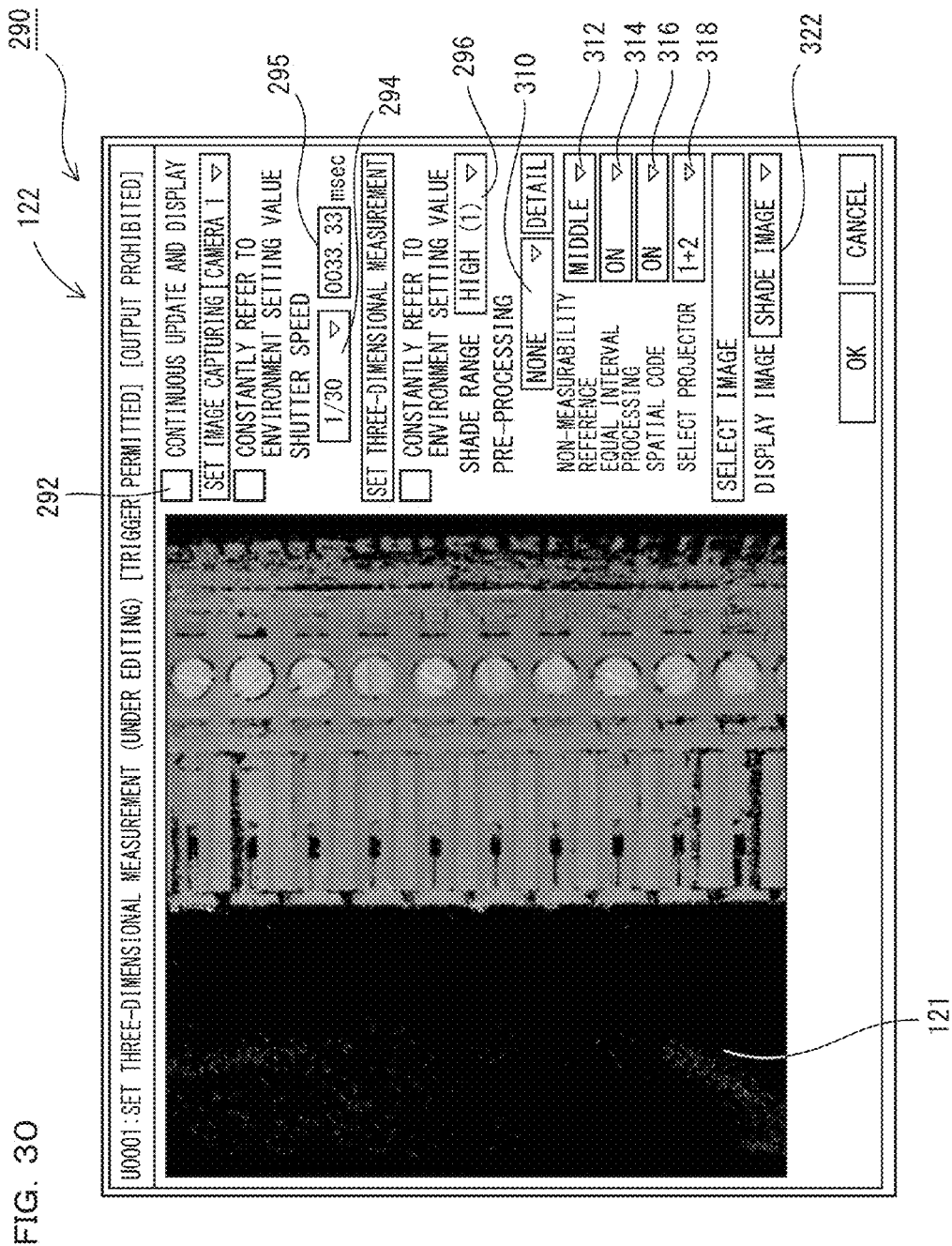
FIG. 30 is an image view showing a state where "Shade image" is selected in the "Display image" selection field and a brightness image is displayed on the second image display region.

In the spatial code setting field 316, whether or not to use the spatial coding method is selected. That is, the spatial code setting field 316 functions as the spatial coding switching part 45. In this three-dimensional image processing apparatus, the phase shift method is essential for generation of the distance image, and it is possible to select in the spatial code setting field 316 as to whether or not to apply the spatial coding method on top of the phase shift method. In the spatial code setting field 316, the on/off can be selected as shown in FIG. 28. When the spatial code setting field 316 is switched on, the height measurement is performed by combining the spatial coding method and the phase shift method. FIGS. 29 and 30 show this example. In these drawings, FIG. 29 shows a state where the distance image is selected as the image to be displayed on the second image display region 121. Specifically, "Height image" is selected in the "Display image" selection field 322. On the other hand, FIG. 30 shows a state where the brightness image is displayed on the second image display region 121, and "Shade image" is selected in the "Display image" selection field 322. An appropriate distance image can be acquired using the spatial coding method on top of the phase shift method. Specifically, since a phase jump due to the phase shift method can be corrected (phase unwrapping can be performed) by the spatial coding method, it is possible to perform the measurement at high resolution while ensuring a wide dynamic range of the height. However, the image capturing time becomes about twice as long as in the case of the spatial code method being off.

Figure 31:
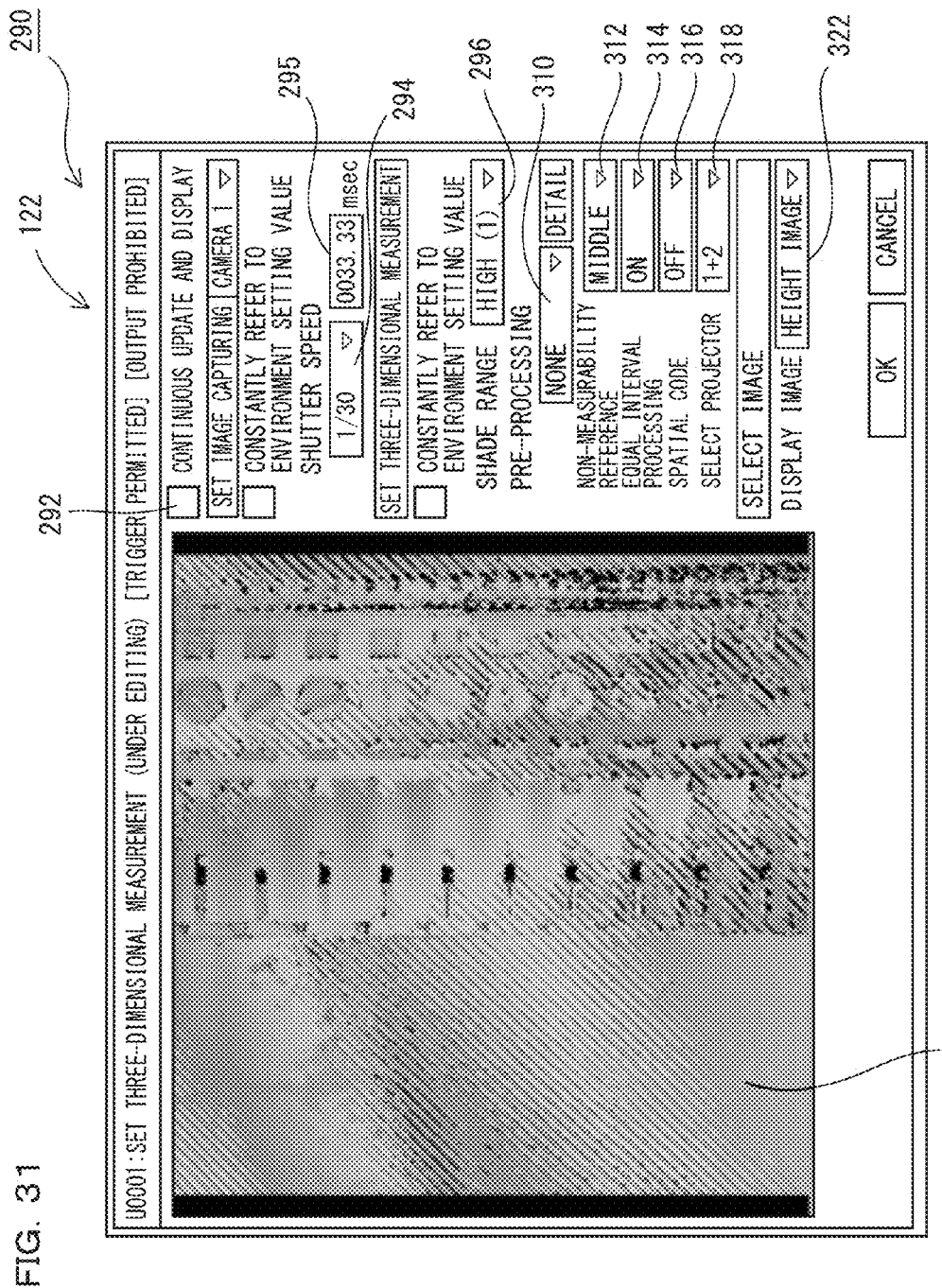
FIG. 31 is an image view showing an example where "OFF" is selected in the spatial code setting field.
Figure 32:
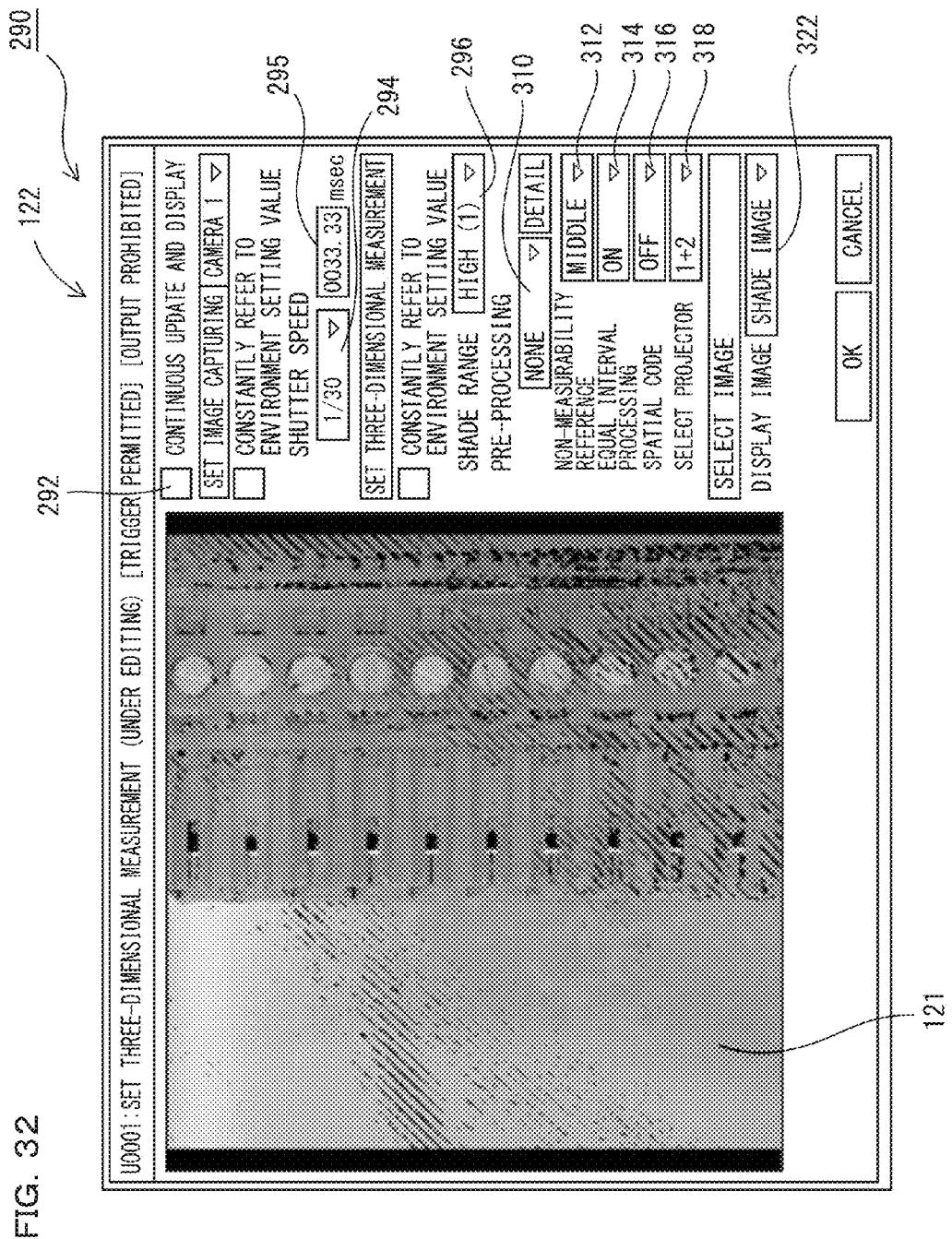
FIG. 32 shows a state where a "Shade image" is displayed in the "Display image" selection field.

On the other hand, as shown in FIGS. 31 and 32, when the off is selected in the spatial code setting field 316, the height measurement is performed only by the phase shift method. In this case, the measurement dynamic range of the height becomes narrow, and hence in the case of a workpiece with a large height difference, the height cannot be correctly measured when there is a phase difference by one cycle or more. In contrast, in the case of a workpiece with a small height change, a fringe image is not captured and synthesized by the spatial coding method, and hence there is an advantage of being able to accelerate the processing accordingly, so as to reduce the image capturing time to about a half. For example, at the time of measuring the workpiece with a small difference in the height direction, the dynamic range does not need taking wide, and hence it is possible to sustain highly accurate height measurement performance even by only the phase shift method while reducing the processing time. In this case, the measurement dynamic range of the height becomes narrow, and hence in the case of the workpiece with a large height difference, the height cannot be correctly measured when there is a phase difference by one cycle or more. In contrast, in the case of the workpiece with a small height change, there can be obtained an advantage of being able to reduce the image capturing time to a half by switching off the spatial code.

The example of FIG. 31 shows a state where "Height image", namely a distance image is displayed in the "Display image" selection field 322, and on the other hand, the example of FIG. 32 shows a state where "Shade image" is displayed in the "Display image" selection field 322.

It is to be noted that, although the phase shift method is essential in this example, the on/off of the phase shift method may be made selectable.

(Projector Selection Setting Field 318)

Figure 33:
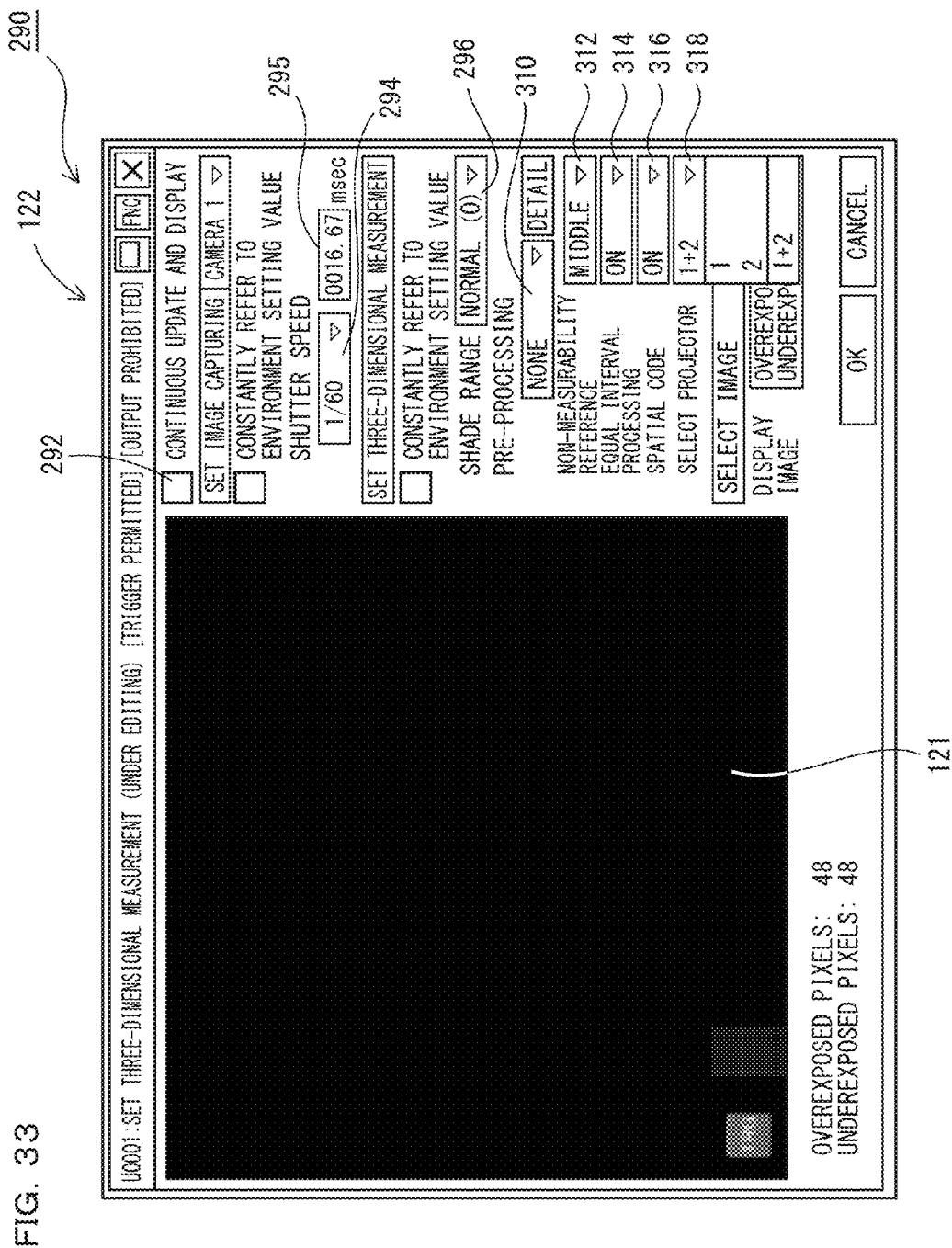
FIG. 33 is an image view showing options that are settable in a projector selection setting field.

The projector selection setting field 318 functions as the light projection switching part 48 for switching on/off the first projector and the second projector. Here, in the projector selection setting field 318, a light projecting part (projector) to be used is selected from the first projector and the second projector which are the two light projecting parts. In this example of the projector selection setting field 318, as shown in FIG. 33, any of "1" (first projector), "2" (second projector) and "1+2" (first projector and second projector) is selected from a drop-down box.

Figure 34:
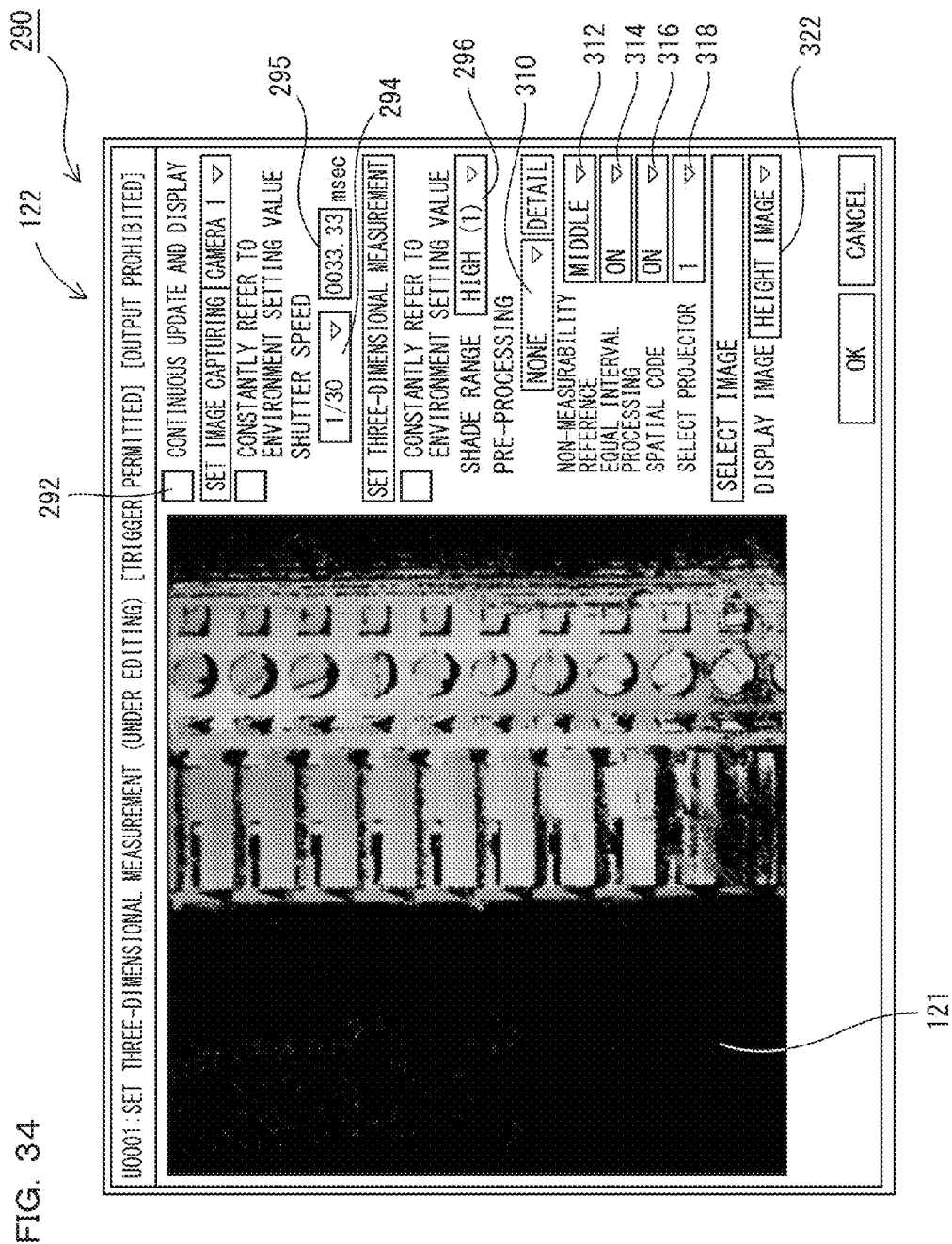
FIG. 34 is an image view showing an example where "1" is selected in the projector selection setting field.
Figure 35:
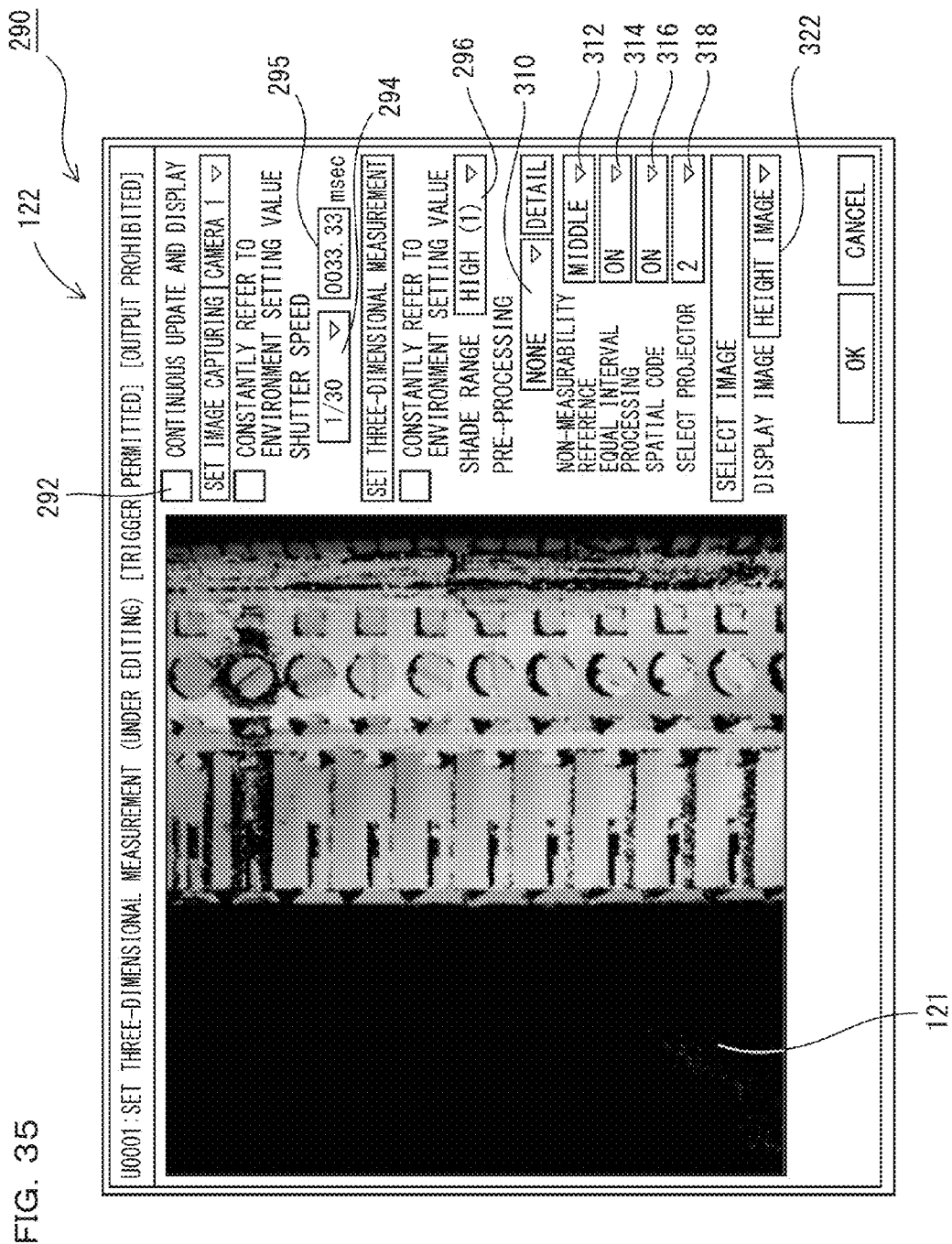
FIG. 35 is an image view showing an example where "2" is selected in the projector selection setting field.

In the case of "1" or "2" being selected in the projector selection setting field 318, namely in the case of one-side light projection which is light projection from either the first projector or the second projector, a portion that is shaded by the light projection is not subjected to the height measurement. FIG. 34 shows an example where "1" is selected in the projector selection setting field 318, and FIG. 35 shows an example where "2" is selected therein. On each of the screens, data of the shaded portion is displayed black, and it can be confirmed from each of the screens that a region where the height is not measurable exists on the workpiece. Further, as obvious from these drawings, it is found that the region that becomes non-measurable differs depending on the light projecting part. In other words, there exist many regions which become the non-measurable regions with one light projecting part, but become measurable with the other light projecting part and can thus be subjected to the height measurement. Therefore, combining these allows reduction in non-measurable regions. Especially by disposing the first projector and the second projector so as to sandwich the workpiece from both sides, the workpiece is irradiated with first light projection from the first projector and second light projection from the second projector in the opposed directions, and hence even a region shaded by either one light projection has a reduced risk of being shaded by the other light projection from the exactly opposite direction.

Figure 36:
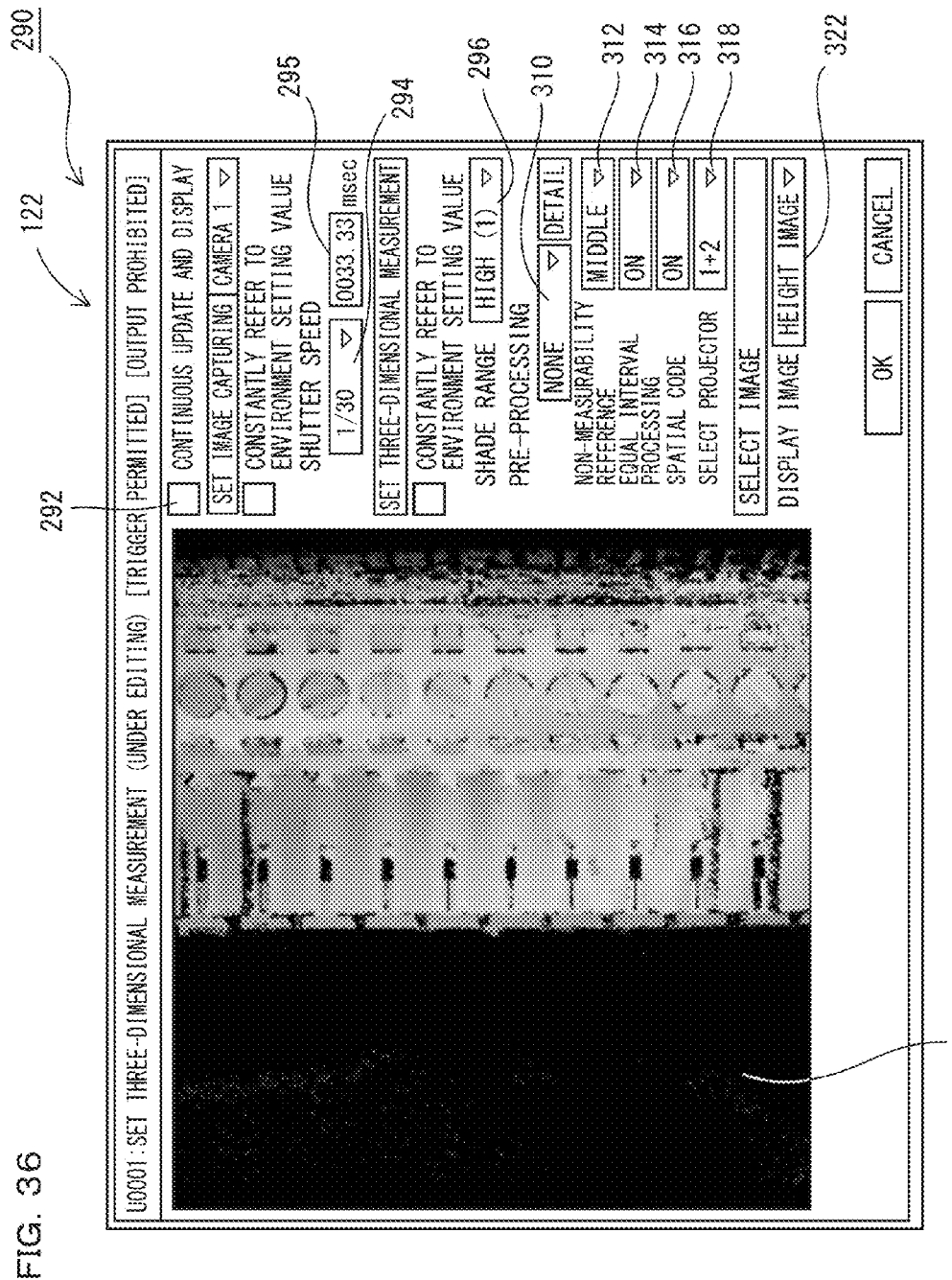
FIG. 36 is an image view showing an example where "1+2" is selected in the projector selection setting field.

Specifically, as shown in FIG. 36, when "1+2" is selected in the projector selection setting field 318, the light projection is switched to both-side light projection which is light projection from both the first projector and the second projector. In this state, when even a portion shaded by the light projection from either one projector can be projected with light from the other projector, this can be interpolated. However, in this case, there is required the image capturing time about twice as long as that in the case of the one-side light projection. The user selects which light projection is to be used in accordance with the unevenness of the workpiece as the inspection target, the permissive image capturing time, or the like.

("Display Image" Selection Field 322)

Figure 37:
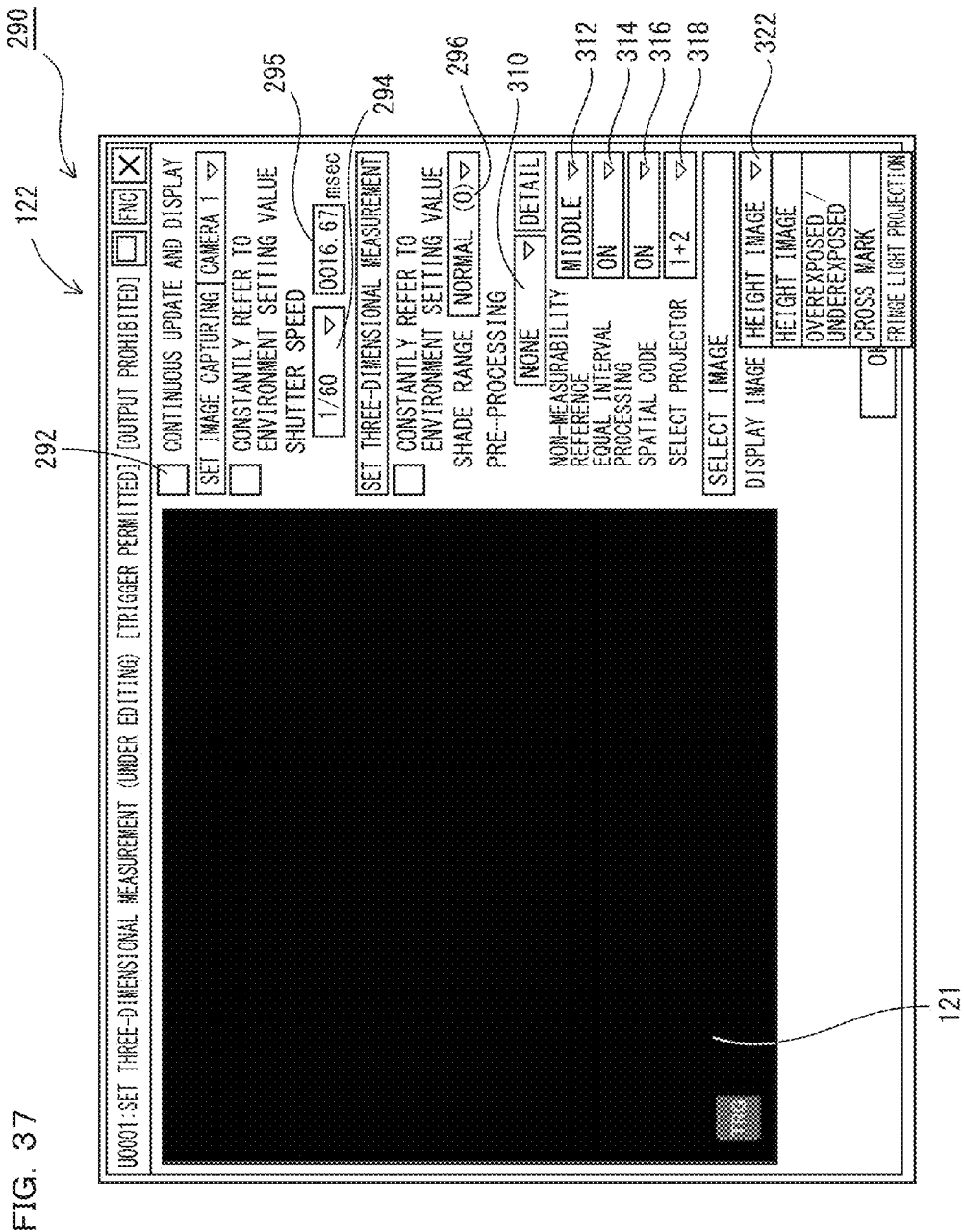
FIG. 37 is an image view showing options that are settable in the "Display image" selection field.

In the "Display image" selection field 322, the image to be displayed on the second image display region 121 is selected. For example, by selecting the display target in accordance with a use of the inspection, it is possible to visually confirm the appropriateness of each setting from the actually displayed image. Particularly, by switching on the foregoing real-time update part, the change in setting can be successively updated and the setting can be compared between before and after the change, thereby allowing the setting to be adjusted based on the image, so as to give an intended image in line with its use. Further, there can also be obtained such an advantage that even a beginner not familiar with a meaning of each setting parameter can perform the setting while viewing the image. In this example, as shown in FIG. 37, from the "Display image" selection field 322, any of "Height image", "Shade image", "Overexposed/underexposed image", "Fringe light projection—Projector 1" and "Fringe light projection—Projector 2". "Height image" is the distance image, and an image color-coded in a contour form with respect to each height is displayed. "Shade image" is the brightness image. In this example, an image obtained by synthesizing a plurality of pattern projected images captured based on the phase shift method is used as the brightness image. However, it is also possible to irradiate the workpiece with light, capture an optical image by means of the image capturing part, and then use the captured image as the brightness image.

(Abnormal Point Highlight Part 62)

Moreover, the three-dimensional image processing apparatus is provided with the abnormal point highlight part 62 as shown in FIG. 5. For example, "Overexposed/underexposed image" that is selectable in the "Display image" selection field 322 described above is an image obtained by partially coloring pixels saturated and overexposed, pixels short of a light amount and underexposed, and the like, with respect to the brightness image. As thus described, a portion in the image where an accurate value has not been obtained and the reliability in measurement accuracy is low is highlighted by coloring treatment, thereby to visually notify the user of the portion with low measurement accuracy and facilitate the user confirming whether or not an image in accordance with a desired inspection use has been acquired. In this example, the overexposed pixels are colored yellow and the underexposed pixels are colored blue. Herewith, the user can visually confirm how an overexposed region distributes in the image with the aid of the color. Further, under the second image display region 121, the numbers of the overexposed pixels and the underexposed pixels are counted and displayed. While referring to these, the user adjusts each setting item so as to get these number of pixels closer to 0.

It is to be noted that the colored color and its mode are not restricted to the above, and a variety of known modes, such as making a display with another color and making a blink display, can be used as appropriate. Further, by changing the colors for coloring the overexposed pixels and the underexposed pixels, it is possible to notify the user of the reason for deterioration in reliability of the measurement, so as to facilitate taking countermeasures. However, the overexposed pixels and the underexposed pixels may be colored with similar colors or be similarly highlighted.

Figure 38:
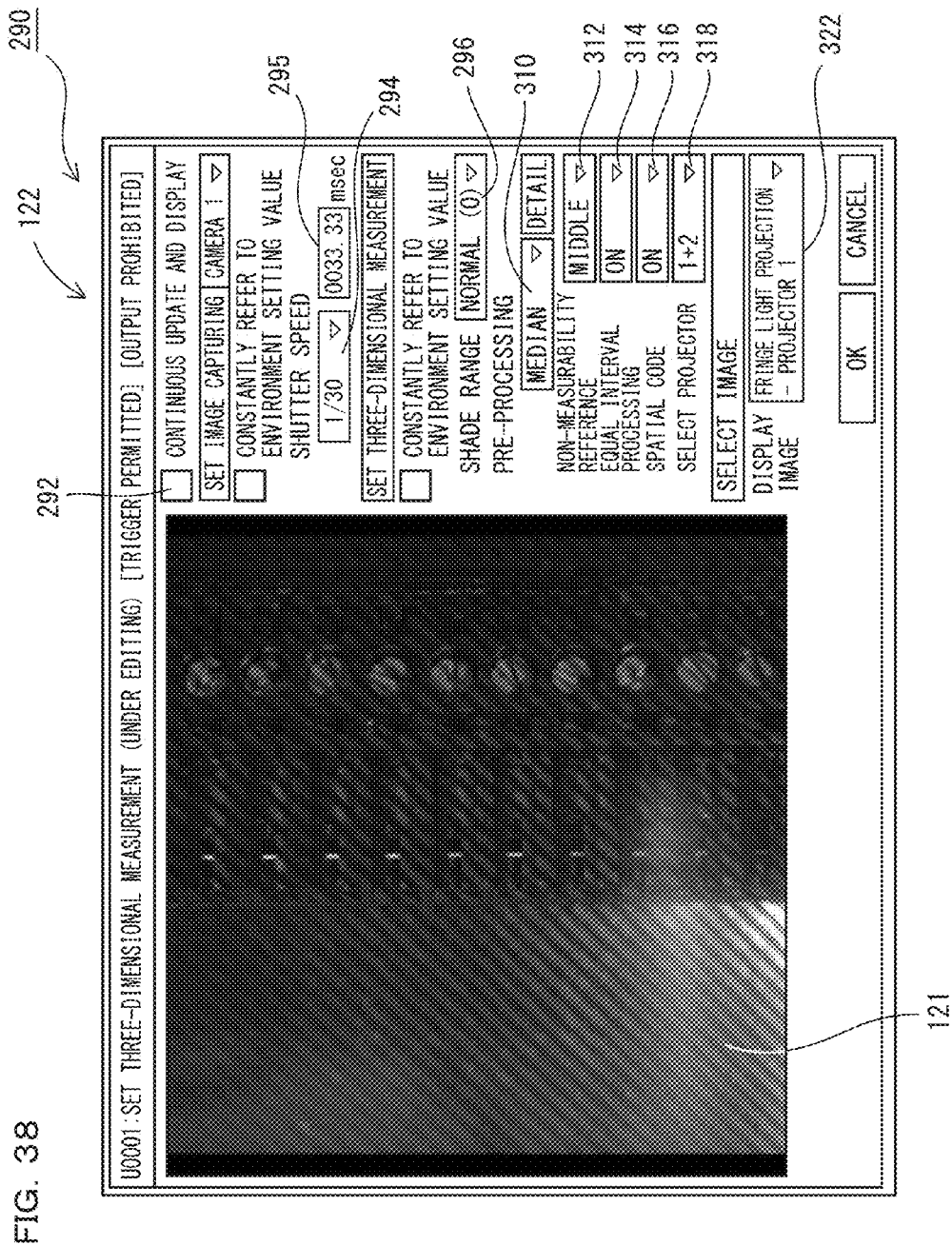
FIG. 38 is an image view showing an example where "Fringe light projection—Projector 1" is selected in the "Display image" selection field, and a pattern projected image of a first projector is displayed on the second image display region.
Figure 39:
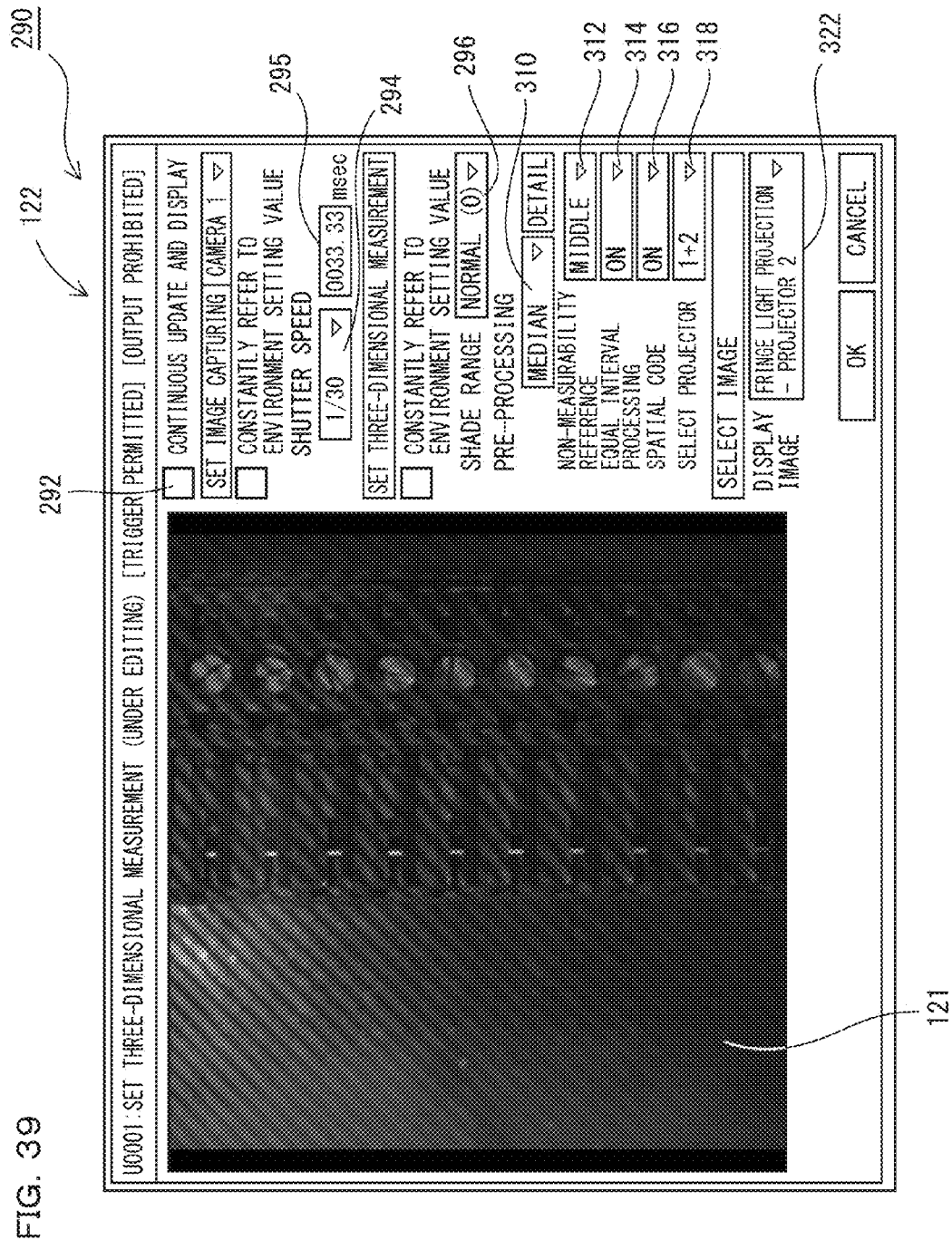
FIG. 39 is an image view showing an example where "Fringe light projection—Projector 2" is selected in the "Display image" selection field and a pattern projected image of a second projector is displayed on the second image display region.

"Fringe light projection—Projector 1" is a pattern projected image expressed by a shade and obtained by projecting a pattern only by means of the first projector. Further, "Fringe light projection—Projector 2" is a pattern projected image obtained only by means of the second projector. FIG. 38 shows an example where "Fringe light projection—Projector 1" is selected in the "Display image" selection field 322 and a pattern projected image of the first projector is displayed on the second image display region 121, and FIG. 39 shows an example where "Fringe light projection—Projector 2" is selected and a pattern projected image of the second projector is displayed on the second image display region 121. By confirming the fringe images from these screens, there can be specified a cause of a case where the height of the workpiece cannot be measured, such as a cause that a material for the workpiece is translucent and projected light has come thereinto, and it can be confirmed from the original pattern projected image before generation of the distance image that the workpiece is one whose pattern projected image is difficult to obtain.

While referring to the image displayed on the second image display region 121, the user confirms whether or not the shutter speed and the shade range are appropriate, and adjusts those to appropriate values. Specifically, in the state where the overexposed/underexposed image is displayed on the second image display region 121, the adjustment is performed while making a confirmation so as to reduce the clipped overexposed pixels and underexposed pixels. For example, the shutter speed is adjusted in the shutter speed setting field 294 so as to eliminate the underexposed pixels, namely the portion being short of a light amount and excessively dark. Further, the shade range is adjusted so as to eliminate the overexposed pixels, namely the excessively bright portion. In an example of FIG. 16, it is excessively dark and the number of underexposed pixels is thus large in the overexposed/underexposed image. Therefore, the shutter speed is to be adjusted.

Figure 40:
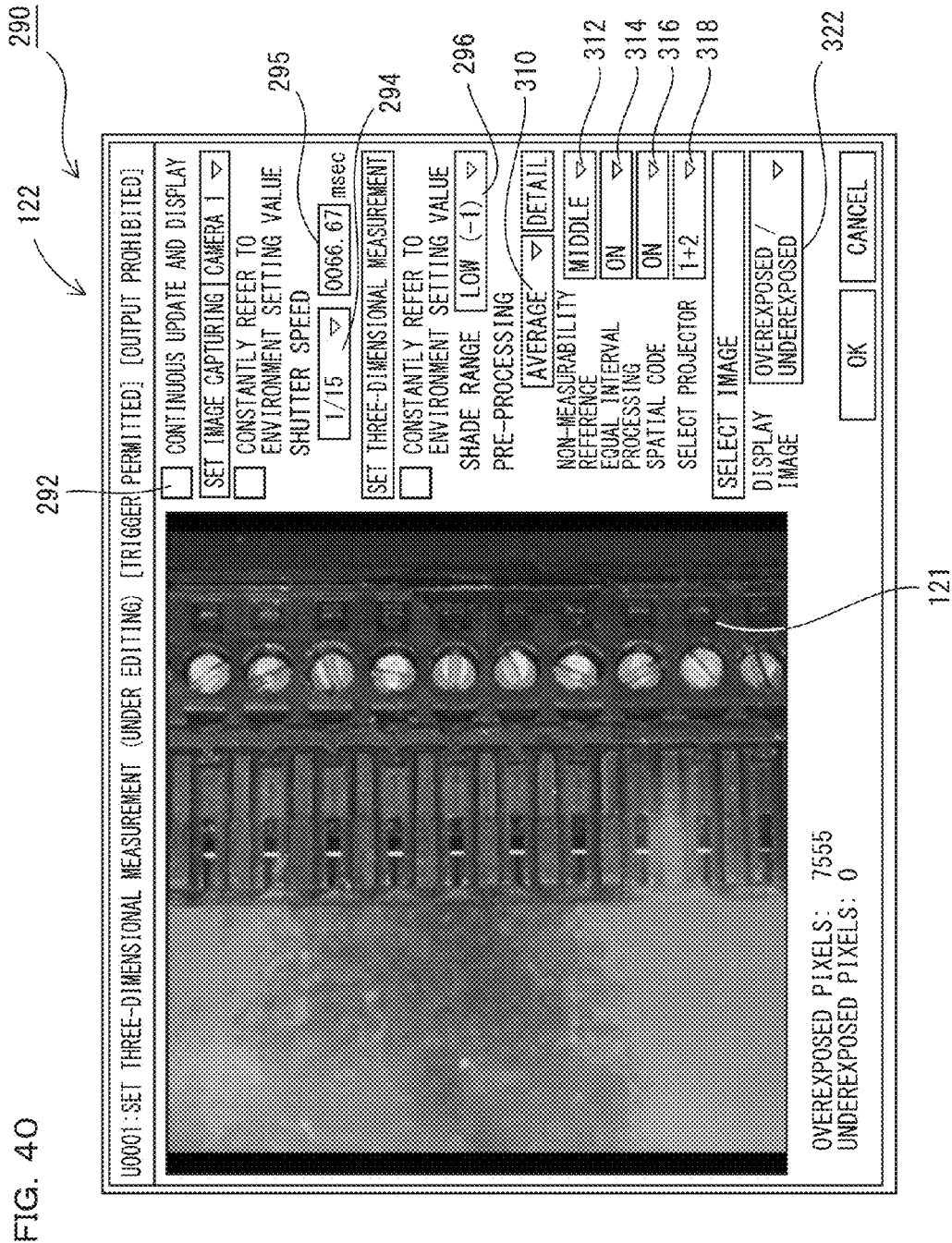
FIG. 40 is an image view showing a three-dimensional measurement setting screen where a shutter speed setting field is set to "1/15"

For example, when the shutter speed is switched to "1/15" as shown in FIG. 40 from the state of FIG. 16 where the shutter speed setting field 294 is set to "1/120", it is found that the brightness image becomes slightly brighter and the number of underexposed pixels becomes 0. In contrast, the number of overexposed pixels has increased. Accordingly, when the shutter speed is switched to "1/30" as shown in FIG. 41, it is found that the number of overexposed pixels decreases while the number of underexposed pixels remains 0.

Figure 41:
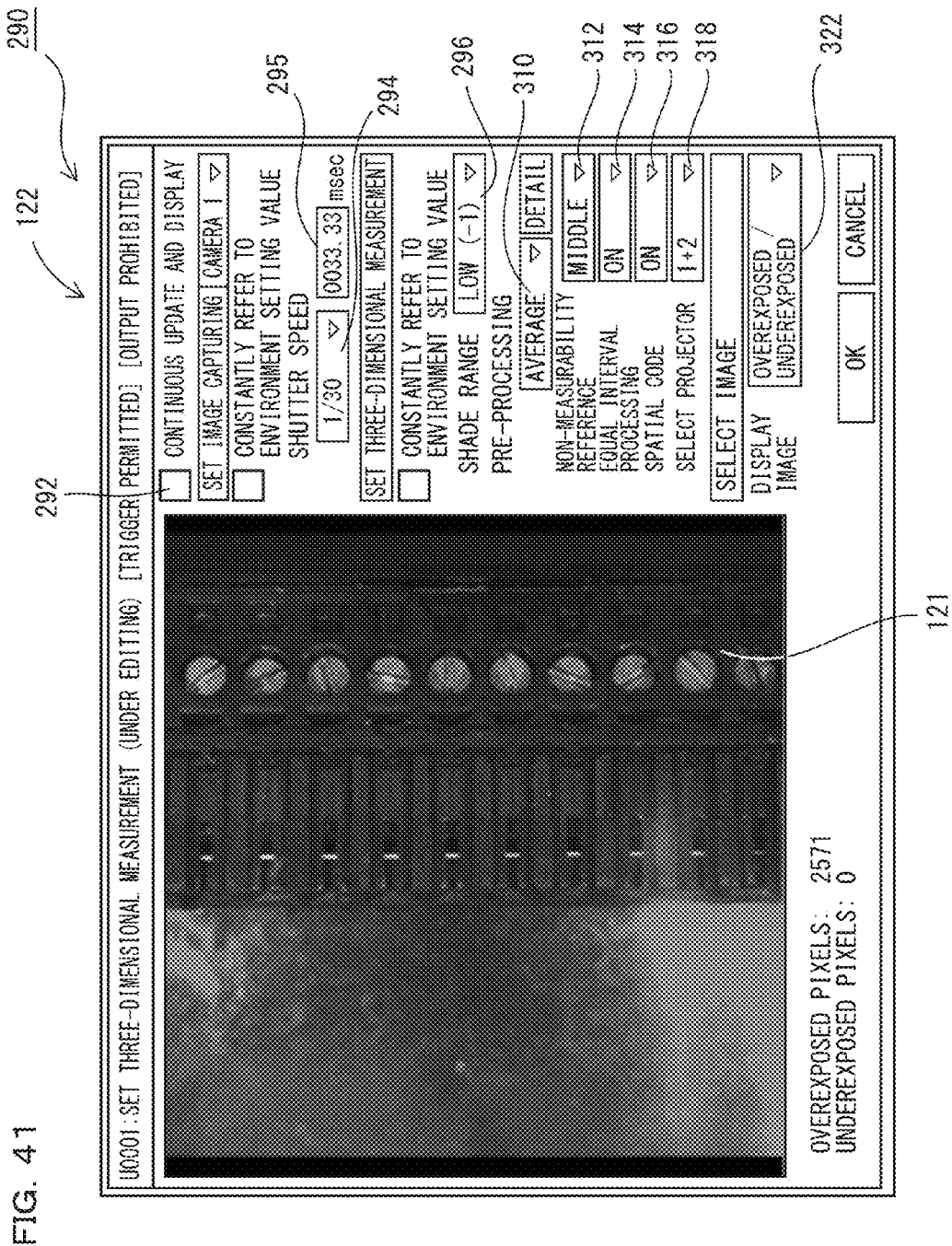
FIG. 41 is an image view showing a three-dimensional measurement setting screen where the shutter speed setting field is set to "1/30"
Figure 42:
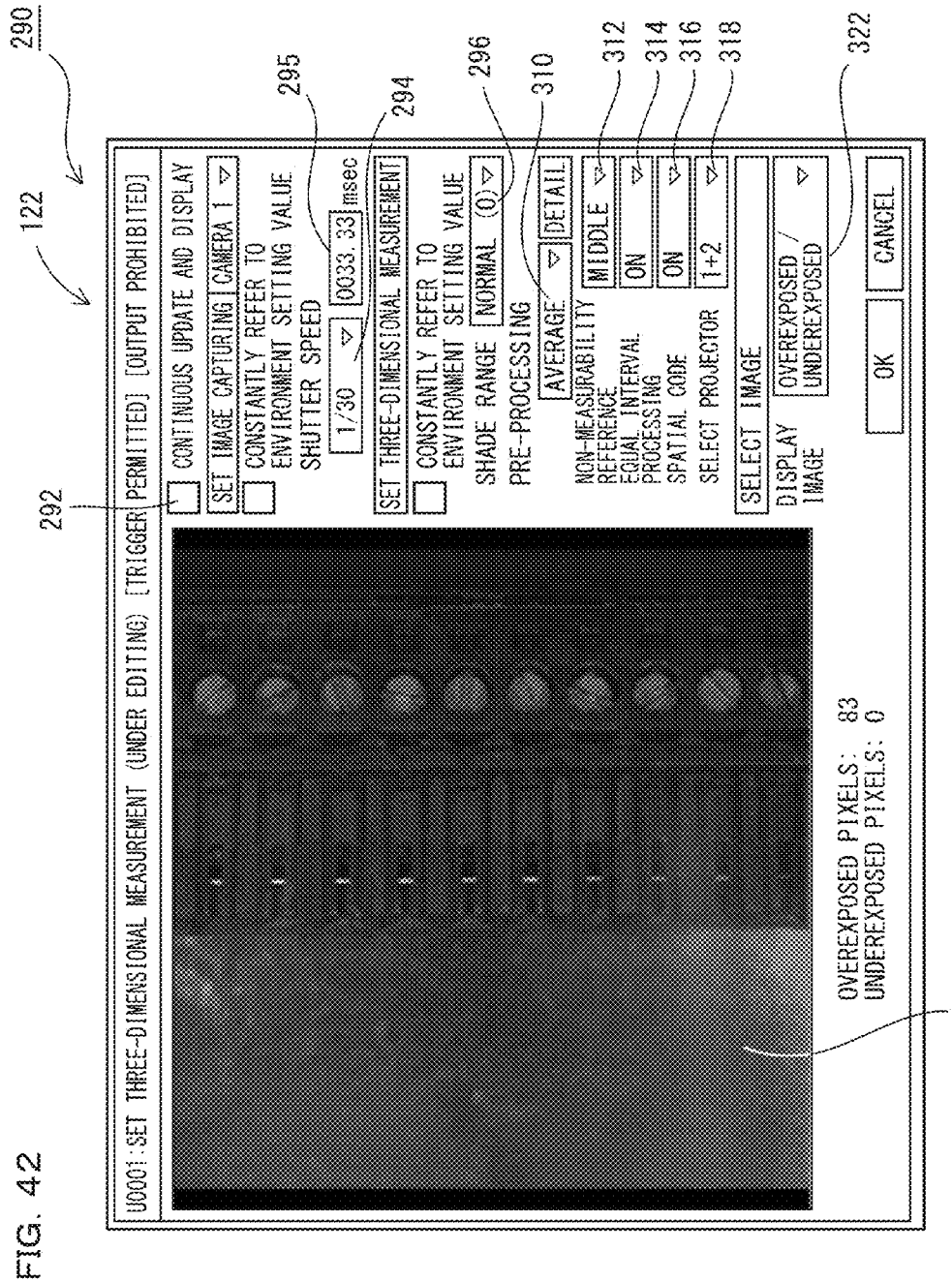
FIG. 42 is an image view showing a three-dimensional measurement setting screen where a shade range setting field is set to "Normal (0)"
Figure 43:
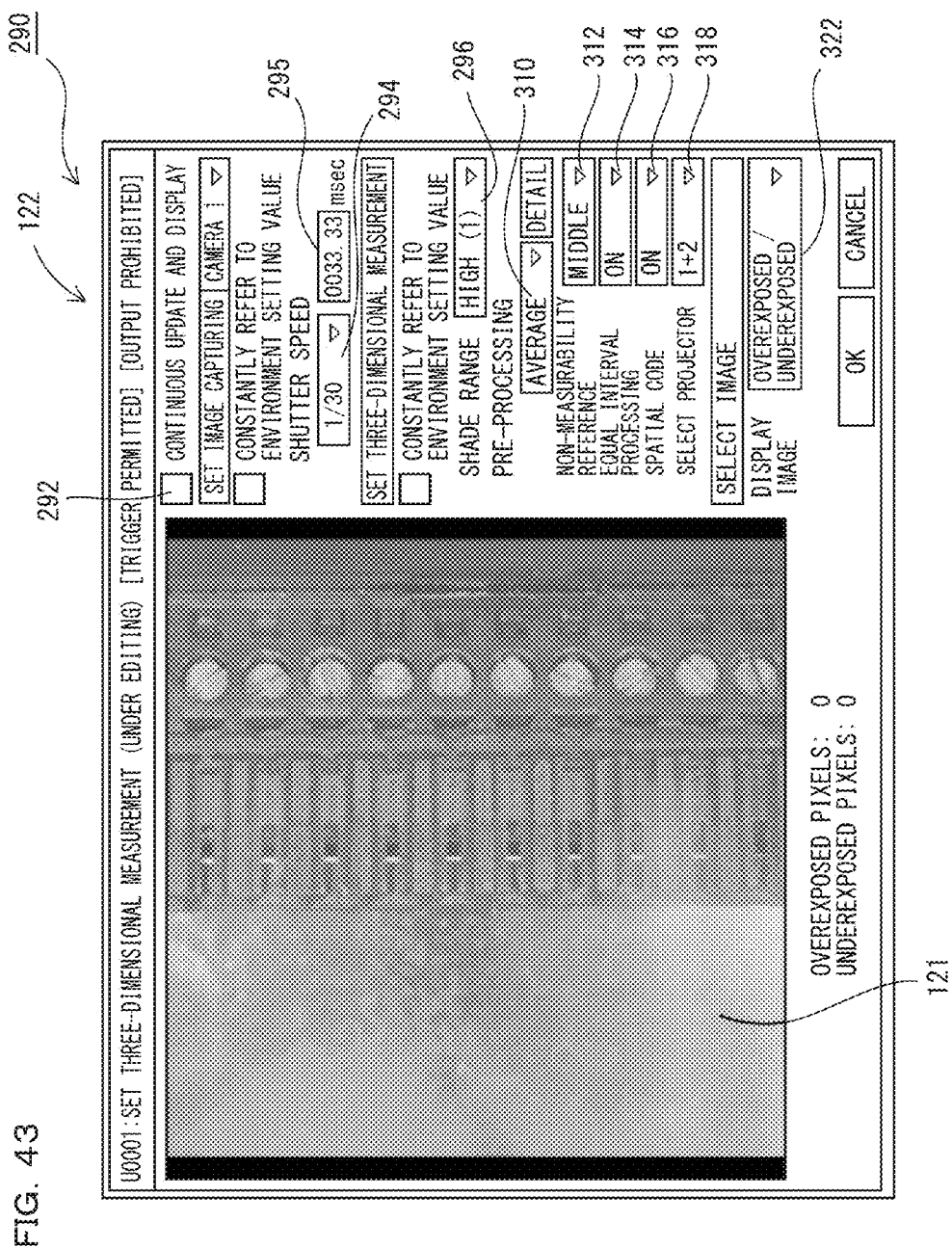
FIG. 43 is an image view showing a three-dimensional measurement setting screen where the shade range setting field is set to "High (1)"

Further, when the shade range is switched to "Normal (0)" as shown in FIG. 42 and leveled up by one from the state of FIG. 41 where the shade range setting field 296 is set to "Low (−1)", it is found that the number of overexposed pixels decreases. When it is further switched to "High (1)" as shown in FIG. 43, it is found that the number of overexposed pixels becomes 0. Herewith, the number of overexposed pixels and the number of underexposed pixels both become 0, and the adjustment operations for the shutter speed and the shade range are completed.

In such a manner as above, after the desired image capturing conditions have been set, the distance image and the brightness image are registered as shown in FIGS. 12 and 13 described above, and the image registration operation is completed.

(Height Measurement Setting Procedure)

Next, based on FIGS. 44 to 55, a description will be given of a procedure for setting a region for performing the height measurement with respect to each of the input images of the workpiece as the inspection target, which are successively inputted at the time of operation. Here, a typical image of the workpiece which represents a plurality of inputted images of the workpiece is previously registered as the registered image by the above described procedure, and a region is set for performing the height measurement with respect to this registered image.

Figure 9:
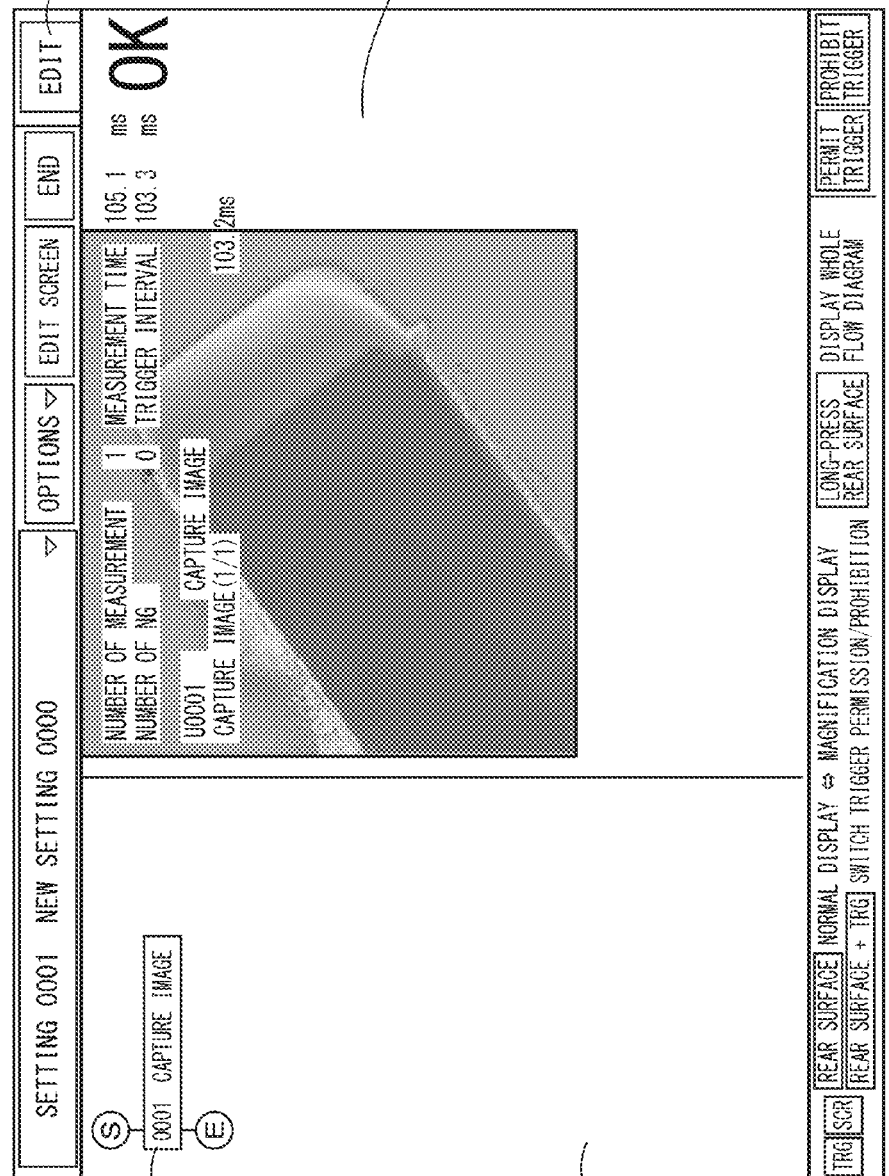
FIG. 9 is an image view showing an initial screen added with "Capture image" in a three-dimensional image processing program.
Figure 44:
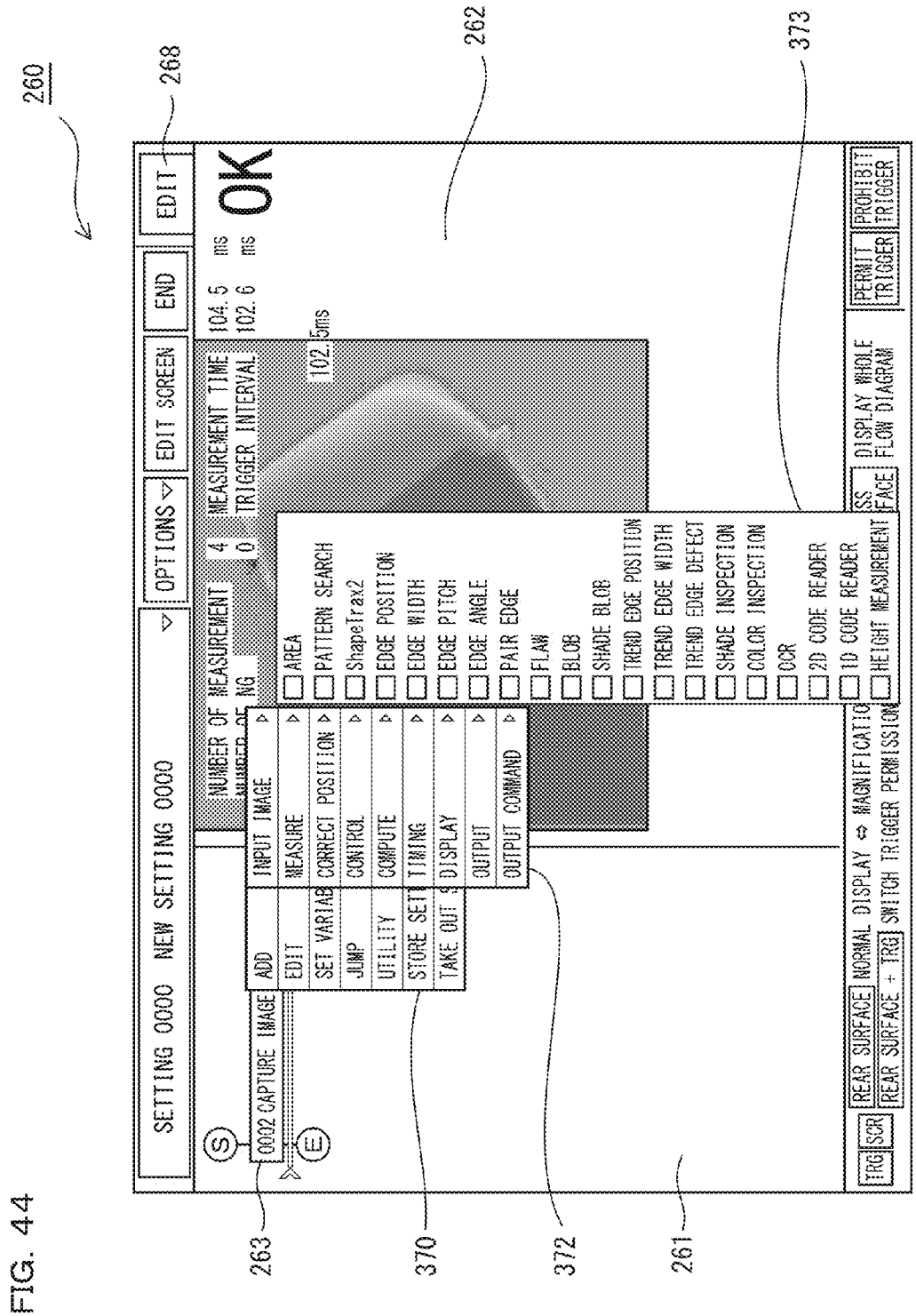
FIG. 44 is an image showing a situation where a "Height measurement" processing unit is added from the state of FIG. 9.
Figure 45:
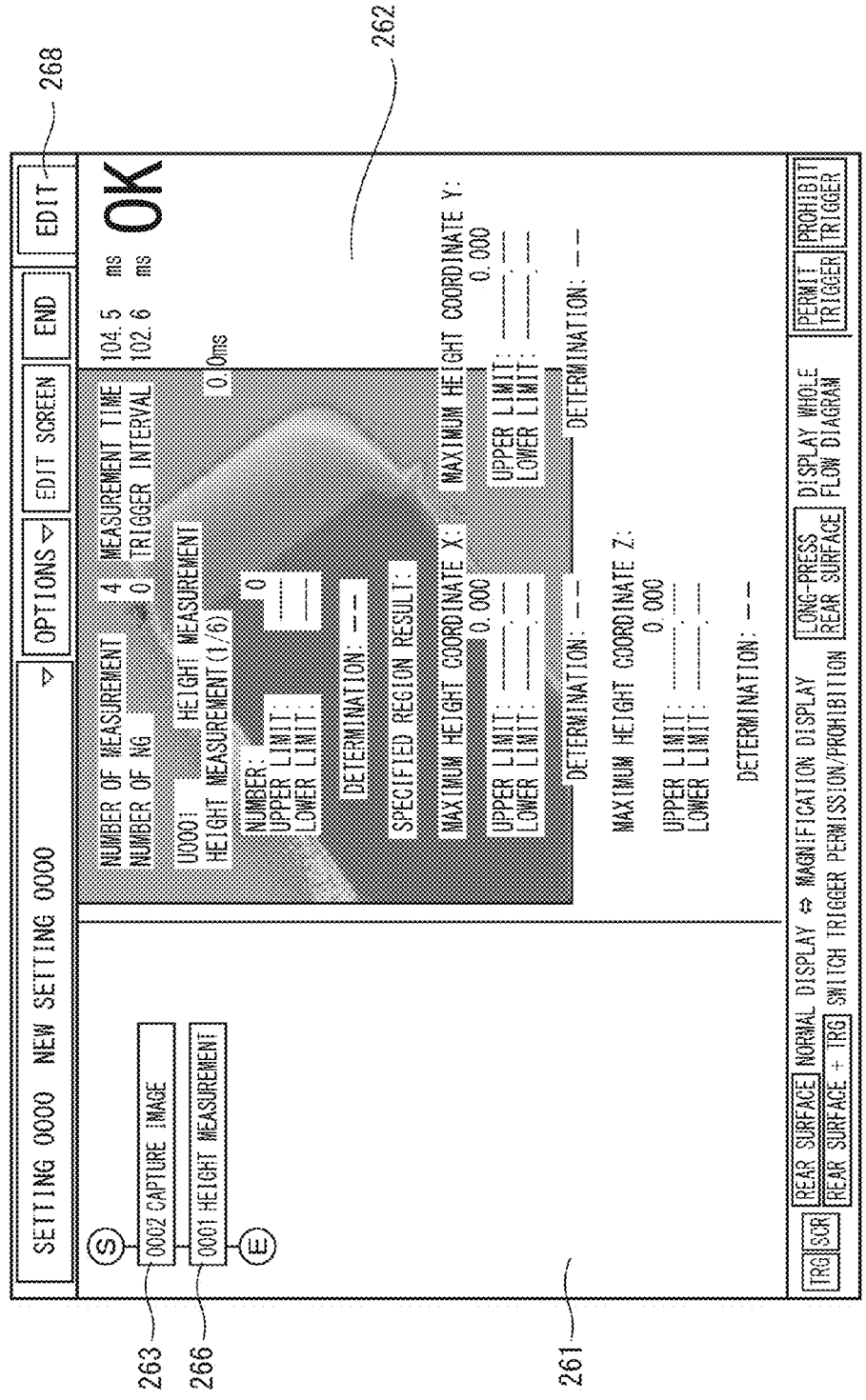
FIG. 45 is an image view showing the initial screen added with the "Height measurement" processing unit through FIG. 44.

Specifically, as shown in FIGS. 44 and 45, a "Height measurement" processing unit 266 is added from the initial screen 260 of FIG. 9. In the example of FIG. 44, "Add" is selected from a first submenu 370 displayed by a right click or the like under the "Image capturing" processing unit 263 in the flow display region 261, and out of inspection processing listed in a "Measurement" menu 373 displayed by selecting "Measurement" in a second submenu 372, the "Height measurement" processing unit 266 for performing "Height measurement" is added. Herewith, as shown in FIG. 45, the "Height measurement" processing unit 266 is newly added under the "Image capturing" processing unit 263 in the flow display region 261. As thus described, the "Measurement" menu 373 functions as an inspection processing selecting part for selecting the inspection processing to be executed by the inspection executing part.

(Inspection Target Region Setting Screen 120)

Figure 46:
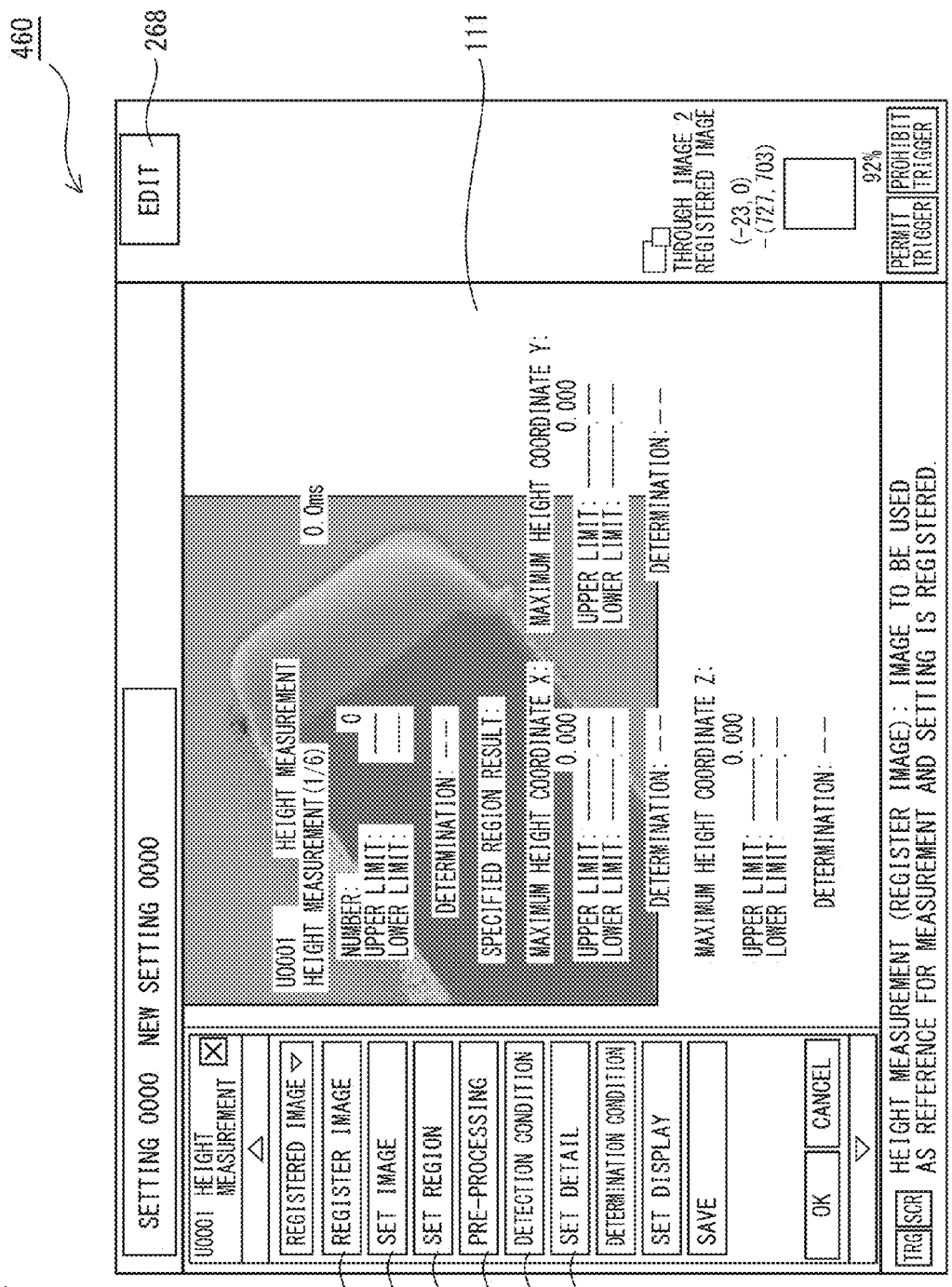
FIG. 46 is an image view showing a height measurement setting screen.
Figure 47:
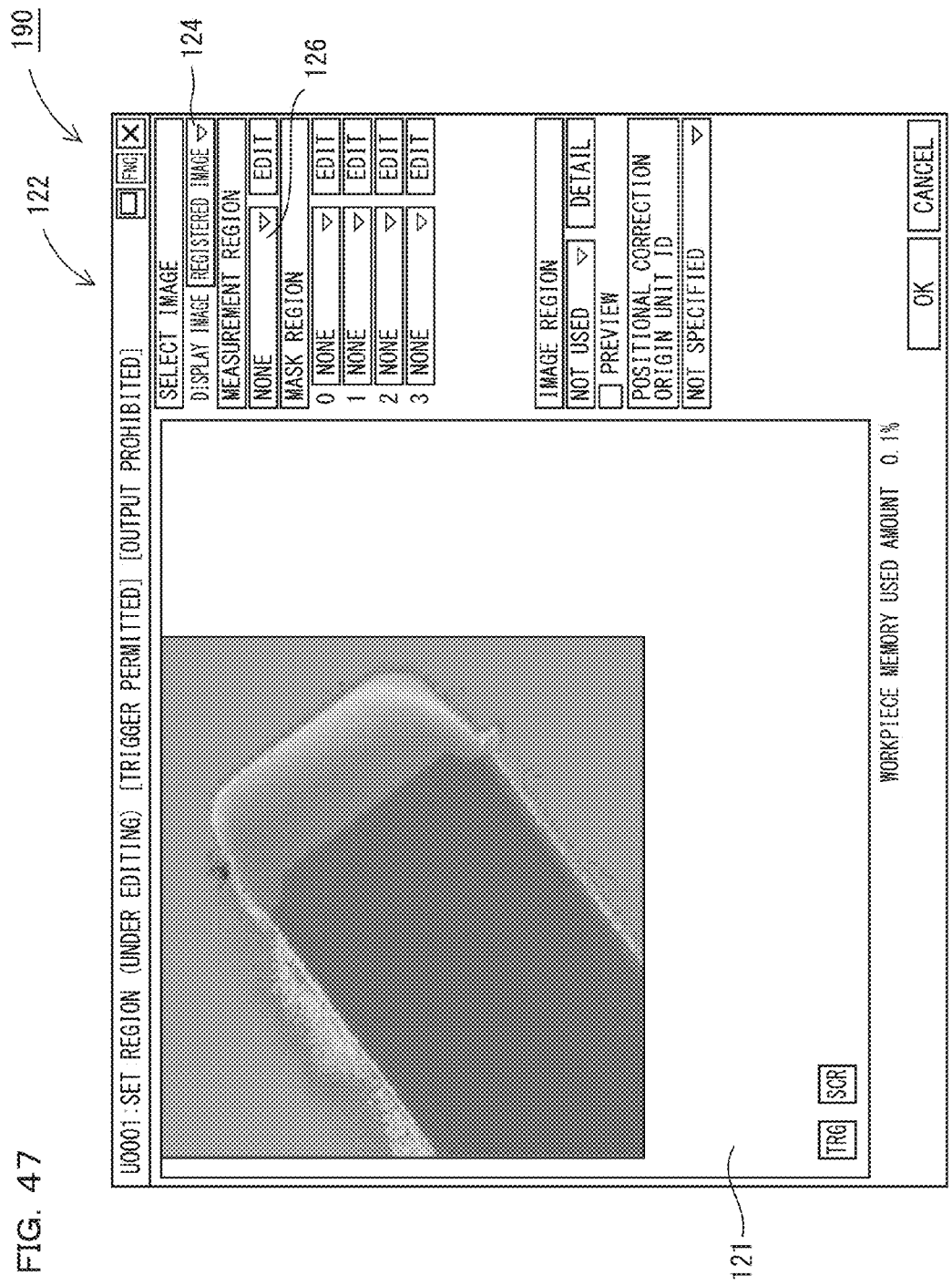
FIG. 47 is an image view showing an inspection target region setting screen.

Next, based on FIGS. 46 to 49, a description will be given of a procedure for setting a region as a setting that should be performed in the "Height measurement" processing unit 266. First, when an edition screen for the "Height measurement" processing unit is called from the screen of FIG. 45, the screen shifts to a height measurement setting screen 460 shown in FIG. 46. Similarly to FIG. 10, also in a GUI screen example of FIG. 46, the first image display region 111 for displaying an image is provided on the right side of the screen, and the setting item button region 112 where a plurality of setting item buttons are disposed is provided on the left side of the screen. The setting item button region 112 is provided with the "Register image" button 113, a "Set image" button 114, "Set region" button 115, a "Pre-processing" button 117, an "Detection condition" button 118, a "Detail setting" button 119, a "Determination condition" button, a "Set display" button, a "Save" button, and the like. When the user presses the "Set region" button 115 corresponding to the inspection target region setting part from this screen, the screen shifts to an inspection target region setting screen 120 shown in FIG. 47. In the inspection target region setting screen 120, it is possible to specify a region for performing the inspection. In the example of FIG. 47, the second image display region 121 is provided on the left of the screen, and the operation region 122 for performing a variety of operations is disposed on the right side of the screen. In the upper stage of the operation region 122, there is provided a "Display image" selection field 124 for selecting the image to be displayed on the second image display region 121. In the example of FIG. 47, the registered image is selected in the "Display image" selection field 124. Still thereunder, a "Measurement region" setting field 126 is provided as an inspection target region setting part for specifying a region for executing the inspection.

Figure 48:
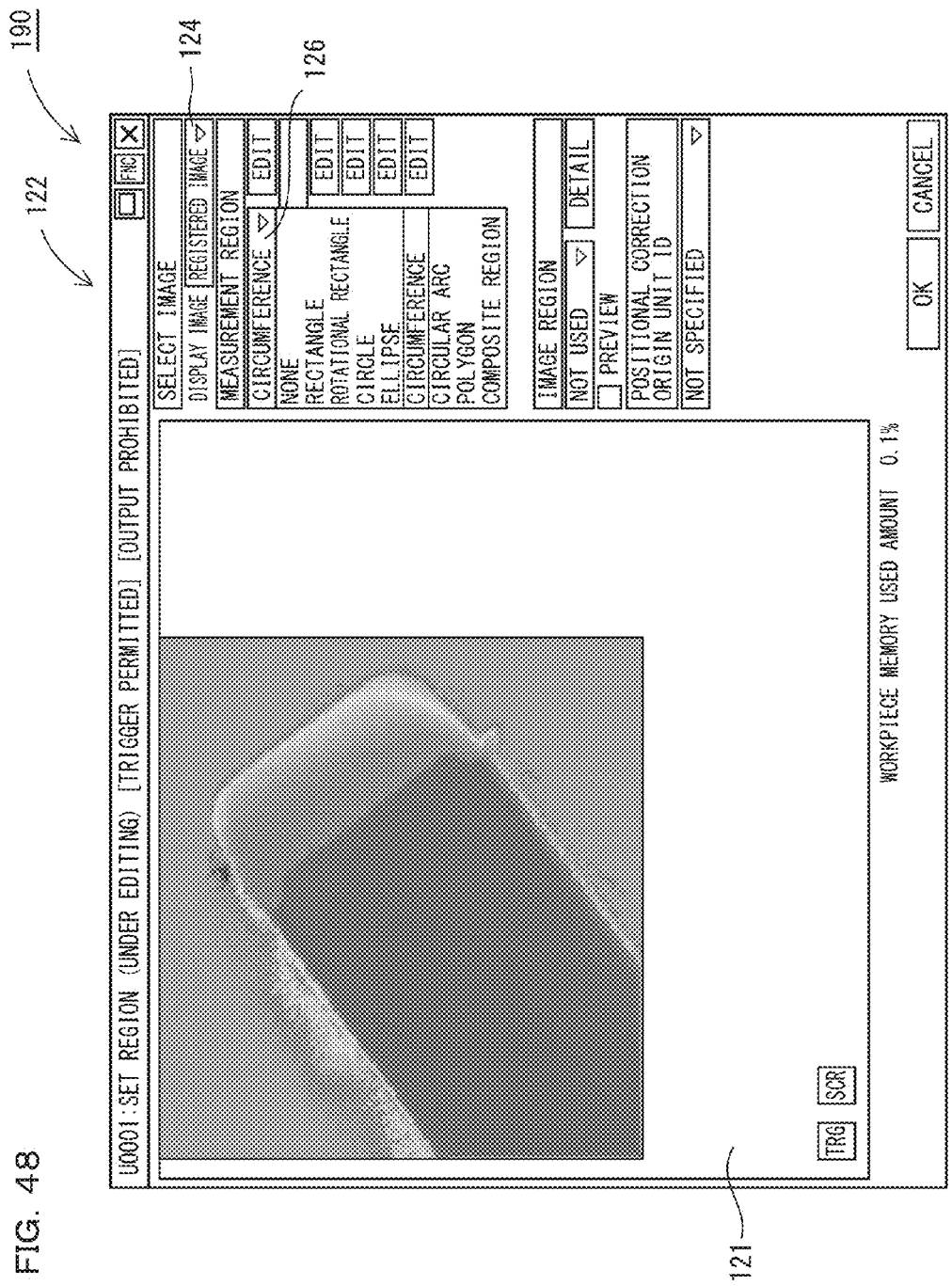
FIG. 48 is an image view showing a state where a drop-down menu of a "Measurement region" setting field in FIG. 47 is displayed.

In the "Measurement region" setting field 126, a previously prescribed region can be selected. Here, when the "Measurement region" setting field 126 is selected, as shown in FIG. 48, a drop-down box is displayed and a desired shape of the measurement region can be selected. In this example, as selectable candidates for the shape of the measurement region, "None", "Rectangle", "Rotational rectangle", "Circle", "Ellipse", "Circumference", "Circular arc", "Polygon", "Composite region", and the like are displayed. When "None" is selected, the whole of the image displayed on the second image display region 121 is used as the inspection target region.

Further, in accordance with the shape selected in the "Measurement region" setting field 126, it is possible to perform a setting of a detailed size or the like. In the example of FIG. 48, an eraser is used as the workpiece, and in the example of FIG. 49, "Rotational rectangle" is selected in the "Measurement region" setting field 126. When an "Edit" button 128 is pressed in this state, a measurement region edition screen 130 shown in FIG. 50 is displayed. In the example of FIG. 50, a rotational rectangle is displayed as superimposed on the workpiece on the second image display region 121. Here, a rectangular measurement region is drawn in a portion of an eraser case and displayed as superimposed on the distance image. Further, while a basic vector of the rotational rectangle is displayed with an arrow within the frame shape of the rotational rectangle, a width and a height of the rotational rectangle, XY-coordinates of its center, an angle of inclination of the basic vector, and the like are displayed on the measurement region edition screen 130. The user can arbitrarily adjust the shape, the position and the like of the rotational rectangle by directly inputting a numerical value from the measurement region edition screen 130 or by operating a handle displayed on the rotational rectangle by means of a mouse or the like.

Figure 51:
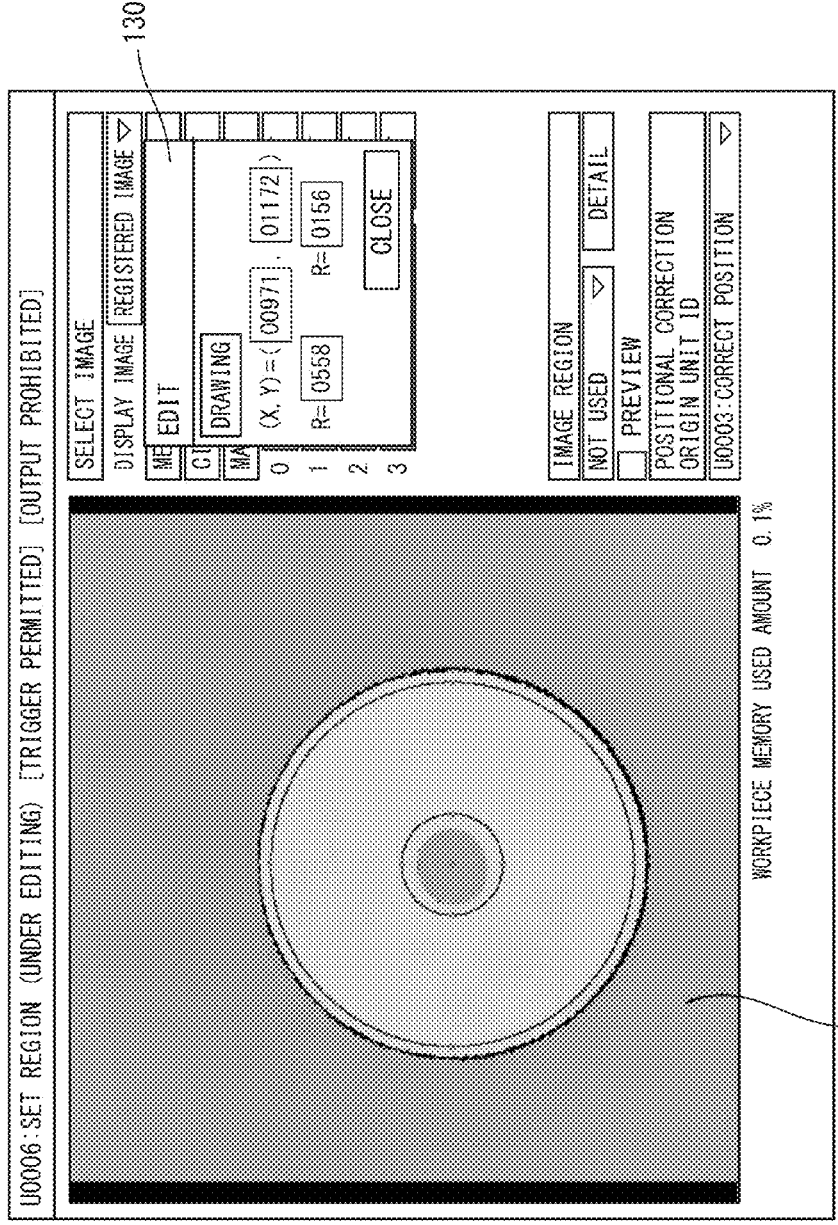
FIG. 51 is an image view showing a state where "Circumference" is selected in the "Measurement region" setting field on the measurement region edition screen.

It is to be noted that the items settable in the measurement region edition screen 130 change in accordance with the shape selected in the "Measurement region" setting field 126. For example, when "Circumference" is selected, as shown in FIG. 51, it becomes possible to perform a setting for parameters regarding the circumference, such as a setting for sizes of an outer diameter and an inner diameter of the circumference. Further, it is also possible to specify a mask region from the screen of FIG. 47. As the mask region, it is possible to specify a circle, a donut shape, a rectangular shape, and other polygonal shapes, a free curve, or the like. In such a manner, the inspection target region is appropriately set in accordance with the shape of the workpiece as the inspection target, and a region unnecessary for the inspection, such as a portion of a hole or a background, is removed, thereby allowing improvement in efficiency of the processing.

(Second Measurement Display Region)

Figure 49:
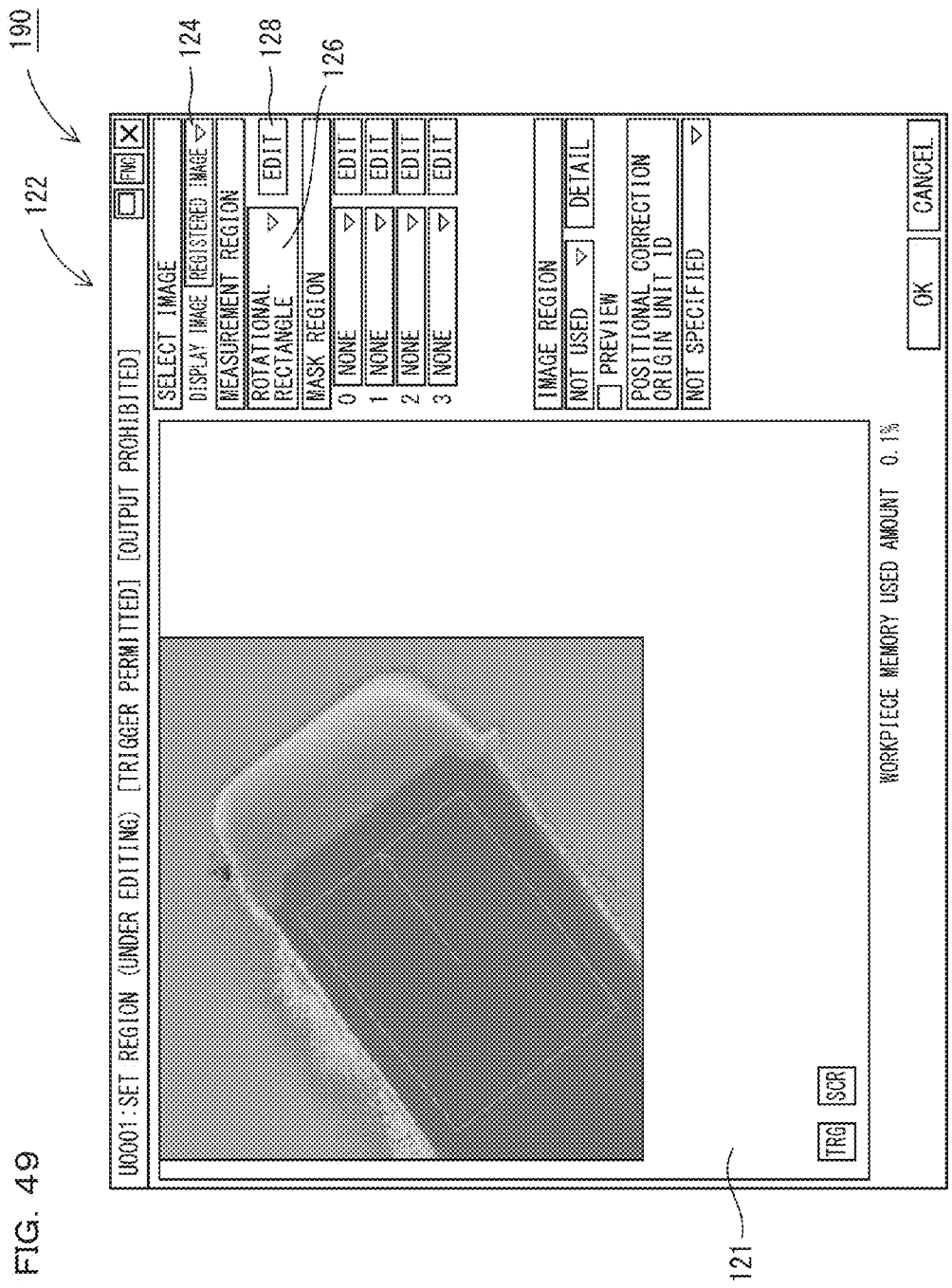
FIG. 49 is an image view showing a state where "Rotational rectangle" is selected in the "Measurement region" setting field.
Figure 50:
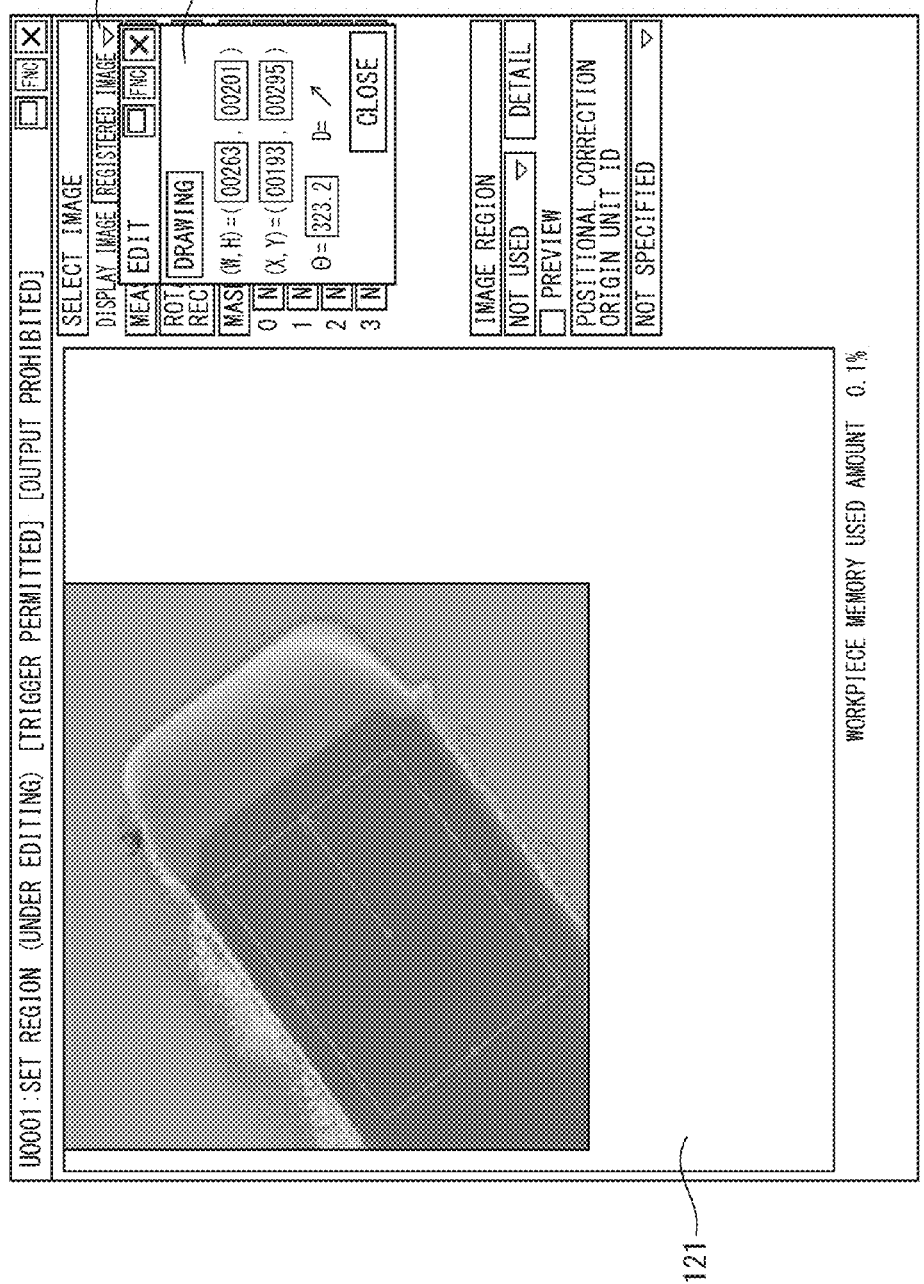
FIG. 50 is an image view showing a measurement region edition screen.
Figure 52:
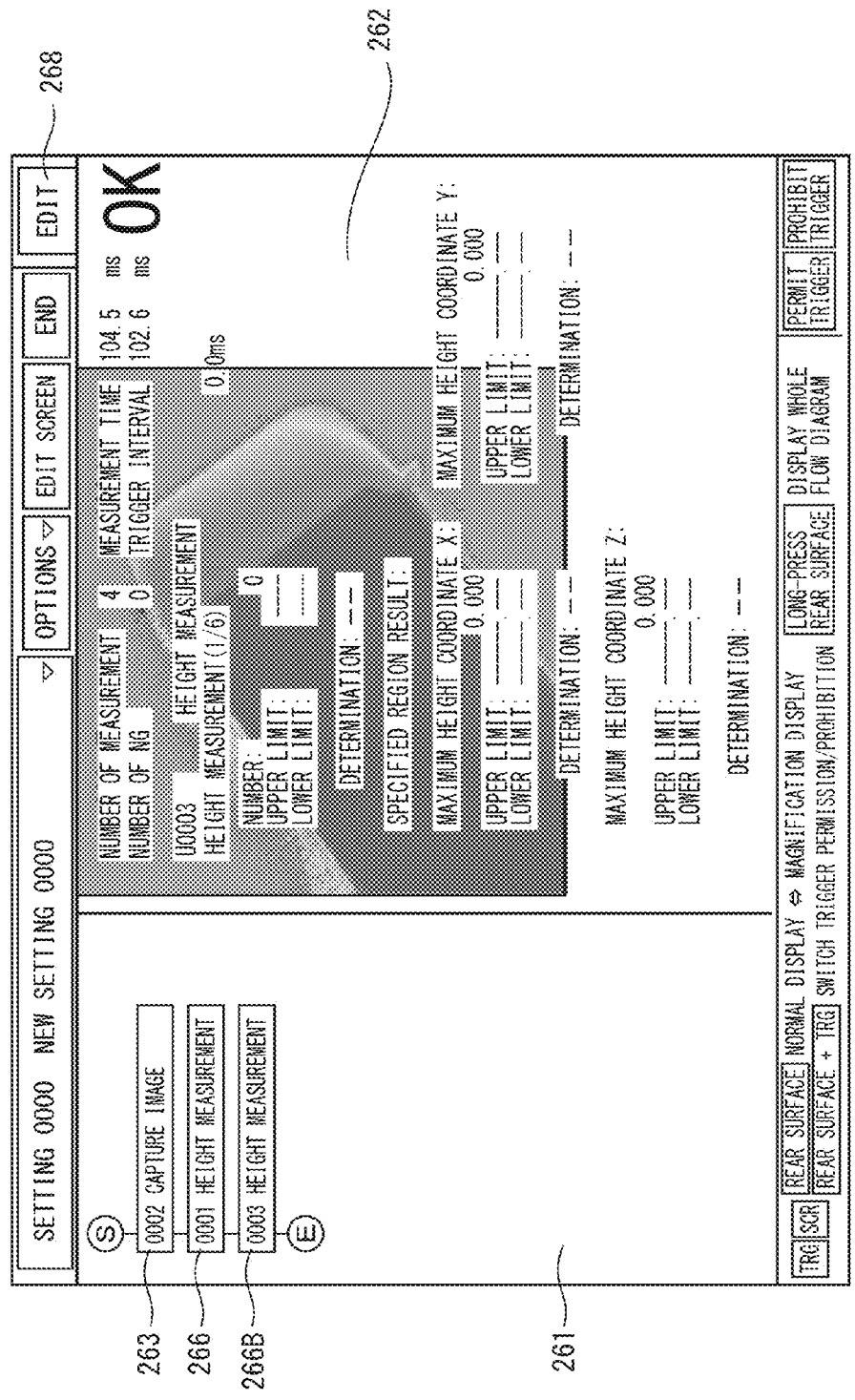
FIG. 52 is an image view showing the initial screen added with a second "Height measurement" processing unit.
Figure 53:
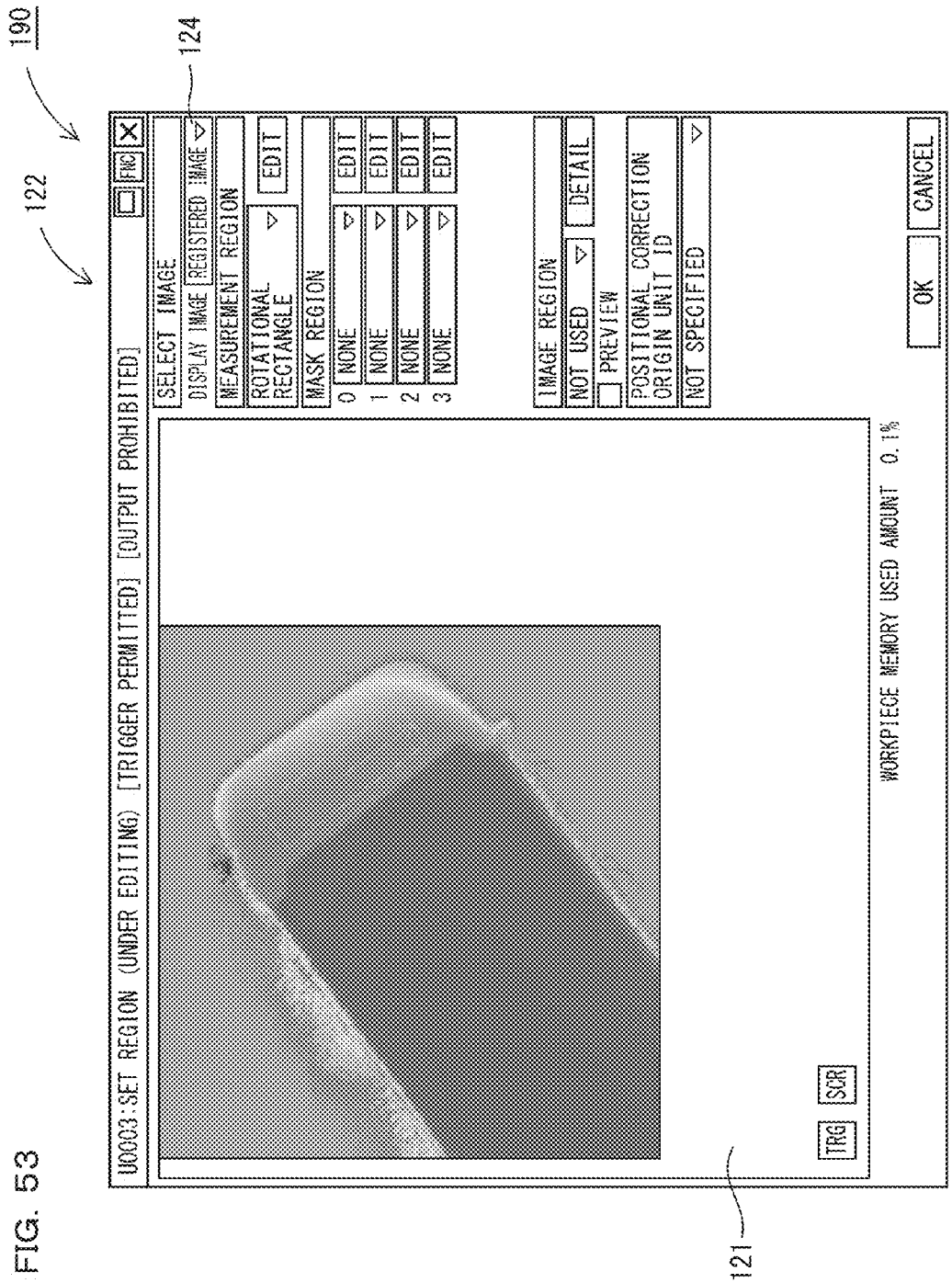
FIG. 53 is an image view showing a state where "Rotational rectangle" is set as a measurement region.
Figure 54:
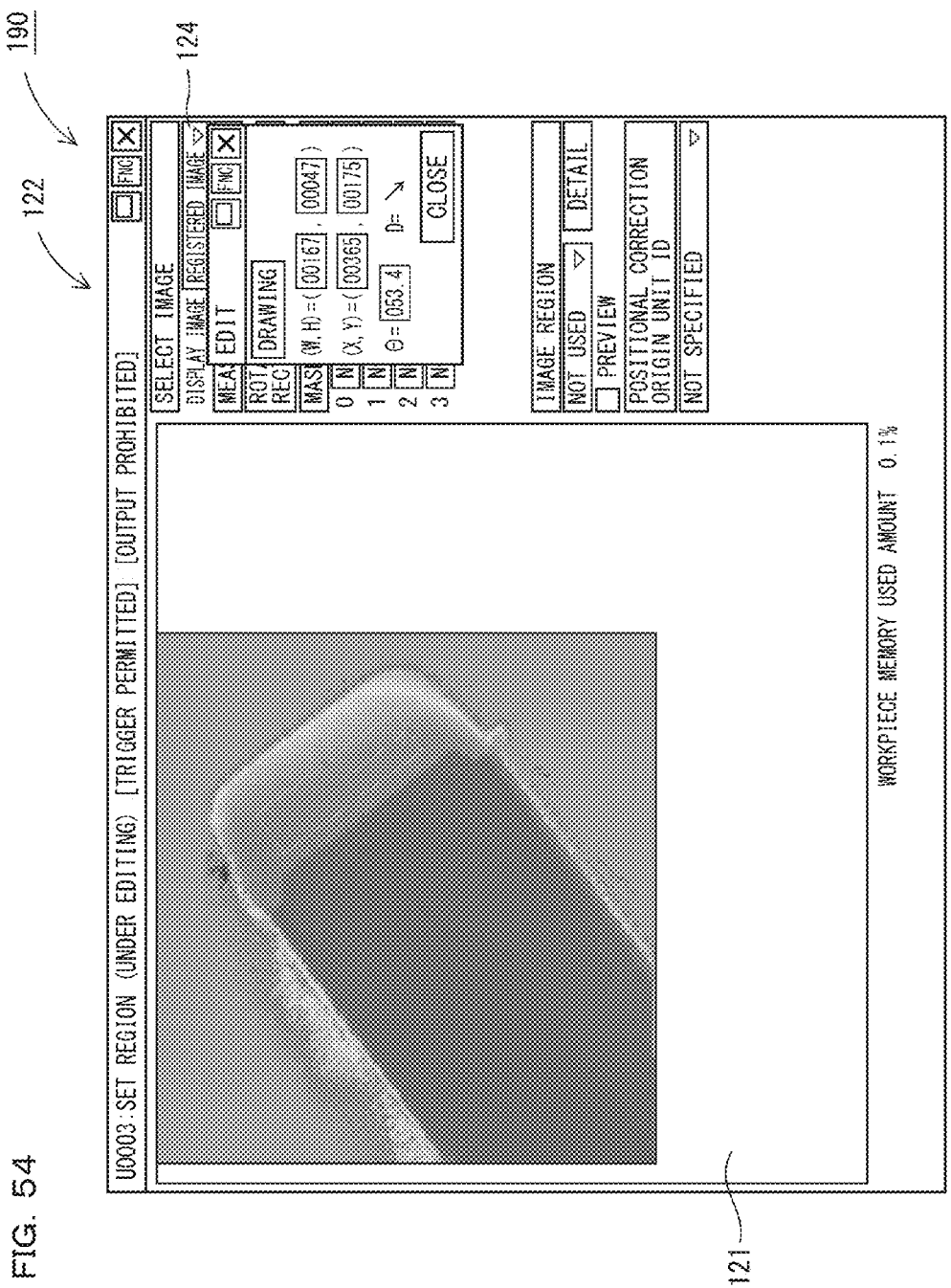
FIG. 54 is an image view showing a state where "Rotational rectangle" is set as the measurement region.
Figure 55:
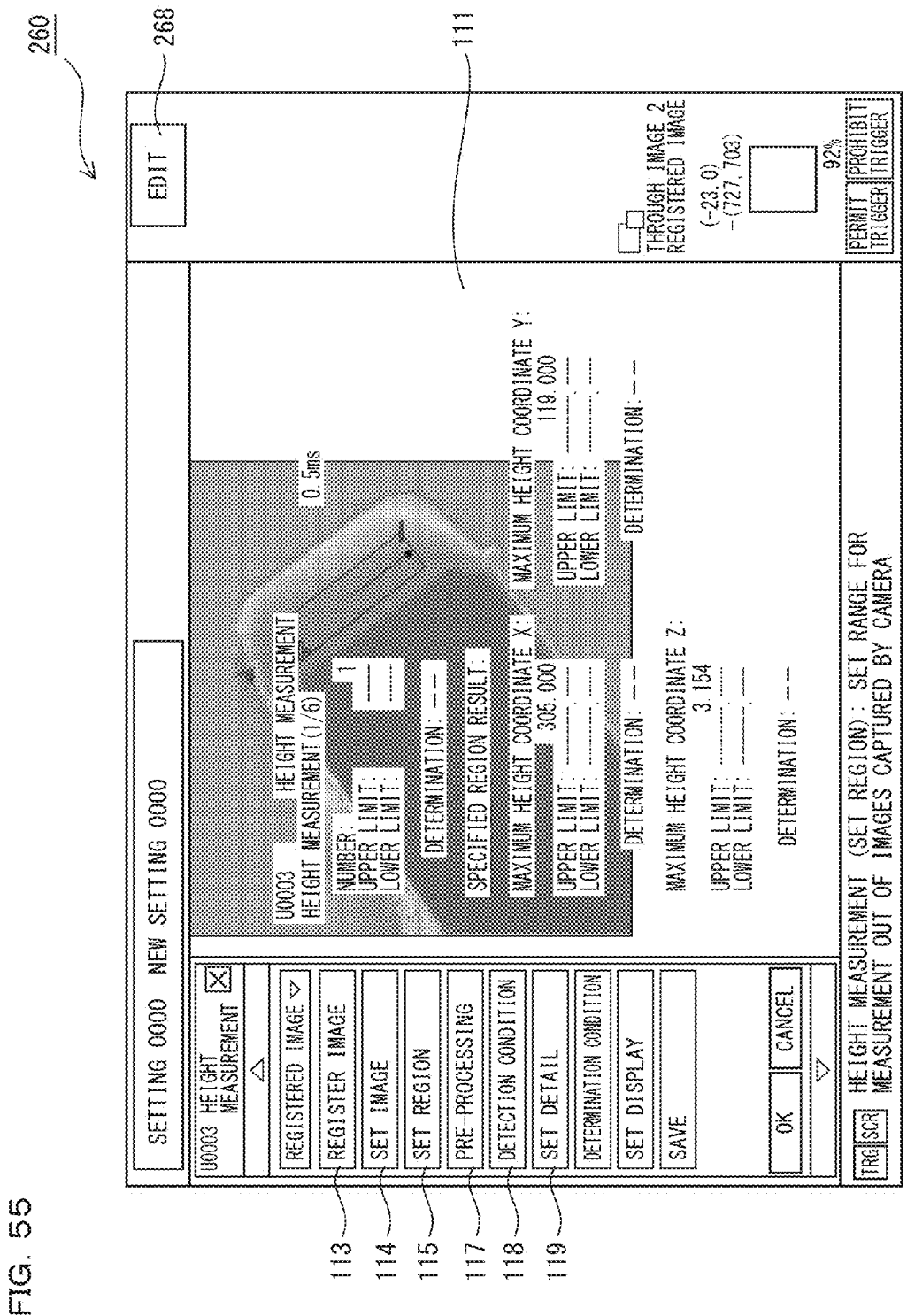
FIG. 55 is an image view showing a state where "Rotational rectangle" is set as the measurement region.

When the measurement region is set as thus described, the already set measurement region is displayed as superimposed on the workpiece as shown in FIG. 49. Subsequently, when another measurement region is to be specified, a similar operation is repeated. That is, as shown in FIG. 52, in the flow display region 261, yet another, second "Height measurement" processing unit 266B is added under the "Height measurement" processing unit 266. Then, as shown in FIGS. 53 and 54, a rotational rectangle as a new measurement region is set on, in this example, a region not covered by the case of the eraser which is the workpiece. As a result, as shown in FIG. 55, a second measurement region having been newly set is displayed as superimposed on the workpiece.

It should be noted that in the above example, one height measurement processing is performed by one "Height measurement" processing unit. That is, for performing a plurality of height measurement processing, it is of necessity to add a plurality of "Height measurement" processing units. However, it goes without saying that it is also possible to form a configuration where a plurality of pieces of height measurement processing are performed in one "Height measurement" processing unit.

(Measurement Processing)

Figure 56:
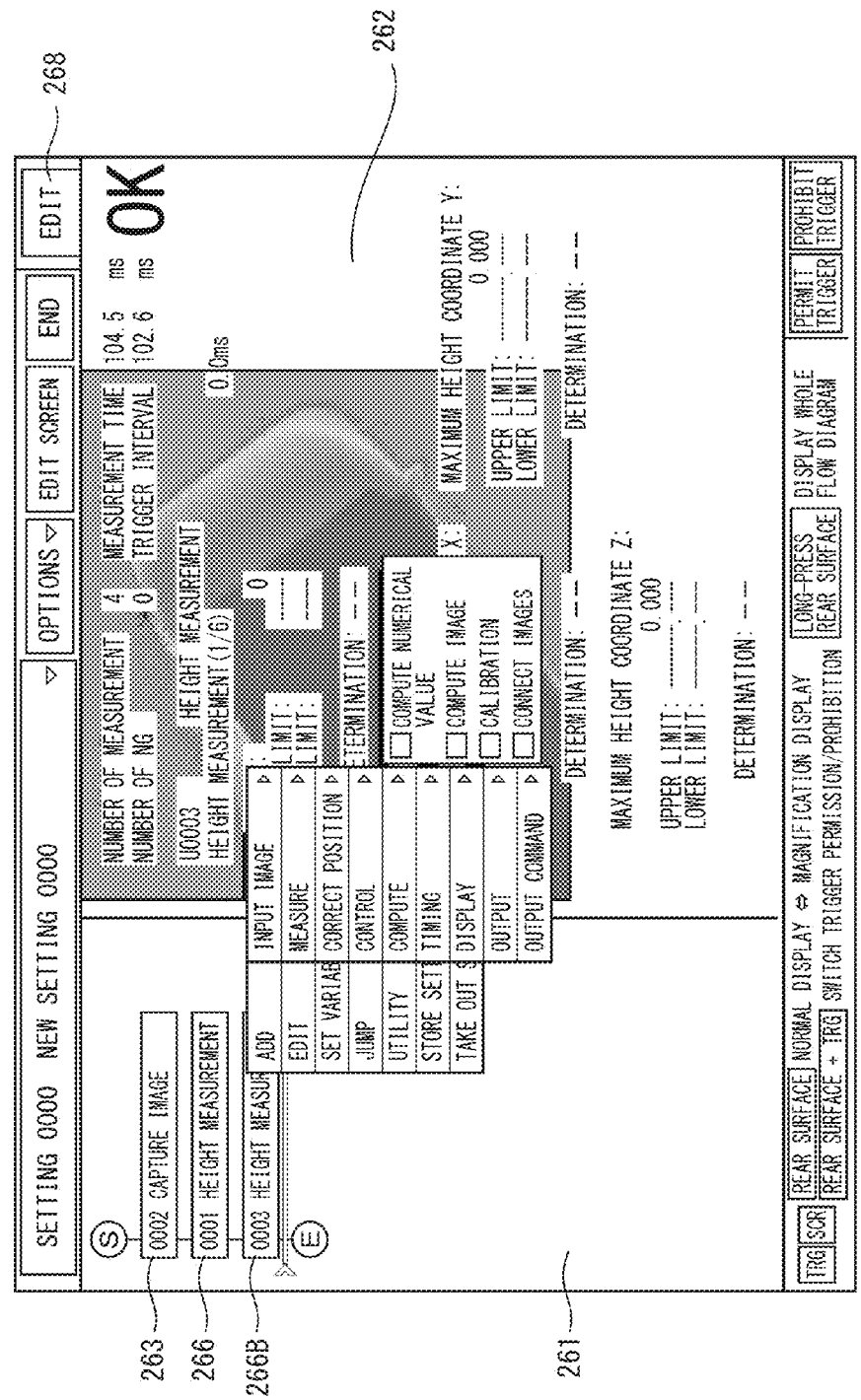
FIG. 56 is an image view showing a state where a "Numerical value computing" processing unit is to be added.
Figure 57:
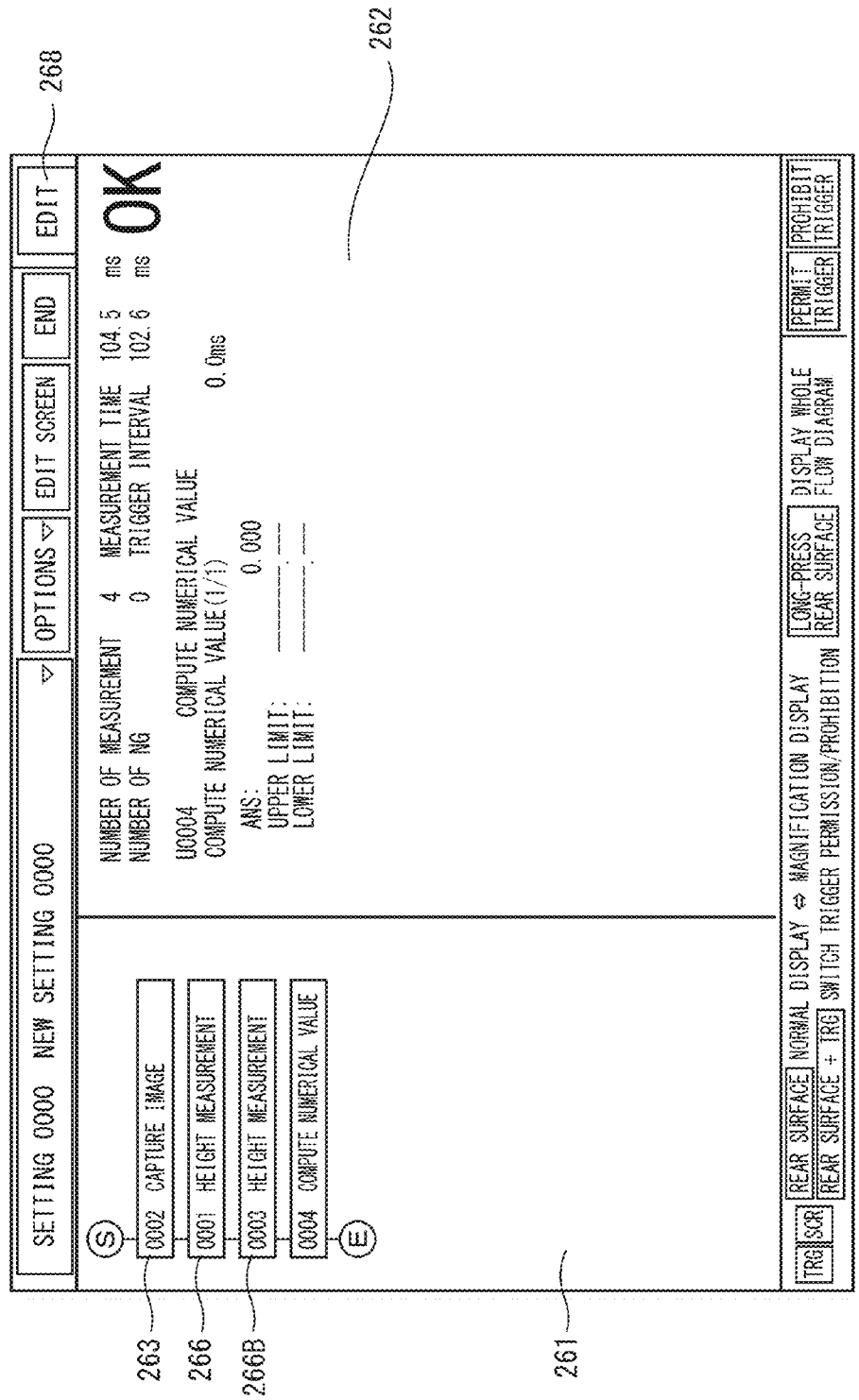
FIG. 57 is an image view showing the initial screen added with the "Numerical value computing" processing unit.

When the setting for the measurement region is completed in such a manner, a processing for actually performing the measurement is added. Here, as shown in FIG. 56, the "Numerical value computing" processing unit for performing "Computing" is added under the second "Height measurement" processing unit 266B in the flow display region 261. As contents of the computing that is executed in the "Numerical value computing" processing unit, there can be selected numerical value computing, image computing, calibration, image connection, and the like. Here, as shown in FIG. 57, there is added the "Numerical value computing" processing unit where numerical value computing is selected.

("Numerical Value Computing" Processing Unit)

Figure 58:
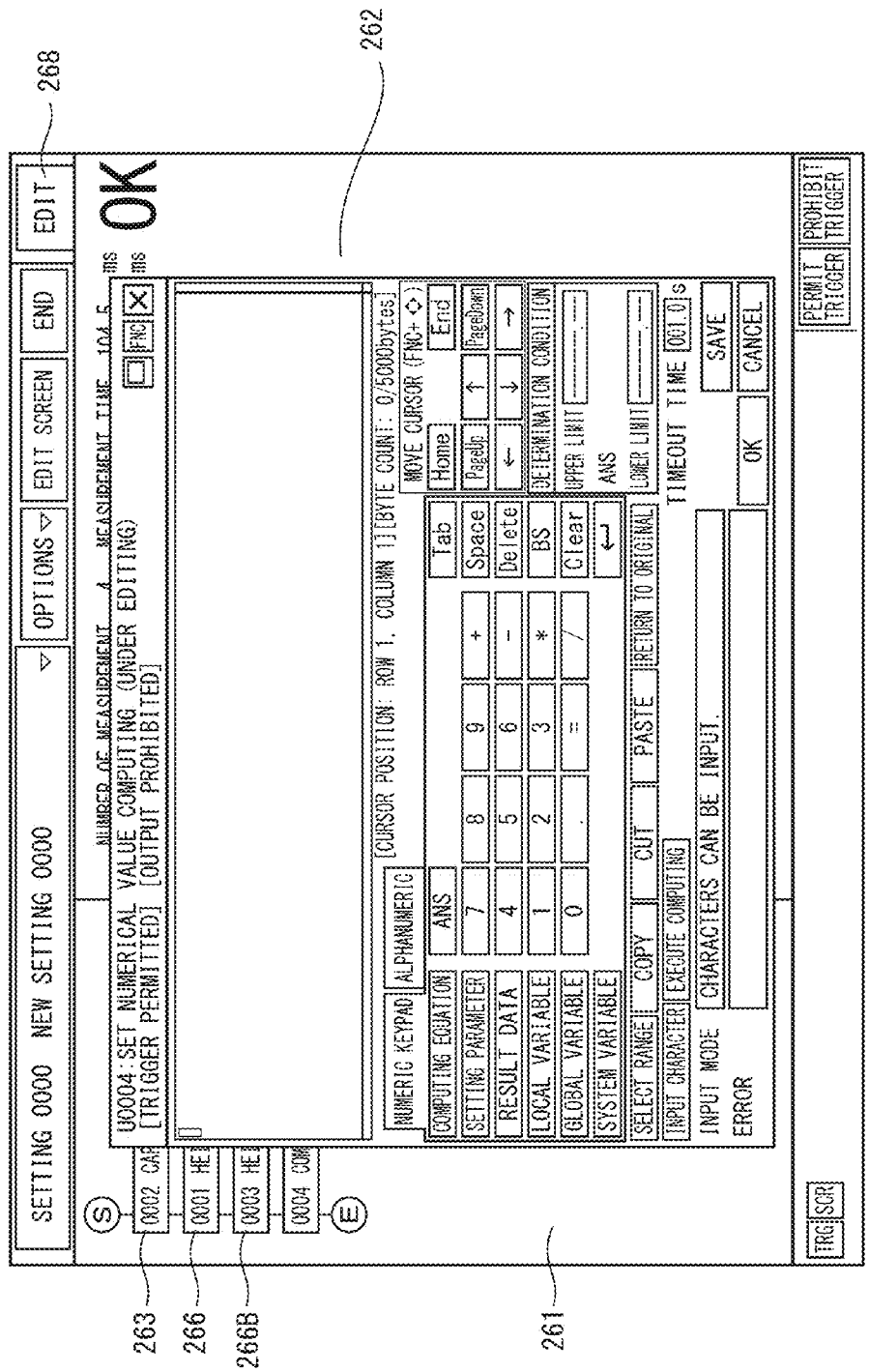
FIG. 58 is an image view showing a state where a numerical value computing edition screen is displayed.
Figure 59:
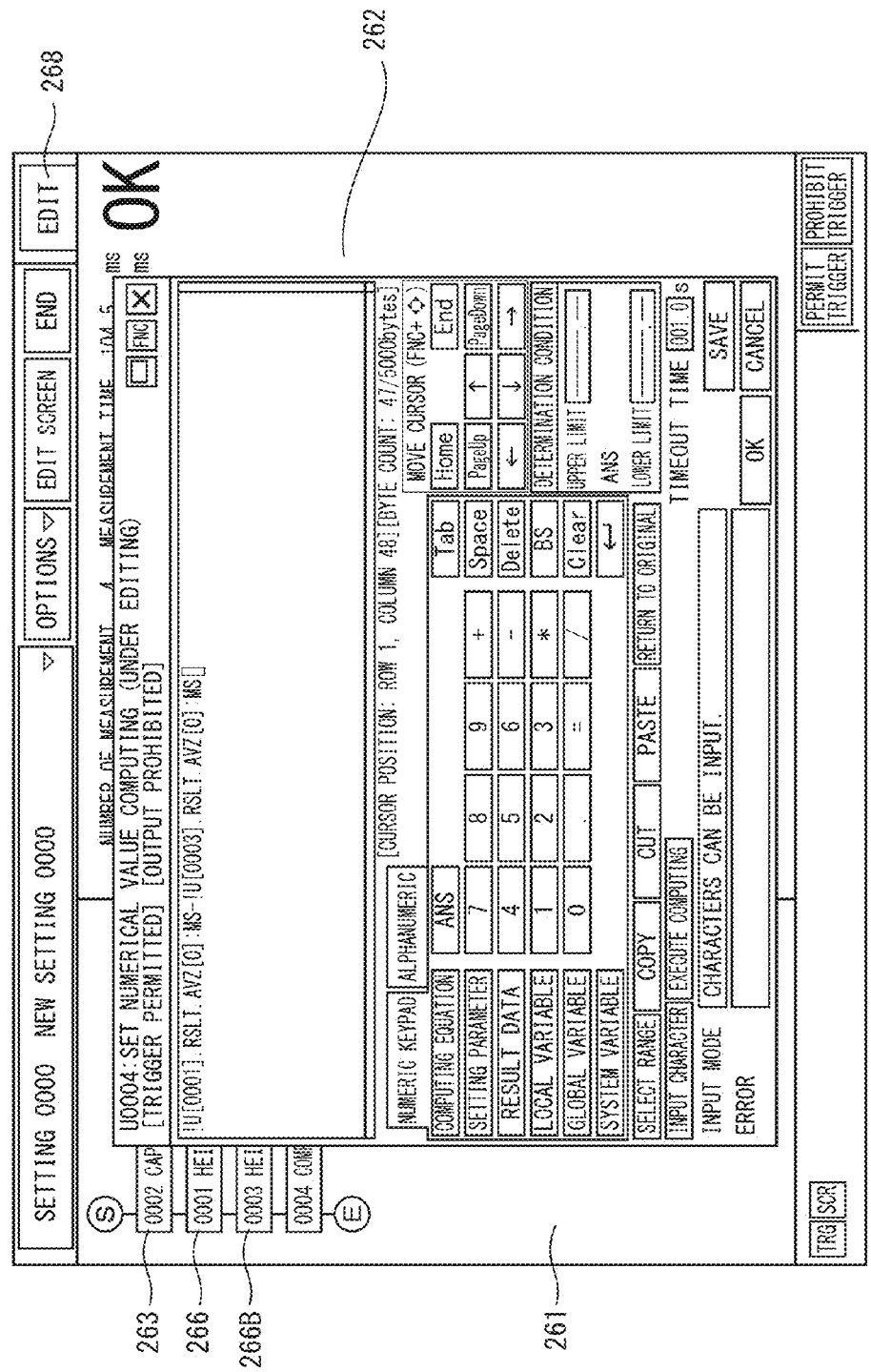
FIG. 59 is an image view showing a state where a computing equation is inputted on the numerical value computing edition screen of FIG. 58.

In the "Numerical value computing" processing unit, a specific computing equation can be inputted. For example, as shown in FIG. 58, a numerical value computing edition screen, where a numerical expression can be directly inputted, is displayed and the user prescribes a computing equation. Here, an input pad in the form of a calculator is prepared, and edit buttons for copy, cut, paste and the like are also prepared, thus facilitating creation of the computing equation. The user inputs a desired computing equation from this screen. FIG. 59 shows an example of the inputted computing equation.

Figure 60:
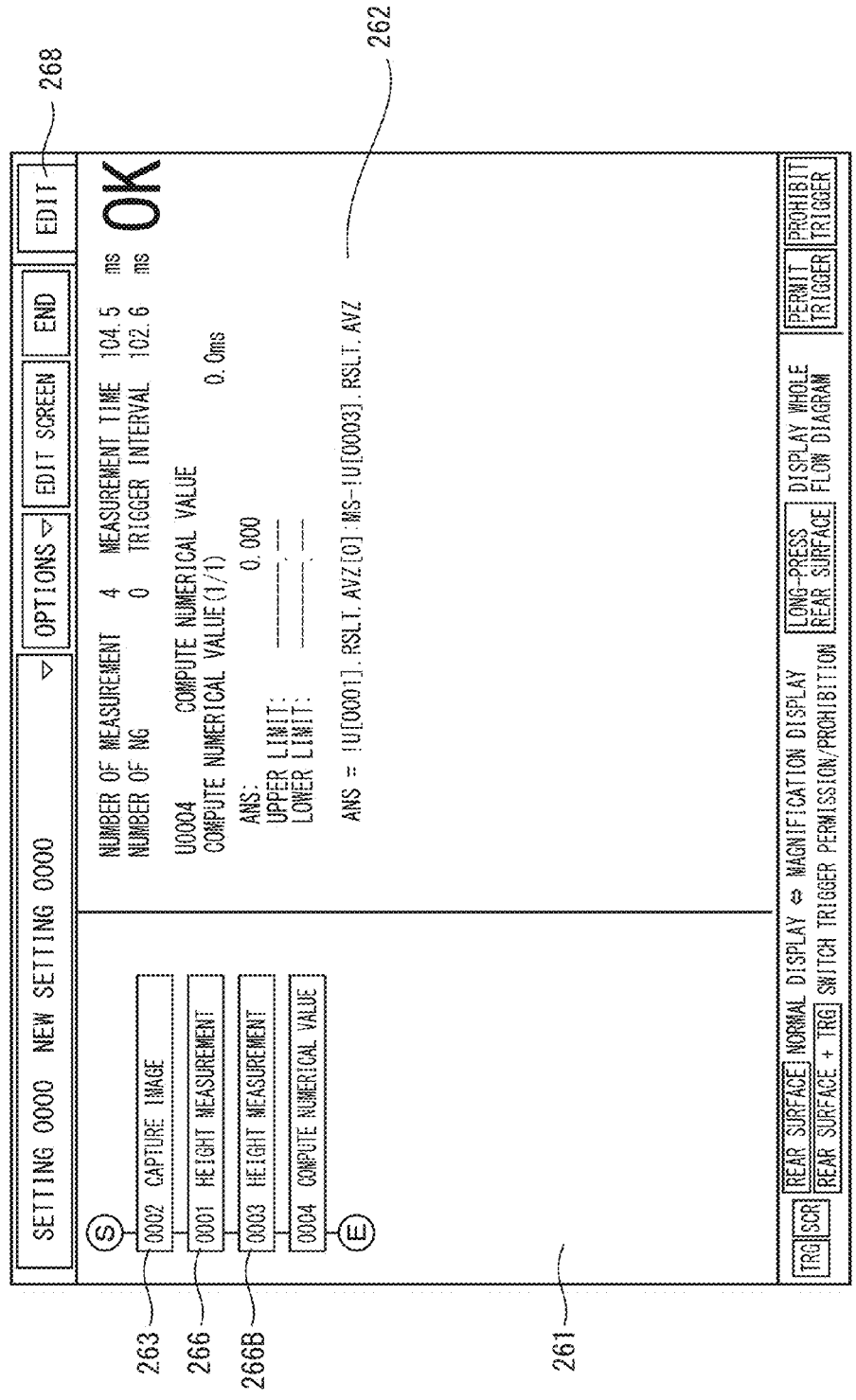
FIG. 60 is an image view showing the initial screen set with the "Numerical value computing" processing unit.

When the content of the numerical value computing processing is prescribed in such a manner, as shown in FIG. 60, the computing equation is displayed on a third image display region 262 in the initial screen 260.

("Area" Processing Unit)

Figure 61:
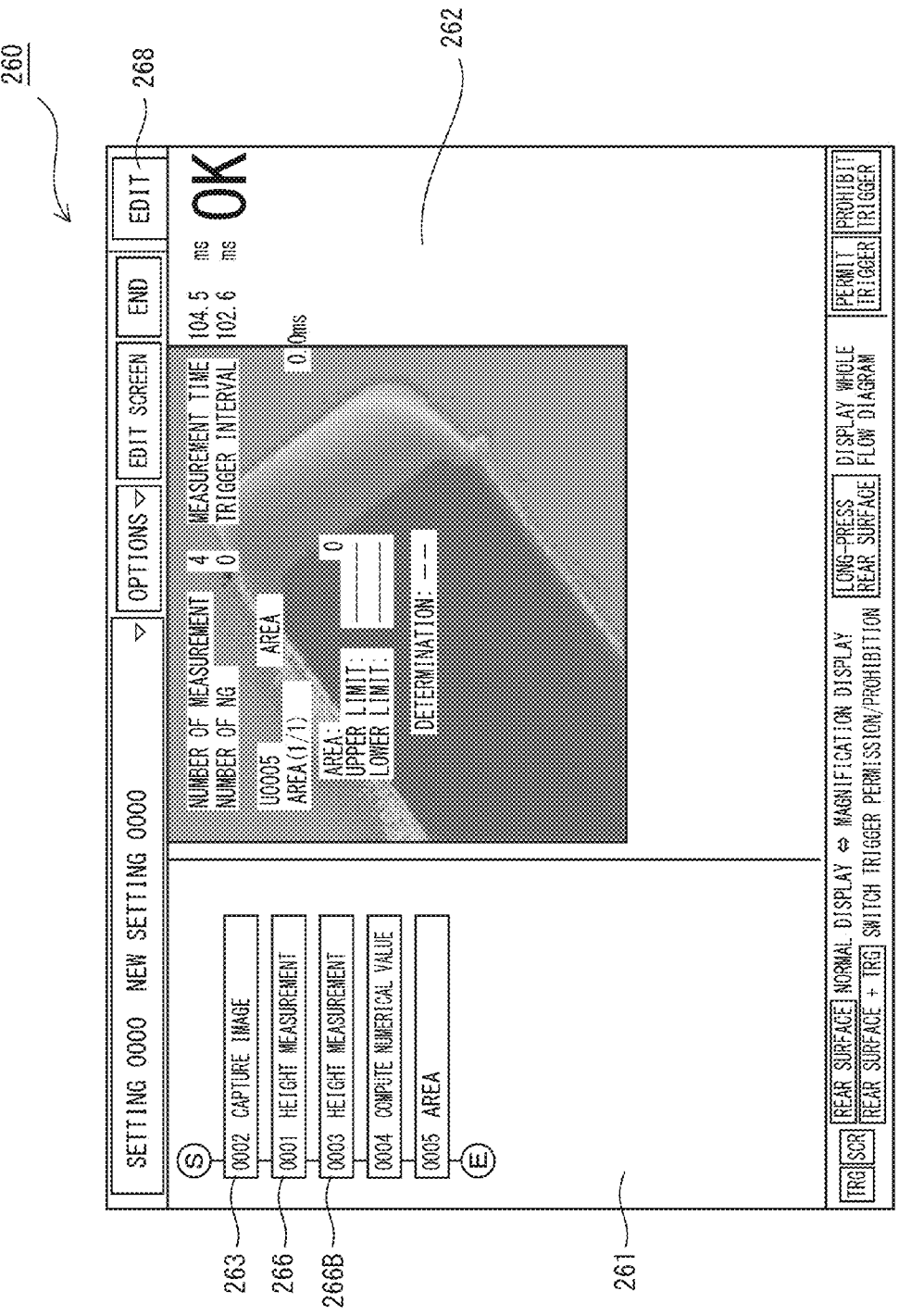
FIG. 61 is an image view showing the initial screen added with an "Area" processing unit.
Figure 62:
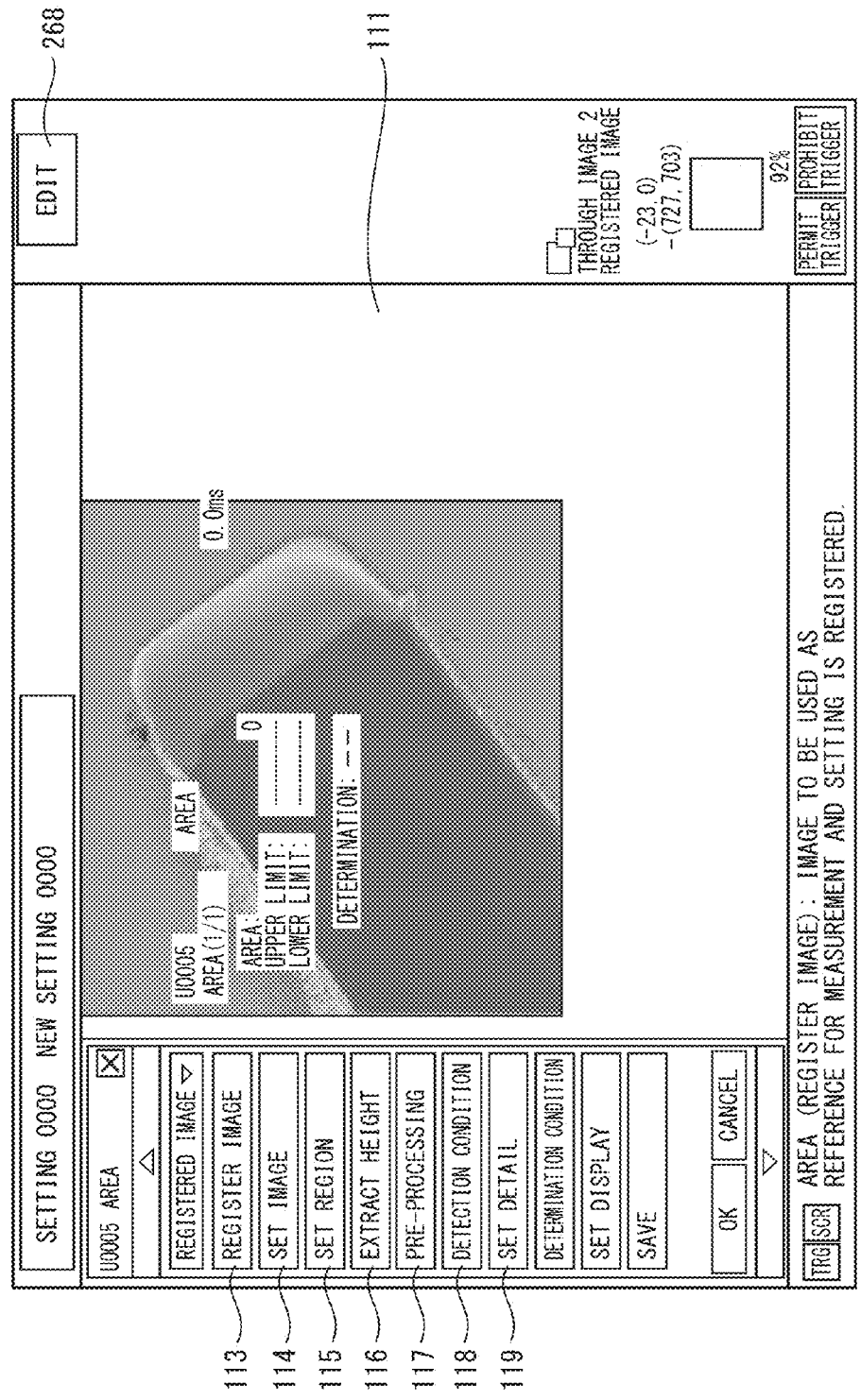
FIG. 62 is an image view showing an area setting screen.
Figure 63:
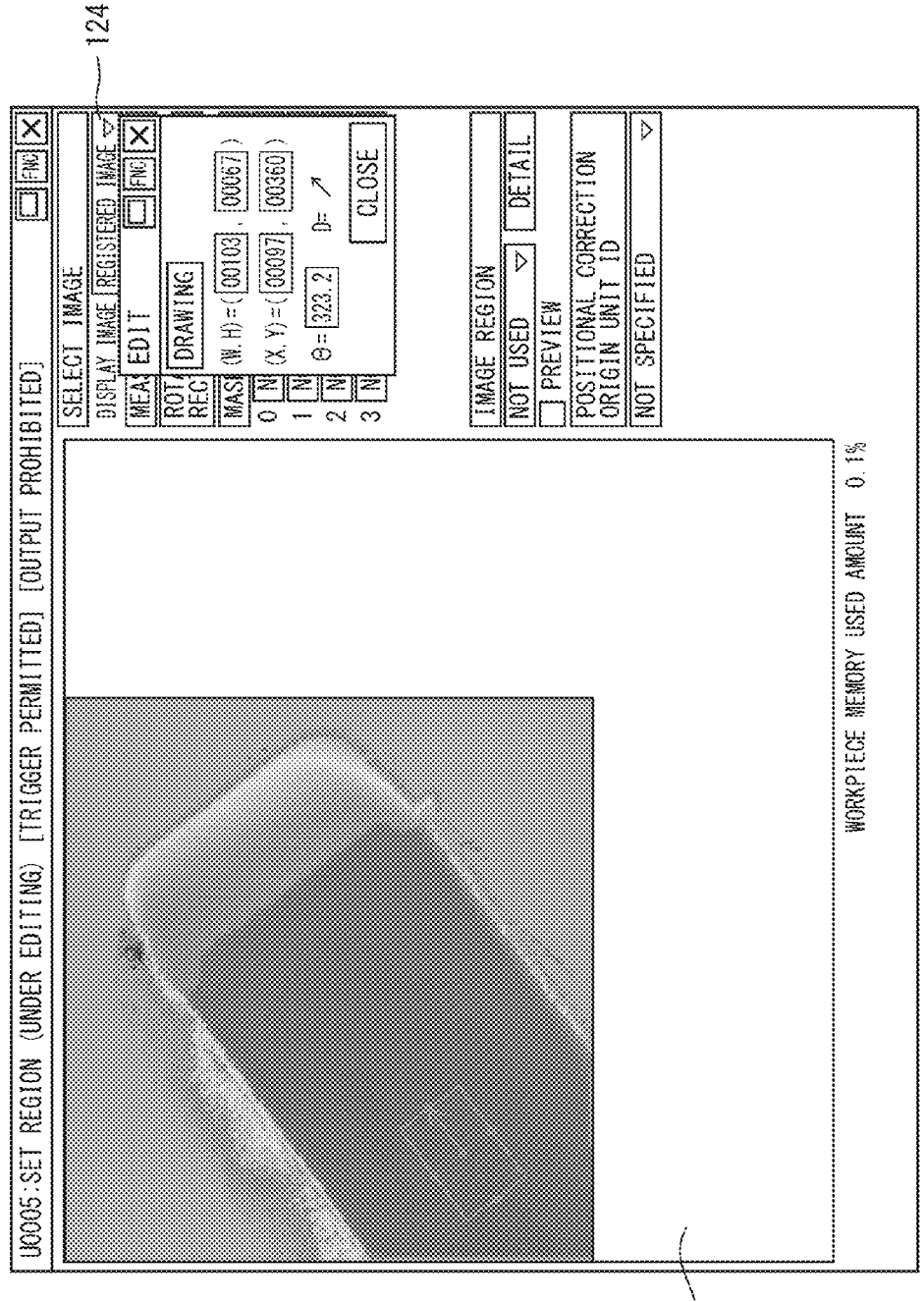
FIG. 63 is an image view showing a region setting screen for setting a detail of a rotational rectangle.
Figure 64:
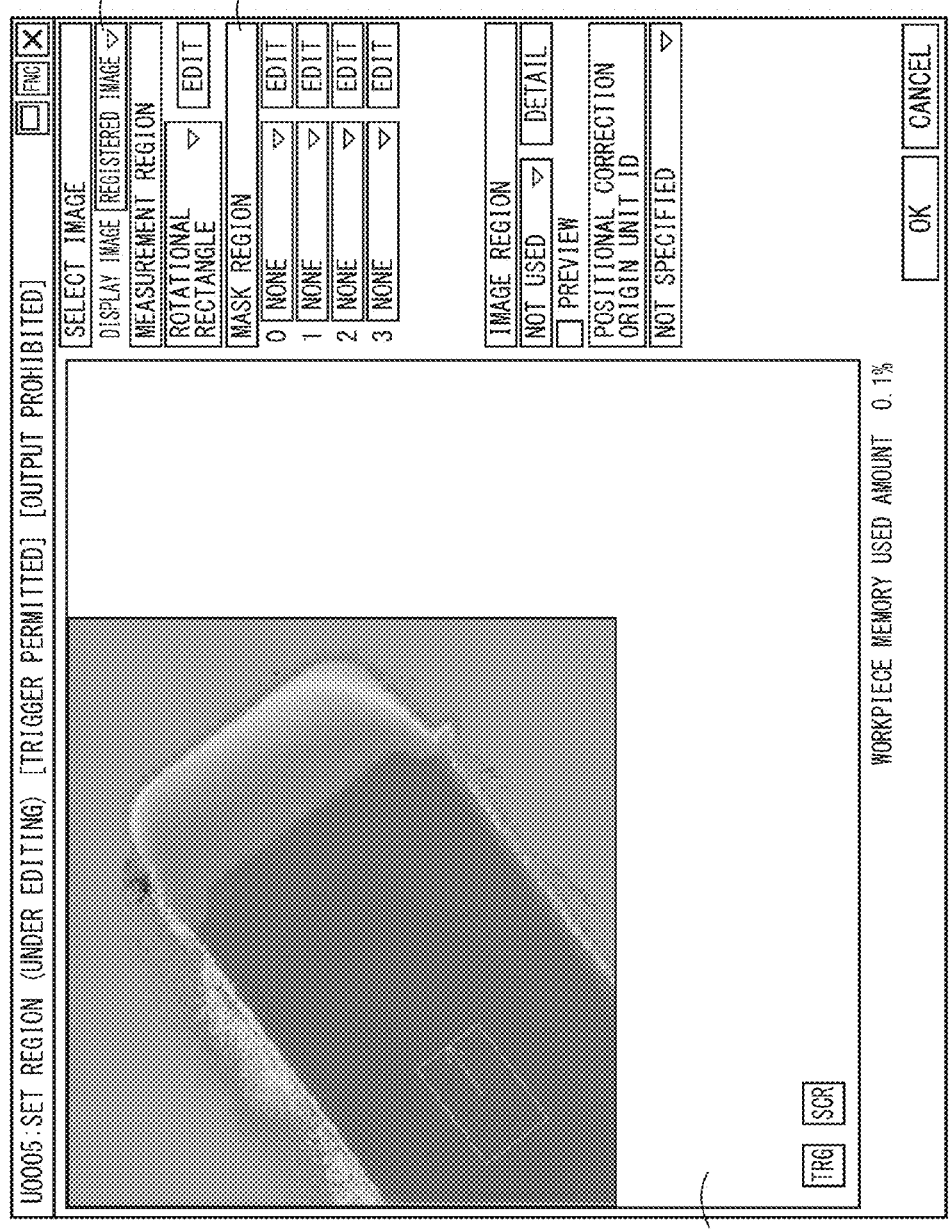
FIG. 64 is an image view showing a region setting screen where a rotational rectangle is set.

Furthermore, an "Area" processing unit is added under the "Numerical value computing" processing unit in the example of FIG. 61. In the "Area" processing unit, a condition for actually performing a pass-fail determination or the like is prescribed. Specifically, there is set a region for acquiring information to be a reference for a tone conversion parameter (detailed later), a condition for extracting a height from this region, a condition for performing filter processing at the time of generating the distance image, or the like, so that the tone conversion condition for tone-converting the distance image to the low-tone distance image is appropriately changed in accordance with the registered image and the input image. That is, in the "Area" processing unit, a region, height extraction, pre-processing, a determination or the like is set. First, the procedure for setting the region is similar to that in the foregoing registered image. That is, when the "Set region" button 115 disposed in the setting item button region 112 is pressed from an area setting screen 620 as shown in FIG. 62, the screen is changed to a region setting screen shown in FIG. 63, and a region that is set as a target is specified. Also here, a rotational rectangle is selected, and further detailed coordinates or the like are specified according to the need. In such a manner, a region in the "Area" processing unit is decided, and the rotational rectangle is displayed as superimposed on the workpiece on the second image display region as shown in FIG. 64.

(Height Extraction Setting Screen)

Figure 65:
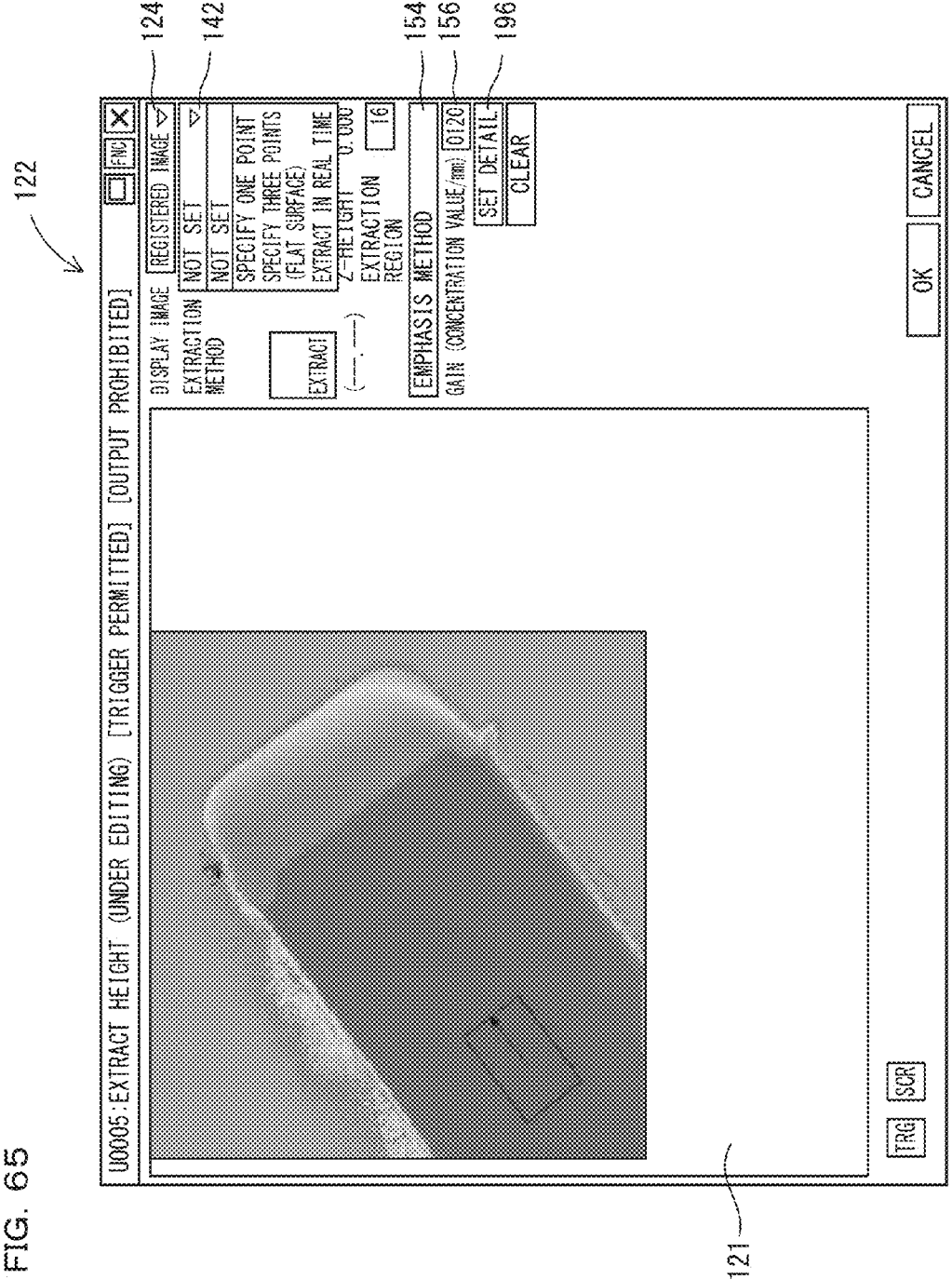
FIG. 65 is an image view showing a height extraction selection screen.

Next, a setting for the height extraction is performed. The setting for the height extraction is to set a tone conversion parameter at the time of performing the tone conversion. That is, when a "Height extraction" button 116 is pressed from the setting item button region 112 of FIG. 62, the screen shifts to a height extraction selection screen 140 shown in FIG. 65, and a display image, an extraction method and the like become selectable. Similarly to FIG. 47 and the like, also in the height extraction selection screen 140, the second image display region 121 is provided on the left of the screen, and the operation region 122 for performing a variety of operations is disposed on the right side of the screen. In the upper stage of the operation region 122, there is provided the "Display image" selection field 124 for selecting the image to be displayed on the second image display region 121. In the example of FIG. 65, the registered image is selected in the "Display image" selection field 124. Still thereunder, there is provided an extraction method selecting part 142 for selecting an extraction method of a height extraction function.

Here, the "Height extraction" button 116 functions as the tone conversion condition setting part 43 that sets the tone conversion parameter for tone-converting the distance image by the tone converting part. In particular, the tone conversion condition setting part 43 is displayed when the processing not requiring the height information of the image is selected in the inspection processing selecting part. In contrast, when the processing requiring the height information of the image is selected in the inspection processing selecting part, this tone conversion condition setting part is not displayed. Specifically, when the "Height measurement" processing unit 266 is selected as an inspection processing tool, the "Height extraction" button is not displayed in the flow display region 261. As for inspection processing tools other than this, such as the "Area" processing unit, a "Blob" processing unit 267, a "Color inspection" processing unit 267B, a "Shapetrax2" processing unit 264 and a "Position correction" processing unit 265, there is displayed the "Height extraction" button 116, to make the tone conversion condition settable. In such a manner, when the tone conversion is necessary, the tone conversion condition setting part 43 is displayed to prompt the user to perform a necessary setting, whereas, when the tone conversion is unnecessary, the part for setting the tone conversion condition itself is not displayed, thereby to avoid the user being confused by the unnecessary setting, and realize the usability of the user.
(Extraction Method Selecting Part 142)

In the extraction method selecting part 142, the tone converting method is specified. For example, the user is allowed to select either the static conversion or the active conversion. In the example of FIG. 65, either "One-point specification" or "Three-point specification (flat surface)" corresponding to the static conversion, or "Real time extraction" corresponding to the active conversion is previously selected as an option from a drop-down box.
(One-Point Specification Screen 150)

Figure 66:
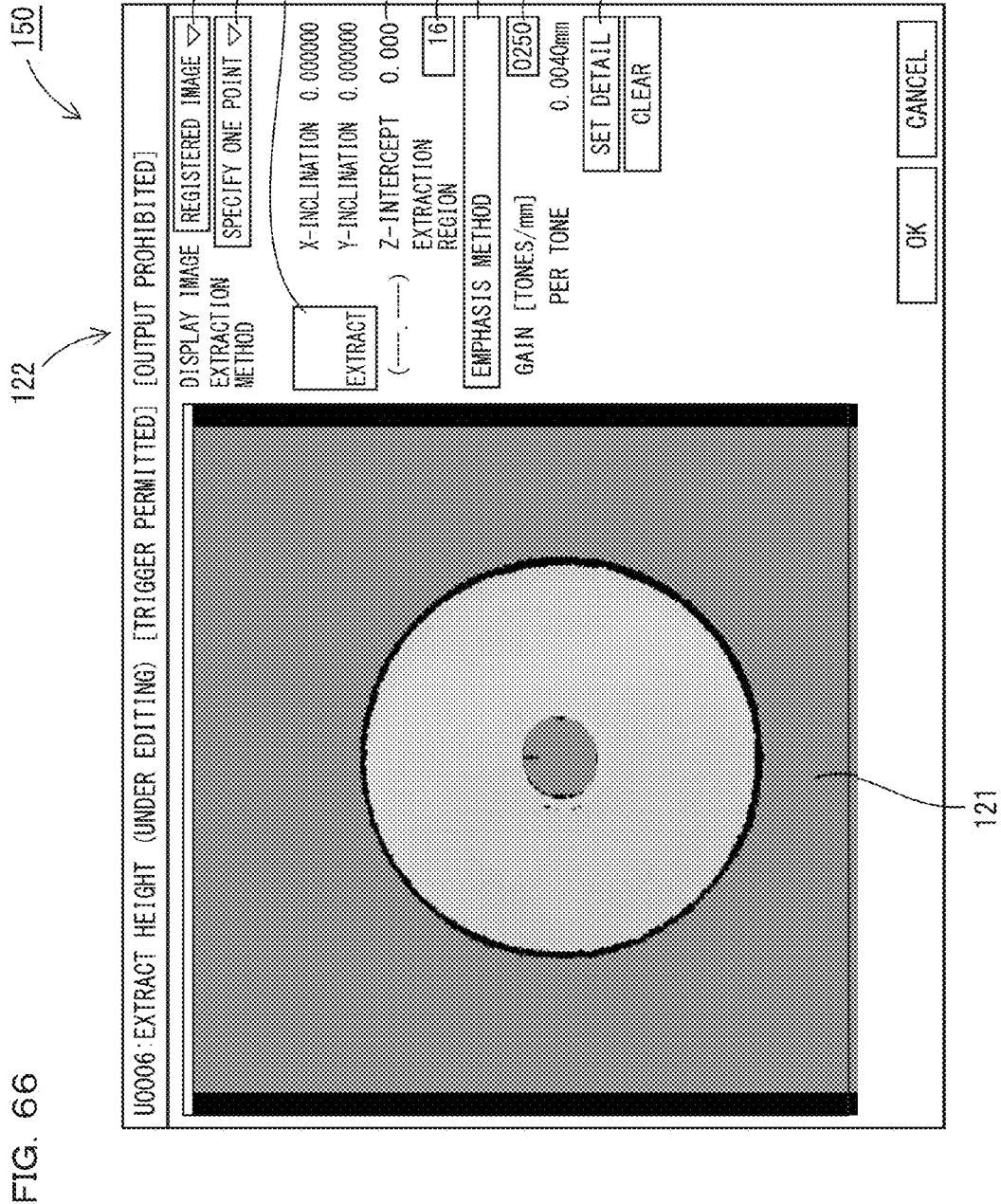
FIG. 66 is an image view showing a GUI of a one-point specification screen.
Figure 67:
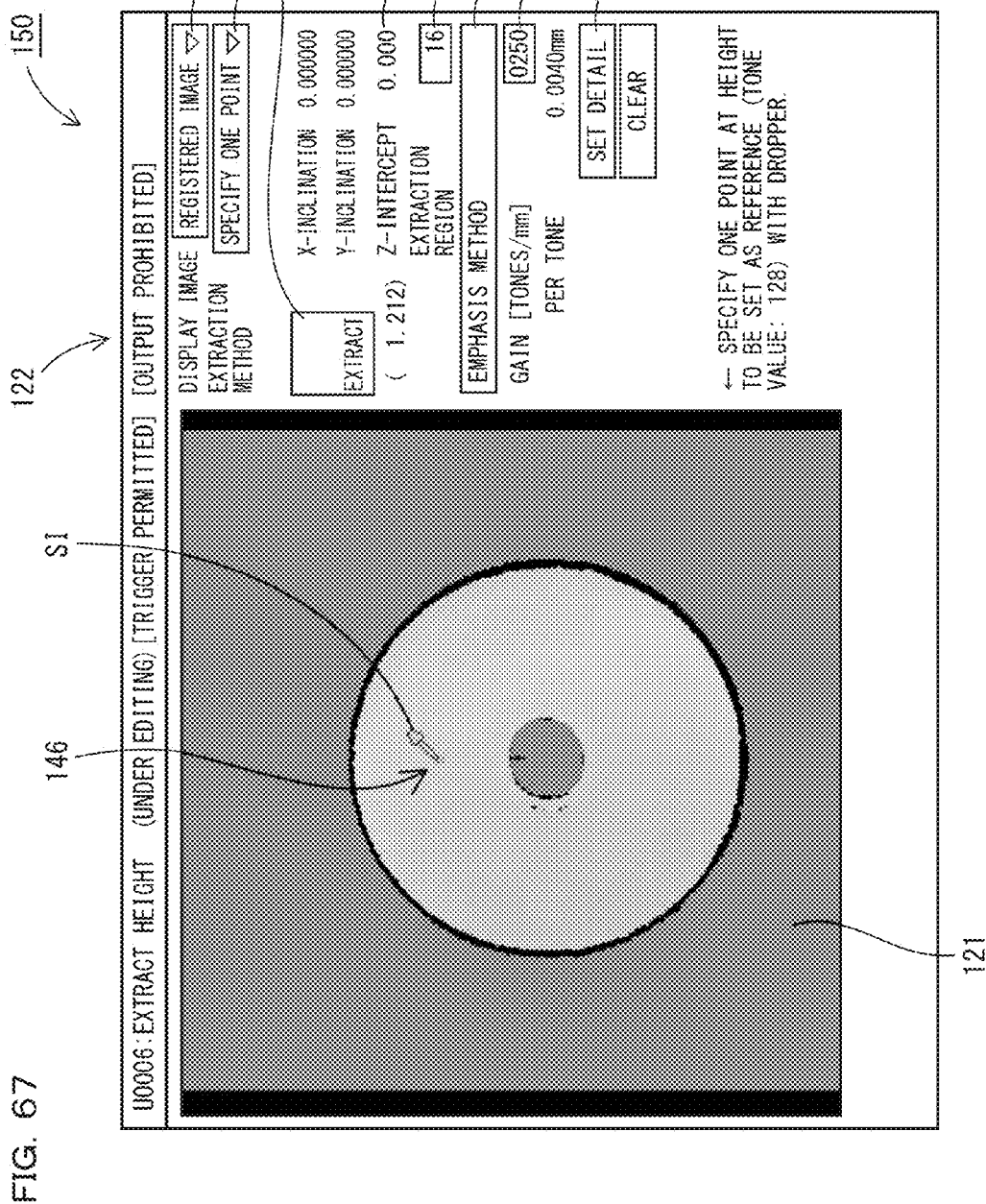
FIG. 67 is an image view showing a GUI of the one-point specification screen.

When "One-point specification" is selected from the extraction method selecting part 142 on the screen of FIG. 65, the screen shifts to a one-point specification screen 150 of FIG. 66. It is to be noted that FIGS. 66 to 96 show an example where a 50-yen coin is used as the workpiece for the sake of description. On the one-point specification screen 150 of FIG. 66, a height of a portion specified on the second image display region 121 is set as a reference height. In the example of FIG. 66, when an "Extract" button 144 provided in the operation region 122 on the right of the screen is selected, the screen is changed to one shown in FIG. 67, and it becomes possible to specify an arbitrary position on the second image display region 121 on the left of the screen. Here, using the height extracting part, a position to be at the center of the height is specified in the workpiece displayed on the second image display region 121. In the example of FIG. 67, the height extracting part is configured of the "Extract" button 144 displayed with a dropper-like icon SI, and when this "Extract" button 144 is pressed, a dot-like pointer 146 is displayed on the second image display region 121. A position specified with this pointer 146 is registered as an intermediate height of a distance range.

Further, a range for finding heights around the point specified with the pointer 146 can be specified in an "Extraction region" specification field 145. In the "Extraction region" specification field 145, one side of the region for finding an average height is specified by means of the number of pixels. In the example of FIG. 67, "16" is specified in the "Extraction region" specification field 145, and an average height within a region of 16 pixels×16 pixels which is centered at the point specified with the pointer 146 is extracted and taken as a height extracted with the pointer 146. It is to be noted that a size of the region specified with the pointer 146 on the second image display region 121 can also be changed in synchronization with the numerical value specified in the "Extraction region" specification field 145.

Figure 68:
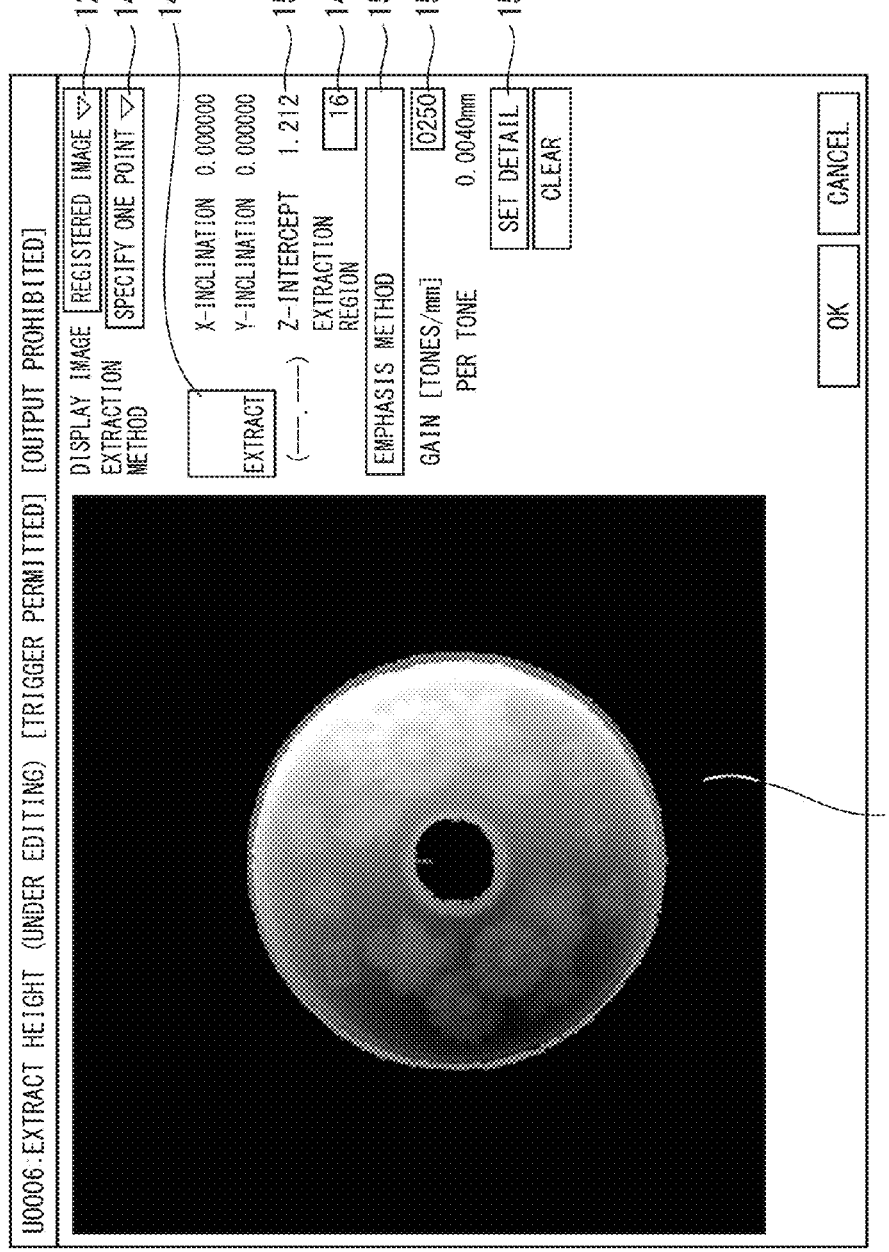
FIG. 68 is an image view showing a GUI of the one-point specification screen.
Figure 70:
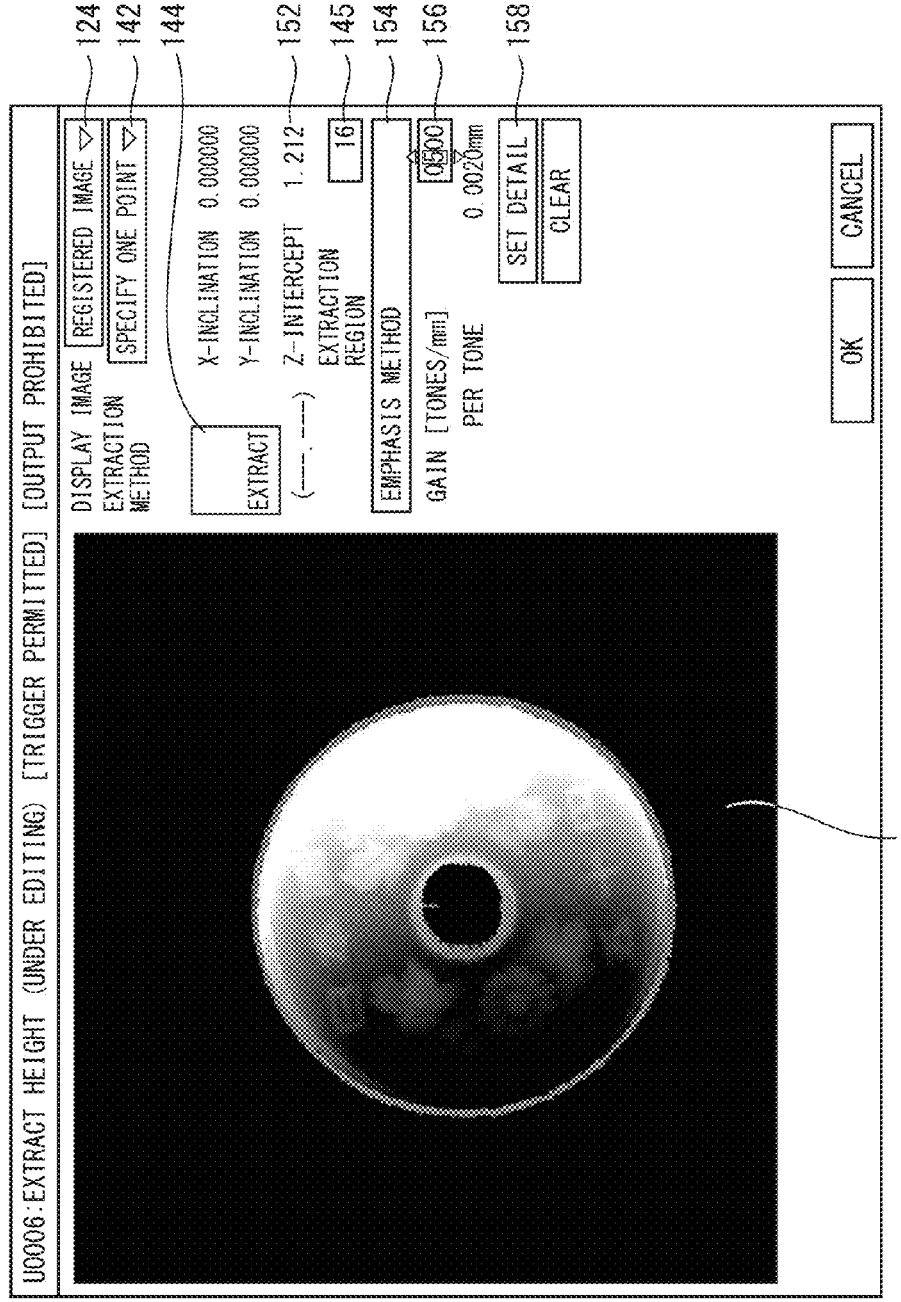
FIG. 70 is an image view showing a state where gain is increased from the state of FIG. 68.

Further, in a "Z-height" display field 152, height information of the specified portion is displayed as a numerical value (in the example of FIG. 68, 1.253 is displayed in the "Z-height" display field 152). For example in the case of expressing the distance range by $2^8$=256 tones (0 to 255), the height specified in the height extracting part is set such that gain (concentration value/mm; detailed later) as its central value is 128. With this configuration, by the user directly specifying a height to be inspected on the screen, the image is tone-converted to a low-tone distance image in the range centered at the specified height, and it is thus possible to avoid a situation where necessary height information is lost.
(Simple Display Function)

When the distance range and the span are decided as the tone conversion parameters necessary for the tone conversion as described above, it is possible to tone-convert the high-tone distance image to the low-tone distance image. Further, as shown in FIG. 68, the low-tone distance image tone-converted on the tone conversion condition currently set in the operation region 122 is simply displayed on the second image display region 121. Moreover, when the tone conversion condition is changed in the operation region 122, the simple display of the low-tone distance image after tone-conversion on the second image display region 121 is also updated in accordance with the tone conversion condition after the change. Herewith, the user can visually and promptly confirm a change after adjustment of the tone conversion condition, so as to easily perform an adjustment operation by trial and error. In such a manner, the image displayed on the second image display region 121 can be changed by switching a mode for displaying the distance image before tone-conversion, the mode for displaying the low-tone distance image after tone-conversion, and a mode for displaying the normal brightness image.
(Gain Adjusting Part)

Further, using a gain adjusting part, the user can perform a gain adjustment as one of tone conversion parameters. In the example of FIG. 68, an emphasis method setting field 154 is provided in the middle stage of the operation region 122, and a gain adjustment field 156 is disposed here as the gain adjusting part. In the gain adjustment field 156, the current gain is displayed with a numerical value. Here, the gain [tones/mm] is a parameter corresponding to the span at the time of performing the tone conversion. For example, at the time of tone-converting a 16-tone distance image to an 8-tone distance image, it is set as to how many tones out of the 8 tones per mm are taken for the conversion. When a gain value is made large, the tone conversion is performed with clear contrast. For example, when the gain value is set to 100 [tones/mm], such a tone conversion with 0.010 mm per tone is set. Further, when the height information of the distance image before conversion has a resolution of 0.00025 mm per tone, in a case where a difference between the found reference plane and the inputted height data is N tones before the conversion, it can be calculated after the conversion as N [tones]×0.00025 [mm/tone]×100 [tones/mm]=N×0.025 tones.

Here, the reference plane is a plane found by means of the one-point specification, or a later-mentioned average height reference, the three-point specification, a flat surface reference, a free curved surface reference, or the like, and is a plane that is set as the reference at the time of tone conversion. For example, when a sectional profile of the 16-tone distance image (input image) before conversion has a shape as indicated with a solid line as shown in FIG. 69A, its reference plane is indicated with a wavy line. A profile of the low-tone distance image obtained by converting the tones of such an input image from 16 tones to 8 tones is one as shown in FIG. 69B, coming into a state where gain (conversion coefficient) is applied as it is to the difference from the reference plane.

Figure 71:
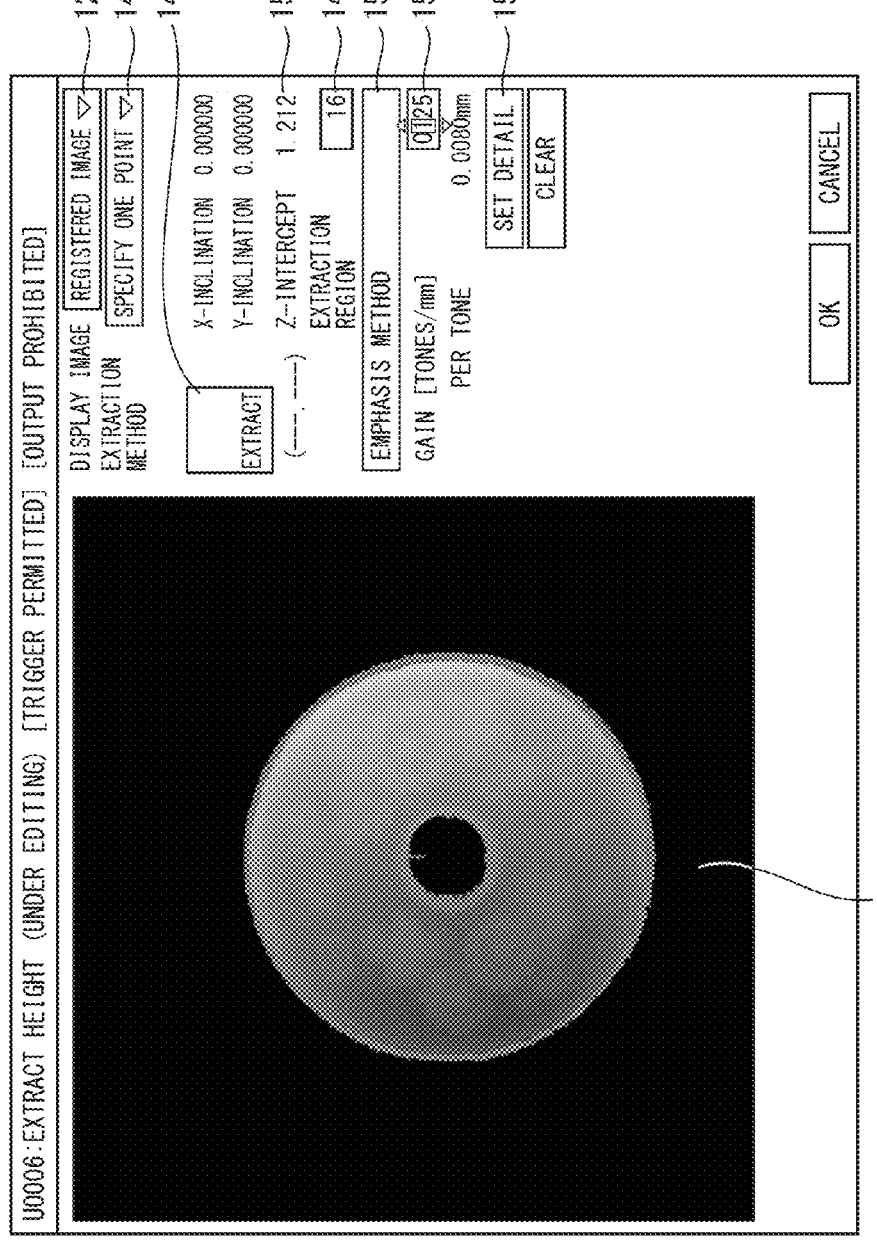
FIG. 71 is an image view showing a state where gain is decreased from the state of FIG. 70.
Figure 72:
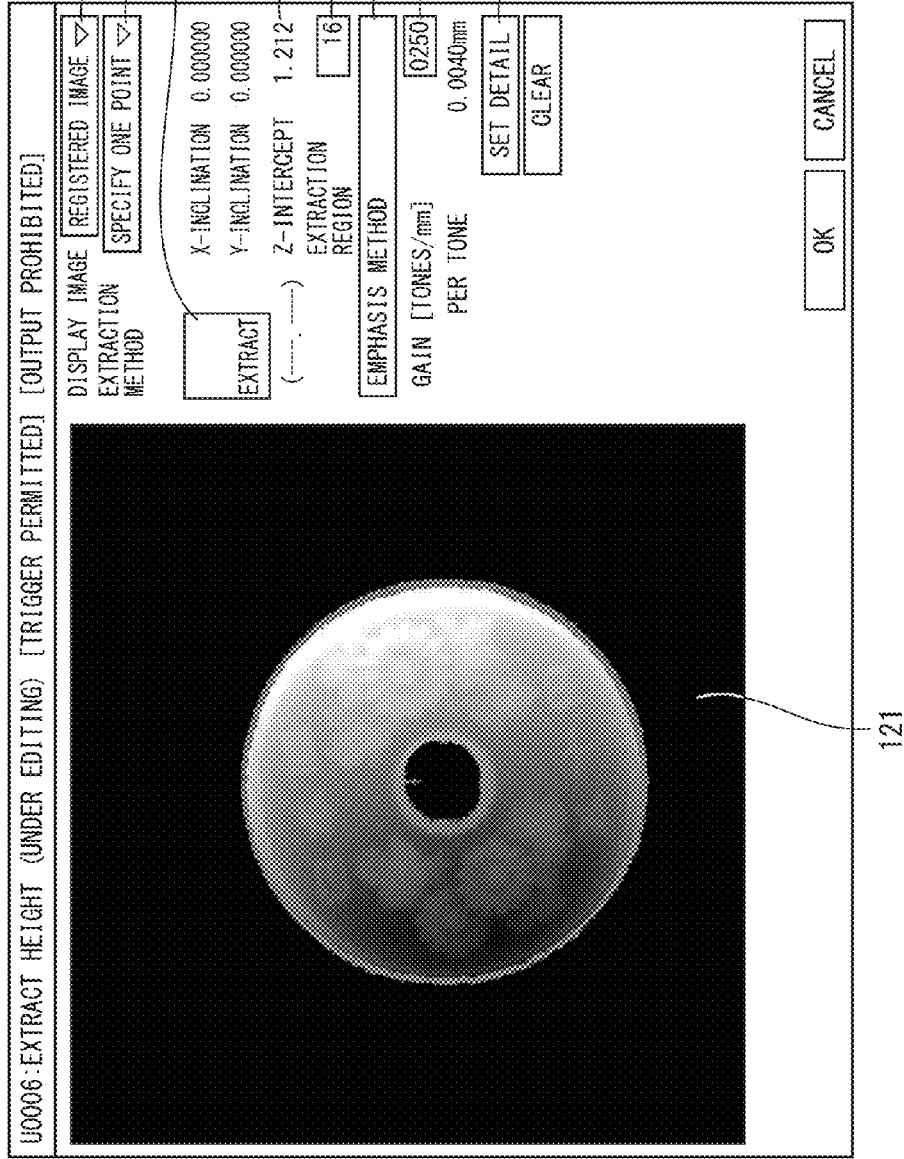
FIG. 72 is an image view showing a state where a detailed setting is selected in FIG. 71.

Further, it is also possible to automatically compute a height per tone (reciprocal number of a gain value) in accordance with the foregoing gain value, and display the height as well. In the example of FIG. 68, 250 [tones/mm] is displayed as the gain value, and 0.0040 mm as the height per tone. The user can adjust the gain value by changing the gain value. For example, when the gain value is increased, as shown on the screen of FIG. 68 to the screen of FIG. 70, a concentration difference can be emphasized to finely inspect the height information, whereas the inspectable height range becomes narrow. In contrast, when the gain value is decreased, as shown in FIG. 71, the inspection can be performed in a broad height range, whereas a fine change is lost. As thus described, when the gain is adjusted by the gain adjusting part, a tone-converted image obtained on that tone conversion condition can be confirmed on the second image display region 121. Herewith, while confirming the tone-converted image that is updated in real time, the user can adjust the gain value to an appropriate one in accordance with his or her inspection purpose or the like.

(Setting of Extracted Height)

Further, the setting items for the emphasis method can include a setting for the extracted height in addition to the gain value. For example, on the screen of FIG. 72, when a "Detail setting" button 158 provided in the lower right of the operation region 122 is pressed, the screen shifts to an emphasis method detail setting screen 160 of FIG. 73, and in the emphasis method setting field 154, an "Extracted height" setting field 162 is displayed in addition to the foregoing gain adjustment field 156. In the "Extracted height" setting field 162, any of large height information, small height information, both large and small height information which are included in the region can be selected as height information to be executed in the height extracting part. Here, as shown in FIG. 74, any of "High side", "Low side", "Both high and low" can be selected by means of a drop-down list provided in the "Extracted height" setting field 162. For example, when "High side" is selected, the tone conversion is performed such that the height of the position pointed with the pointer 146 becomes a lower limit of the distance range. This results in generation of a low-tone distance image extracted only on the higher side than the specified height. Similarly, when "Low side" is selected, the tone conversion is performed such that the height of the position pointed with the pointer 146 becomes an upper limit of the distance range. This results in generation of a low-tone distance image extracted only on the lower side than the specified height. Further, in the case of "Both high and low", the tone conversion is performed such that the height of the position pointed with the pointer 146 becomes an intermediate of the foregoing distance range. It should be noted that as for pixels that got out of the range after the tone conversion, those on the lower side are clipped to black (pixel value of 0 in the case of 8 tones) and those on the high side are clipped to white (pixel value of 255).

Figure 73:
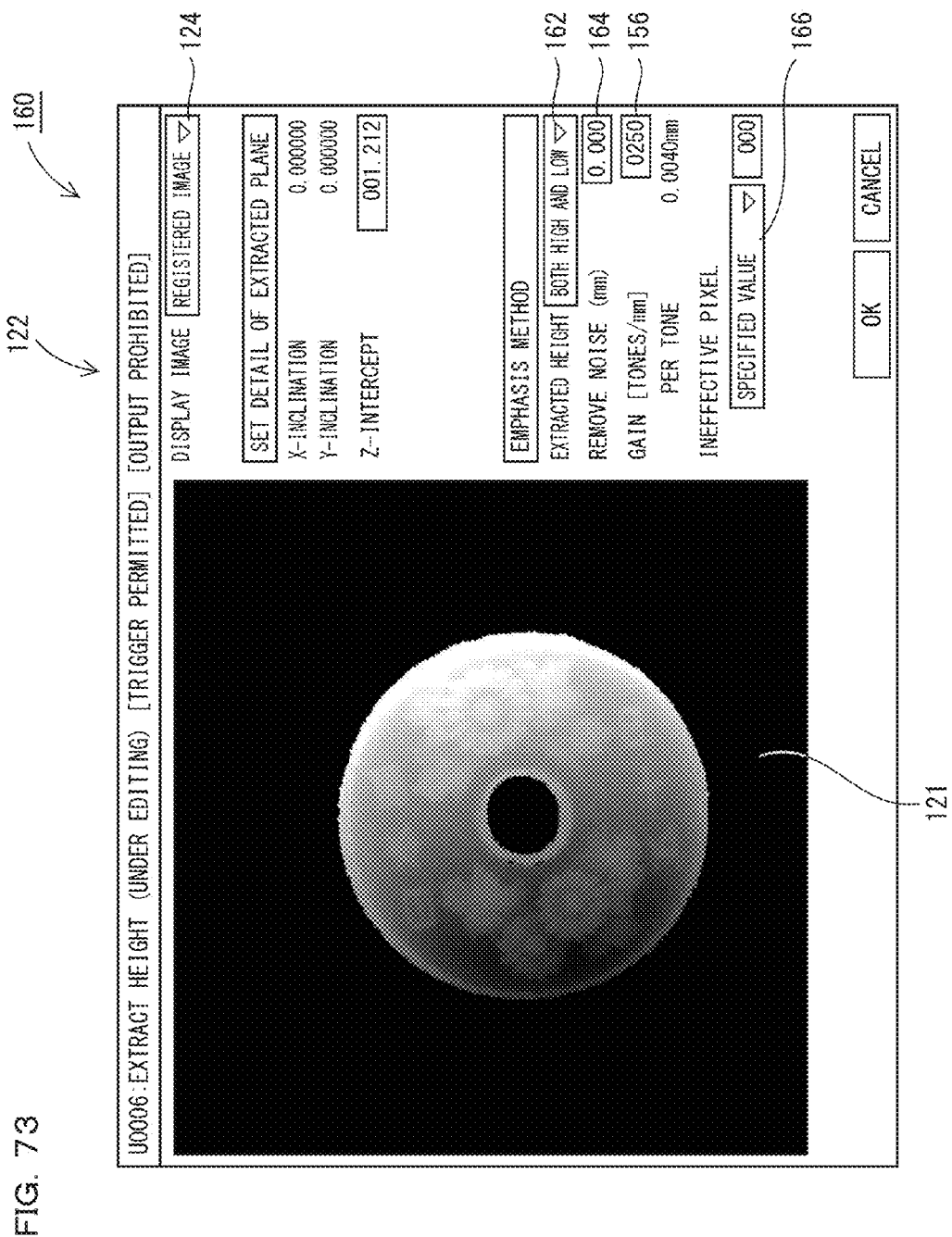
FIG. 73 is an image view showing a GUI of an emphasis method detail setting screen for one-point specification.
Figure 74:
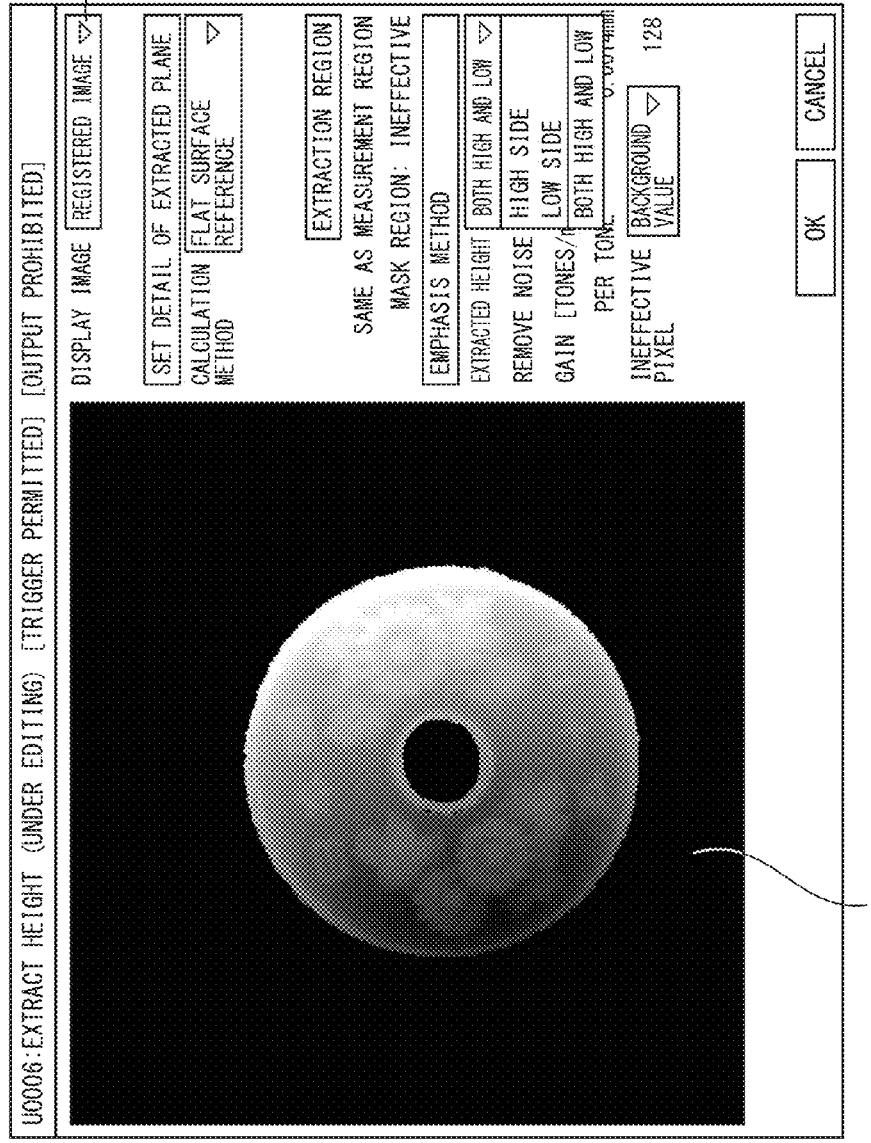
FIG. 74 is an image view showing a state where a drop-down list of an "Extracted height" setting field is displayed from the state of FIG. 73.

Further, the emphasis method detail setting screen 160 of FIG. 73 is also provided with a noise removal setting field 164 for removing noise, and an ineffective pixel specification field 166 for specifying a value to be given to an ineffective pixel.

(Noise Removal Setting Field 164)

In the noise removal setting field 164, as one of the tone conversion parameters, it is specified how many mm difference from the reference plane is removed as noise. For example, when the noise removal parameter is set to 0.080 mm, a difference of 0.080 mm from the reference plane is removed. Here, assuming that the height information before conversion has a resolution of 0.00025 mm per tone, the above operation is performed ignoring a difference of 0.080 [mm]÷0.00025 [mm]=320 [tones]. This situation will be described based on FIGS. 75A to 75C. In these drawings, similarly to FIG. 69A, FIG. 75A indicates a sectional profile of the 16-tone distance image before conversion with a solid line and its reference plane with a wavy line, and further indicates a range subjected to the noise removal with a dashed line. As a result of performing the noise removal on such an input image with the reference plane taken as the reference, a profile shown in FIG. 75B is given. Further, a profile of the low-tone distance image obtained by converting the tones of the distance image of FIG. 75B from 16 tones to 8 tones becomes one as shown in FIG. 75C, coming into a state where gain (conversion coefficient) is applied to the remaining component.

Figure 77A:
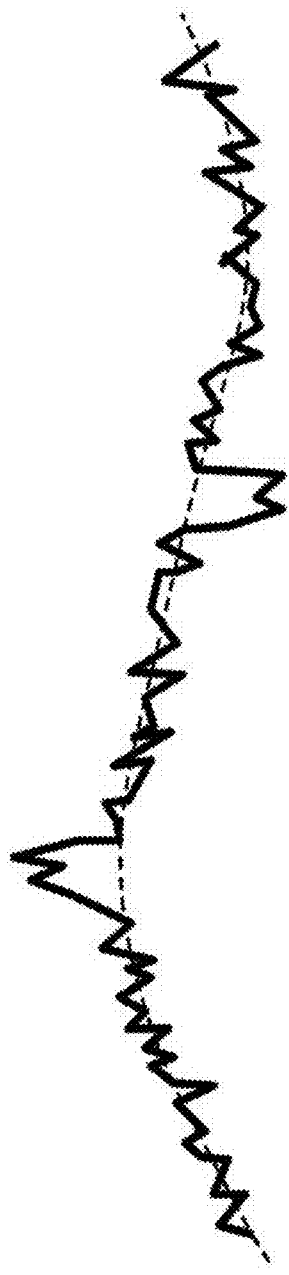
FIG. 77A is an image diagram showing a profile of an input image.
Figure 77B:
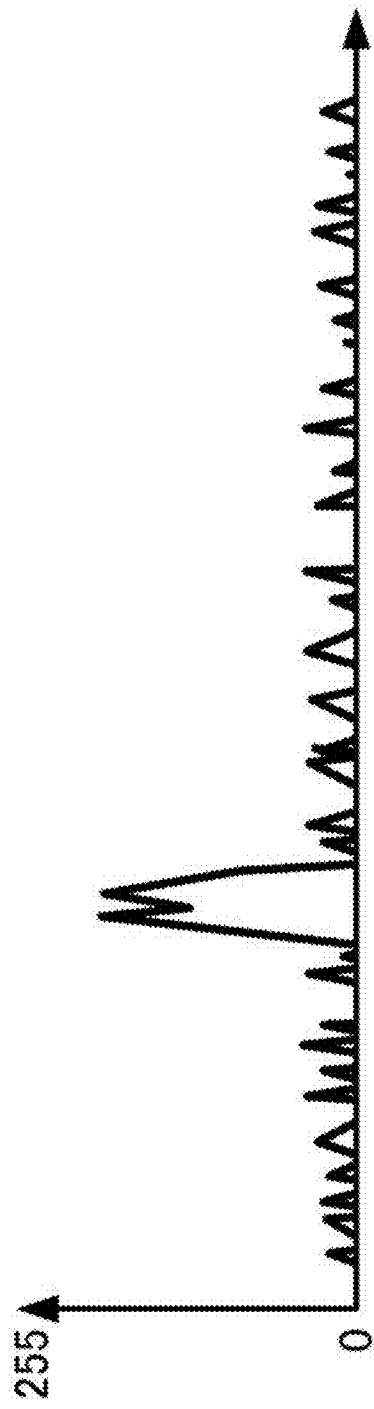
FIG. 77B is an image diagram showing a profile of a low-tone distance image obtained by setting "Extracted height" on the high side in the input image of FIG. 77A and tone-converting it

Further, effects of the gain adjustment and the noise removal will be described based on FIGS. 76A to 76F. First, it is assumed that a brightness image as shown in FIG. 76A and a high-tone (16-tone) distance image as shown in FIG. 76B are obtained. Here, 76C shows a low-tone distance image obtained by converting the tones of the distance image of FIG. 76B to low tones (8 tones) while holding the initial setting (here, the gain of 100 [tones/mm] and the noise removal of 0.000 [mm]). This low-tone distance image has a relatively low contrast. Therefore, when the gain is increased from this state, a low-tone distance image with an increased contrast is newly tone-converted from FIG. 76B and displayed, as shown in FIG. 76D. However, a noise component has also increased on this image. In the example of FIG. 76D, the gain is set to 1000 [tones/mm] and the noise removal is set to 0.000 [mm]. Accordingly, FIG. 76E shows a low-tone distance image obtained by increasing an amount of noise removal from FIG. 76D. Here, the gain is set to 1000 [tones/mm] and the noise removal is set to 0.080 [mm]. This noise component is thereby reduced, but it is possible to confirm that noise which is lower than the reference plane exists in the upper right of "E" in the upper left of the image. Accordingly, when "High side" is set in an "Extracted height" setting field 182 shown in FIG. 74 and the like, since the conversion is performed such that the reference plane becomes the minimum value (pixel value of 0), a lower portion than the reference plane is ignored and only the higher side than the reference plane is extracted, resulting in that a low-tone distance image as shown in FIG. 76F is obtained. For example, when "Extracted height" is set to "High side" with respect to a distance image (16 tones) with a profile as shown in FIG. 77A, only the higher side from the reference plane is extracted as a result, and a low-tone distance image (8 tones) as shown in FIG. 77B is obtained. In such a manner, it is possible to obtain a low-tone distance image with a high contract and a small noise component as compared with FIG. 76C and the like. In this example, as the ultimate tone conversion parameters, the gain is set to 1000 [tones/mm], the noise removal is set to 0.080 [mm] and "Extracted height" is set to "High side", and the tone conversion is performed from the distance image of FIG. 76B to the low-tone distance image of FIG. 76F.

Figure 78:
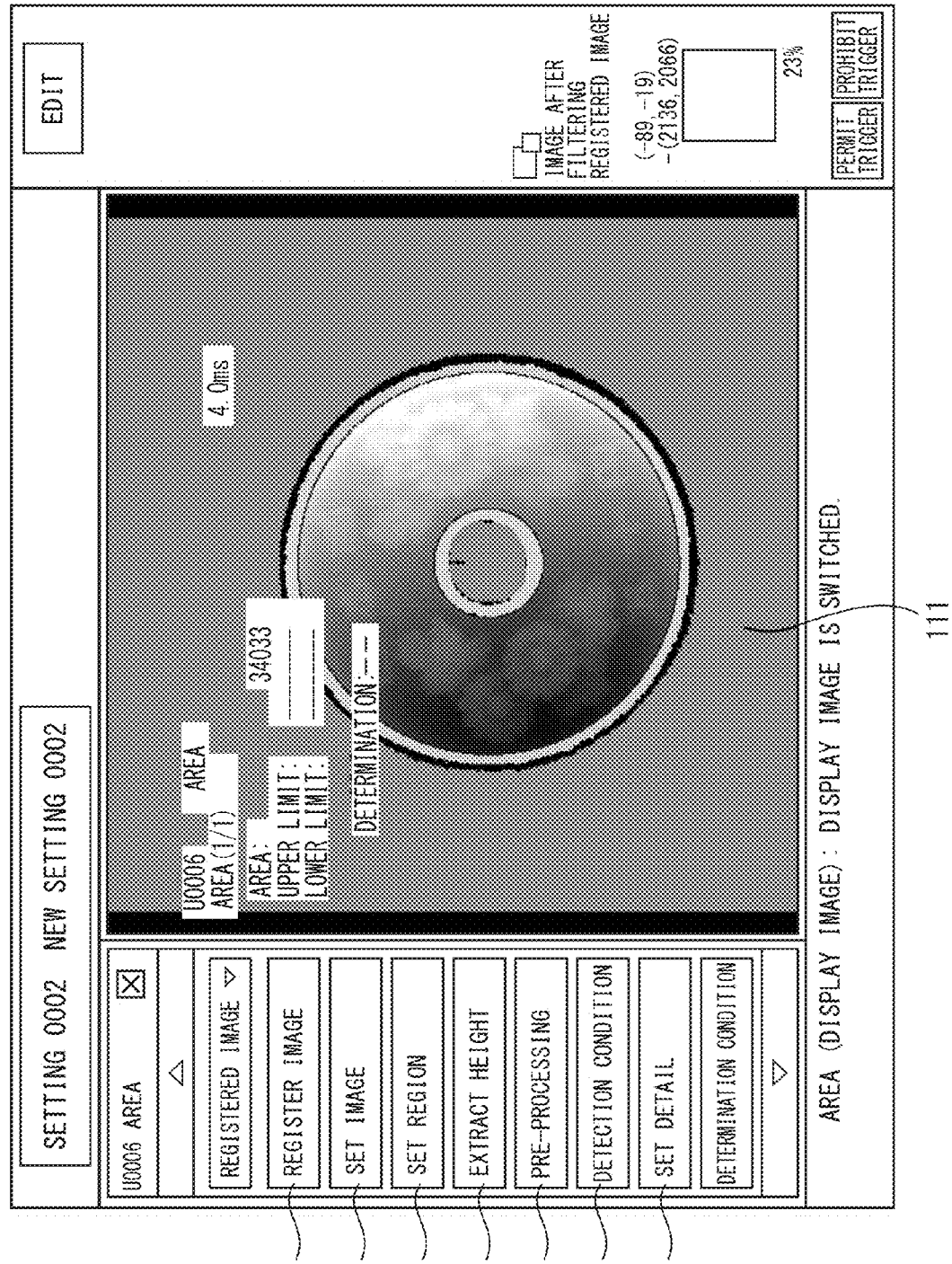
FIG. 78 is an image view showing a state where a tone-converted image is displayed.

As thus described, when the conditions necessary for executing the one-point specification are set, the input image is tone-converted from the high-tone distance image to the low-tone distance image in accordance with the specified tone conversion conditions, namely the reference height and the like, and the converted image is displayed on the first image display region 111 as shown in FIG. 78.

Figure 79A:
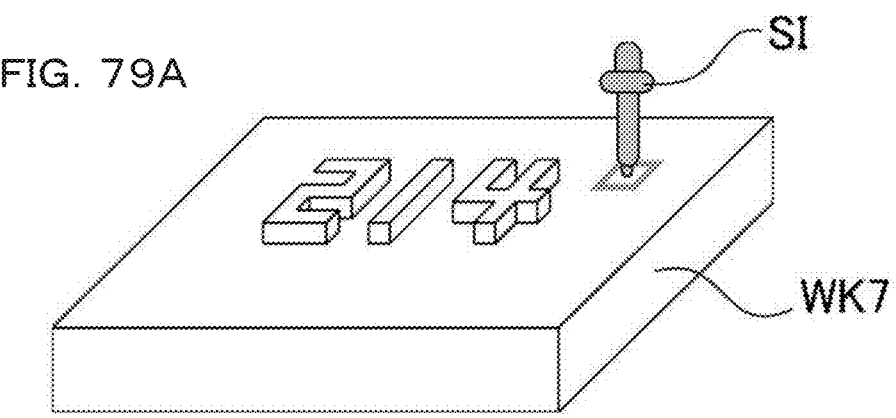
FIG. 79A is a perspective view showing an example of a workpiece for which a method for setting a reference plane by means of one-point specification is effective.
Figure 79B:
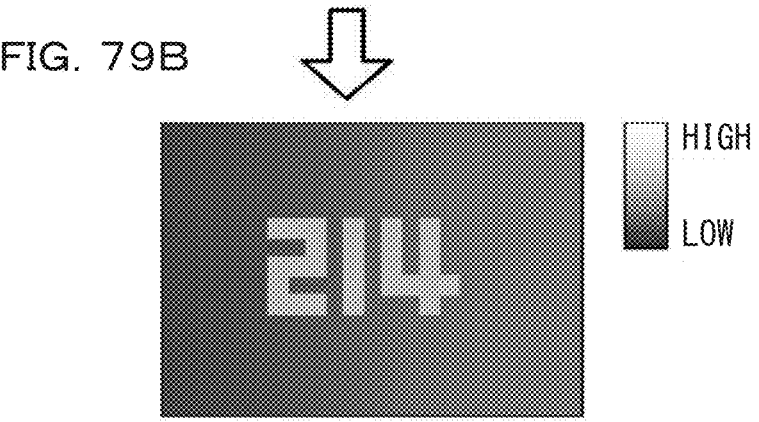
FIG. 79B is an image view of a low-tone distance image obtained by tone-converting a distance image captured in FIG. 79A.

Here, based on FIGS. 79A and 79B, a description will be given of an example of a workpiece for which the method for specifying the reference plane by means of the one-point specification is effective. FIG. 79A shows a workpiece WK7 where the measurement surface does not have a flat inclination, or even when the measurement surface has a slight inclination, it does not affect the inspection processing. Here, the workpiece WK7 obtained by three-dimensionally forming a number or character string on the surface of a casting is subjected to inspection processing for reading whether the character string is appropriate by means of OCR (Optical Character Recognition). In such a use, by pressing the "Extract" button 144 shown in FIG. 67 and the like, the dropper-like icon SI is displayed on the second image display region 121. Then, one point is specified with the pointer 146 on the flat surface (background surface) not formed with the character string out of the upper surface of the workpiece WK7 as shown in FIG. 79A. Herewith, the tone conversion is performed taking as the reference plane a height of an extraction region (16 pixels in the example of FIG. 67) specified with the pointer 146, and the image is converted to a low-tone distance image shown in FIG. 79B. In this low-tone distance image, taking the flat surface of the workpiece WK7 as a background, a character string portion protruding from it is clearly extracted, thereby facilitating execution of accurate OCR. As thus described, the one-point specification can be effectively used for the case where, even when the workpiece is slightly inclined, it does not affect the inspection processing. Further, the one-point specification also has an advantage of allowing the processing to be performed with a low load and high speed.

(Three-Point Specification)

In the above, the description has been given of the method for setting the tone conversion condition by means of the one-point specification. Next, based on GUI screens of FIGS. 80 to 85, a description will be given a method for setting the tone conversion condition by means of the three-point specification. The three-point specification is a method for tone-converting a distance image to a low-tone distance image by taking as a reference plane the flat surface found by three points specified by the user. Similarly to the foregoing reference height of the one-point specification, it is assumed that the reference plane is, for example, at an intermediate height of a height range (distance range) in which tone conversion to a low-tone distance image is performed out of height information of the distance image. Alternatively, it can also be at the upper limit of the distance range (the highest position at which the tone conversion is performed) or the lower limit thereof (the lowest position at which the tone conversion is performed).

Figure 80:
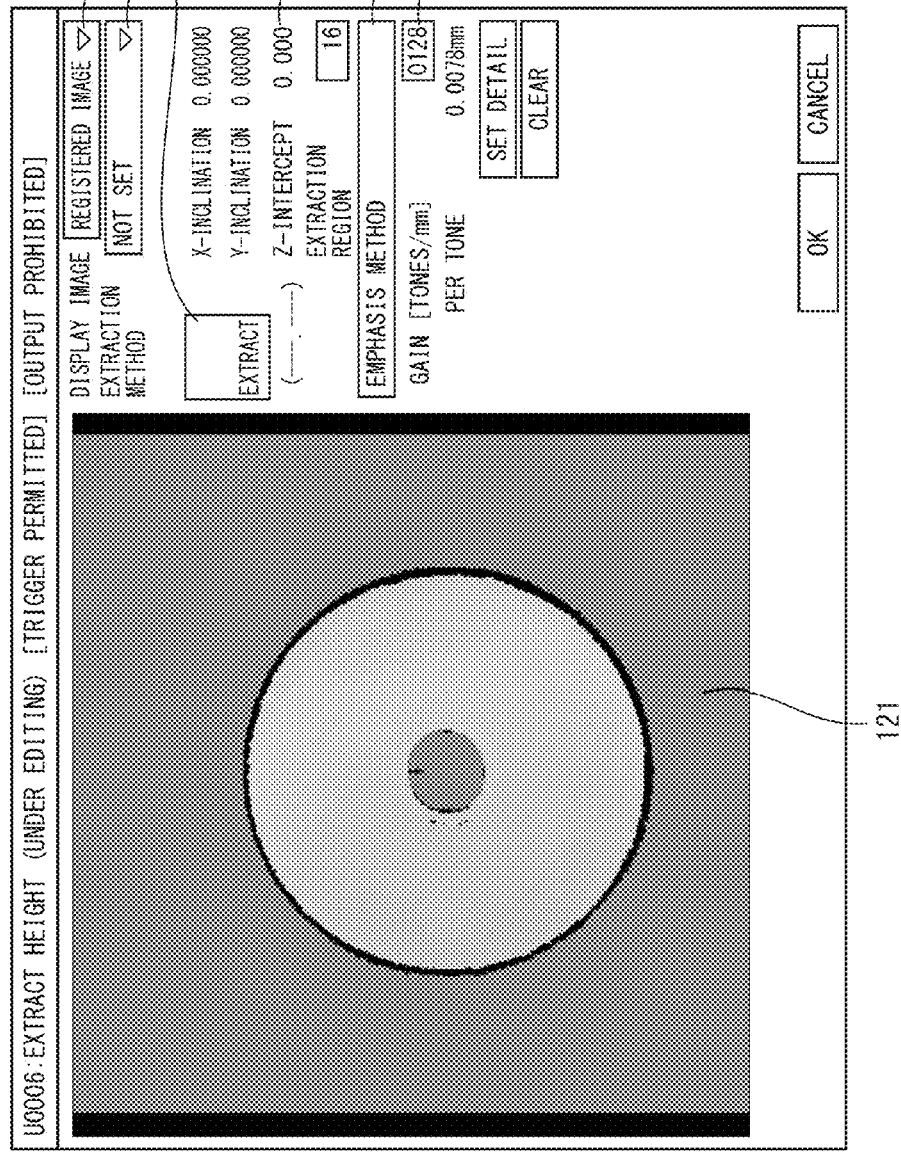
FIG. 80 is an image view showing a GUI of the height extraction selection screen.
Figure 81:
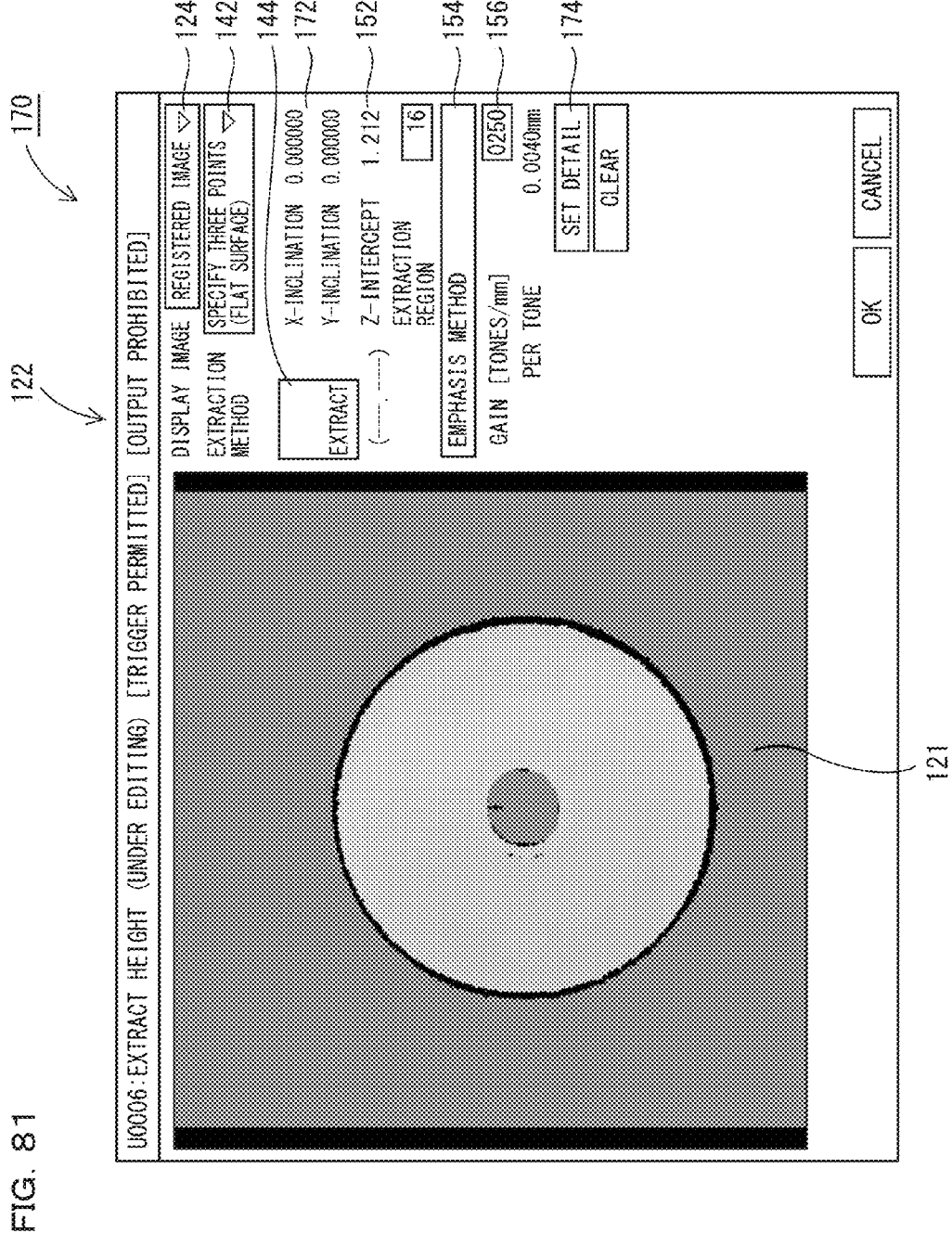
FIG. 81 is an image view showing a GUI of a three-point specification screen.

The "Height extraction" button 116 is pressed on the GUI screen of the three-dimensional image processing program of FIG. 62, and in a state where the screen has shifted to the height extraction selection screen 140 shown in FIG. 80, "Three-point specification (flat surface)" is selected as the tone converting method in the extraction method selecting part 142. Herewith, a three-point specification screen 170 shown in FIG. 81 is displayed to perform height extraction setting.

(Three-Point Specification Screen 170)

Figure 82:
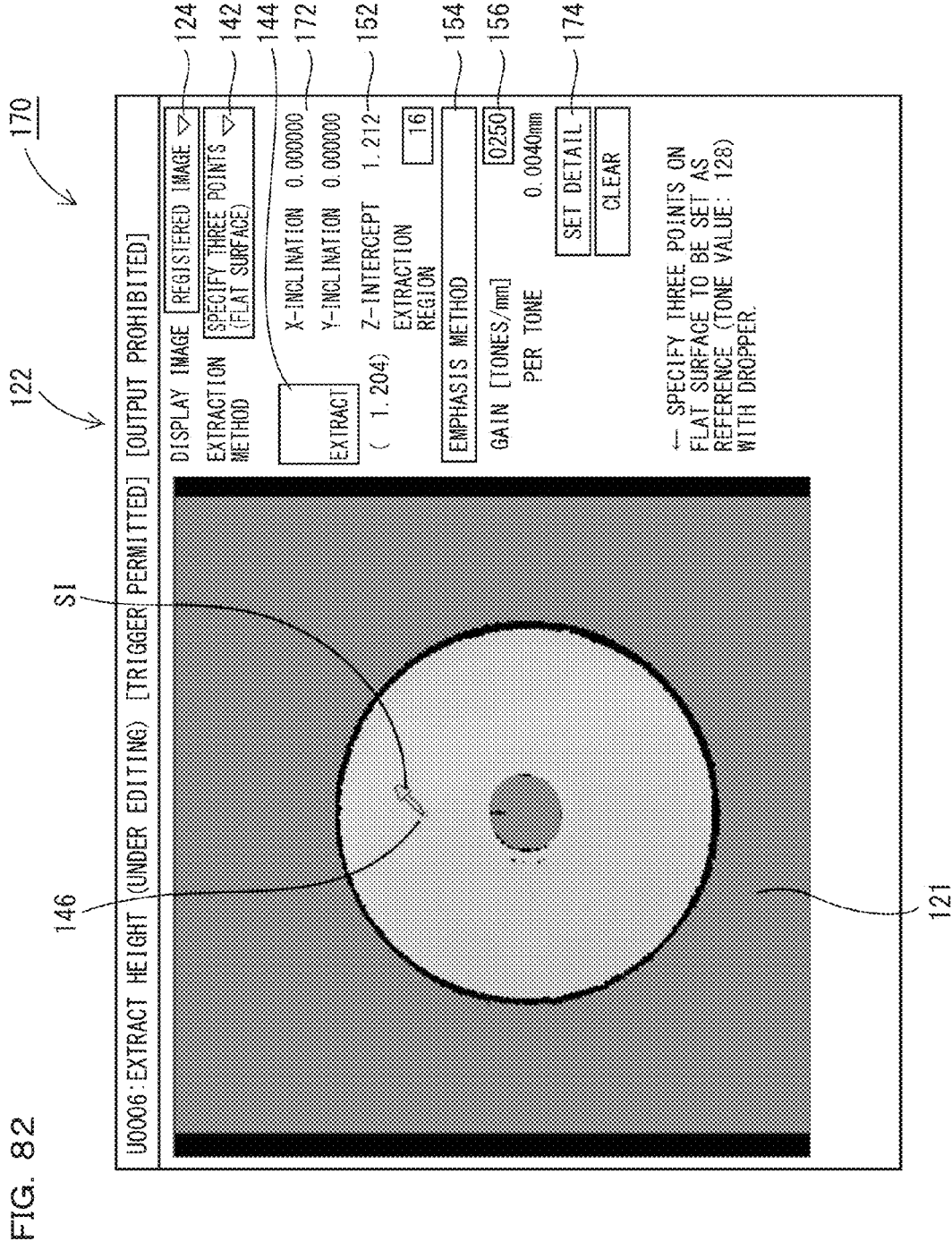
FIG. 82 is an image view showing a state where a first point is specified by a height extracting part from the state of FIG. 81.
Figure 83:
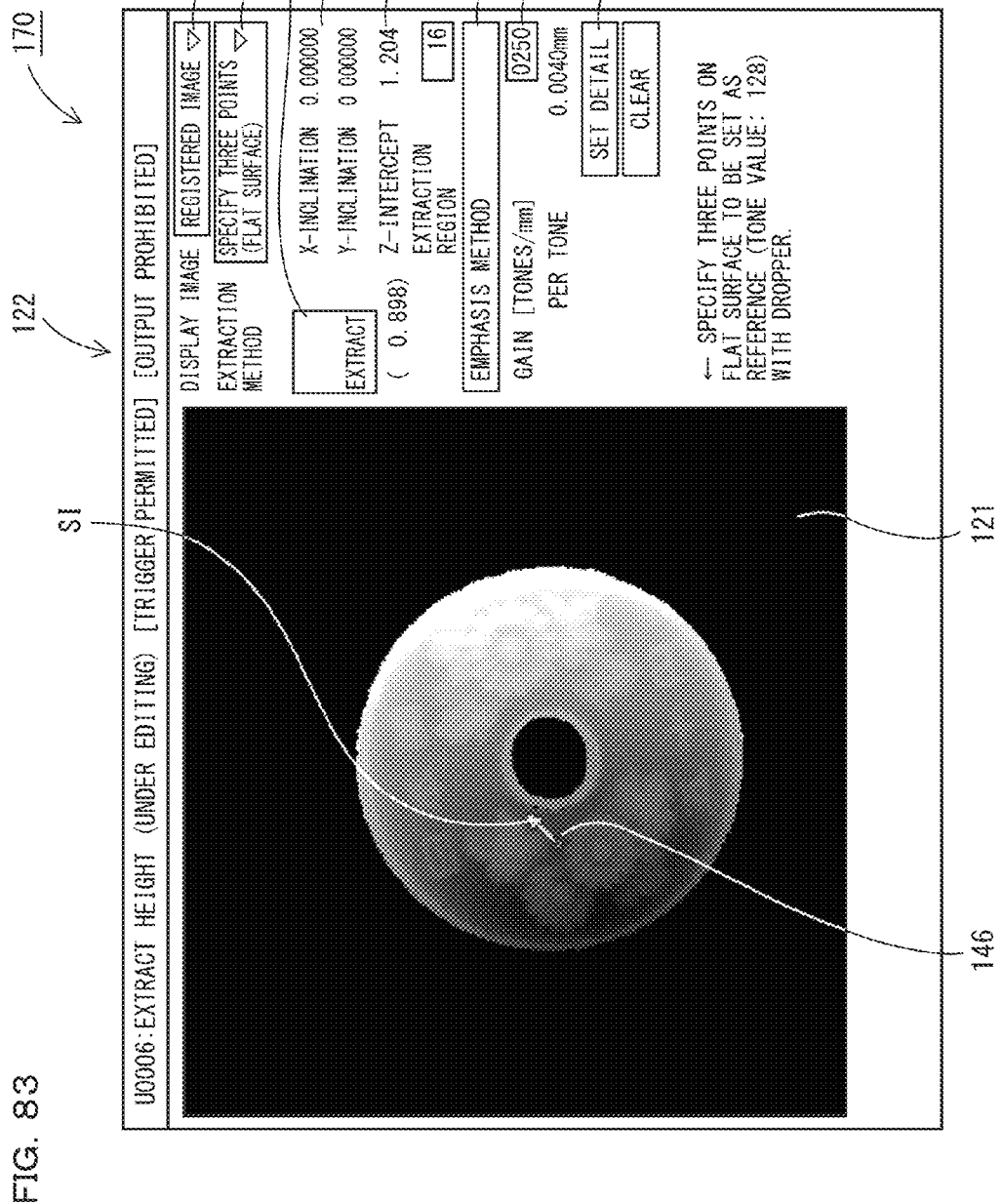
FIG. 83 is an image view showing a state where a second point is further specified from the state of FIG. 82.
Figure 84:
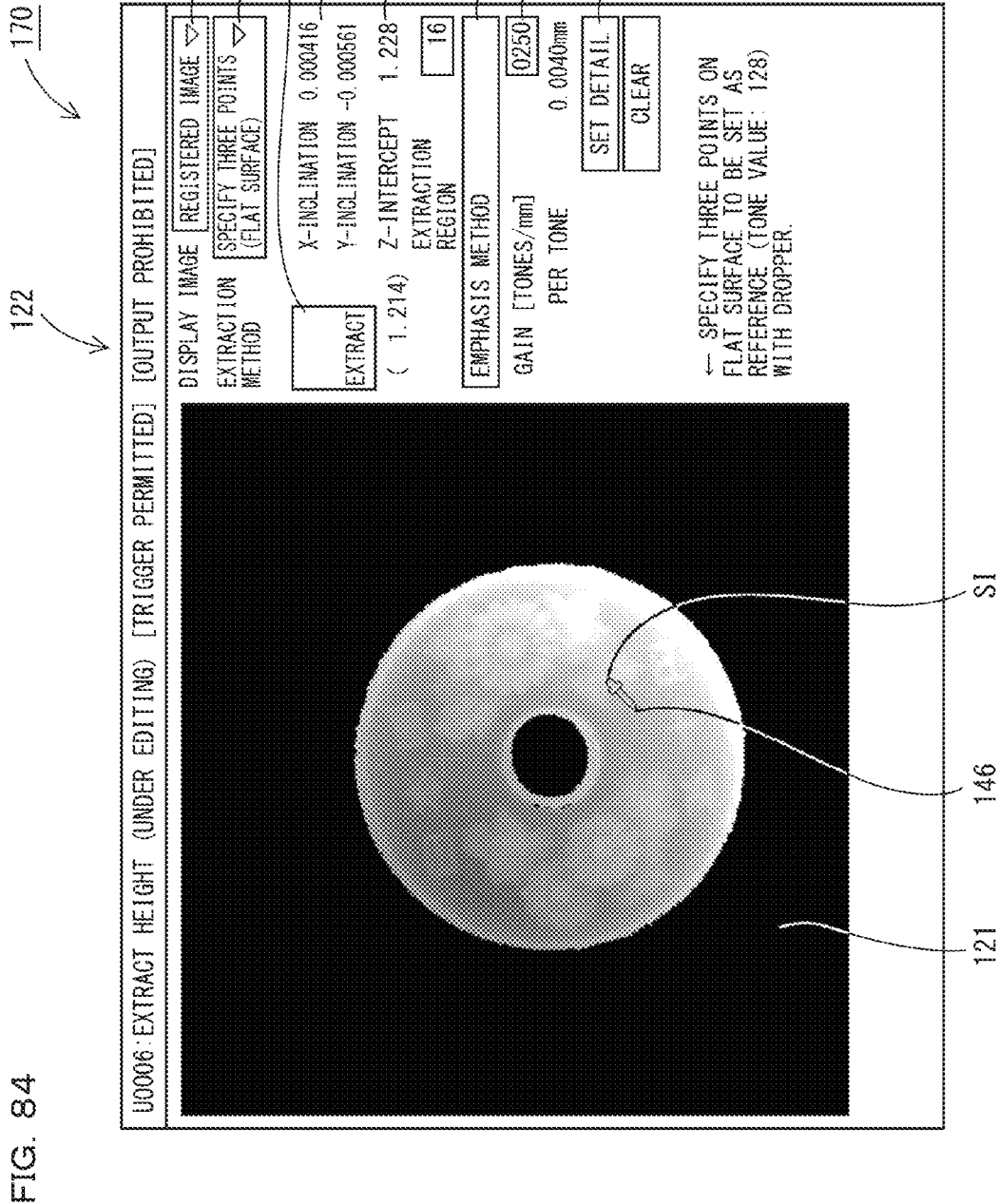
FIG. 84 is an image view showing a state where a third point is further specified from the state of FIG. 83.

On the three-point specification screen 170, three points are specified on the second image display region 121, to set the reference plane to be the reference of the tone conversion. For this reason, a height extracting part is provided on the three-point specification screen 170 of FIG. 81. Specifically, by selecting the "Extract" button 144 provided in the operation region 122 on the right of the screen, the screen is changed to one shown in FIG. 82, and it becomes possible to specify arbitrary positions of three points on the second image display region 121 on the left of the screen. Here, the dot-like pointer 146 is displayed as the height extracting part similarly to FIG. 67, and the user sequentially specifies desired positions by means of a pointing device such as a mouse, a trackball or a touch panel. First, when a first point is specified on the second image display region 121, a rectangular shape changes to a cross-like shape as in FIG. 83 at the specified position to indicate the already specified position, and it also becomes possible to specify a next, second point with the same pointer 146. At this time, a color distance image being displayed in FIG. 82 is tone-converted taking as the reference a horizontal surface that includes a height of the specified first point, and the low-tone distance image after tone-conversion is displayed as the shade image on the second image display region. Further, when the second point is specified, as shown in FIG. 84, a position of the second point is changed from a rectangular shape to a cross-like shape, and it also becomes possible to specify a third point. At this time, the tone conversion is performed again, taking as the reference an inclined surface that includes heights of the two specified points, to update the low-tone distance image. When the third point is then specified, the reference plane is set by means of the flat surface including these already specified three points. Further, at the time of specifying each point in the height extracting part, the heights of the currently specified points in a height extraction screen display region may be displayed in the "Z-height" display field 152.

Moreover, as information of the reference plane, an angle of inclination can also be displayed. In the example of FIG. 84, in a height extraction display field 172 provided in the operation region 122, an X-directional inclination and a Y-directional inclination of the reference plane and a Z-directional height of the third point are displayed.

Figure 85:
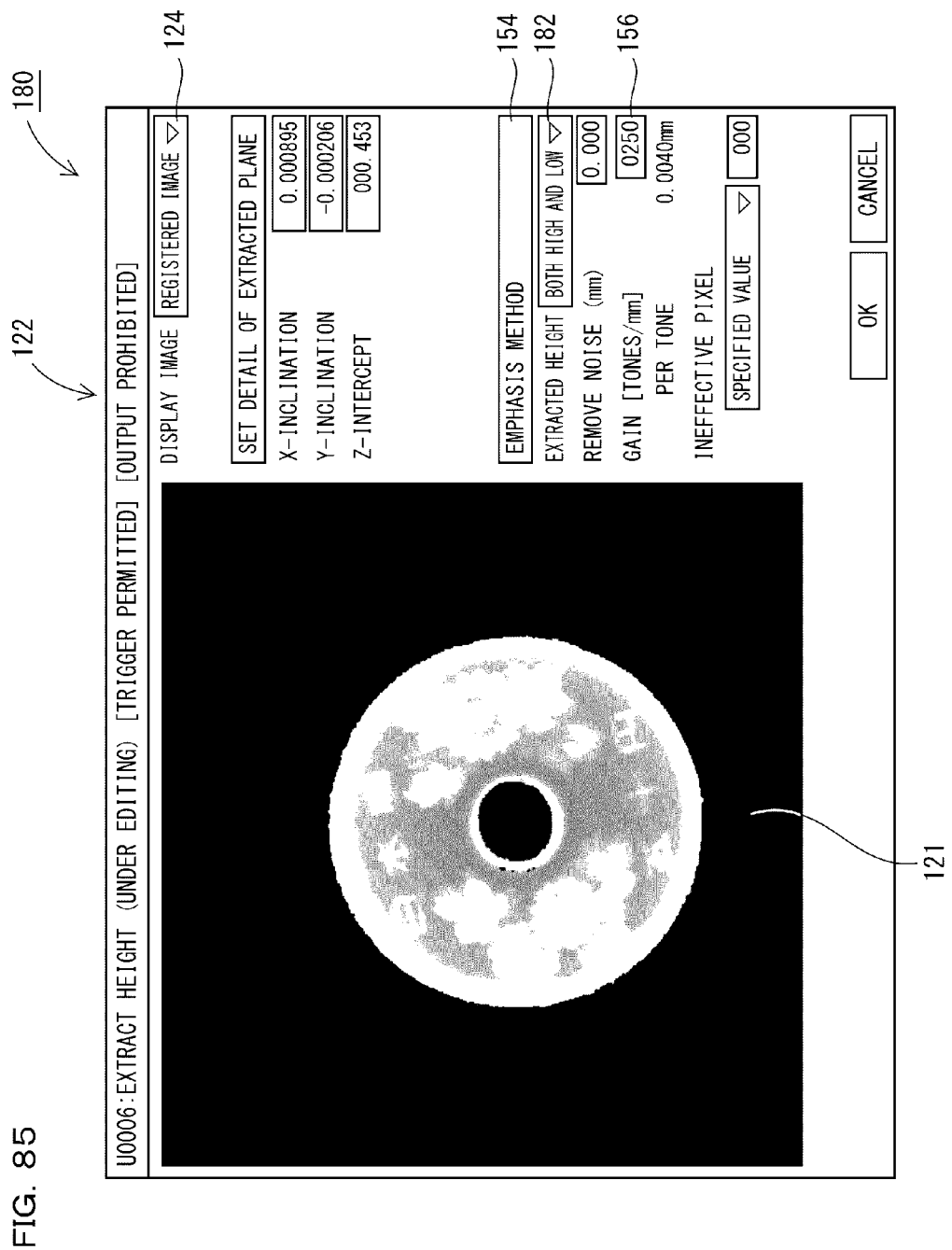
FIG. 85 is an image view showing a GUI of a detail setting screen for three-point specification.

Further, similarly to the one-point specification, the emphasis method can also be specified according to the need. For example, the gain is adjusted using the gain adjusting part, or a three-point specification detail setting screen 180 as shown in FIG. 85 is called by pressing a three-point specification "Detail setting" button 174, to display the "Extracted height" setting field 182 in the emphasis method setting field 154 in addition to the gain adjustment field 156, and any of "High side", "Low side" and "Both high and low" can be selected from a drop-down list as height information to be extracted in the height extracting part.

As thus described, the distance image can be tone-converted taking as the reference plane the arbitrary flat surface prescribed by the specified three points. As a result, it becomes possible to perform not only the tone conversion with the horizontal surface taken as the reference like the foregoing one-point specification, but also the tone conversion with the inclined flat surface taken as the reference plane. For example, in the use of inspecting a flaw or a foreign substance on the inclined surface out of the surface of the workpiece, a distance range would be narrow if the inclined surface remains as it is, but by setting the reference plane along the inclined surface, it is possible to cancel the inclined surface, so as to efficiently inspect the flaw or the foreign substance. In such a manner, it is possible to realize the flexible tone conversion, making use of the height information in accordance with the workpiece or the inspection purpose.

Figure 86A:
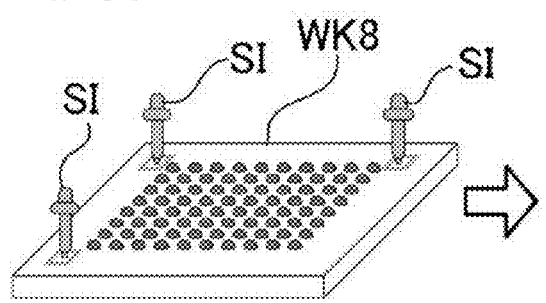
FIG. 86A is a perspective view showing an example of a workpiece for which a method for setting a reference plane by means of three-point specification is effective.
Figure 86B:
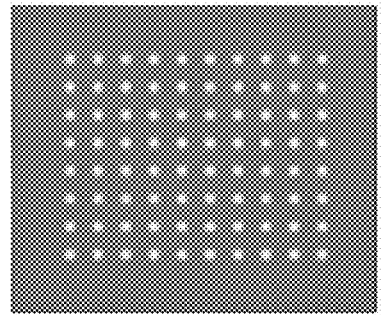
FIG. 86B is an image view of a low-tone distance image obtained by tone-converting a distance image captured in FIG. 86A.
Figure 86D:
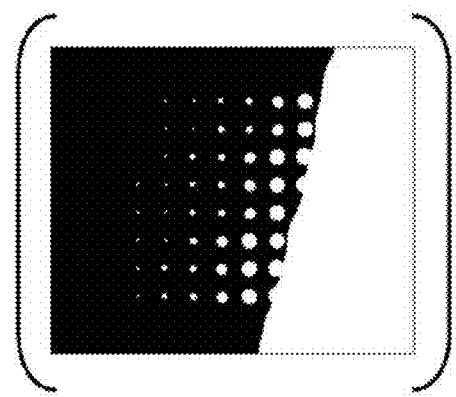
FIG. 86D is an image view of a binary image obtained by the one-point specification in the case of the workpiece of FIG. 86A being inclined.
Figure 86C:
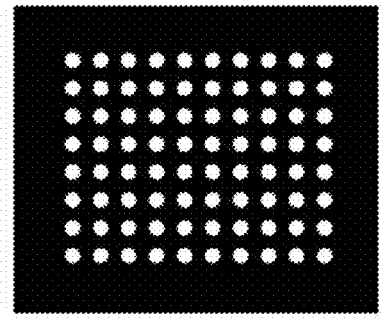
FIG. 86C is an image view of an image obtained by binarizing FIG. 86B.

Here, based on FIGS. 86A and 86D, a description will be given of an example of a workpiece for which the method for specifying the reference plane by means of the three-point specification is effective. FIG. 86A shows such a workpiece WK8 that, when a flat inclination occurs or a minute flat inclination exists on the measurement surface of the workpiece, it affects a result of the inspection processing. Here, inspection processing for detecting a ball grid array (BGA) formed on a substrate is performed. In such a use, by pressing the "Extract" button 144 shown in FIG. 84 and the like, the dropper-like icon SI is displayed on the second image display region 121. Then, as shown in FIG. 86A, three points each not formed with the BGA are specified with the pointer 146 within the upper surface of the workpiece WK8. Herewith, the flat surface including the specified three points is extracted as the reference plane, and the tone conversion is performed, to convert the image to a low-tone distance image shown in FIG. 86B. In this low-tone distance image, with the flat surface of the workpiece WK8 taken as the background, the BGA protruding from it is clearly extracted, and hence this can be binarized as shown in FIG. 86C to confirm a shape of the BGA, for example. With this method, it is possible to obtain an advantage of being able to accurately perform the detection even when the flat surface of the workpiece WK8 has the inclination. If the workpiece WK8 shown in FIG. 86A has an inclination, for example, the binarized image is shown as in FIG. 86D by means of the one-point specification, and the detection cannot be accurately performed. As opposed to this, by the three-point specification, the inclination can be corrected as described above, so as to obtain an accurate detection result. In such a manner, the three-point specification is effective in the case where the inclination of the flat surface affects the result of the inspection processing.

Figure 87A:
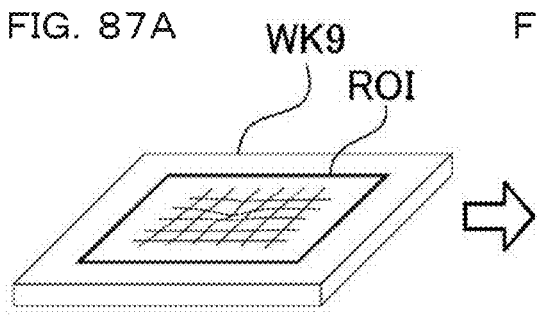
FIG. 87A is a perspective view showing an example of another workpiece for which a method for setting a reference plane by means of the three-point specification is effective.
Figure 87B:
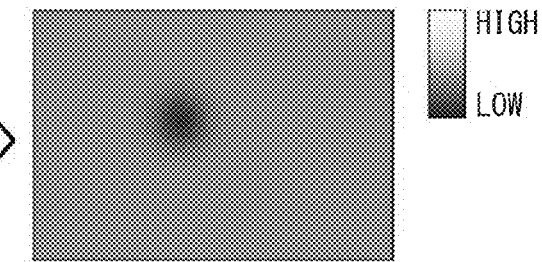
FIG. 87B is an image view of a low-tone distance image obtained by tone-converting a distance image captured in FIG. 87A.
Figure 87D:
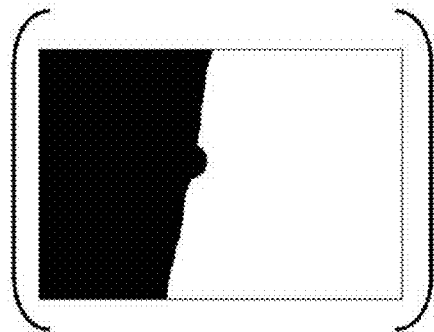
FIG. 87D is an image view of a binary image obtained by the one-point specification in the case of the workpiece of FIG. 87A being inclined.
Figure 87C:
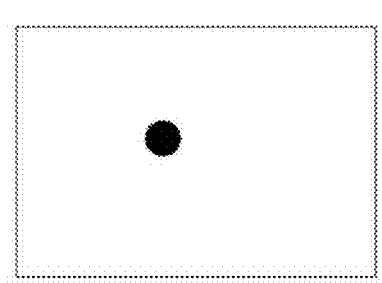
FIG. 87C is an image view of an image obtained by binarizing FIG. 87B.
Figure 88:
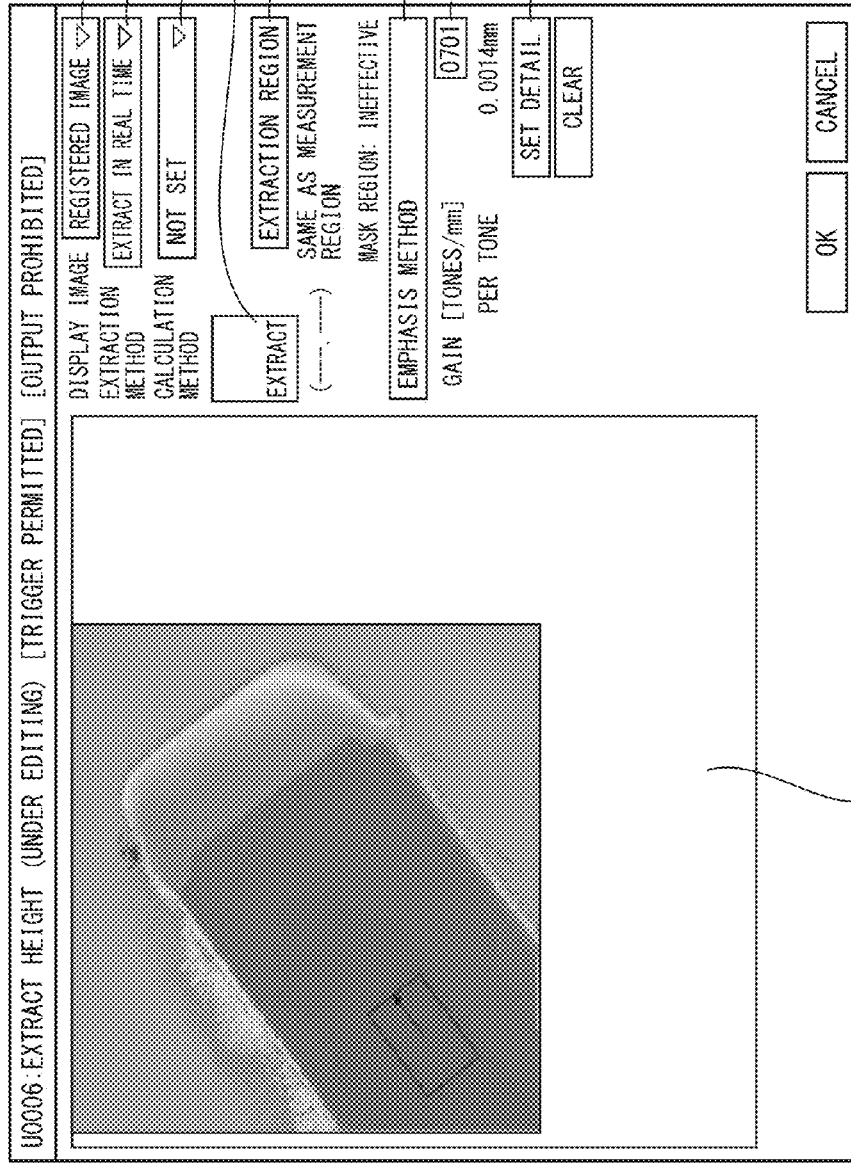
FIG. 88 is an image view showing a GUI of a height active extraction setting screen.

Further, there is considered inspection processing for detecting a gentle depression when this depression is on the upper surface of a flat workpiece WK9 as shown in FIG. 87A. Here, as shown in FIG. 87A, a measurement region ROI is set to be a region including the depression. Herewith, the tone conversion is performed taking as the reference plane the flat surface found from the height data within the measurement region ROI including the depression, to obtain a low-tone distance image as shown in FIG. 87B. In this example, the reference plane is estimated by a least squares method. Further, the obtained low-tone distance image is binarized, to obtain a binarized image shown in FIG. 87C. The inclination can thereby be corrected, to stably extract only the depression portion. If a binarized image is found by means of the one-point specification in the state of there being an inclination, a result is as shown in FIG. 87D, and it is found difficult to detect the depression due to the inclined surface. As thus described, the three-point specification is effective for highly accurate estimation of the reference plane. It should be noted that in terms of the processing time, it is longer than in the case of the one-point specification, but the processing can be performed at relatively high speed.

In the above, the description has been given of the static conversion in which a tone conversion condition is previously set at the setting stage and the tone conversion is performed on the specified condition at the time of operation. In other words, in the static conversion, the tone conversion parameter is a fixed value regardless of the input image. Next, a description will be given of a specific example of the active conversion for adjusting the tone conversion condition in accordance with the input image as the inspection target. First, as specific methods for correcting the reference of height information which should remain at the time of tone-converting the distance image to the low-tone distance image, the active conversion includes: (B1) an average height reference where the tone conversion is performed taking as an average reference height an average height (average distance) within an average extraction region specified with respect to the input image; (B2) a flat surface reference where an estimated flat surface within a specified region of the input image is generated and the tone conversion is performed taking this flat surface as the reference plane; and (B3) a free curved surface reference where a free curved surface with a high-frequency component removed from the input image is generated and the tone conversion is performed taking this curved surface as the reference plane. Hereinafter, each of the methods will be sequentially described.

(B1: Average height reference)

Figure 89:
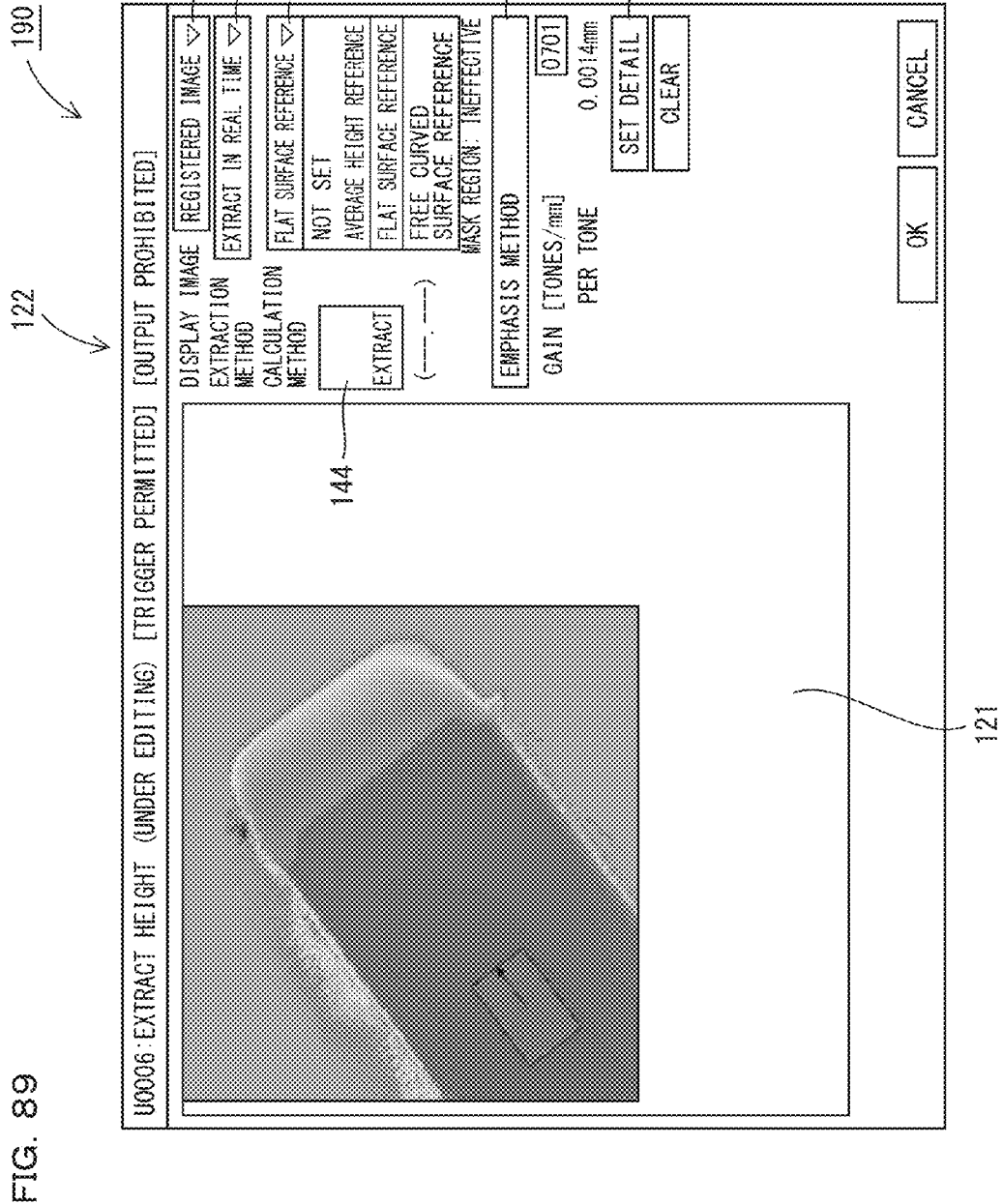
FIG. 89 is an image view showing a drop-down box of a "Calculation method" selection field.
Figure 90:
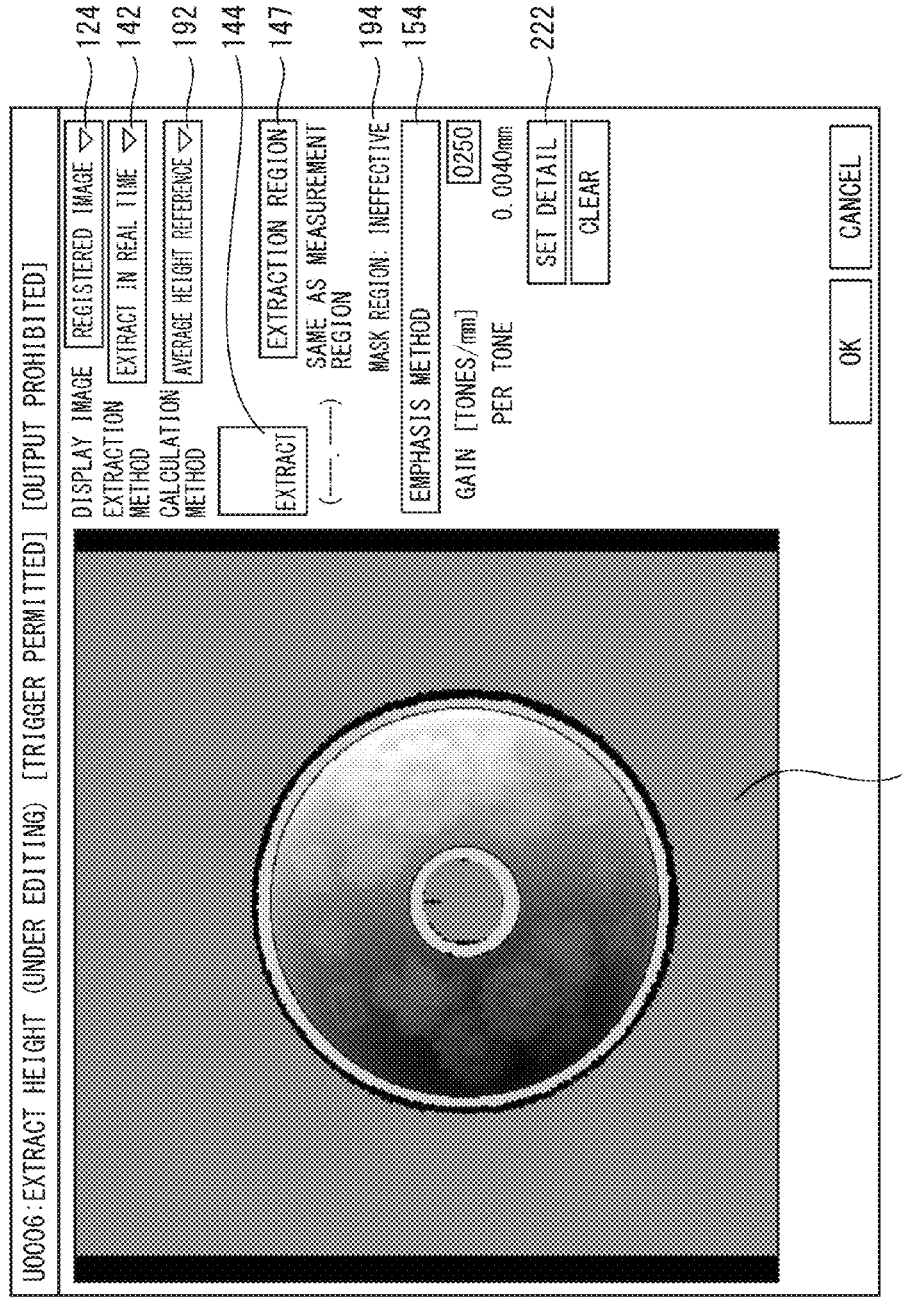
FIG. 90 is an image view showing an average height reference setting screen.
Figure 91:
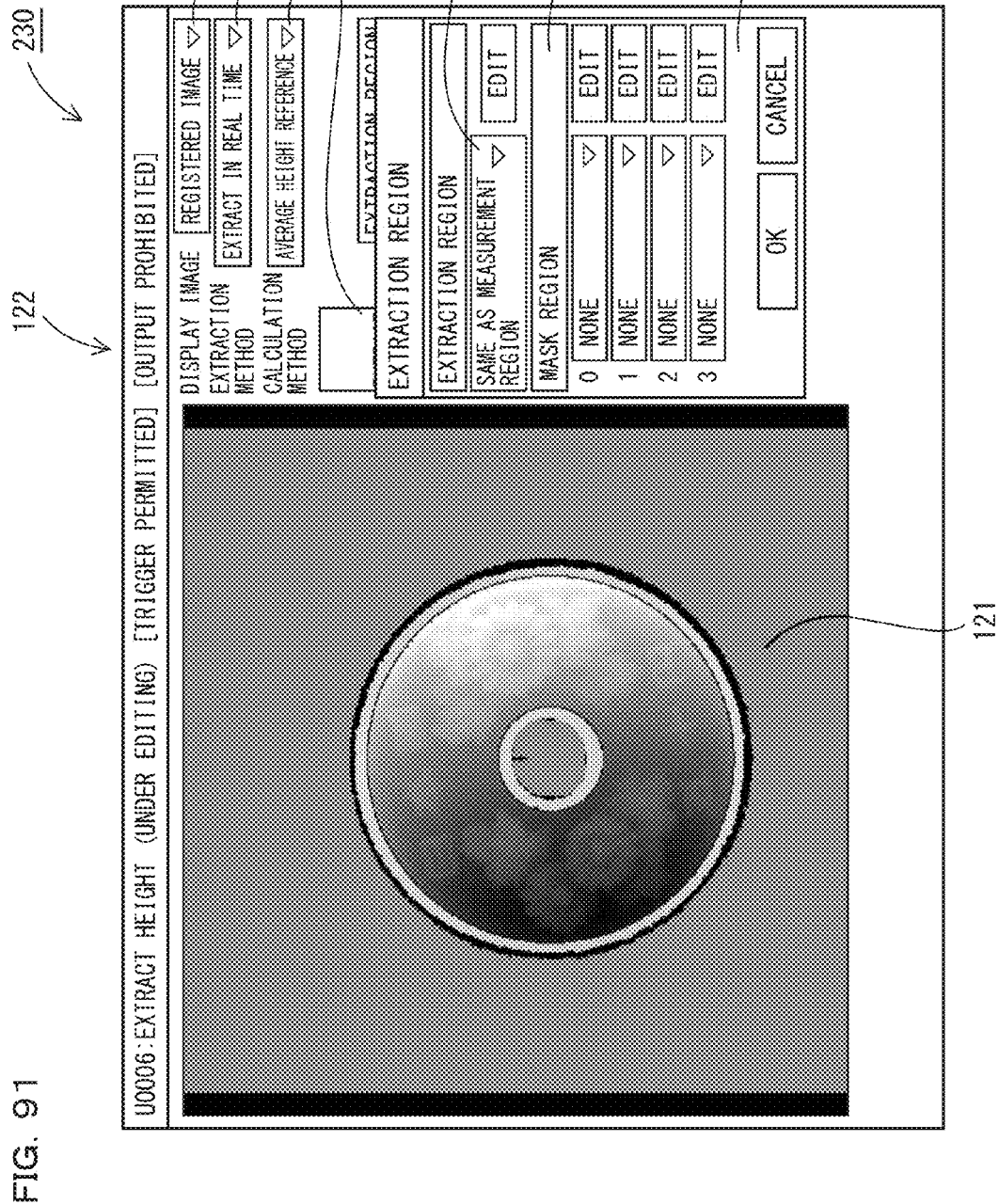
FIG. 91 is an image view showing a mask region setting screen.
Figure 92:
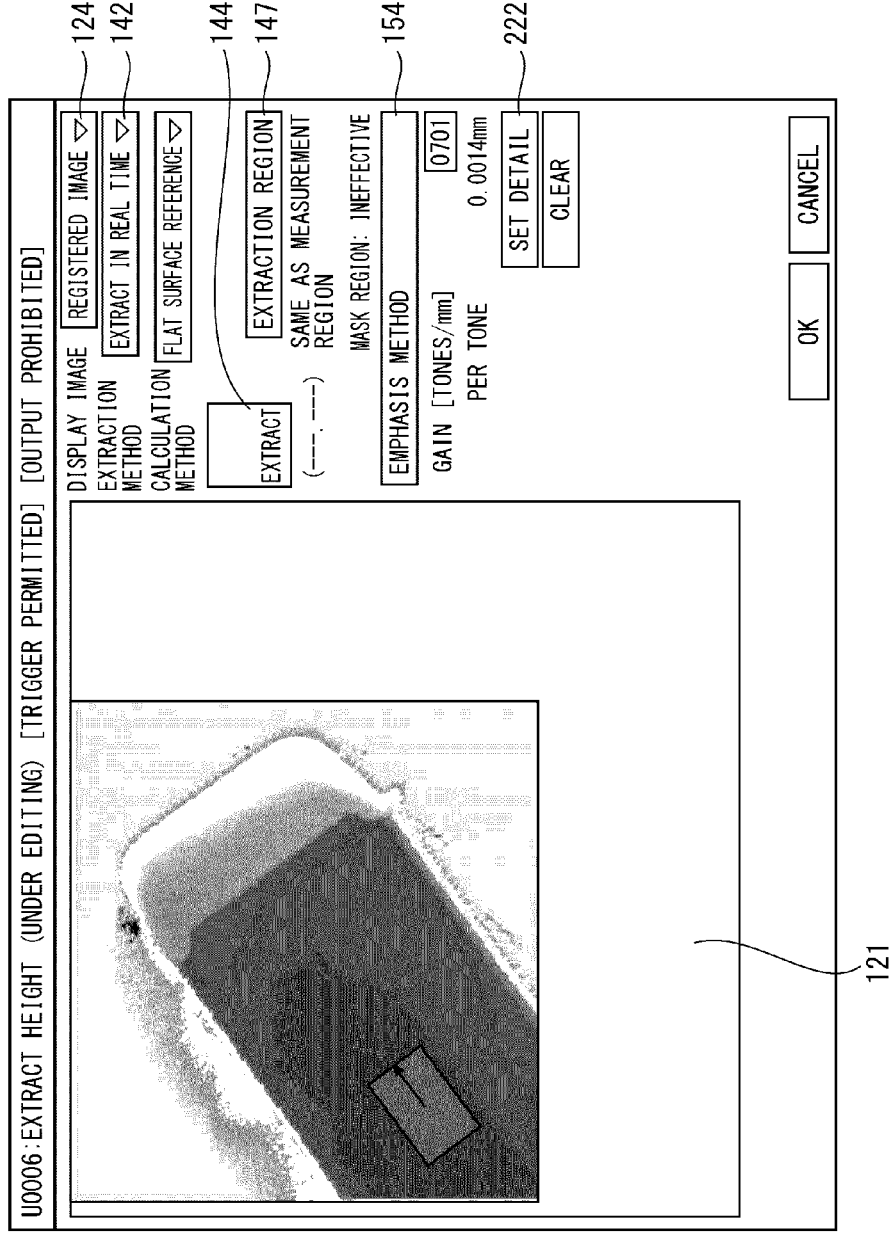
FIG. 92 is an image view showing a flat surface reference detail setting screen.

The average height reference is a method where an average height within a specified average extraction region is computed with respect to each input image, and the tone conversion is performed taking this average height as an average reference height. An average extraction region for specifying an average reference height is previously set prior to the operation (Step S83 of FIG. 8 above). Hereinafter, in Step S83 of FIG. 8, one example of a procedure for specifying the average extraction region will be described based on the GUIs of FIGS. 62, 65 and 88 to 92. First, when the "Height extraction" button 116 is selected on the GUI screen of FIG. 62 to go to the height extraction selection screen 140 of FIG. 65 and "Real time extraction" corresponding to the active conversion is selected in the extraction method selecting part 142, the screen is changed to a height active extraction setting screen 190 of FIG. 88. In this example, an example of using an eraser is again shown. Next, in a "Calculation method" selection field 192 provided below the extraction method selecting part 142, the reference of the active conversion is specified. Here, as shown in FIG. 89, any of "Average height reference", "Flat surface reference" and "Free curved surface reference" is selected from a drop-down box. Here, "Average height reference" is selected. Herewith, the screen shifts to an average height reference setting screen 210 of FIG. 90. In addition, FIGS. 90 and 91 show an example of using a 50-yen coin as the workpiece for convenience of description.

It should be noted that at the time of setting regarding the active conversion, it is necessary to set the average reference height or the like with respect to a different image from a distance image that is inputted at the time of actual operation. For this reason, an image corresponding to the workpiece at the time of operation is previously captured and stored as a registered image, and in the setting for the active conversion, the registered image is read and a variety of settings are performed in the form of substituting this registered image for the workpiece at the time of operation. Hence on the screens of FIG. 65 and the like, corresponding "Registered image" is specified in the "Display image" selection field 124.

In the average height reference setting screen 210, a separately set inspection target region is used as it is, or an arbitrary average extraction region is specified according to the need. As for specification of the average extraction region, an arbitrary method can be used such as specification of a rectangular shape, four points, a circle obtained by specifying its center and radius, or a free curve. Further, only one point on the workpiece can be specified, or in contrast, the whole of the workpiece or the whole of the image displayed on the second image display region 121 can be taken as the average extraction region. Alternatively, the inspection target region having been separately specified as described above can be used as the average extraction region. In such a case, the operation for specifying the average extraction region by the height extracting part may be omitted.

(Mask Region)

Moreover, a mask region where an average height is not extracted may be specified with respect to the average extraction region. For example, when an "Extraction region" button 194 provided in the operation region 122 is pressed from the screen of FIG. 90, the screen shifts to a mask region setting screen 220 shown in FIG. 91. From this mask region setting screen 220, one or more mask regions unnecessary for extraction of the average height can be specified. The mask region can also be specified by specifying an arbitrary region in a rectangular shape, a circular shape or the like from the second image display region 121 as described above.

Further, the gain adjustment or the like can also be performed according to the need. For example, when a "Detail setting" button 196 provided in the lower right of the operation region 122 is pressed from the screen of FIG. 90, the screen shifts to an average height reference detail setting screen 230 shown in FIG. 92, and in addition to the gain adjustment, detailed setting items such as extracted height specification and noise removal are displayed in the emphasis method setting field 154.

When the average extraction region is set in such a manner, the setting screen is completed. At the time of tone conversion, the tone conversion is performed taking as a reference height an average value (average reference height) of height information included in this average extraction region. For example, the tone conversion is performed such that the average reference height becomes a central value of a distance range (in the case of $2^8=256$ tones, the central value is 128 which is a central value of a distance range from 0 to 255). Further, pieces of height information of all points included in the average extraction region need not necessarily be used, and the processing can be simplified by appropriately thinning out the points, averaging them, or some other way.

At the time of operation, the active conversion is performed in a sequence shown in FIG. 133 described later. For example, an image of the workpiece being carried on the production line is captured to generate a distance image (Step S13301), an average height of the above set average extraction region is computed (Step S13302), the tone conversion is executed based on this to generate a low-tone distance image (Step S13303), and the obtained low-tone distance image is inspected (Step S13304). With this method, even when the workpiece has variation in a height direction, the reference plane of the tone conversion can be re-set every time with respect to each workpiece, and hence it is possible to realize an accurate inspection regardless of the variations in height direction of the workpiece.

Figure 93A:
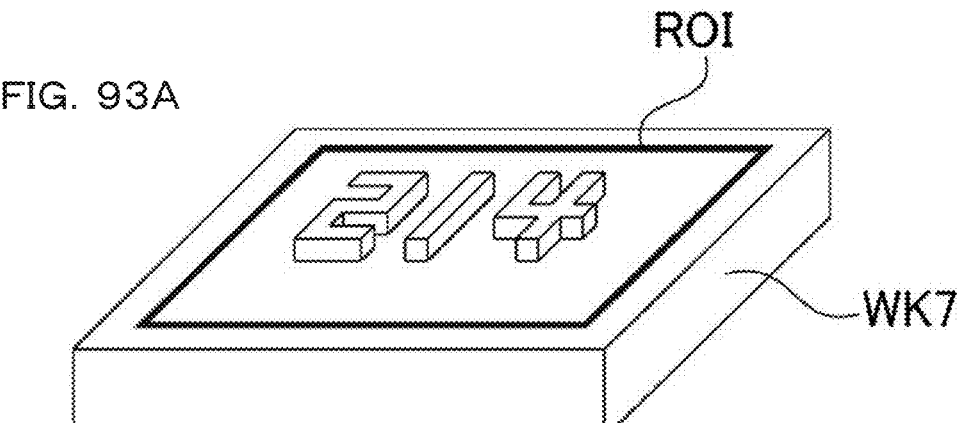
FIG. 93A is a perspective view showing an example of a workpiece for which a method for setting a reference plane by means of an average height reference is effective.
Figure 93B:
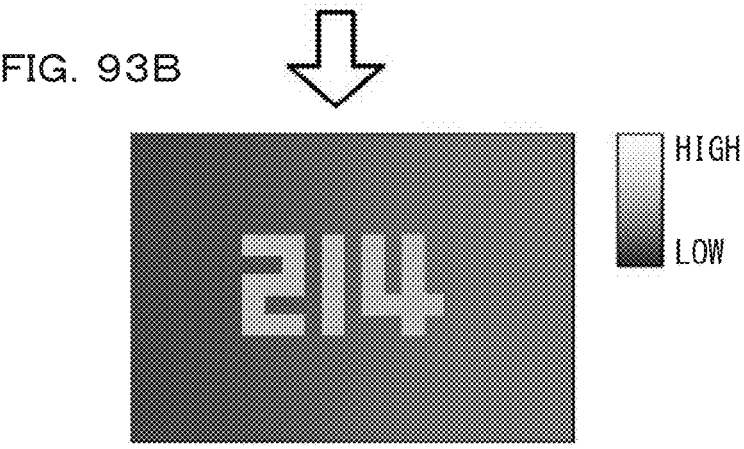
FIG. 93B is an image view of a low-tone distance image obtained by tone-converting a distance image captured in FIG. 93A.
Figure 94:
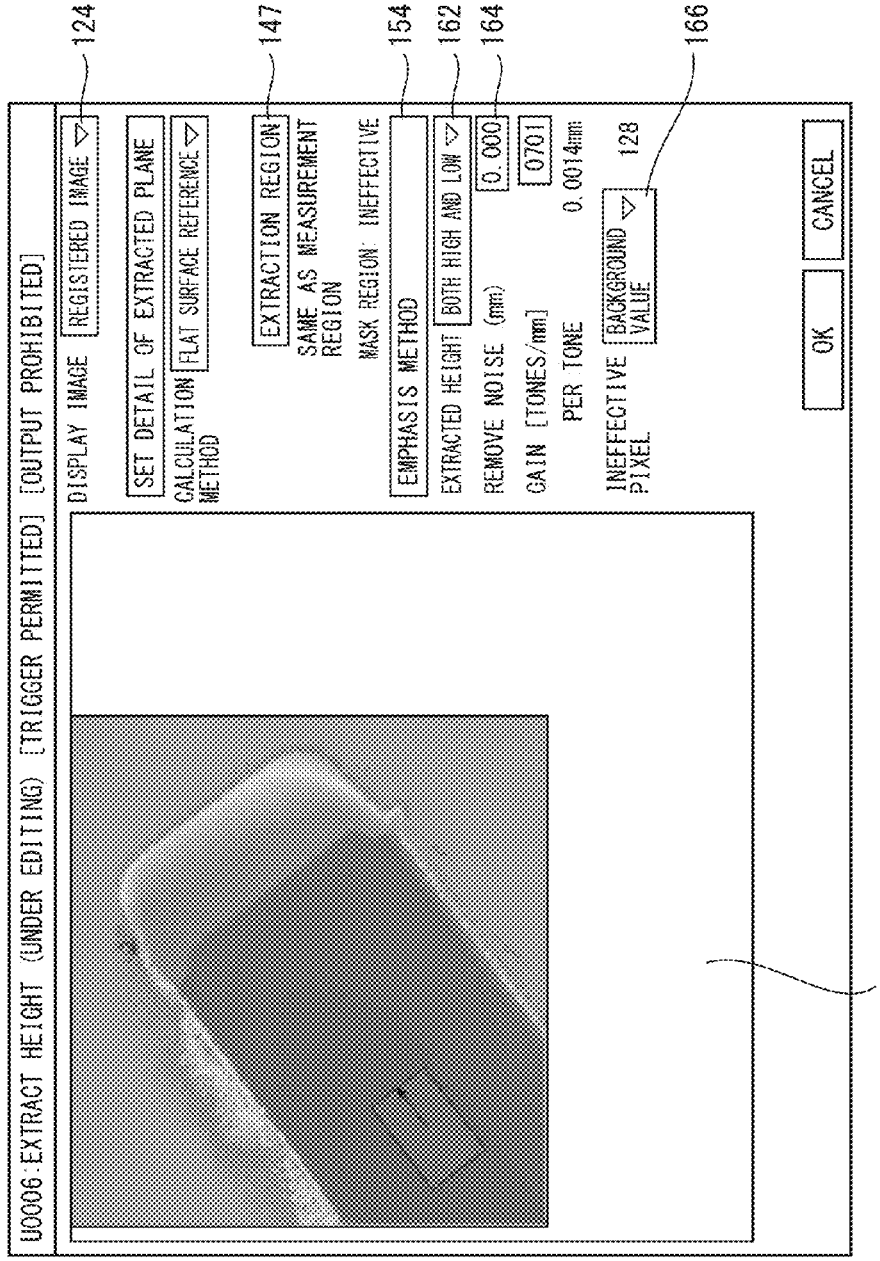
FIG. 94 is an image view showing a flat surface reference detail setting screen.

Here, based on FIGS. 93A and 93B, a description will be given of an example of a workpiece for which the method for specifying the reference plane by means of the average height reference is effective. Similarly to FIG. 79A described above, FIG. 93A shows the workpiece WK7 where the measurement surface does not have a flat inclination, or even when the measurement surface has a slight inclination, it does not affect the inspection processing, and the workpiece WK7 obtained by three-dimensionally forming a number or character string on the surface of a casting is subjected to inspection processing for reading whether the character string is appropriate by means of OCR. In such a use, on the extraction region setting screen shown in FIG. 92 and the like, there is set the measurement region ROI for deciding an average height reference in a rectangular shape on the second image display region 121. Here, as shown in FIG. 93A, the flat surface surrounding the character string on the upper surface of the workpiece WK7 is specified as the measurement region ROI. Herewith, the tone conversion is performed taking as the reference plane a height of the measurement region ROI, and the image is converted to a low-tone distance image shown in FIG. 93B. Similarly to FIG. 79B, also on this low-tone distance image, taking the flat surface of the workpiece WK7 as a background, a character string portion protruding from it is clearly extracted, thereby facilitating execution of accurate OCR. Further, in FIG. 79A described above, only one point on the workpiece WK7 is specified and the selected point may thus be influenced by noise, whereas in FIG. 93A, the flat surface is specified and there can thus be obtained an advantage of being able to reduce such an influence of noise as above.

(Flat Surface Reference)

In the above, the description has been given of the example of performing the active conversion by means of the average height reference. Next, as another active conversion, a description will be given of the flat surface reference where a flat surface included within a reference plane estimation region previously specified with respect to the input image is estimated and the tone conversion is performed taking this estimated surface as the reference plane. In this method, for example in a case where the surface of the workpiece is inclined, or some other case, it is possible to cancel an inclination component and then perform the tone conversion, so as to obtain an advantage of being applicable in a similar manner to the three-point specification of the static conversion described above. In the following, a specific setting method for the flat surface reference will be described. Similarly to the foregoing average height reference, also in the flat surface reference, the reference plane estimation region for deciding the reference plane is previously set prior to the operation (Step S83 of FIG. 8 described above). Hereinafter, in Step S83 of FIG. 8, one example of a procedure for specifying the reference plane estimation region will be described based on the GUIs of FIGS. 62, 88 and 92 to 95. First, when the "Height extraction" button 116 is selected on the GUI screen of FIG. 62 to go to the height extraction selection screen 140 of FIG. 80 and "Real time extraction" corresponding to the active conversion is selected in the extraction method selecting part 142, the screen is changed to a height active extraction setting screen 190 of FIG. 88. Next, in the "Calculation method" selection field 192, as shown in FIG. 89, when "Flat surface reference" is selected as the reference of the active conversion, the screen shifts to the a flat surface reference setting screen of FIG. 92.

Similarly to the height extracting part on the height extraction selection screen 140 of FIG. 80 described above, on the flat surface reference setting screen, a separately set inspection target region is used as it is, or an arbitrary reference plane estimation region is specified according to the need. As for specification of the reference plane estimation region, an arbitrary method can be used such as specification of a rectangular shape, four points, a circular shape obtained by specifying its center and radius, or a free curve. Further, only one point on the workpiece can be specified, or in contrast, the whole of the workpiece or the whole of an image displayed on the second image display region 121 can be regarded as the reference plane estimation region.

Figure 95:
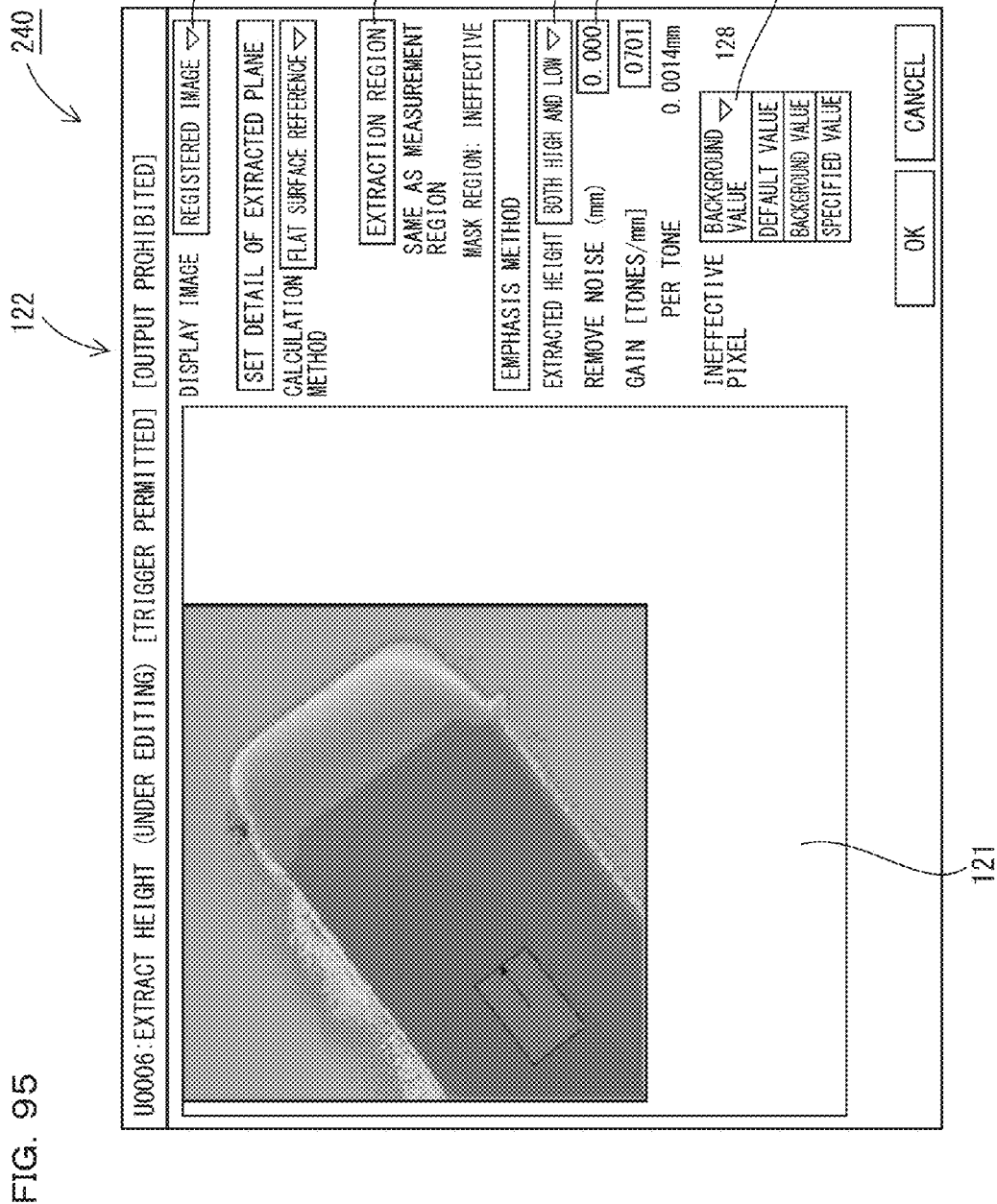
FIG. 95 is an image view showing a detail of an ineffective pixel specification field on the screen of FIG. 94.
Figure 96:
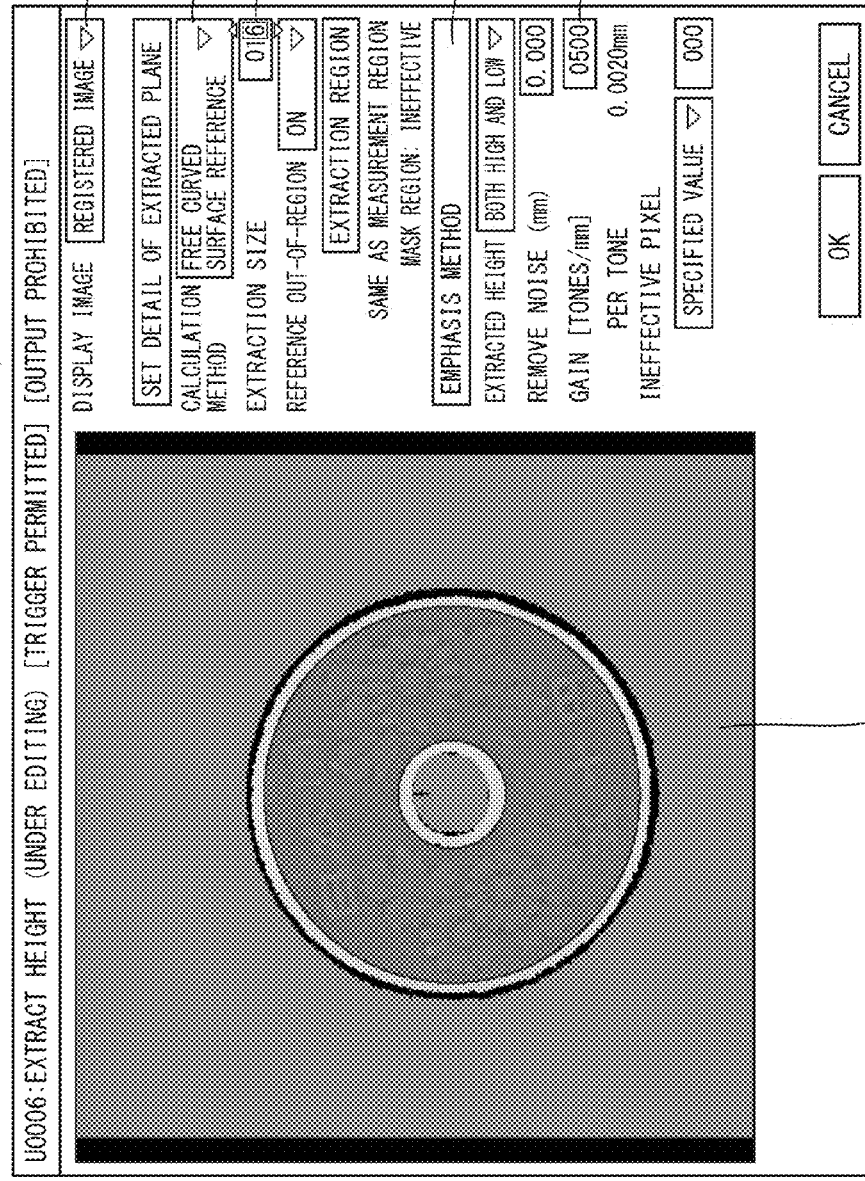
FIG. 96 is an image view showing a free curved surface reference setting screen.

Further, it is similar to FIG. 90 and the like described above that a mask region where the estimated surface is not estimated can be specified in the reference plane estimation region. Moreover, it is also similar to the above that the gain adjustment, extracted height specification, noise removal and the like can also be performed according to the need. For example, when a "Detail setting" button 222 provided in the operation region 122 is pressed on the screen of FIG. 92, the screen is changed to a flat surface reference detail setting screen 240 of FIG. 94. In the emphasis method setting field 154, in addition the gain adjustment field 156, there are displayed the "Extracted height" setting field 162 for specifying an extracted height, the noise removal setting field 164 for removing noise, and the ineffective pixel specification field 166 for specifying an ineffective pixel, and detailed settings for these become possible. Further, as shown in FIG. 95, the ineffective pixel specification field 166 can be filled with a prescribed value specifying an ineffective pixel whose distance could not be found, or further with a pixel value of a background or an arbitrary value specified by the user.

When the reference plane estimation region is prescribed in such a manner, the setting screen is completed. At the time of tone conversion, the flat estimated surface is computed from height information included in this reference plane estimation region. For fitting the height information distributed within the reference plane estimation region, a known method such as the least squares method can be used as appropriate. In addition, it is as described above that pieces of height information of all points included in the reference plane estimation region need not necessarily be used for computing the estimated surface, and the processing can be simplified by appropriately thinning out the points, averaging them, or some other way.

When the estimated surface is decided in such a manner, the tone conversion is performed taking this estimated surface as the reference. For example, the tone conversion is performed such that the estimated surface becomes a central value of a distance range. Further, it is also possible to display information of the computed estimated surface. For example in the example shown in FIG. 92, in an estimated surface display field provided in the operation region 122, an X-directional inclination and a Y-directional inclination of the estimated surface and a Z-directional height of the estimated surface are displayed. In addition, although the number of estimated surfaces is one in this example, the estimated surface may be one formed by combining a plurality of flat surfaces. Further, although the estimated surface is the flat surface in this example, it is also possible to perform the computing with the estimated surface taken as the simple curved surface such as the spherical surface.

Further, examples of the workpiece for which the method for specifying the reference plane by means of the flat surface reference is effective include FIGS. 86A and 87A described above. By setting the flat surface reference with respect to such a workpiece, even when the upper surface of the workpiece has an inclination, the reference plane is detected as an amount of the inclination is corrected, and hence it is possible to realize an accurate inspection of the BGA pattern similarly to the three-point specification described above.

(B3: Free Curved Surface Reference)

Finally, a description will be given of the free curved surface reference where the free curved surface with a high-frequency component removed from a predetermined region (free curved surface target region) of the input image is generated and the tone conversion is performed taking this curved surface as the reference plane. For example, when approximation is difficult by use of the simple flat surface due to the workpiece having the curved surface or the like, it is difficult to accurately extract height information of a region to be inspected. Accordingly, an image simplified by removing a high-frequency component from the input image is generated and the surface shape (free curved surface) of this image is used as the reference plane, thereby allowing an inspection where an overall shape and a gentle change are ignored and only a portion making an abrupt change, namely a fine shape, is left.

Hereinafter, a specific method for setting the free curved surface reference will be described based on the GUIs of FIGS. 62 to 96. Similarly to the foregoing average height reference and the like, also in the free curved surface reference, a necessary condition for deciding the reference plane is previously set prior to the operation (Step S83 of FIG. 8 described above). First, when the "Height extraction" button 116 is selected on the GUI screen of FIG. 62 to go to the height extraction selection screen 140 of FIG. 80 and "Real time extraction" corresponding to the active conversion is selected in the extraction method selecting part 142, the screen is changed to a height active extraction setting screen 190 of FIG. 88. Next, in the "Calculation method" selection field 192, as shown in FIG. 89, "Free curved surface reference" is selected as the reference of the active conversion. Herewith, the screen shifts to a free curved surface reference setting screen 250 of FIG. 96.

Also on the free curved surface reference setting screen 250, although an arbitrary region can be specified as the free curved surface target region, the whole of an image displayed on the second image display region 121, or a separately specified inspection target region, is preferably used as it is as the free curved surface target region. A harmonic component is removed from the region specified as the free curved surface target region, to generate the free curved surface. Then, on the free curved surface target region displayed on the second image display region 121, a tone-converted image obtained by performing the tone conversion with the free curved surface taken as the reference plane is superimposed and displayed. Further, it is also similar to FIG. 90 and the like described above that at the time of tone conversion, the gain adjustment, extracted height specification, noise removal and the like can be performed according to the need.

(Extraction Size Adjusting Part)

Figure 97:
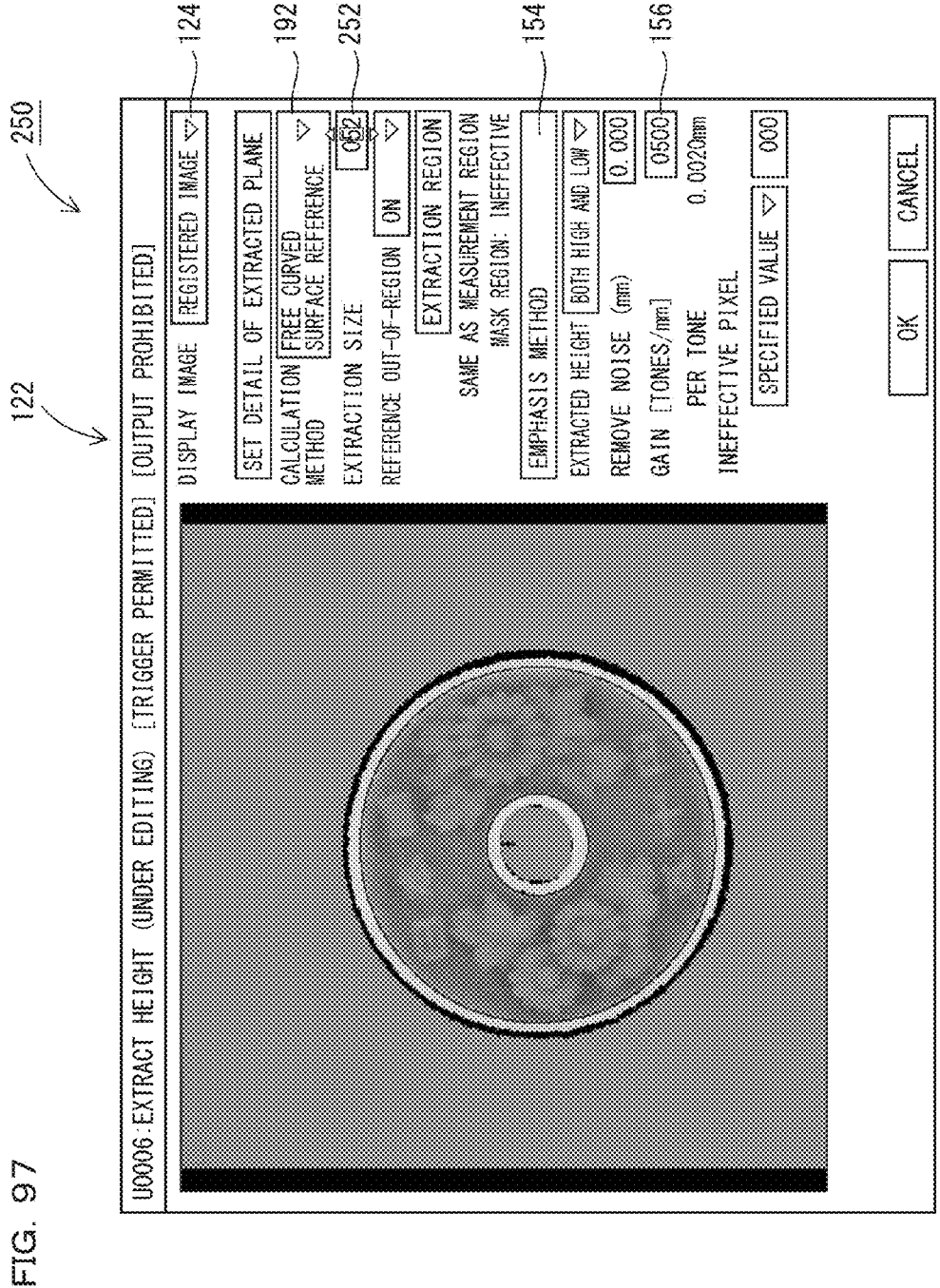
FIG. 97 is an image view showing a state where a numerical value in an "Extracted size" specification field is increased in FIG. 96.

Further, there is also provided an extraction size adjustment function of adjusting fineness (extraction size) of the extracted surface which is extracted by means of the free curved surface reference. Specifically, in FIG. 96, an "Extraction size" specification field 252 is provided as an extracted size adjusting part in a "Detail setting for extracted surface" field in an operation field. When a numerical value of the "Extraction size" specification field 252 is increased/decreased, in accordance with this, a curvature of the free curved surface changes, and an extractable defect size varies. Here, a free curved surface image is generated and displayed on the second image display region 121 such that the unevenness not larger than a predetermined size can be extracted. When the extraction size is made large, the gentle free curved surface is generated, and a defect with a size in accordance with the set extraction size can be extracted. On the other hand, when the extraction size is made small, the free curved surface along the surface shape of the workpiece is generated, and only a small defect in accordance with the set extraction size is extracted. For example, when the extraction size is made large, as shown in FIG. 97, the free curved surface becomes smooth with respect to the surface shape of the workpiece, and the unevenness extracted by means of the smoothed reference plane becomes clear. In contrast, when the numerical value is made small, as shown in FIG. 90, the free curved surface gets close to a detailed shape along the unevenness of the surface shape of the workpiece, and as a result, the unevenness extracted by means of such a complicated reference plane becomes unclear. Further, when the numerical value in the "Extraction size" specification field 252 is increased/decreased, in accordance with this, also on the tone-converted image within the free curved surface target region displayed on the second image display region 121, a state of the free curved surface internally generated as the reference plane changes, and a size of a target extracted and displayed as a difference from the reference plane changes in real time. The user can optimally adjust the numerical value in the "Extraction size" specification field 252 while referring to the second image display region 121.

When the free curved surface target region is prescribed in such a manner, the setting screen is completed. At the time of tone conversion, the free curved surface is computed from height information of an image included in this free curved surface target region. For fitting the height information distributed within the free curved surface target region, there can be used a method for performing image reduction processing, filter processing and image enlargement processing in accordance with the set extraction size, to generate a free curved surface image. Alternatively, as described above, the known method such as the least squares method can be used as appropriate. In addition, it is as described above that pieces of height information of all points included in the free curved surface target region need not necessarily be used for computing the estimated surface, and the processing can be simplified by appropriately thinning out the points, averaging them, or some other way. When the free curved surface is decided in such a manner, the tone conversion is performed taking this free curved surface as the reference. For example, the tone conversion is performed such that the free curved surface becomes a central value of a distance range.

Here, based on FIGS. 98A and 98B, a description will be given of an example of a workpiece for which the method for specifying the reference plane by means of the free curved surface is effective. FIG. 98A shows inspection processing for detecting defects such as a projection and a depression included in the curved surface of the workpiece. Here, from the curved surface, a region including the defects is specified as the measurement region ROI. Then, the free curved surface is found from height information included in the specified measurement region ROI, and the tone conversion is performed taking the obtained free curved surface as the reference plane. FIG. 98B shows the obtained low-tone distance image. As shown in this drawing, with the free curved surface taken as the reference, a portion higher than this surface can be detected as a projection (displayed with a white point in FIG. 98B), and a portion lower than the surface can be detected as a depression (displayed with a black point in FIG. 98B). As thus described, specification of the reference plane by means of the free curved surface can be effectively used with respect to the workpiece in the shape of the curved surface. It is to be noted that a processing load for detecting the free curved surface is higher than those of the foregoing one-point specification and three-point specification.

(Extraction Region Setting Dialog 148)

Figure 99:
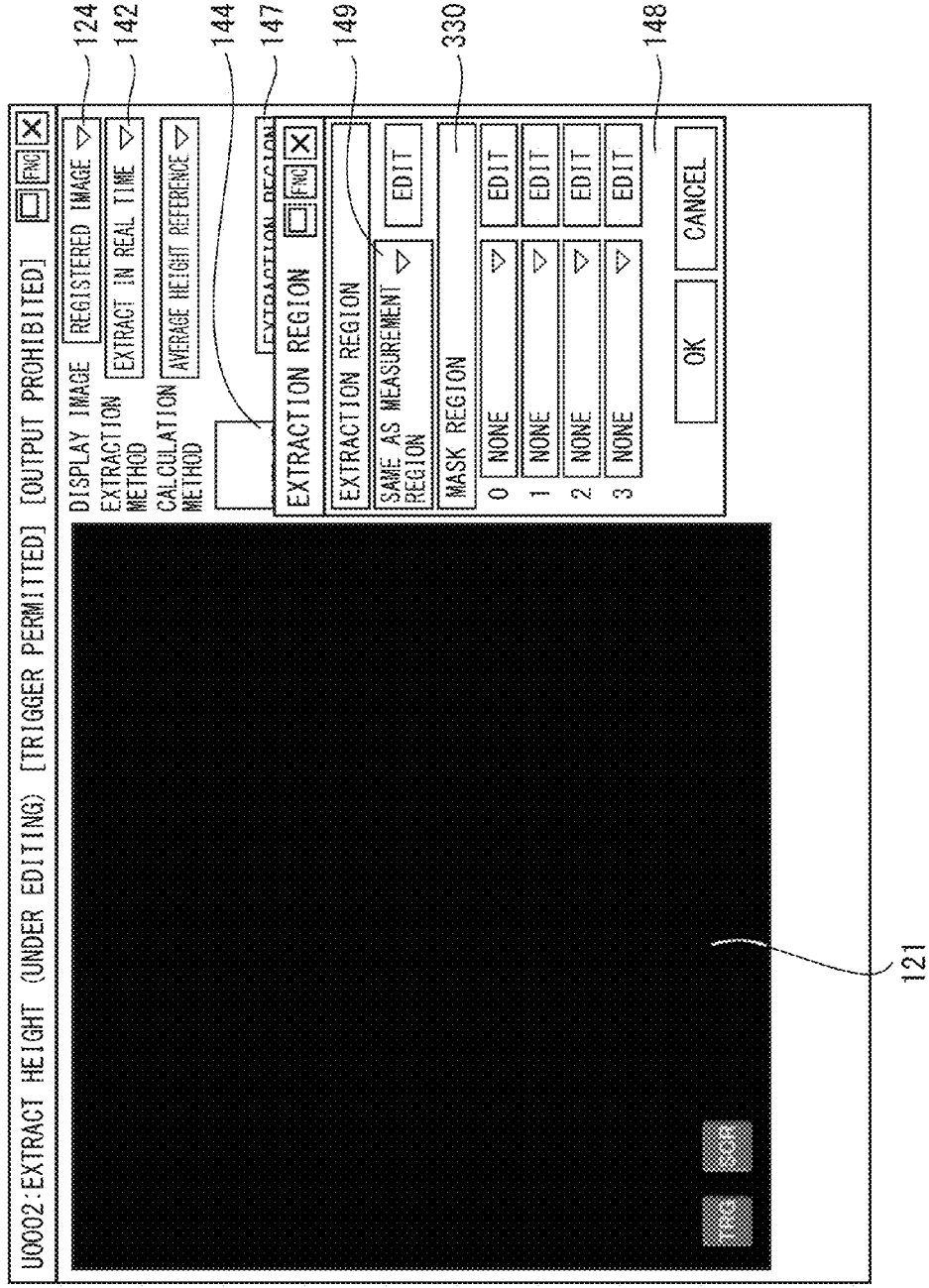
FIG. 99 is an image view showing a state where an extraction region setting dialog is displayed from the state of FIG. 90.
Figure 100:
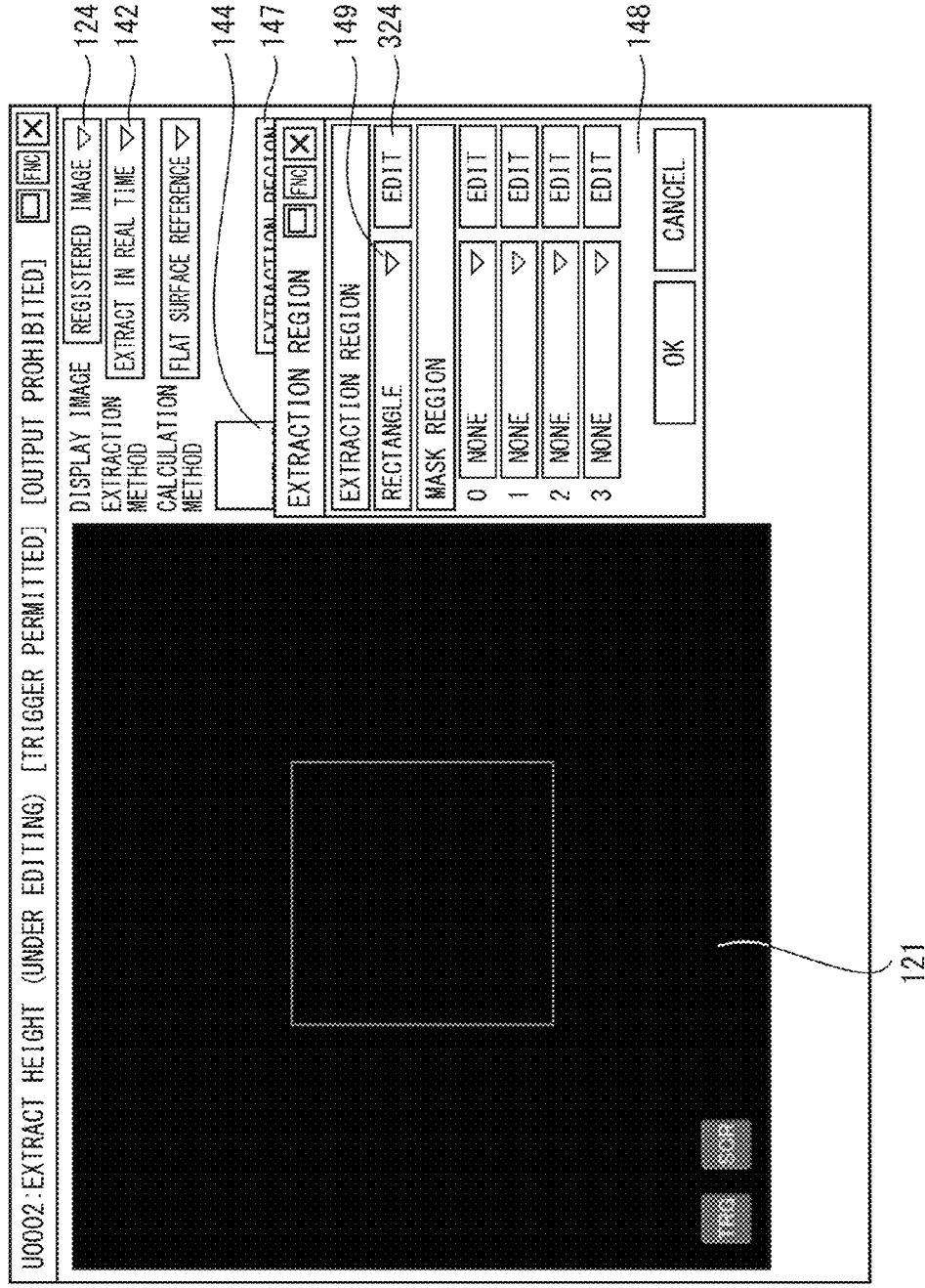
FIG. 100 is an image view showing a state where "Rectangle" is selected in an extraction region selection field of FIG. 99.
Figure 101:
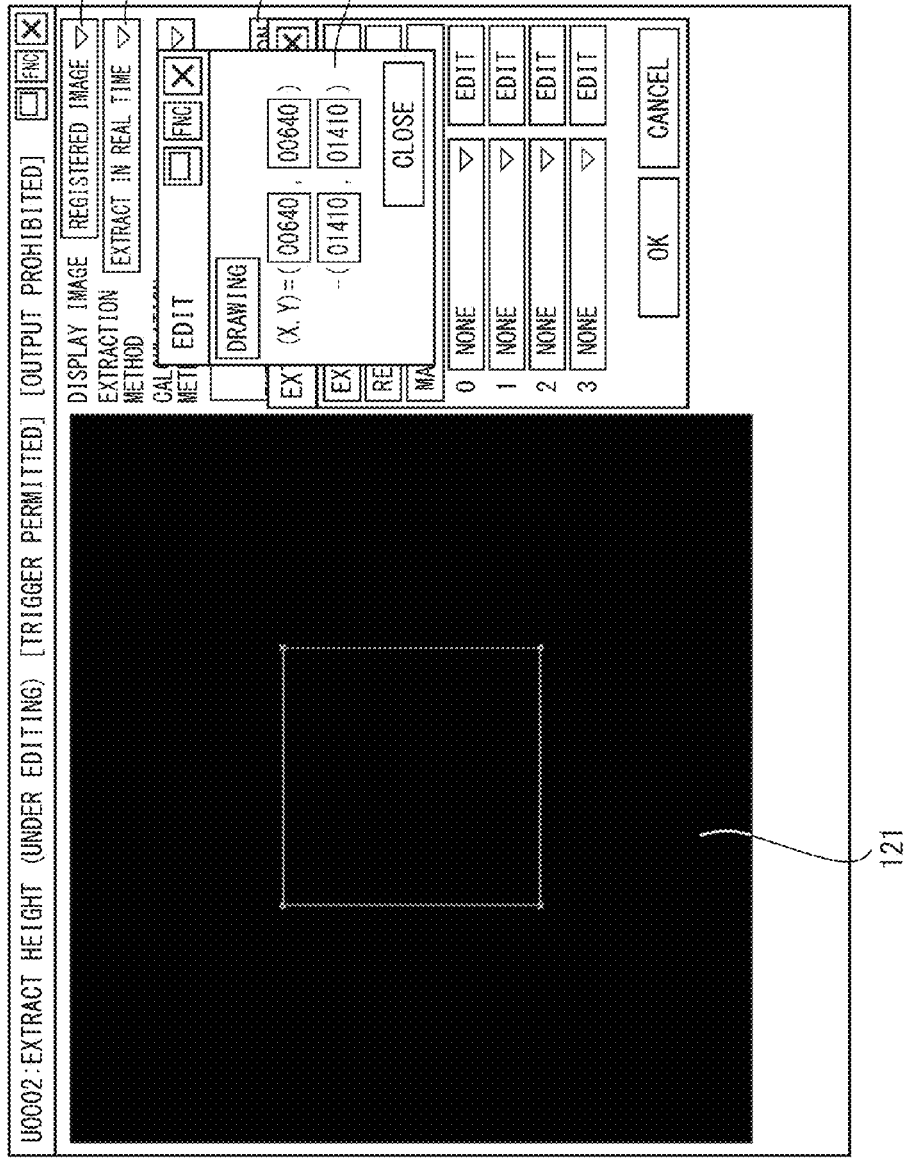
FIG. 101 is an image view showing a state where an extraction region edition dialog is displayed from the state of FIG. 100.

Further, at the time of performing the height extraction, a target region (extraction region) for calculating the reference plane from the input image can be made the same region as the inspection target region (measurement region) for performing the inspection processing, or can be set separately from the measurement region. As one example, in FIG. 90, when an "Extraction region" button 147 is pressed, an extraction region setting dialog 148 capable of setting the extraction region is displayed as shown in FIG. 99. In this extraction region setting dialog 148, an extraction region selection field 149 is provided, and from the extraction region selection field 149, the user can select "Same as measurement region", "Rectangle", "Circle", "Rotational rectangle" or the like. When "Same as measurement region" is selected, the extraction region becomes the same as the measurement region as described above. On the other hand, by selecting one other than "Same as measurement region", a region different from the measurement region can be set as the extraction region. For example, as shown in FIG. 100, when "Rectangle" is selected in the extraction region selection field 149, a rectangular frame is displayed on the second image display region 121, and the user can specify a desired region by dragging it with a mouse, or the like. Further, when an "Edit" button 324 provided on the right of the extraction region selection field 149 of FIG. 100 is pressed, as shown in FIG. 101, an extraction region edition dialog 326 is displayed and the rectangular extraction region can be specified by means of a numerical value by means of XY-coordinates. When the extraction region is adjusted in the extraction region edition dialog 326, the change is reflected on the second image display region 121.

(Mask Region Setting Field 330)

Figure 102:
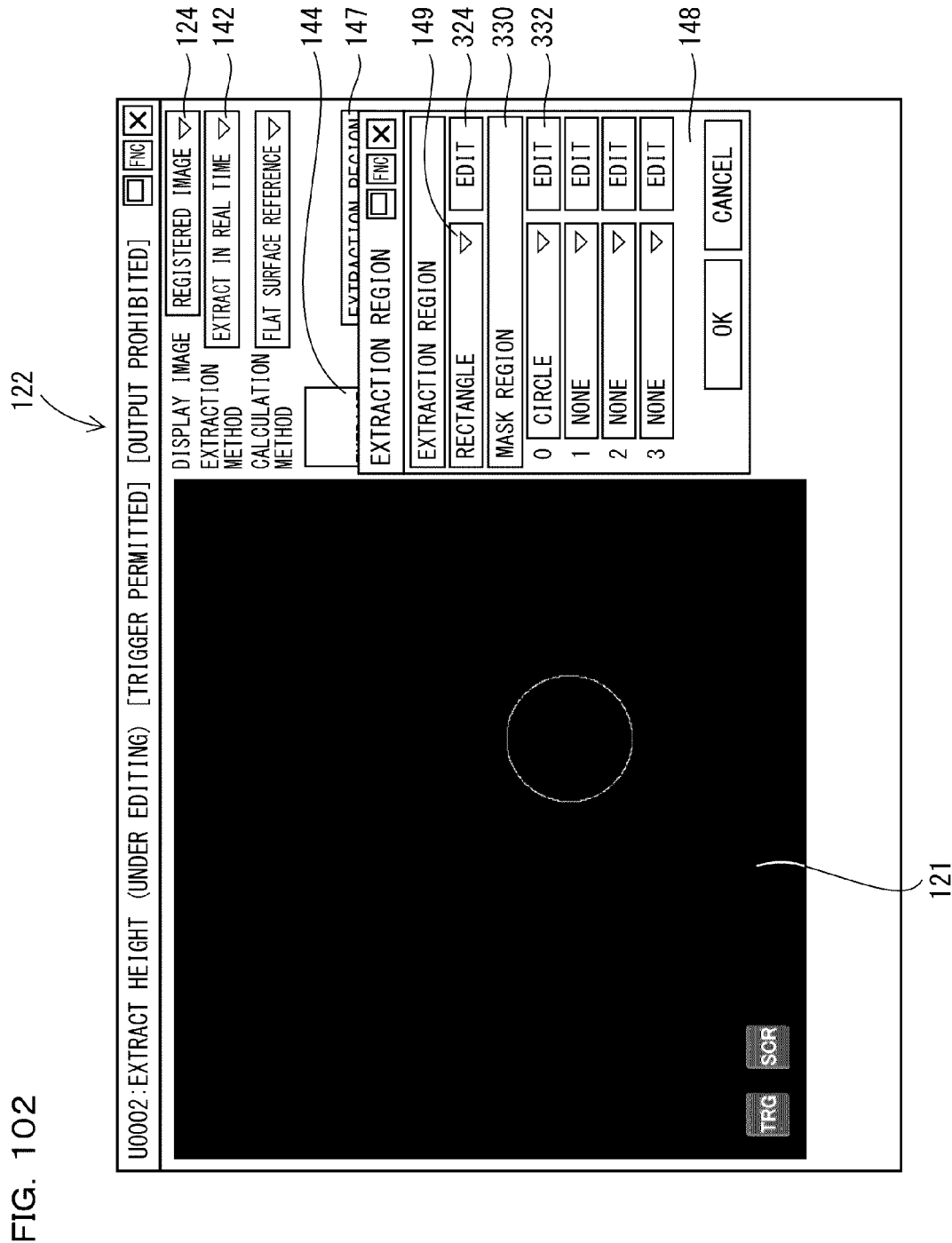
FIG. 102 is an image view showing a state where a "Circle" is selected in a mask region selection field of FIG. 99.
Figure 103:
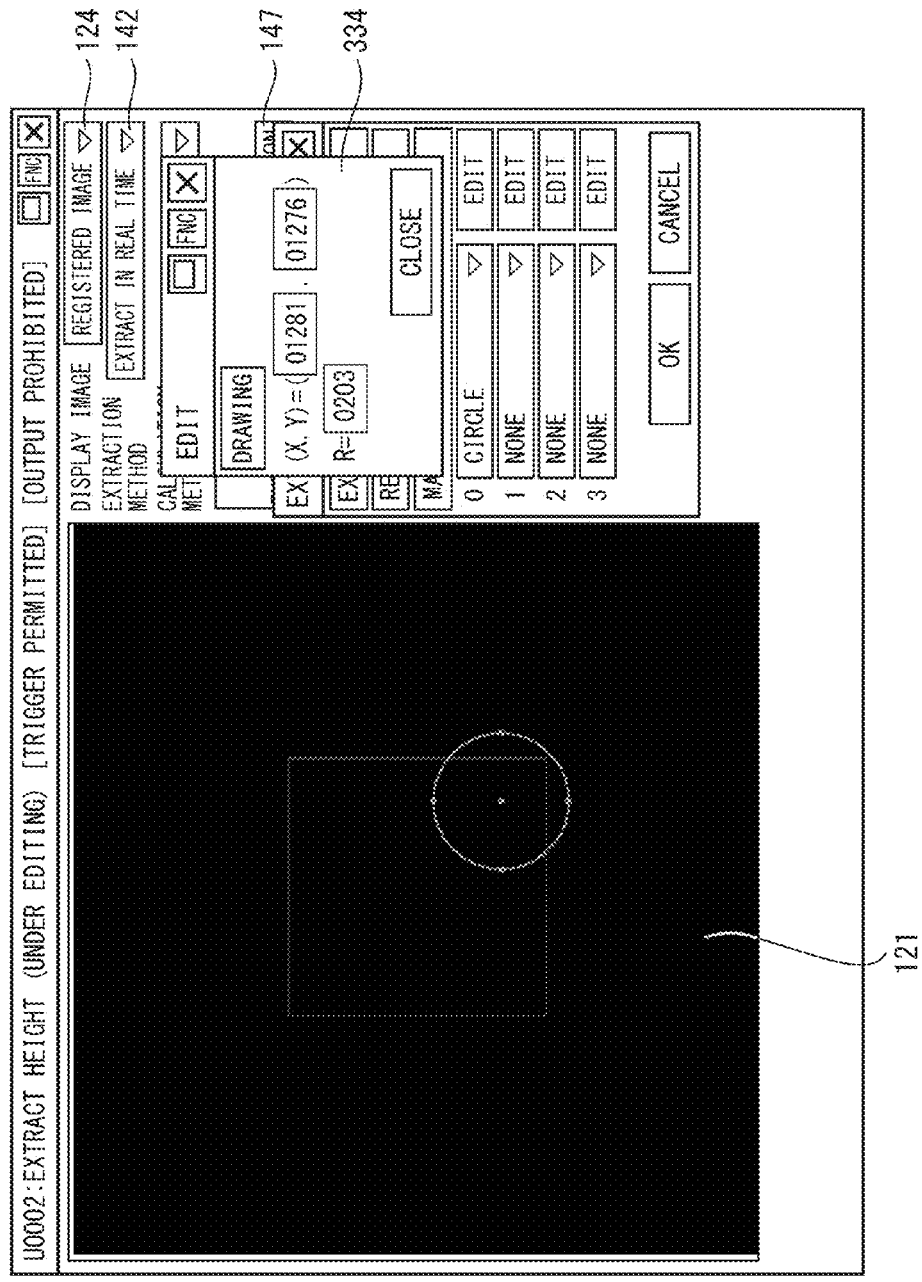
FIG. 103 is an image view showing a state where a mask region edition dialog is displayed from the state of FIG. 102.

Further, a mask region for specifying a region not to be the extraction region can also be set from the extraction region setting dialog 148. In the example of FIG. 99, the mask region setting field 330 is provided under the extraction region selection field 149. In the mask region setting field 330, a plurality of mask regions can be set. Here, 4 mask regions, from 0 to 3, can be specified at the maximum, and each mask region can be independently set. For example, as shown in FIG. 102, when "Circle" is selected as a mask region 0, the circular mask region 0 is displayed on the second image display region 121. Further, when an "Edit" button 332 is pressed from this state, as shown in FIG. 103, a mask region edition dialog 334 for prescribing a detail of the circular mask region 0 is displayed. The user can prescribe the circular mask region 0 by means of Xi-coordinates of the center and a radius. The mask region is displayed with a frame line in a different color from that of the extraction region on the second image display region 121, to facilitate the user visually distinguishing between the extraction region and the mask region. In the example of FIG. 103, the extraction region is displayed in green and the mask region is displayed in yellow. However, needless to say, this example is not restrictive, and the regions can be distinguished by different colors, or distinguished by thicknesses of lines, types (solid line, broken line, etc.) of the lines, highlights (flashing or emphasis), or the like.

As thus described, the extraction region can also be set independently of the measurement region. Further, a setting content of the extraction region can be displayed using character information. For example, in the example of FIG. 90, "Same as measurement region" is displayed with a text under the "Extraction region" button 147, and it indicates that the extraction region for calculating the flat surface reference is the same as the measurement region. Still thereunder, "Mask region: ineffective" is displayed, indicating that the mask region is not set in the extraction region. This allows the user to also confirm an outline of "Extraction region" as text information.

(Pre-Processing)

Figure 104:
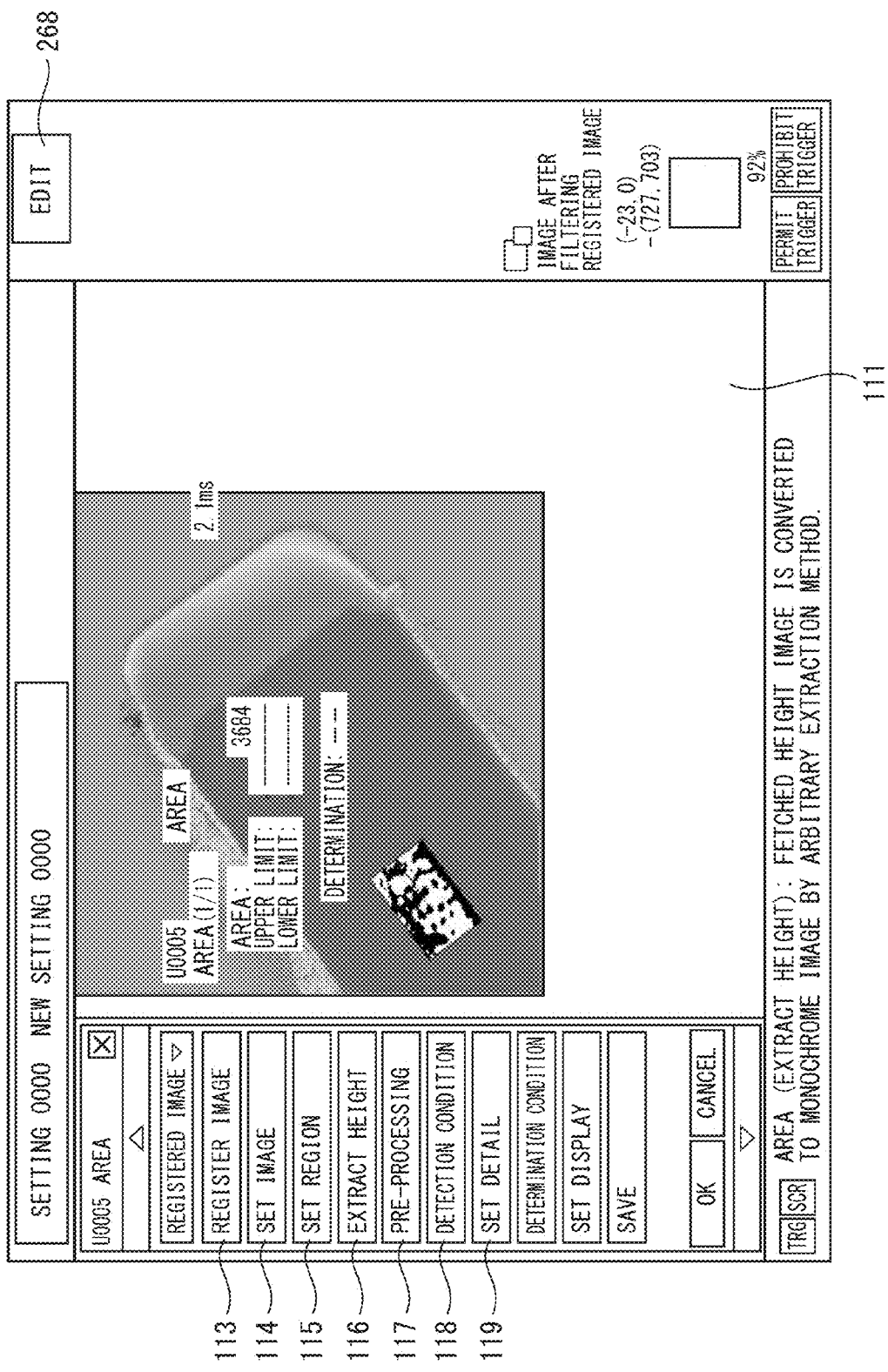
FIG. 104 is an image view showing a state where height extraction is set in the "Area" processing unit.
Figure 105:
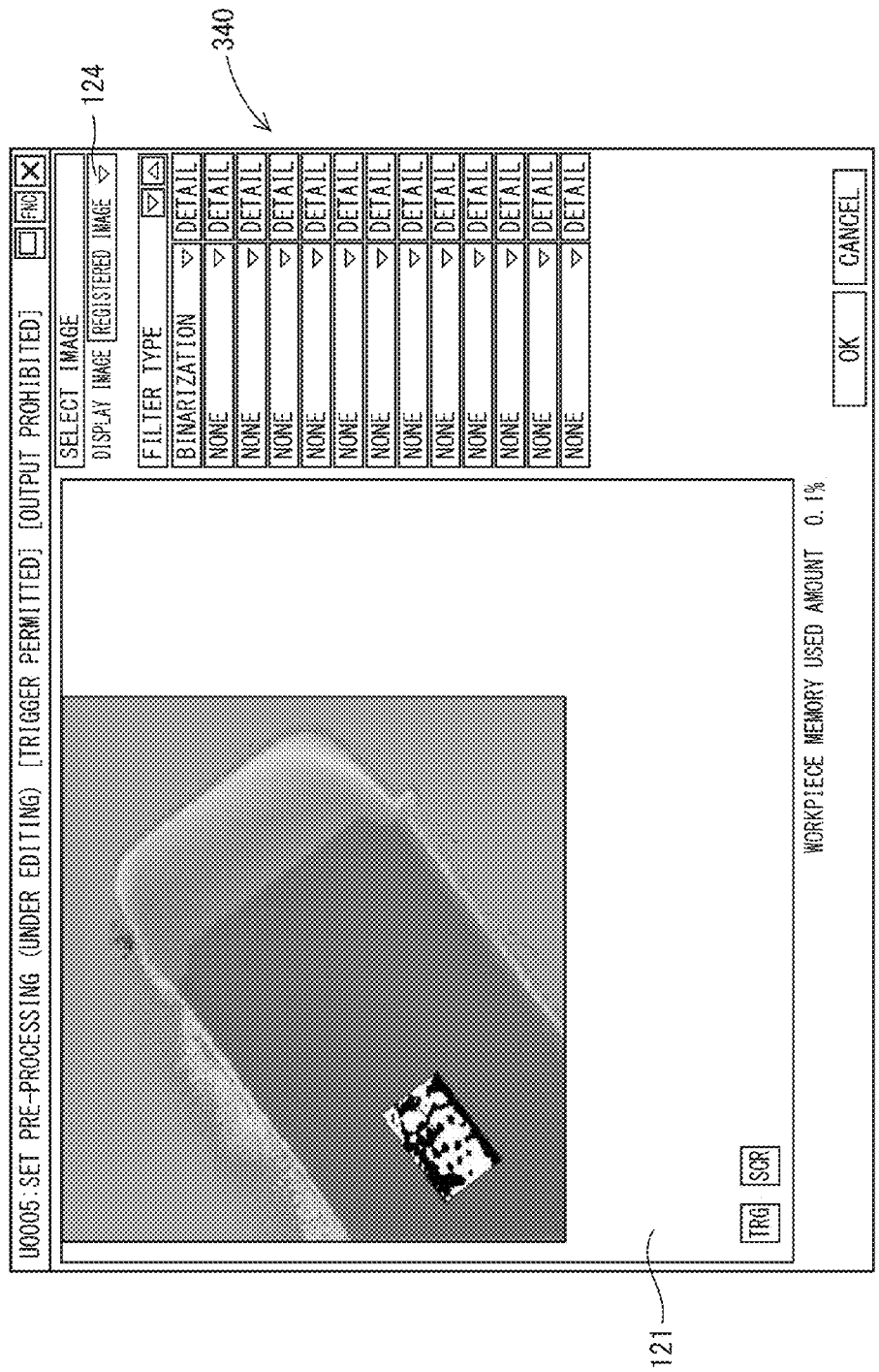
FIG. 105 is an image view showing a filter processing setting screen.
Figure 106:
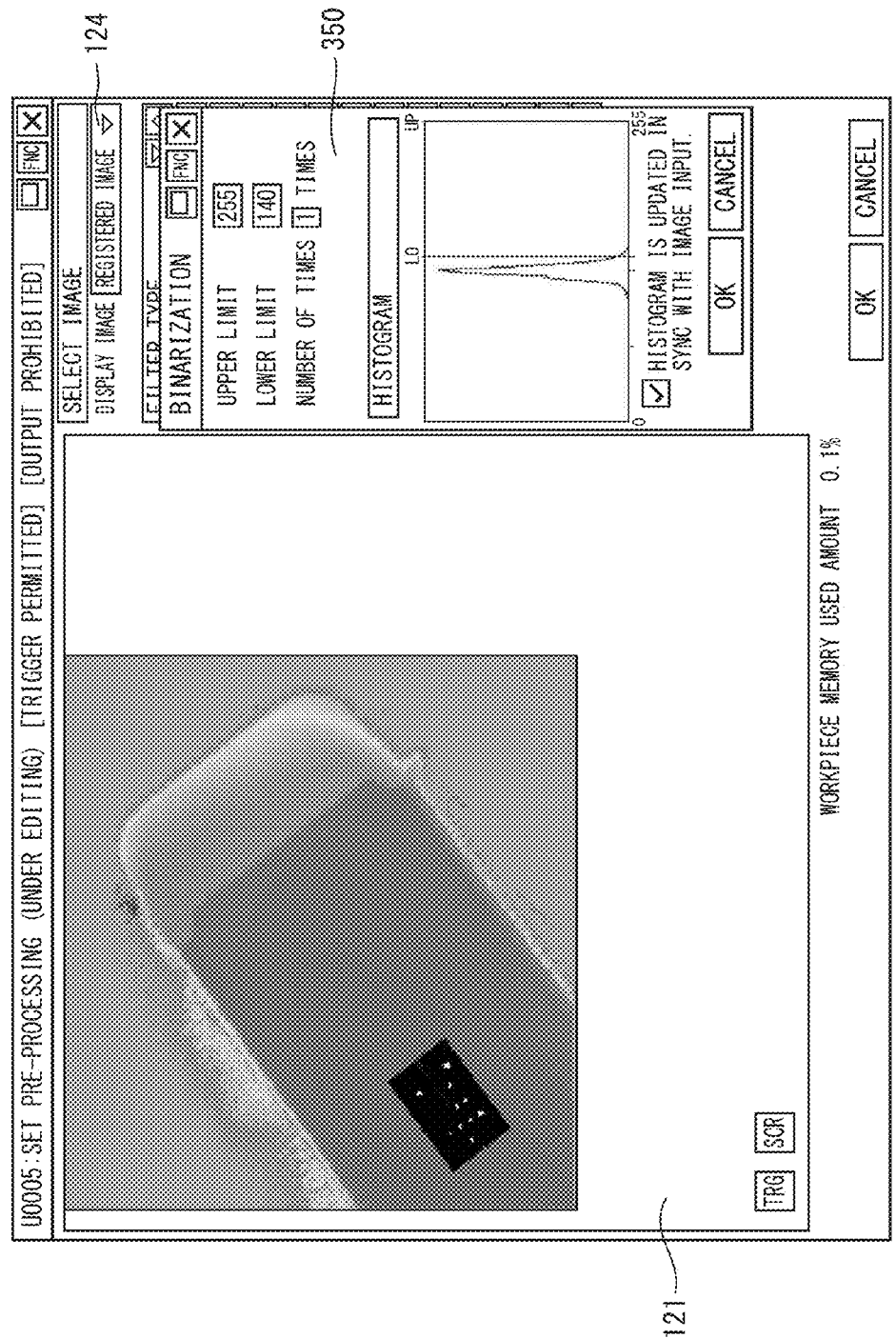
FIG. 106 is an image view showing a binarization level setting screen.
Figure 107:
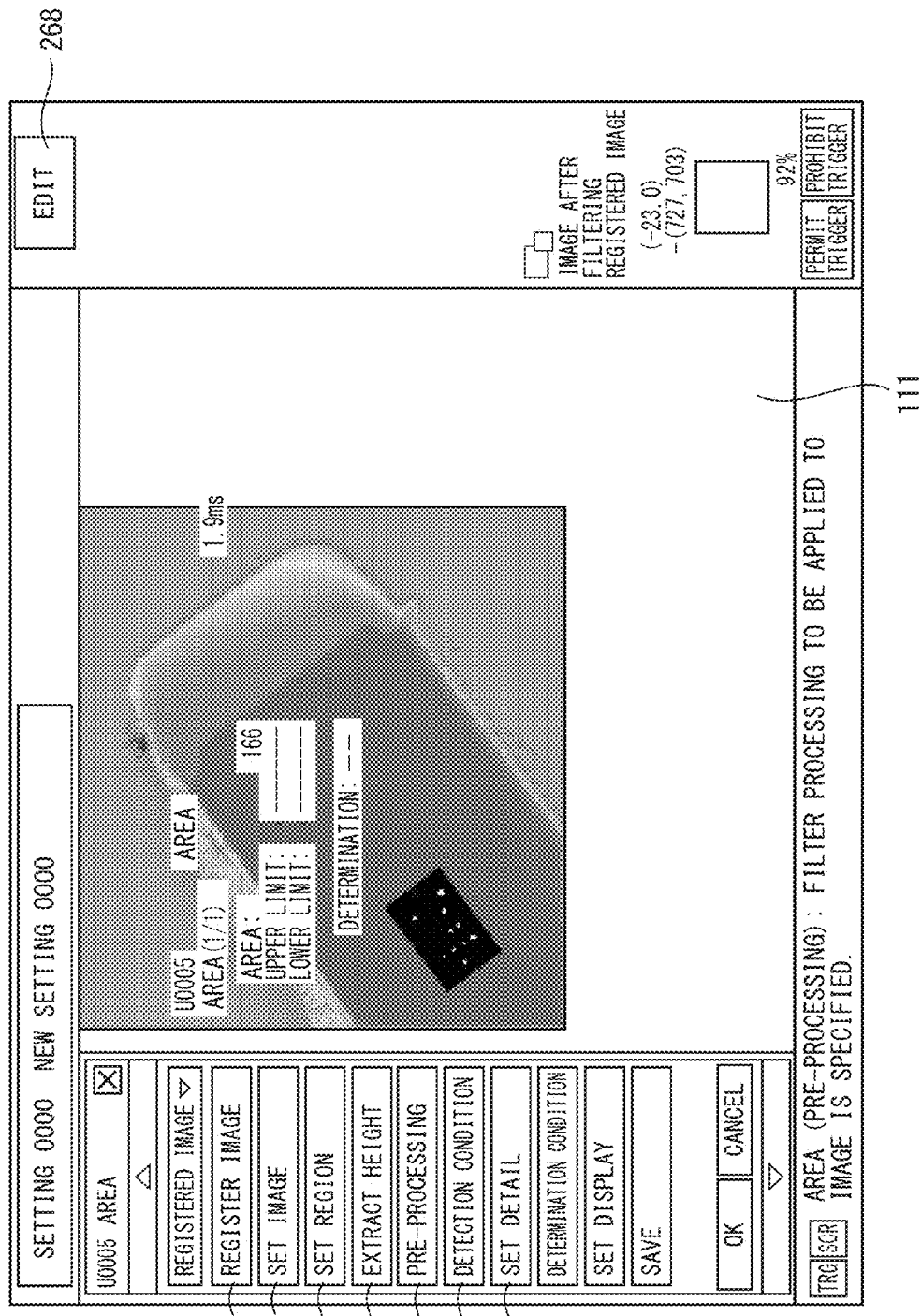
FIG. 107 is an image view showing a state where filter processing is set.

Upon completion of the setting for the height extraction in the "Area" processing unit as described above, as shown in FIG. 104, a low-tone distance image, obtained by performing the tone conversion based on the extracted height, is superimposed and displayed within the rectangular region set in the "Area" processing unit on the third image display region. Next, setting for pre-processing is performed. The pre-processing is common filter processing that is performed before the distance image is generated as described above, and here, a variety of filters can be selected. Specifically, when a "Pre-processing" button provided in the setting item button region 112 is selected from the screen of FIG. 104, the screen is changed to a filter processing setting screen 340 of FIG. 105, and a filter to be applied can be selected. Here, examples of the selectable filter include an averaging filter, a median filter and a Gaussian filter. Further, in addition to such filters, for example, a binarization level can also be set. For example, on a binarization level setting screen 350 of FIG. 106, it is possible to set an upper limit value, a lower limit value and the number of times of binarization. Further, there may also be given a function of displaying a histogram that indicates a distribution of binarized pixels or a function of updating the histogram in synchronization with the input image. When the setting for the filter processing is completed in such a manner, as shown in FIG. 107, a low-tone distance image having been binarized through the filter processing is superimposed and displayed within the set region on the third image display region.

(Determination Setting)

Figure 108:
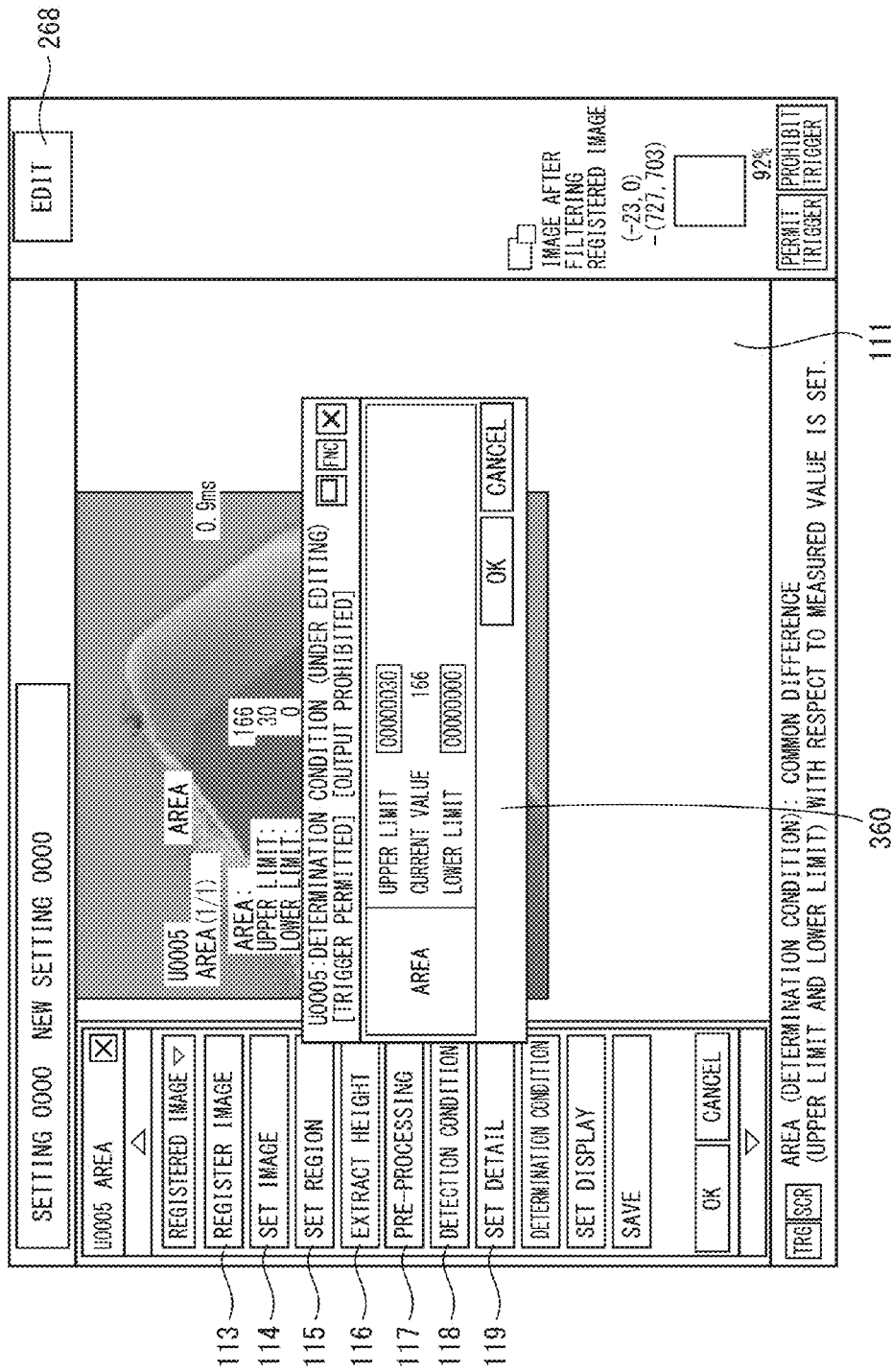
FIG. 108 is an image view showing a determination condition setting screen.
Figure 109:
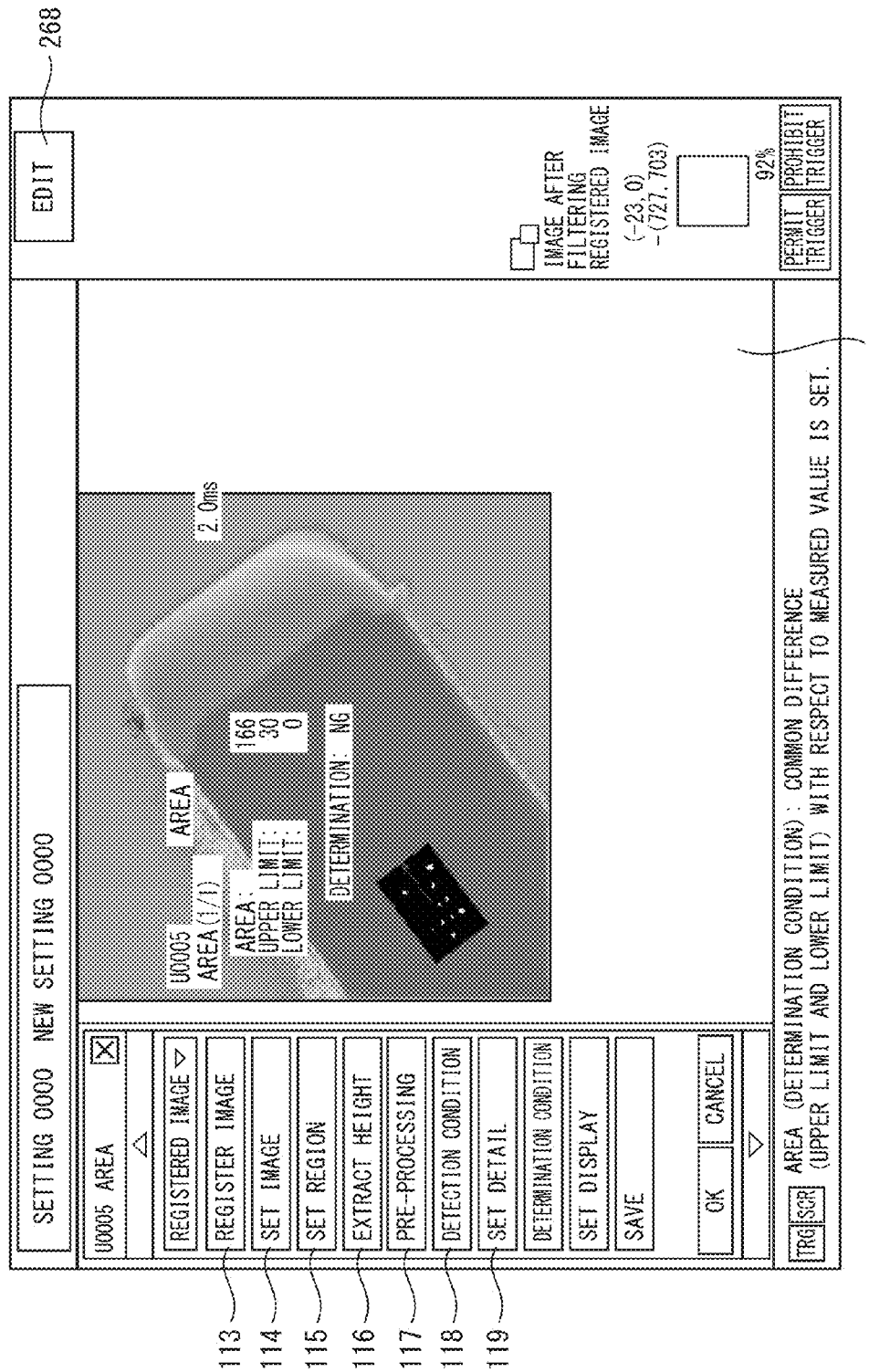
FIG. 109 is an image view showing a state where a determination condition is set.

Further, in the "Area" processing unit, after the input image has been tone-converted to the low-tone distance image in accordance with the conditions such as the set region, the height extraction and the pre-processing, there are also prescribed conditions for performing determinations on the height inspection, the image inspection and the like with respect to this low-tone distance image. For example, from the screen of FIG. 107, when a "Determination condition" button provided in the setting item button region 112 is pressed, the screen is changed to a determination condition setting screen 360 of FIG. 108, and a determination condition is set. In this example, the number of pixels in the binarized low-tone distance image is counted, and the case of the obtained numerical value being within a predetermined range is set to OK, and the case of the numerical value being not therewithin is set to NG. In the example of FIG. 108, since the determination condition is 0 to 30 and the current value is 166, it is determined as NG, and "Determination result: NG" is displayed with red characters on the third image display region, as shown in FIG. 109. As thus described, when the determination result is NG, the characters are made to have a mode of standing out by being made red, or the like, which can thus facilitate the user recognizing the characters at the time of operation.

("Blob" Processing Unit 267)

Figure 110:
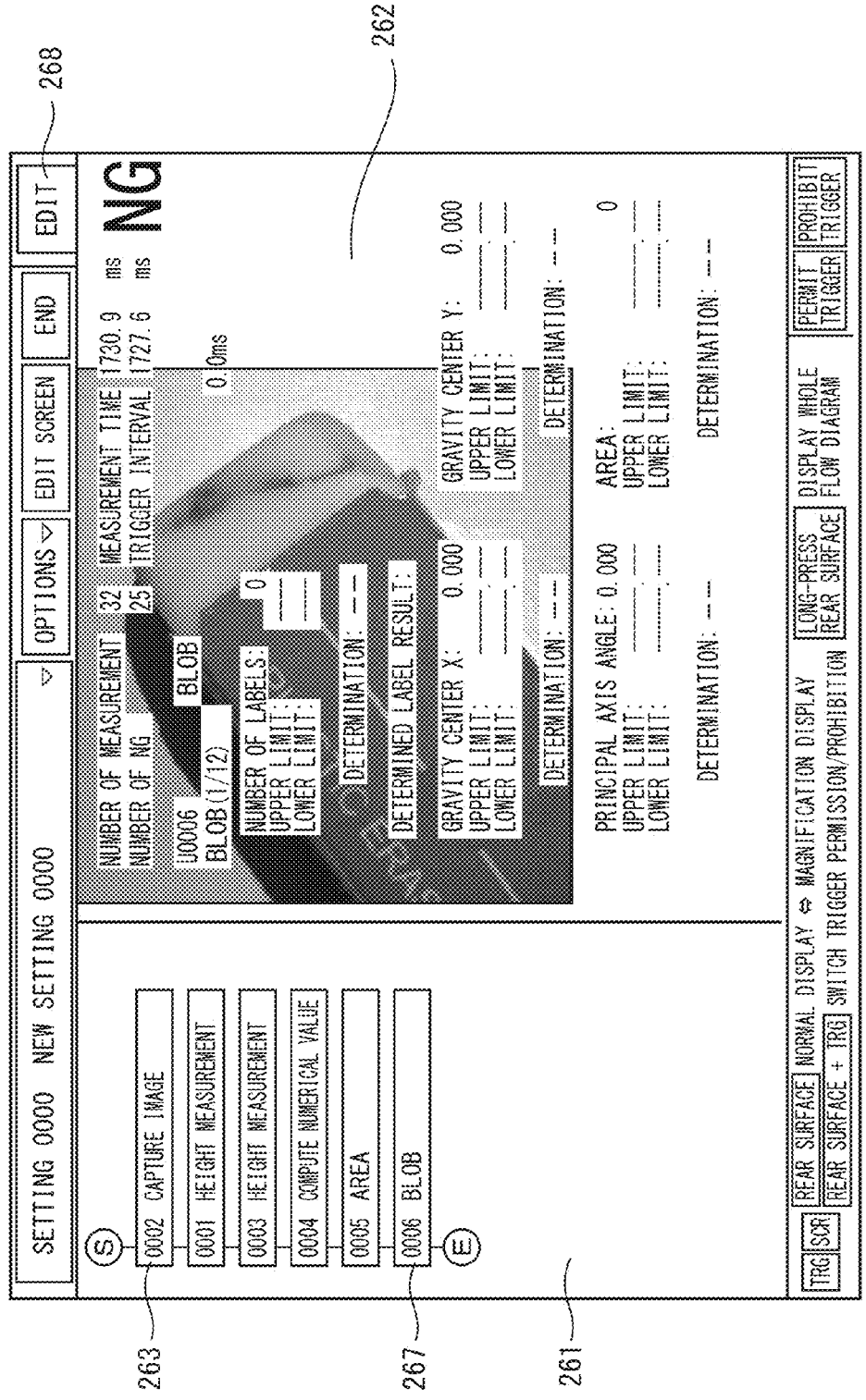
FIG. 110 is an image view showing the initial screen added with a "Blob" processing unit.
Figure 111:
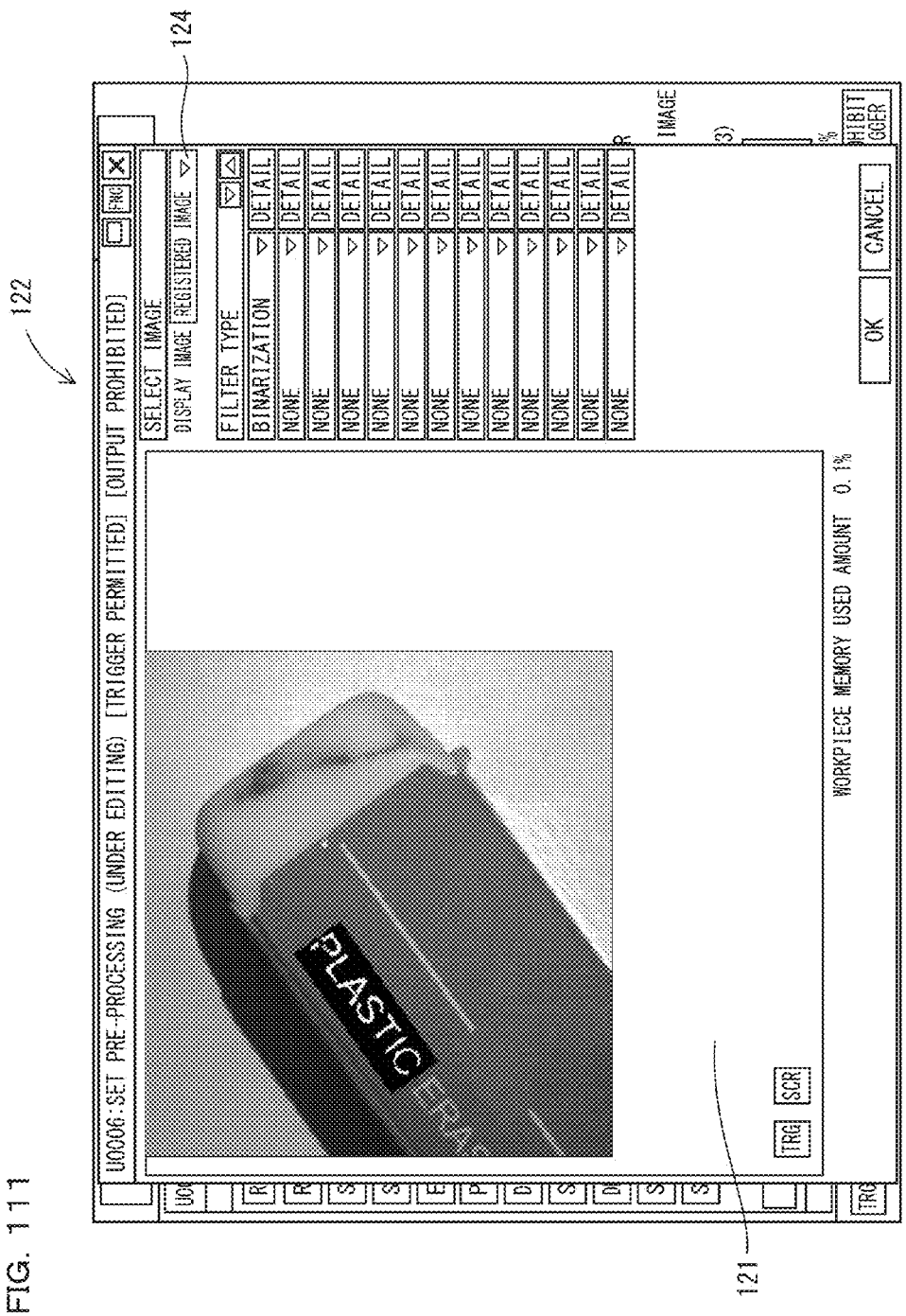
FIG. 111 is an image view showing a situation where filter processing is set in the "Blob" processing unit.
Figure 112:
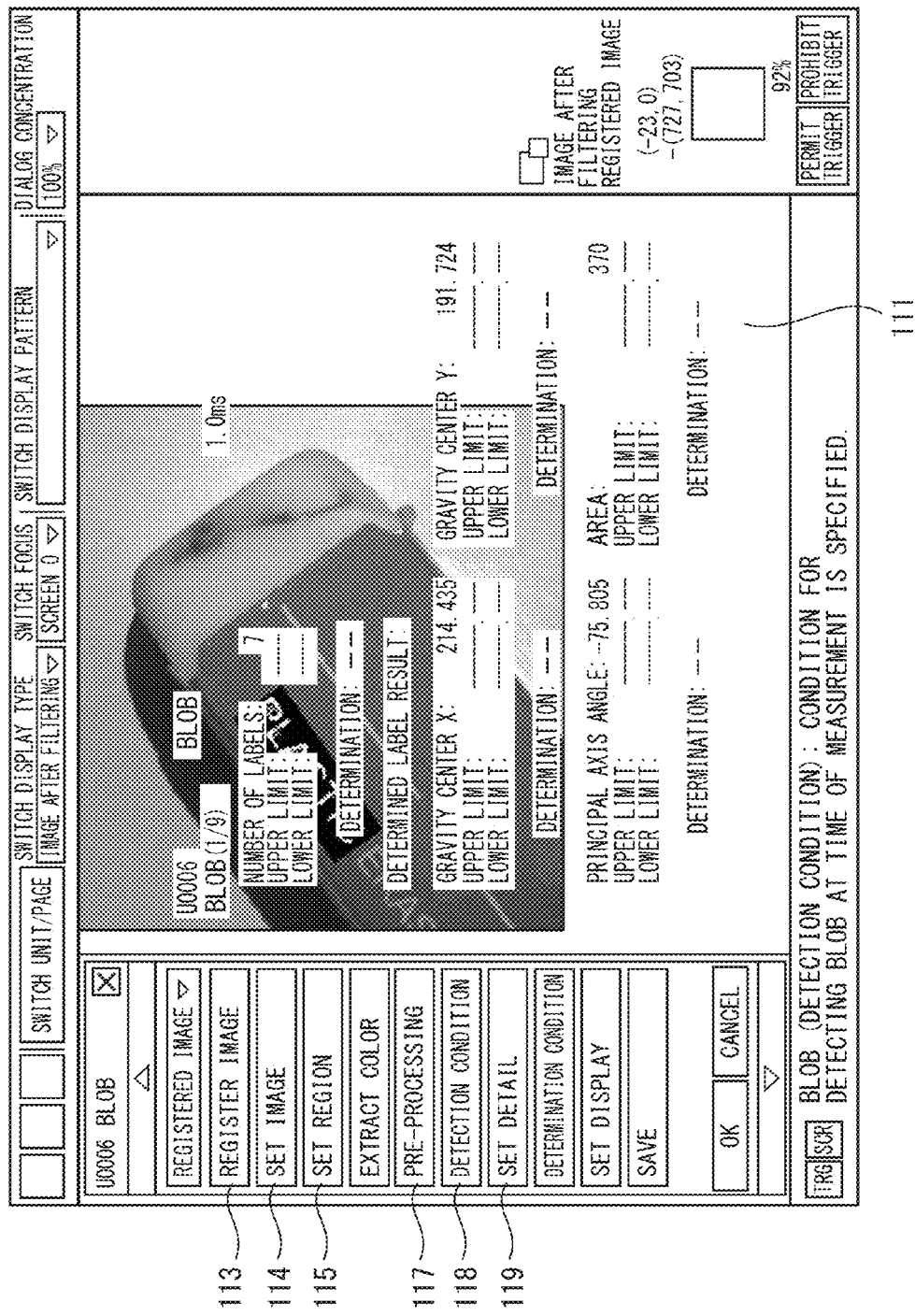
FIG. 112 is an image view showing a situation where a detection condition is set in the "Blob" processing unit.
Figure 113:
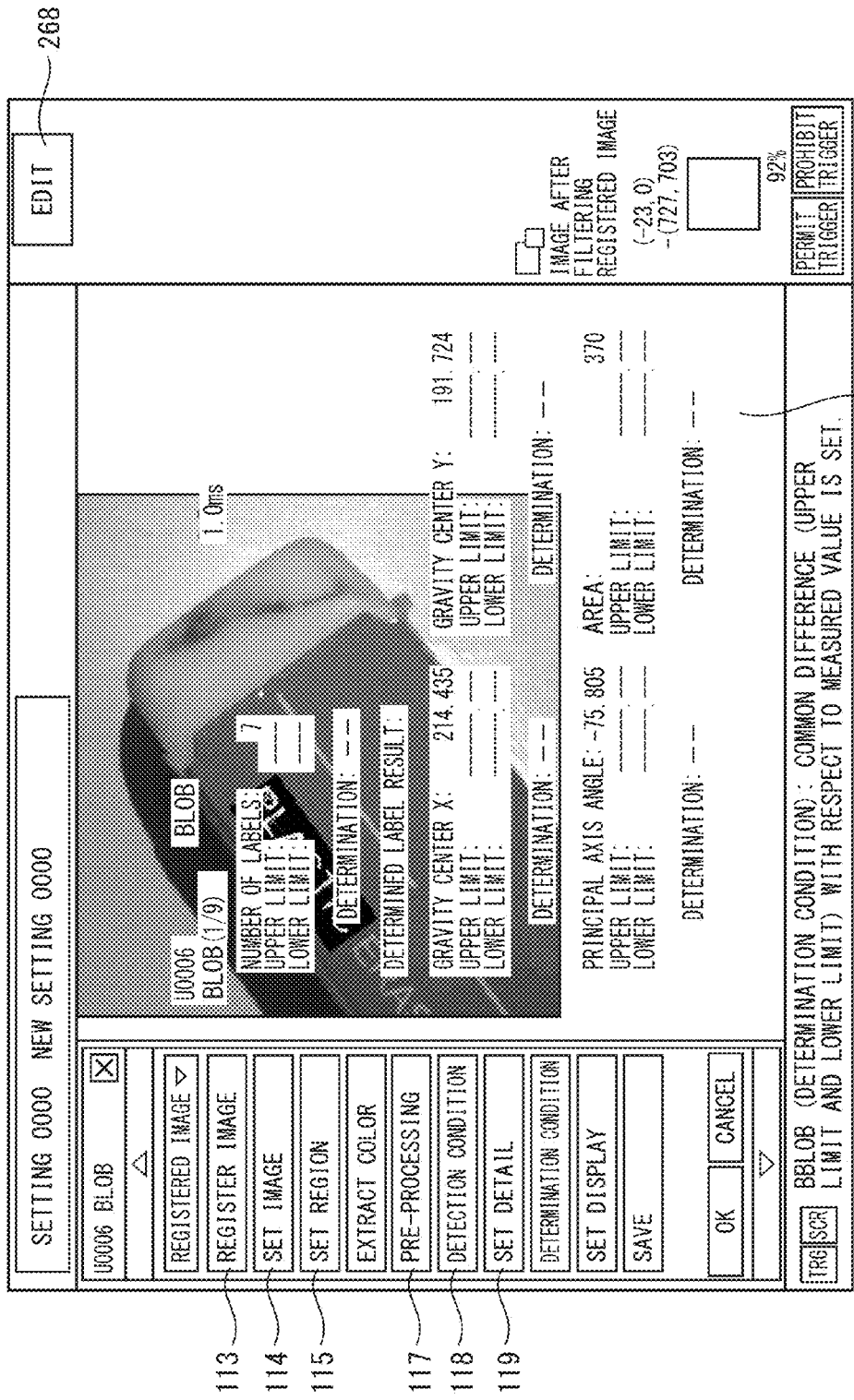
FIG. 113 is an image view showing a situation where a determination condition is set in the "Blob" processing unit.

In the above, the description has been given of the determination based on the height inspection by use of the height information, but the present invention is not restricted to this, and it is also possible to add determination processing based on the conventional image inspection with respect to a brightness image. Such an image inspection is called a blob. For example, as shown in FIG. 110, in the flow display region 261, the "Blob" processing unit 267 for performing a blob (image inspection) is added under the "Area" processing unit. Similarly to the above, also in the "Blob" processing unit 267, it is possible to set a target region to set pre-processing (FIG. 111) and set a detection condition (FIG. 112), so as to set a determination condition and output a determination result (FIG. 113).

("Color Inspection" Processing Unit 267B)

Figure 114:
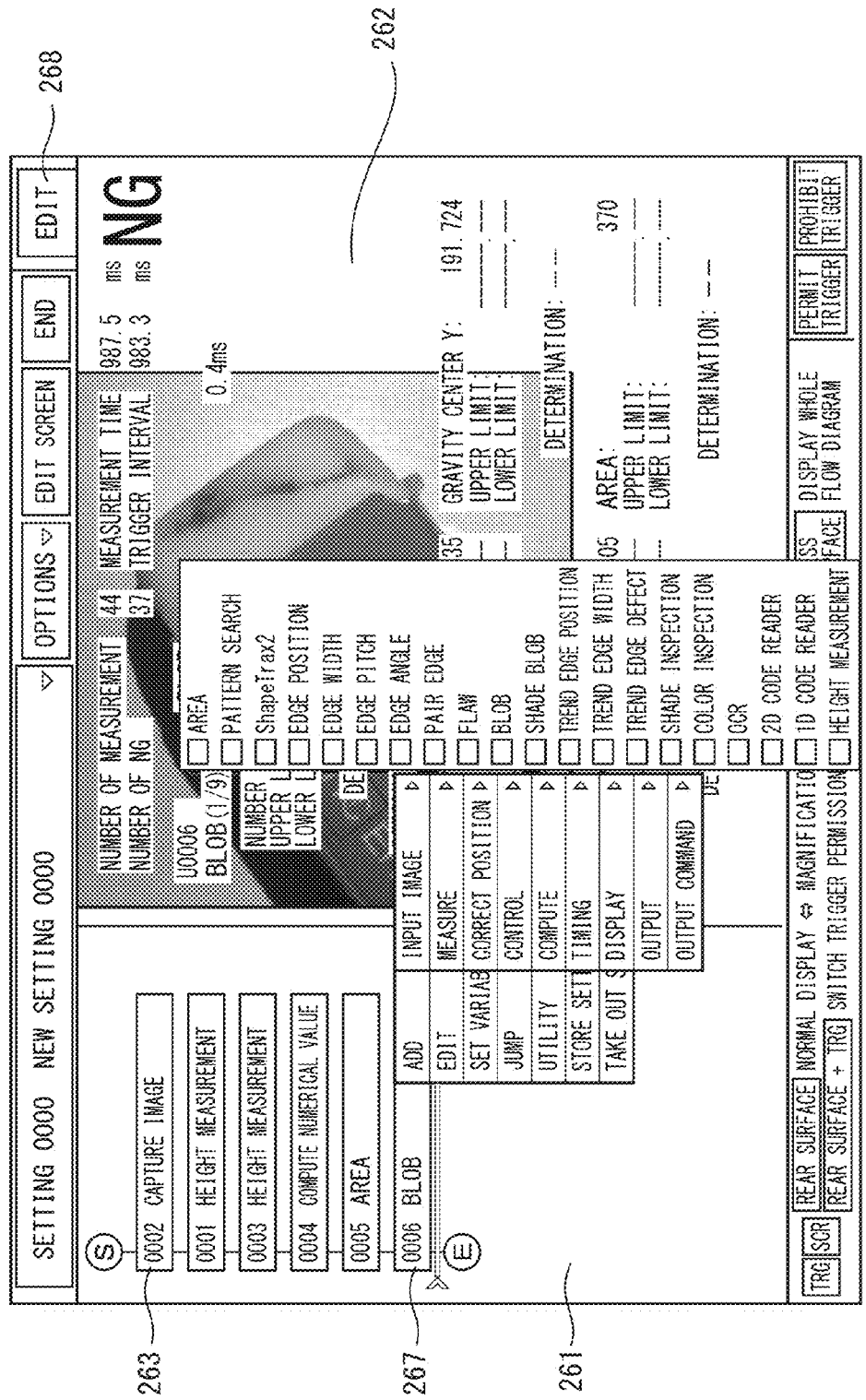
FIG. 114 is an image view showing a state where a "Color inspection" processing unit is to be added to the initial screen.
Figure 115:
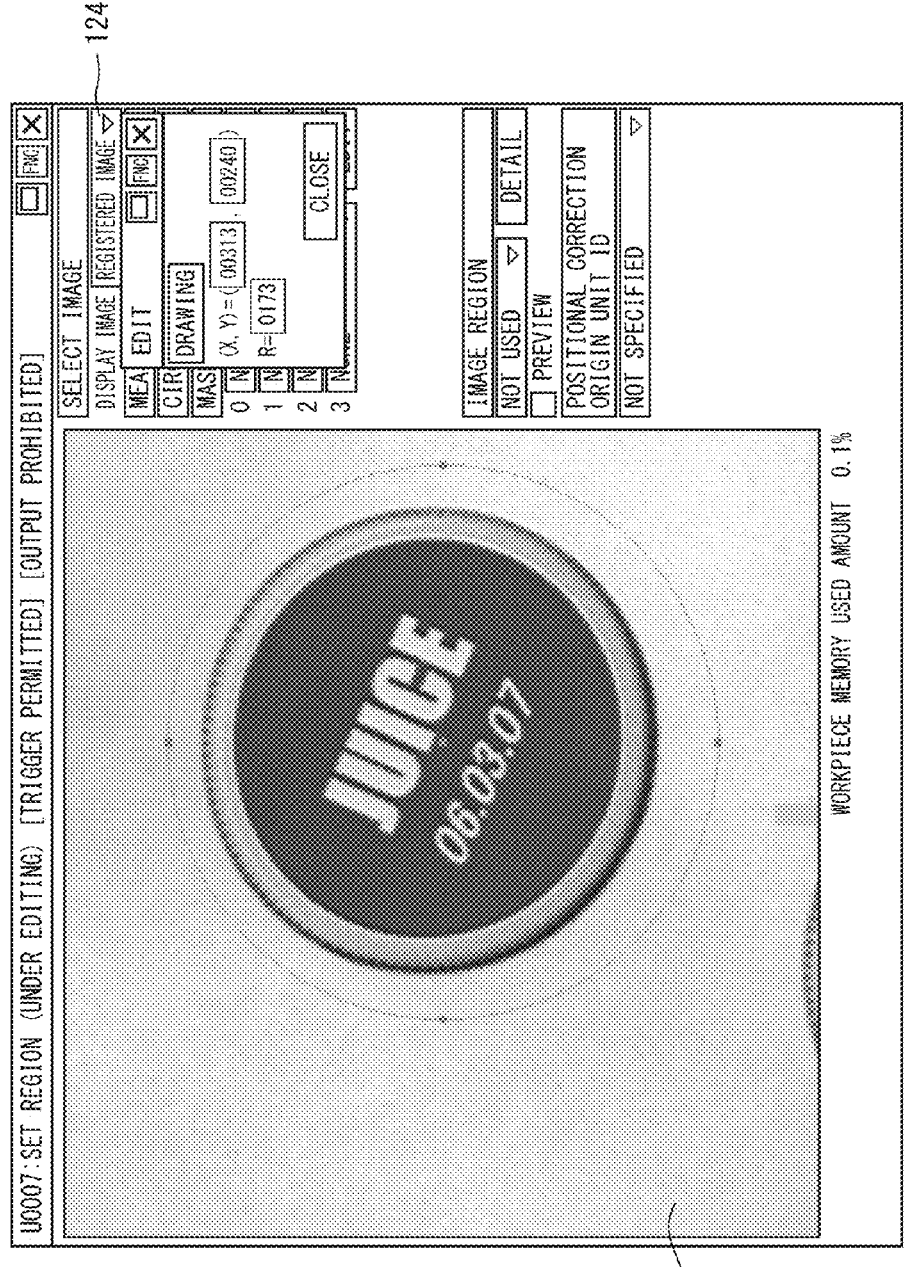
FIG. 115 is an image view showing a situation where a circle region is set to the "Color inspection" processing unit.
Figure 116:
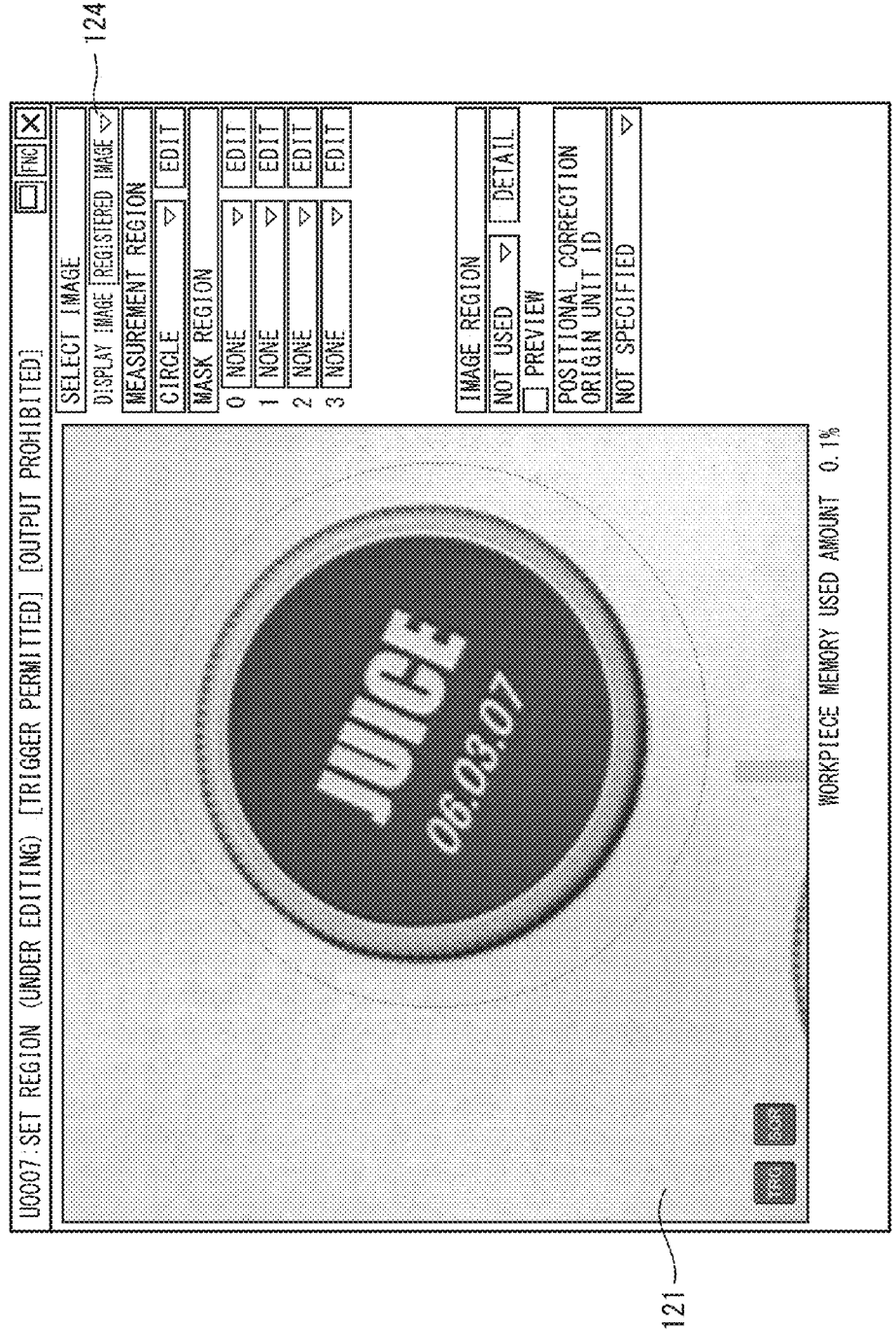
FIG. 116 is an image view showing a state where the circle region is set to the "Color inspection" processing unit.
Figure 117:
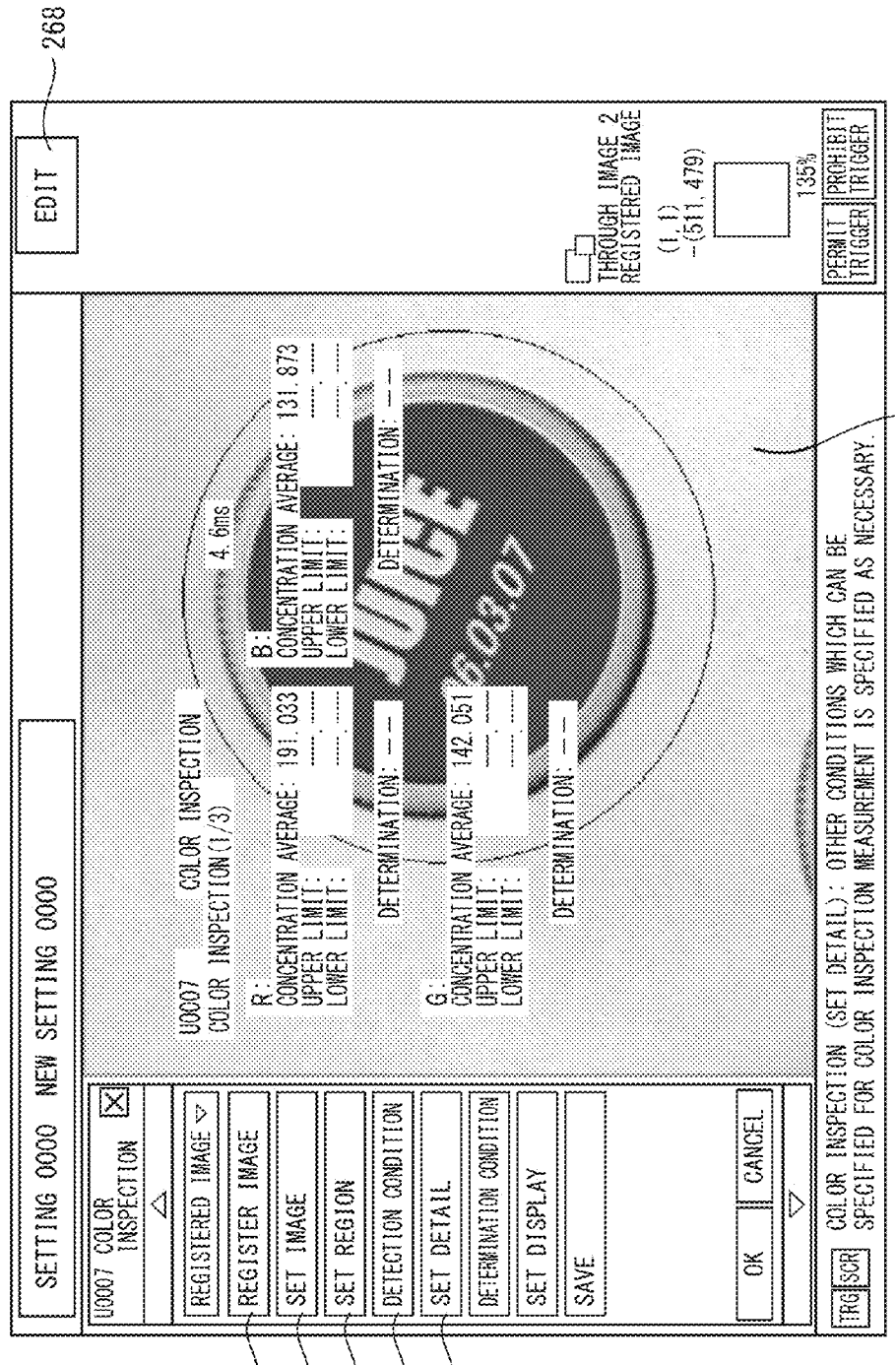
FIG. 117 is an image view showing a state where a concentration average is set to the "Color inspection" processing unit.
Figure 118:
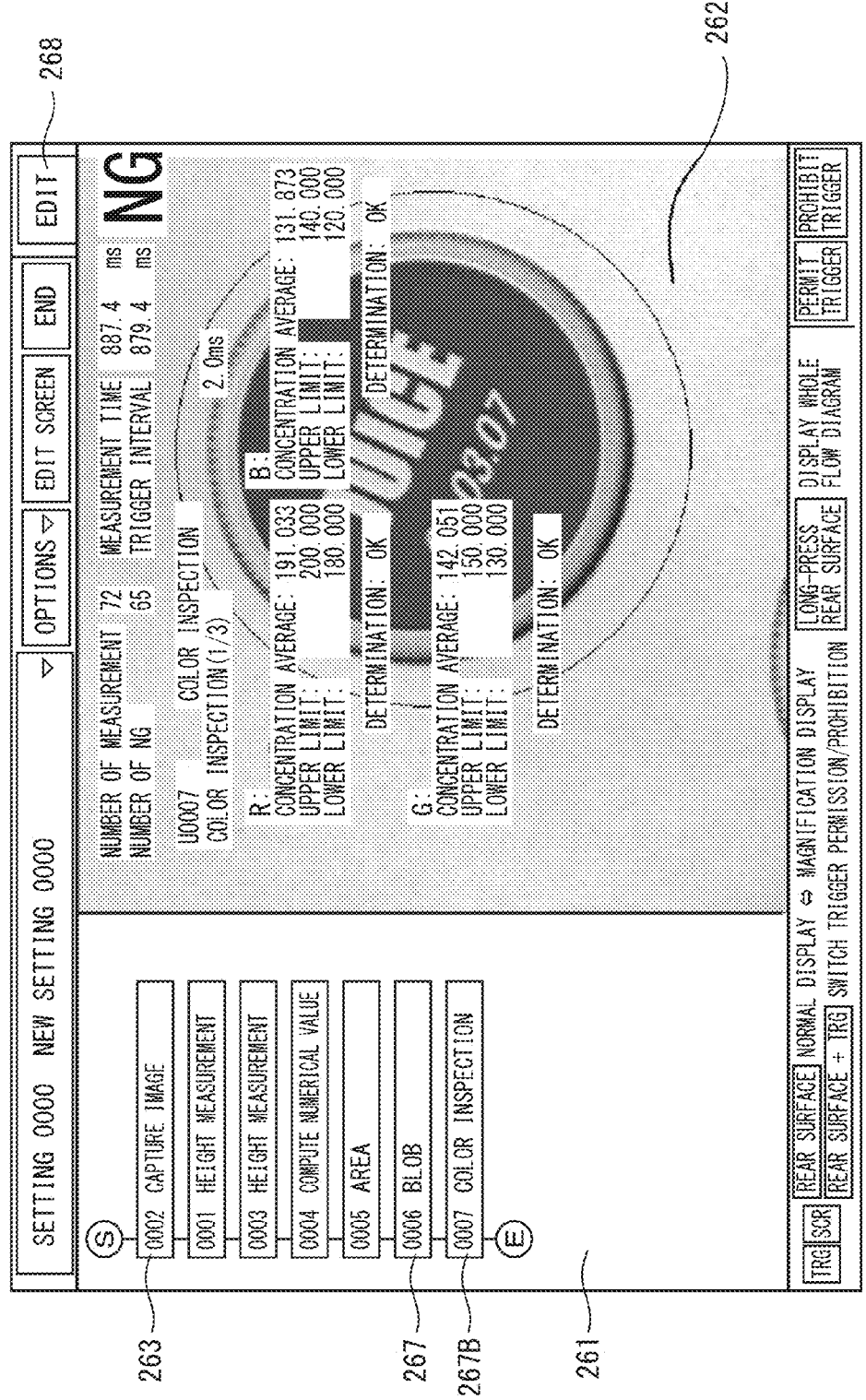
FIG. 118 is an image view showing the initial screen set with the "Color inspection" processing unit.

Moreover, in a case where a color optical image can be inputted such as a case where a color CCD camera is connected as the image capturing part, it is possible to combine color inspections. For example, as shown in FIG. 114, in the flow display region 261, the "Color inspection" processing unit 267B for performing a color inspection as measurement processing is added under the "Blob" processing unit 267. Similarly to the above, also in the "Color inspection" processing unit 267B, it is possible to set a target region (FIGS. 115 and 116) and set a detail such as a concentration average (FIG. 117), so as to set a determination condition and output a determination result (FIG. 118).

As thus described, after a variety of settings are performed in the setting mode, an image of the workpiece is actually captured in the operation mode to acquire an input image, and based on results of the height inspection and the image inspection, determination processing is performed. It is to be noted that in the above example, the configuration has been made where a determination result can be outputted also in the setting mode, thereby to facilitate the user recognizing an image of the determination result on the setting stage. However, it goes without saying that it is also possible to allow the determination result to be outputted only in the operation mode.

(Operation Mode)

Figure 119:
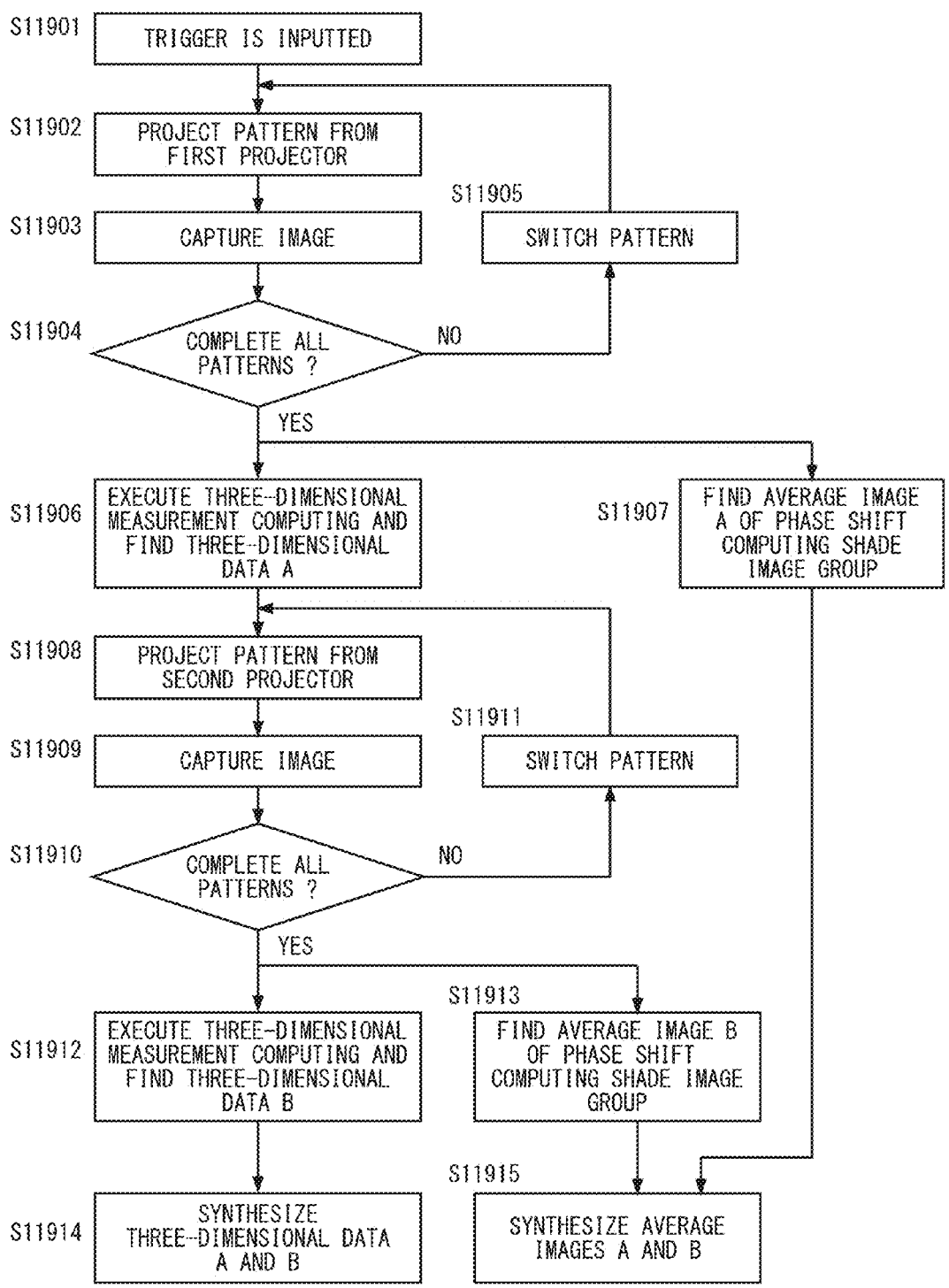
FIG. 119 is a flowchart showing a flow of processing at the time of operation in the head section of the three-dimensional image processing apparatus according to the third embodiment.
Figure 120:
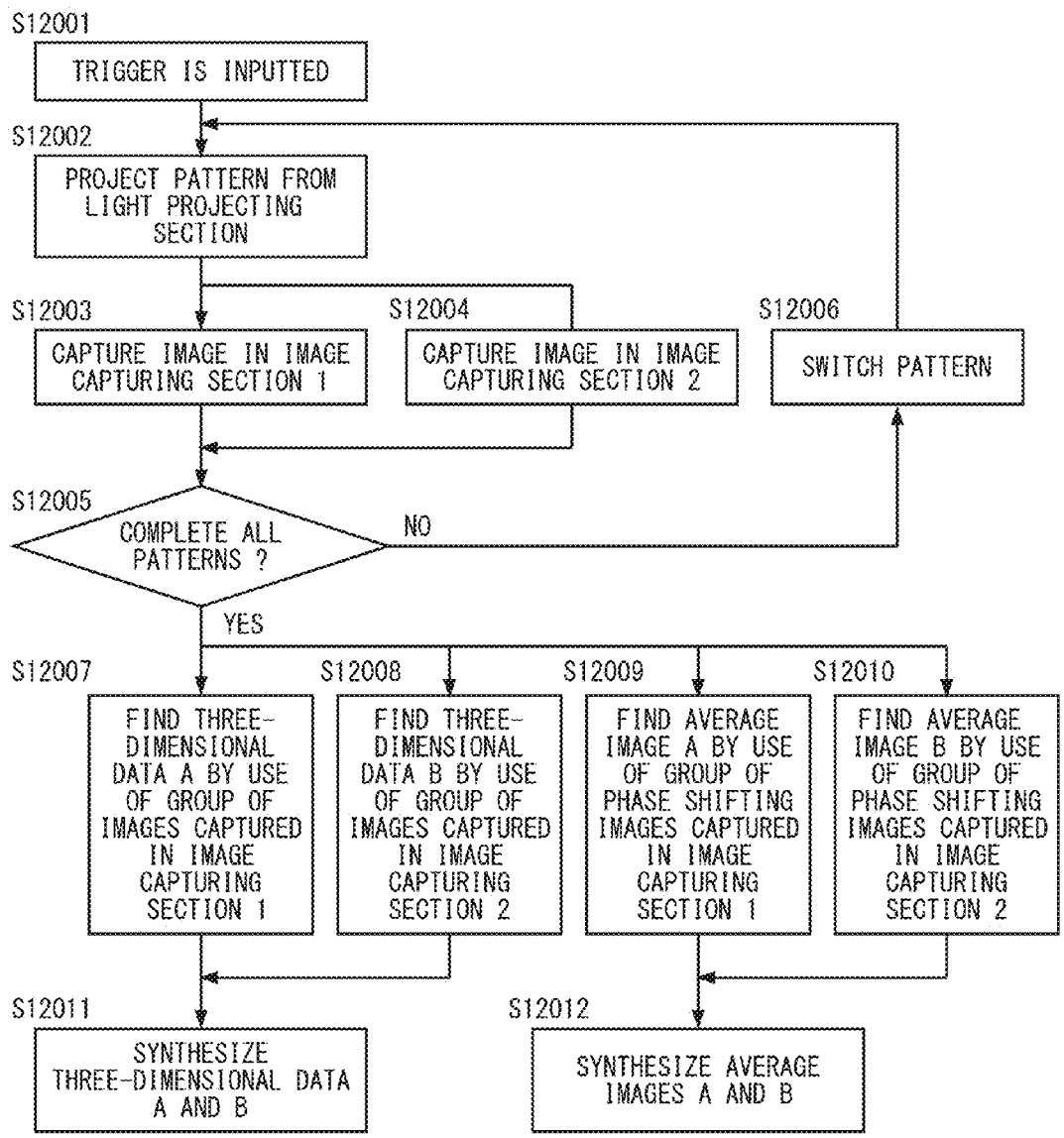

Next, a description will be given of processing at the time of operation inside the head section and the controller section in the three-dimensional image processing apparatus shown in FIGS. 4A and 4B based on flowcharts of FIGS. 119 and 120. First, a description will be given of a flow of the processing at the time of operation in the head section of the three-dimensional image processing apparatus according to the third embodiment shown in FIGS. 4A and 5 based on a flowchart of FIG. 119.

(Flow of Processing According to Third Embodiment)

First, when a trigger is inputted from the outside (Step S11901), one light projection pattern is projected from the first projector 20A to the workpiece (Step S11902), and its image is captured in the image capturing part (Step S11903). Next, it is determined whether or not image capturing of every light projection pattern has been completed (Step S11904), and when it has not been completed, the light projection pattern is switched (Step S11905), to return the processing to Step S11902 and repeat the processing. Here, there are captured a total of 16 pattern projected images, which are 8 pattern projected images with light projection patterns by use of the phase shift method and 8 pattern projected images with light projection patterns by use of the spatial coding method.

On the other hand, when image capturing of every light projection pattern is completed in Step S11904, the processing is branched into Step S11906 and S11907. First, in Step S11906, the three-dimensional measurement computing is executed, to generate a distance image A.

On the other hand, in Step S11907, there is computed an average image A' obtained by averaging a plurality of pattern projected images (pattern projected image group) captured by the phase shift method.

Steps S11902 to S11906 above are the three-dimensional measurement by means of pattern light projection from the first projector 20A. Next, the three-dimensional measurement by means of pattern light projection from the second projector 20B is performed. Here, similarly to Steps S11902 to S11905, in Step S11908 subsequent to Step S11906, a light projection pattern is projected from the second projector 20B to the workpiece (Step S11908), and its image is captured in the image capturing part (Step S11909). It is then determined whether or not image capturing of every light projection pattern has been completed (Step S11910). When it has not been completed, the light projection pattern is switched (Step S11911), to return the processing to Step S11902 and repeat the processing. On the other hand, when the image capturing of every light projection pattern has been completed, the processing is branched into Steps S11912 and S11913. In Step S11912, the three-dimensional measurement computing is executed, to generate a distance image B. On the other hand, in Step S11913, there is computed an average image B' obtained by averaging a pattern projected image group captured by the phase shift method. When the three-dimensional distance images A, B are generated in such a manner, in Step S11914, the three-dimensional distance images A, B are synthesized to generate a distance image. Further, in Step S11915, a brightness image (average two-dimensional shade image) is generated which is obtained using the average images A', B' by synthesizing these images. In such a manner, a distance image having height information of the workpiece is acquired in the three-dimensional image processing apparatus of FIG. 5. It is to be noted that, when the brightness image is unnecessary, Steps S11907, S11913 and S11915 can be omitted.

(Flow of Processing According to Fourth Embodiment)

Figure 4A:
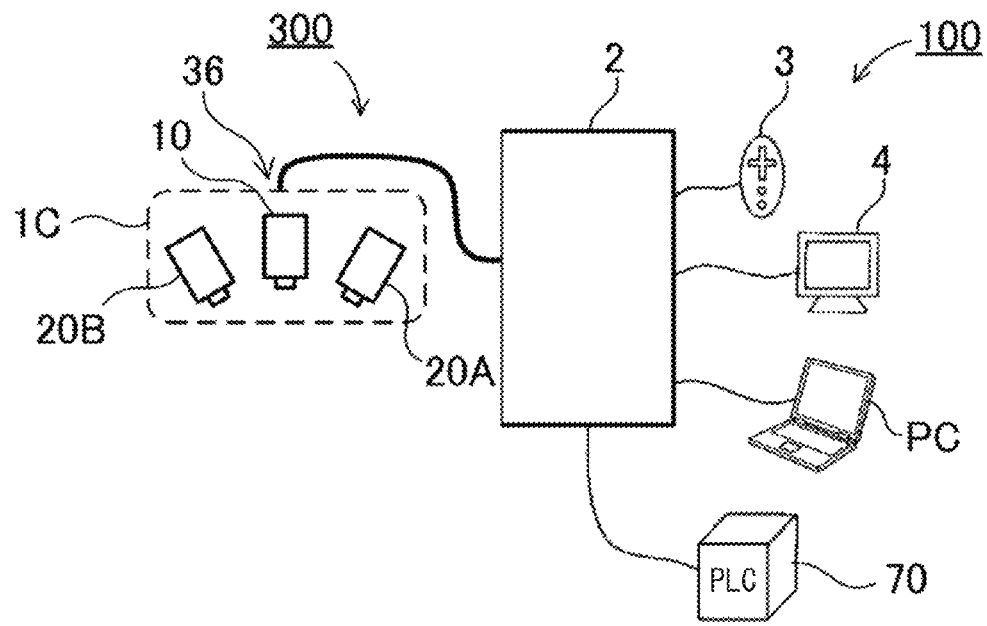
FIG. 4A is a head section of a three-dimensional image processing apparatus according to a third embodiment of the present invention.
Figure 4B:
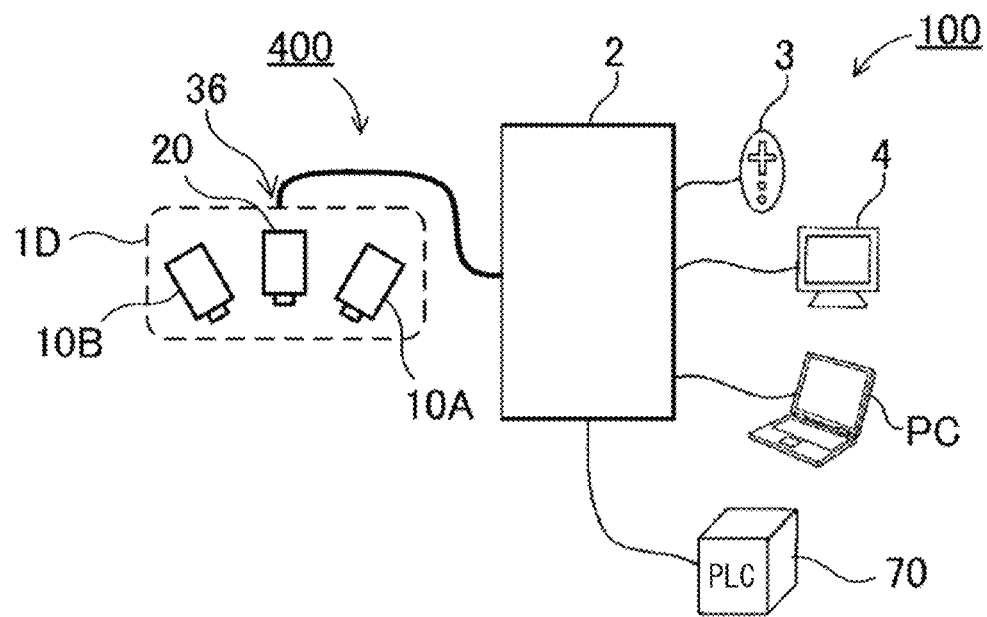
FIG. 4B is a schematic view showing a head section of a three-dimensional image processing apparatus according to a fourth embodiment.

In the above, the description has been given of the flow of the processing of the head section in the three-dimensional image processing apparatus according to the third embodiment shown in FIG. 4A. Next, a description will be given of a flow of processing of the head section in the three-dimensional image processing apparatus according to the fourth embodiment shown in FIG. 4B, based on a flowchart of FIG. 120. First, when a trigger is inputted from the outside (Step S12001), one light projection pattern is projected from the light projecting part 20 to the workpiece (Step S12002), and its image is captured in a first image capturing part 10A (Step S12003), while it is simultaneously captured in a second image capturing part 10B (Step S12004). It is then determined whether or not image capturing of every light projection pattern has been completed (Step S12005). When it has not been completed, the light projection pattern is switched (Step S12006), to return the processing to Step S12002 and repeat the processing. On the other hand, when the image capturing of every light projection pattern has been completed, the processing is branched into Steps S12007 to S12010. In Step S12007, the three-dimensional measurement computing is executed, to generate a distance image A. In Step S12008, the three-dimensional measurement computing is executed, to generate a distance image B. On the other hand, in Step S12009, there is computed an average image A' obtained by averaging the pattern projected image group captured by the phase shift method, and in Step S12010, there is computed an average image B' obtained by averaging the pattern projected image group captured by the phase shift method. Then in Step S12011, the three-dimensional distance images A, B obtained in Steps S12007 and S12008 are synthesized to generate a distance image. Further, there is generated a brightness image obtained by synthesizing the average images A', B' obtained in Steps S12009 and S12010. By this method, it is possible to simultaneously capture two images, so as to improve reduction in image capturing time.

(Inspection Target Region Setting Part)

In an inspection at the time of actual operation, it is necessary to previously specify a region (inspection target region) that is set as a target where the inspection executing part 50 executes an inspection on the workpiece. Such a setting for the inspection target region is performed by the inspection target region setting part at a setting stage. The inspection target region setting part can be provided on the controller section 2 side as described above, or can also be realized by the three-dimensional image processing program. Specifically, as described above, when the "Set region" button 115 corresponding to the inspection target region setting part of the three-dimensional image processing program shown in FIG. 62 is pressed, the screen shifts to an inspection target region setting screen 120 shown in FIG. 47, and on this inspection target region setting screen 120, a region for performing the inspection can be specified.

Figure 121:
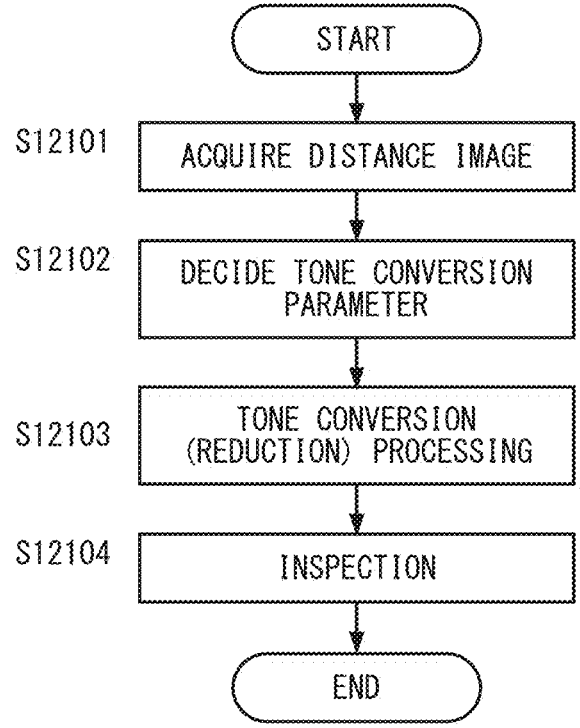

When the inspection target region is specified in such a manner, the three-dimensional image processing apparatus performs the image processing on this inspection target region and further executes the inspection. That is, as shown in a flowchart of FIG. 121, an inspection target region is allocated to a distance image (Step S12101), a tone conversion parameter is set based on this distance image (Step S12102), the tone conversion is performed in accordance with this tone conversion parameter (Step S12103), and the image processing is performed on the tone-converted image, to perform a predetermined inspection (Step S12104).

It is to be noted that the tone conversion processing is performed on the inspection target region set in the foregoing inspection target region setting part. That is, in this example, the inspection target region setting part is made common with a tone conversion target region specifying part for specifying a tone conversion target region. However, a region used for deciding a parameter for the tone conversion processing may be set independently of the inspection target region. For example, a tone conversion parameter creating region is set by the inspection target region setting part or a tone conversion parameter creating region specifying part which is prepared separately from the inspection target region setting part.

(Operation Flow of Controller Section at Time of the Operation)

Next, based on a flowchart of FIG. 122 and the GUIs of FIGS. 123 to 127, a description will be given of a procedure for processing a distance image, obtained on the head section side, on the controller section side at the time of operation. Here, FIGS. 123 to 126 each show the GUI of the three-dimensional image processing program. The GUI of the three-dimensional image processing program shown in FIG. 123 shows the initial screen 260. The flow display region 261 is provided on the left side of the screen, and the third image display region 262 is provided on the right side thereof. In the flow display region 261, there is displayed a flowchart formed by connecting, in the form of processing units, contents of processing that is performed in the three-dimensional image processing apparatus. Here, as the processing unit, the "Image capturing" processing unit 263, the "Shapetrax2" processing unit 264, the "Position correction" processing unit 265 and the "Height measurement" processing unit 266 are displayed in the flow display region 261. Further, at the setting stage before the operation, it is possible to select each processing unit so as to perform a detailed setting. Moreover, on the third image display region 262, a brightness image, a distance image, an inspection result, or the like is displayed in accordance with the content of the processing. In the example of FIG. 123, a brightness image obtained by capturing an image of the workpiece (IC in this example) is displayed, and a later-mentioned search target region SA is displayed in the form of a green frame.
(Image Capturing Step)

Figure 122:
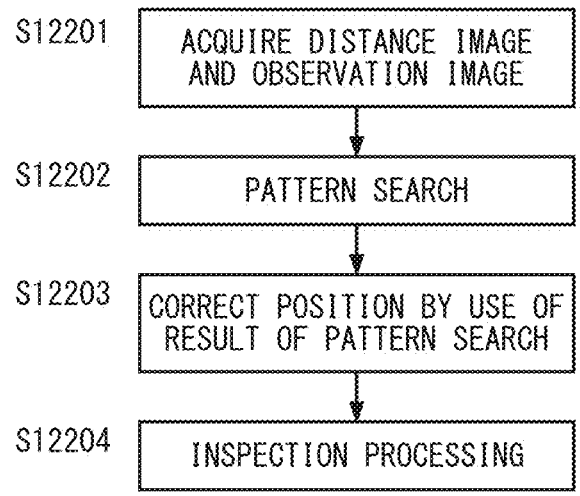
Figure 123:
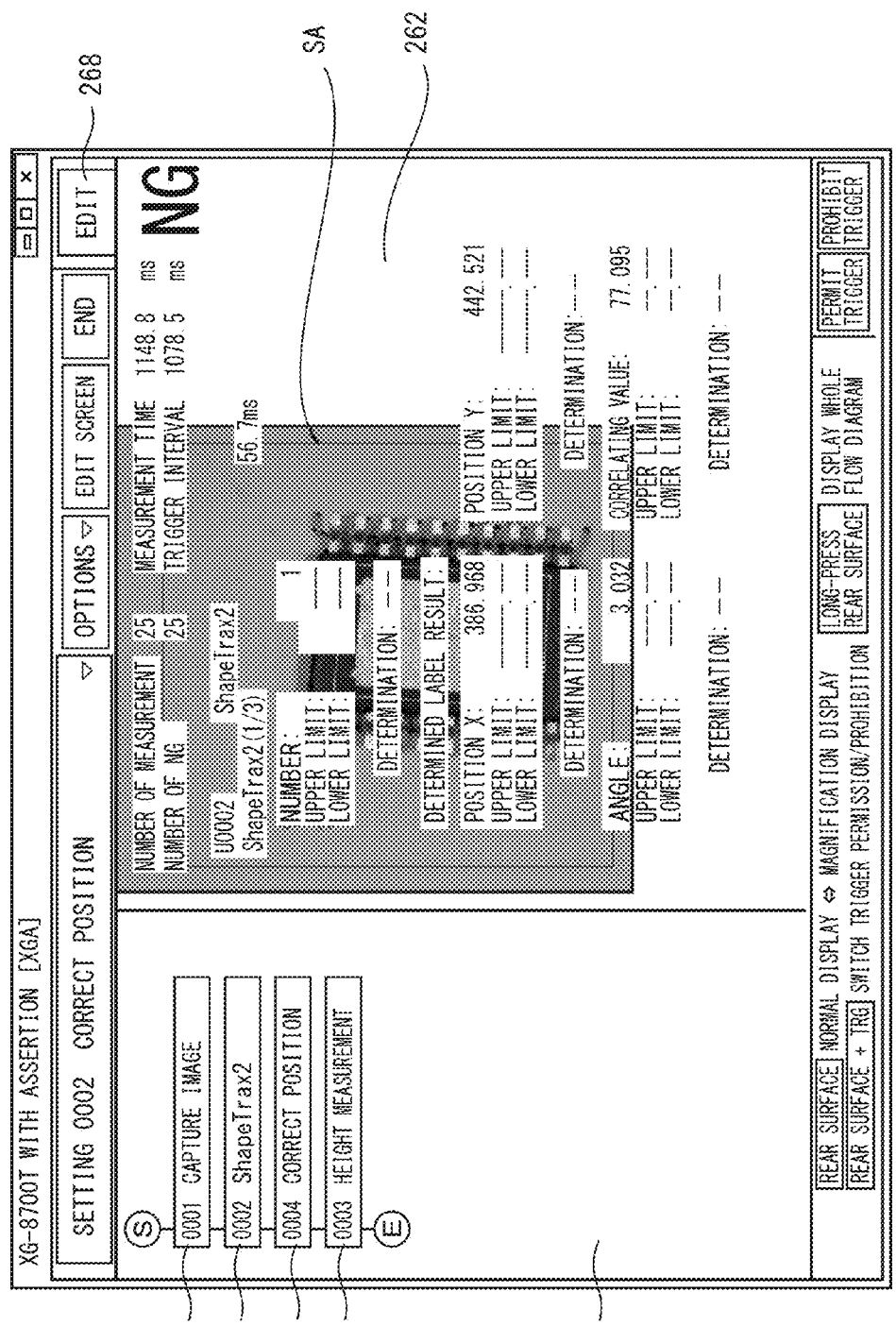
Figure 124:
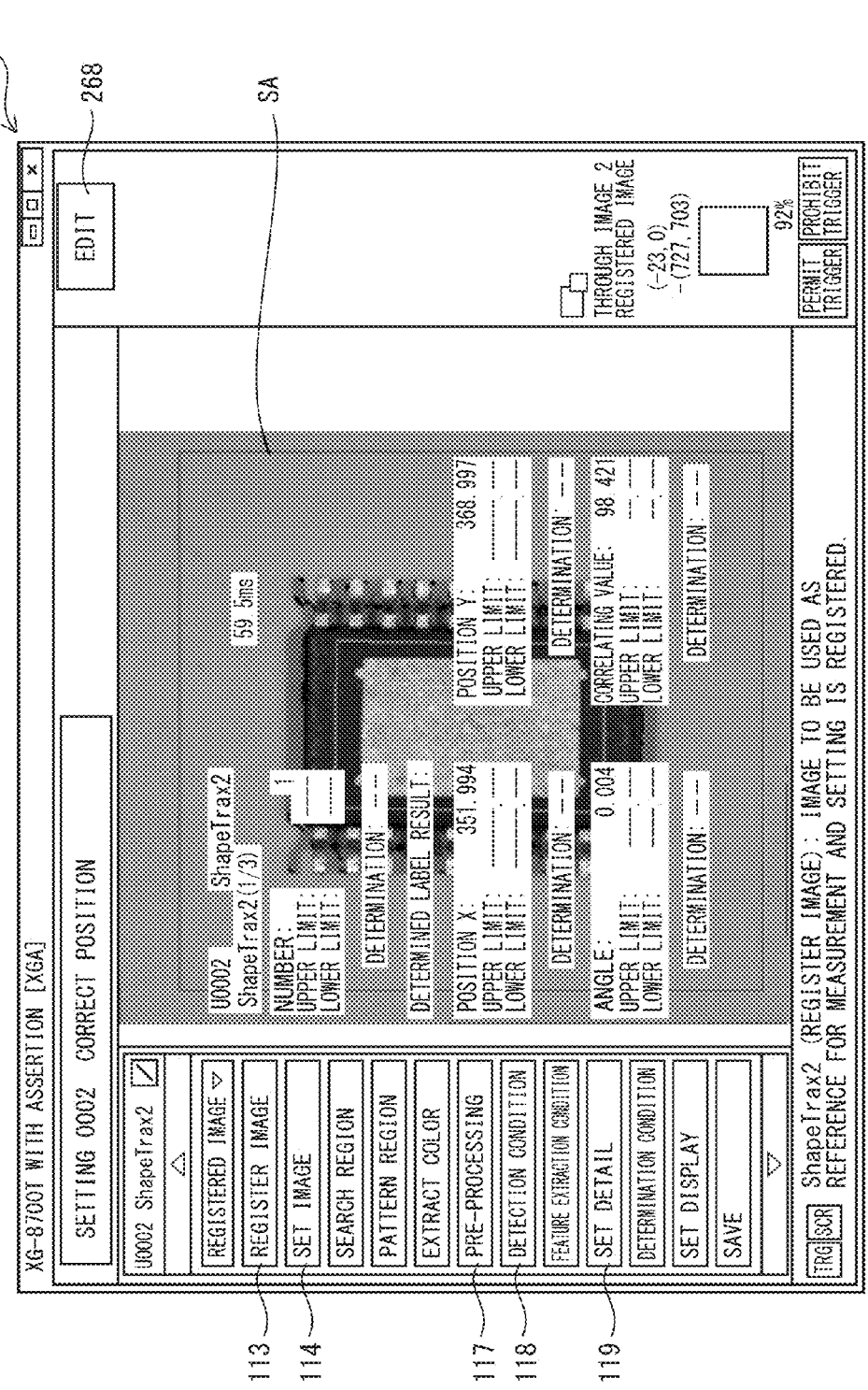

First, in Step S12201 of FIG. 122, a distance image and a brightness image are acquired from the head section 1. Here, a pattern projected image is captured on the head section side, to generate a distance image and a brightness image. In the example of the GUI of FIG. 123, the "Image capturing" processing unit 263 displayed in the flow display region 261 corresponds to the above.

As for the image data, the distance image is first transmitted from the head section to the controller section, and then the brightness image is also transmitted to the controller section. It is to be noted that, conversely, the brightness image may be transmitted and thereafter the distance image may be transmitted, or these images may be simultaneously transmitted.
(Search Step)

Further in Step S12202, a pattern search is performed in the controller section on an input image that is inputted at the time of operation. That is, a portion to be inspected is specified so as to follow movement of the workpiece included in the captured brightness image. In the example of FIG. 123, the "Shapetrax2" processing unit 264 displayed in the flow display region 261 corresponds to the pattern search. Here, the image searching part 64 of FIG. 5 performs the pattern search on the brightness image (input image) obtained by capturing the image of the workpiece, and performs positioning. Specifically, there is specified a position in the inputted brightness image where the previously set inspection target region is included. The search target region SA for performing the pattern search is previously set. For example, in the example of FIG. 124, the search target region SA is specified in a rectangular shape on the brightness image displayed on the third image display region.
(Positional Correction Step)

Figure 125:
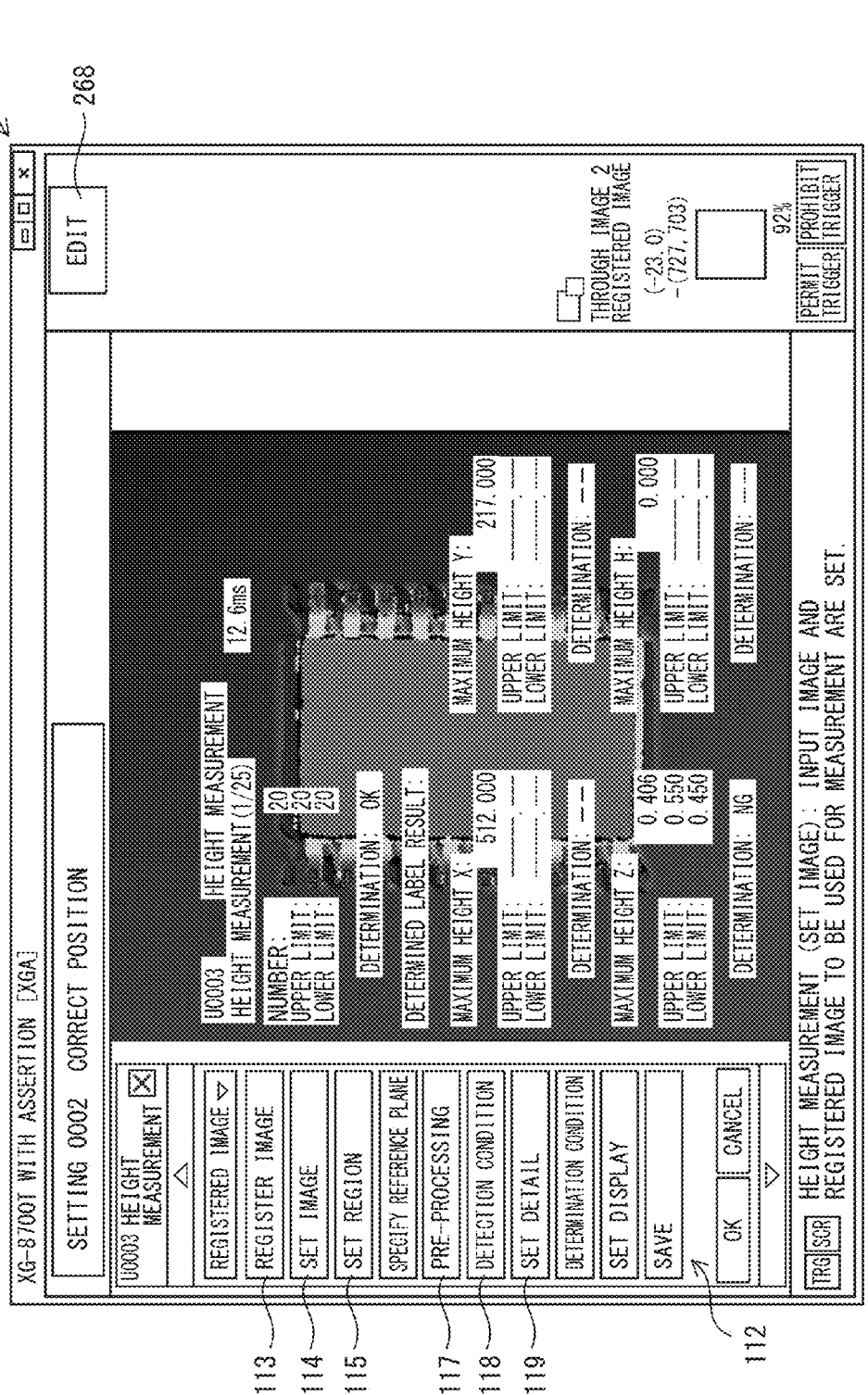
Figure 126:
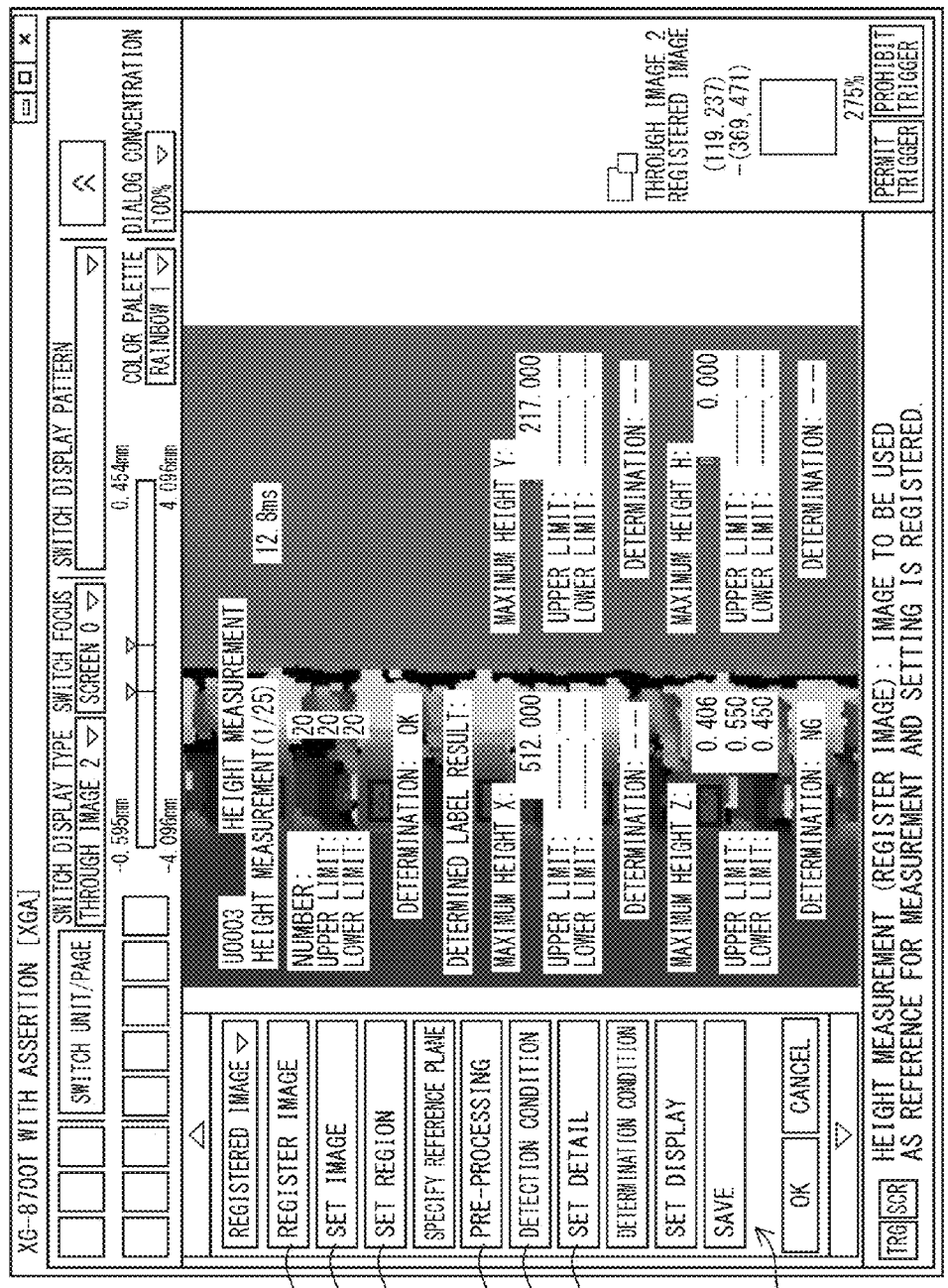
Figure 127:
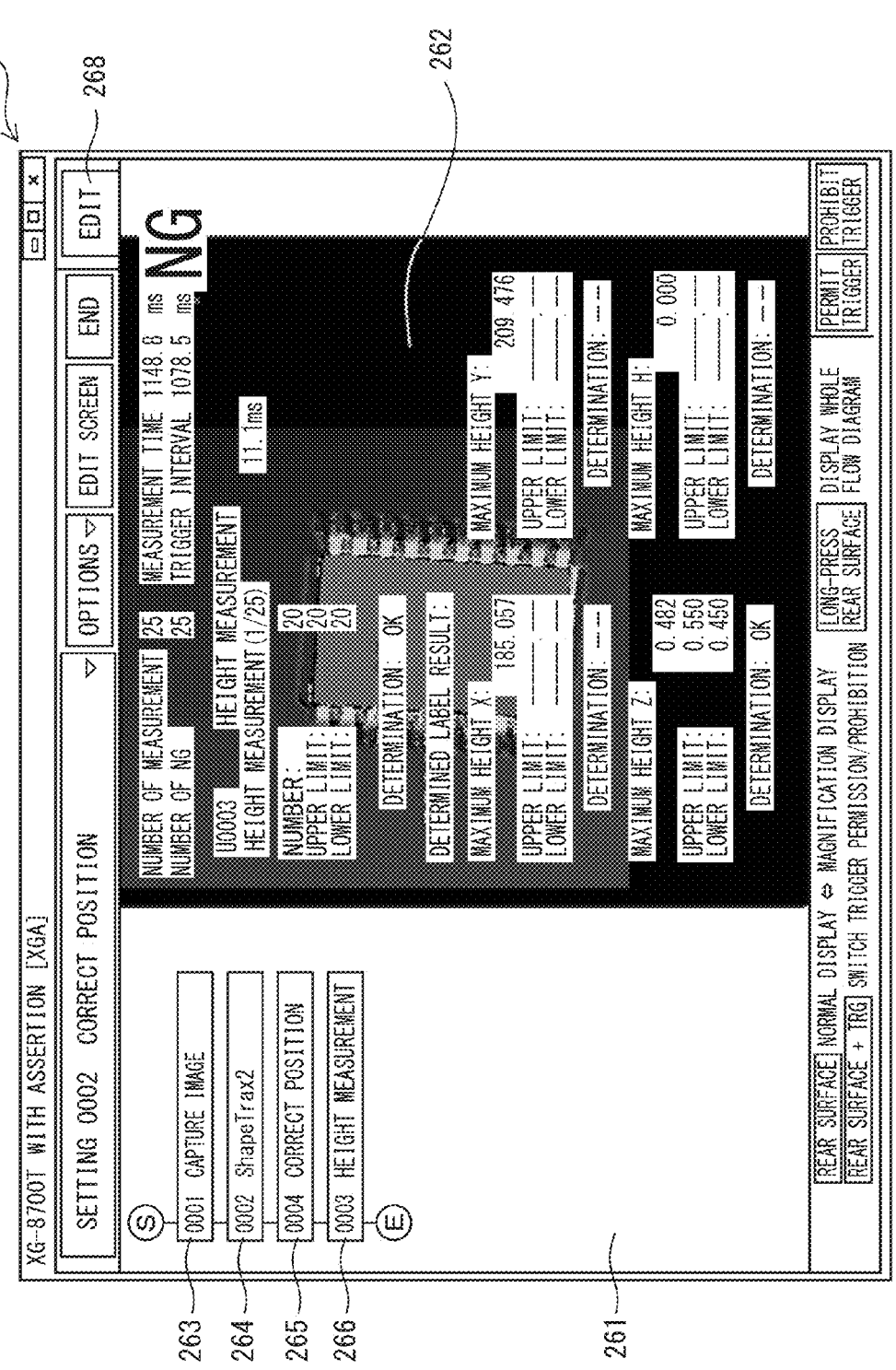

Next, in Step S12203, the inspection target region is subjected to positional correction by use of a result of the pattern search. In the example of FIG. 123, the "Position correction" processing unit 265 displayed in the flow display region 261 corresponds to the above. The inspection target region is previously set on the inspection target region setting screen. In the example of FIG. 125, a plurality of inspection target regions are set on the distance image displayed on the third image display region. Specifically, as shown in FIG. 126 a rectangular region is set with respect to each pin of the IC as the workpiece. The positional correction is performed, for example, by a method for calculating a positional displacement amount by means of normalized correlation searching, a method based on the result of the pattern search, or some other method. As thus described, the position of the inspection target region for inspection processing that is executed on the next stage is corrected by means of the positional correction.
(Inspection Processing Step)

Finally, in Step S12204, the inspection is executed using the distance image at the corrected position. In the example of FIG. 123, the "Height measurement" processing unit 266 displayed in the flow display region 261 corresponds to the above. Further, in the example of FIG. 127, height measurement is executed. That is, a height is measured and inspected in each inspection target region at the corrected position. For example, it is determined whether or not a flat surface height is within a predetermined reference value, and a determination result is outputted.

It should be noted that in the above procedure, the description has been given of the example of performing the positional correction by use of the brightness image and thereafter performing the inspection based on the distance image. However, the present invention is not restricted to this, and an image for performing the positional correction and an image for performing the inspection processing can be arbitrarily set. For example, in contrast to the above, it is possible to perform the positional correction by use of the distance image and thereafter perform the inspection processing by use of the brightness image. As one example, in an example where an accurate pattern search is difficult to perform by means of the brightness image as in a case where white workpiece is placed on a white background, a pattern search based on height information by use of the distance image is effective. Further, also in the inspection processing, the determination is performed not only by means of the determination processing based on height information, but also by means of an image processing result obtained by using the brightness image, for example by reading the character string printed on the workpiece by the OCR.
(Height Information Output Form)

The measured three-dimensional height information is found as a three-dimensional point cloud data having respective values of X, Y and Z. Further, as for how to output an actually found value, in addition to outputting it as the three-dimensional point cloud data, it can be converted to a Z-image or a Z-image with equal-pitched XY, for example.
(1. Z-Image)

The Z-image is height image data of only a Z-coordinate. For example, when the unevenness of the position of the workpiece whose image has been captured in the image capturing part is important and XY-coordinates need not be accurate, the XY-coordinates are unnecessary, and hence it would be sufficient if the Z-image as data of only the Z-coordinate is outputted. In this case, a data amount to be transmitted becomes small, thereby to allow reduction in transmission time. Further, as in the normal two-dimensional image capturing part, the data can also be used as an image, thus allowing the image processing to be performed using the existing image processing apparatus for two-dimensional image.
(2. Z-Image with Equal-Pitched XY)

The Z-image with equal-pitched XY is height image data obtained by equal-pitching XY-coordinates regardless of the height thereof. Specifically, a Z-coordinate at a position in the case of XY-coordinates being equal-pitched is subjected to interpolation computing from point cloud data therearound, to obtain a Z-image with equal-pitched XY.

Generally, when a lens of the image capturing part is not an objective telecentric lens, a position (XY-coordinates) at which the image capturing is performed in the image capturing part varies depending on the height position (Z-coordinate) of the workpiece being captured in the image. For this reason, even in the case of ones taken at the same position on the capturing element, actual XY-coordinates positions of those vary depending on the heights thereof. For example, this is inconvenient in the case of wishing to inspect a three-dimensional difference such as a volume because a value becomes large when the workpiece is close to the camera and the value becomes small when the workpiece is distant from the camera. Accordingly, Z-data with equal-pitched XY is found from the point cloud data, thereby to give a Z-image having XY position not affected by the height.

(3: XYZ (Point Cloud Data))

Alternatively, the point cloud data can be outputted as it is as three-dimensional information. For example, this is applied to the case of wishing to treat the measured three-dimensional data as it is. In this case, an amount of the data is three times as large as in the case of only the Z-coordinate, but since it is raw data, it can be applied to the use of finding a three-dimensional difference from three-dimensional CAD data.

(Generation of Equal-Pitched Image)

Figure 128:
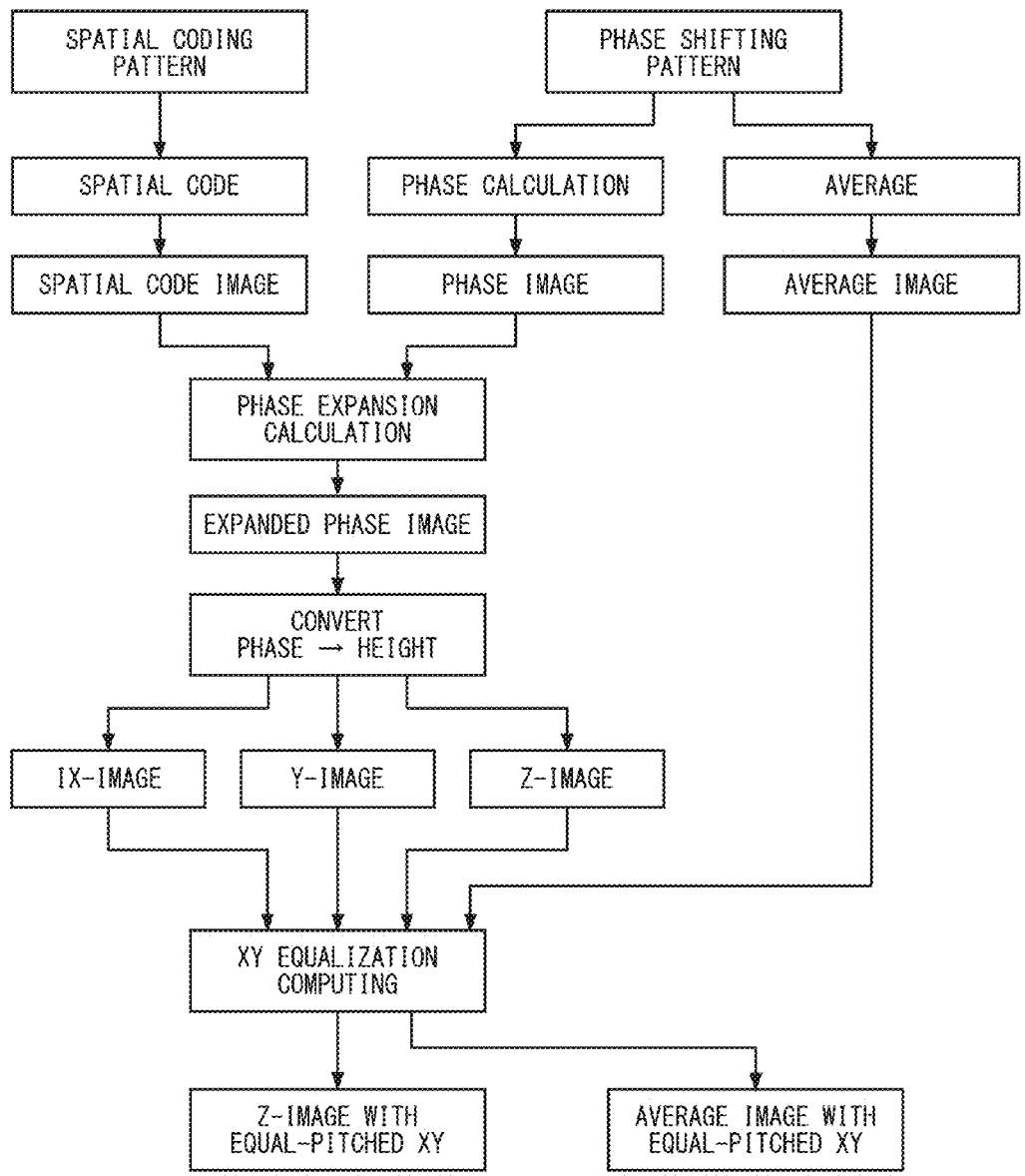

Next, FIG. 128 shows a data flow diagram for creating an equal-pitched image obtained by correcting an angle of view, in addition to the distance image and the brightness image. As shown in this drawing, first, from a spatial coding pattern light projection workpiece image group whose images are captured in the head section, a spatial code image is generated in accordance with the spatial coding method. On the other hand, from a phase shifting pattern light projection workpiece image group, a phase image is generated in accordance with a phase calculation. Then, phase expansion calculation is performed from these spatial code image and phase image, to generate an expanded phase image. Further, it is also possible to apply common filter processing, such as performing filtering on the spatial coding pattern light projection workpiece image group and the phase shifting pattern light projection workpiece image group. Examples of the common filter processing include application of two-dimensional filters such as a median filter, a Gaussian filter or an averaging filter. On the other hand, the phase shifting pattern light projection workpiece image group is averaged, thereby to generate a brightness image (average shade image).

(Equal Interval Processing)

As described above, after the three-dimensional data and the brightness image have been generated in the head section, the distance image such as the Z-image or the Z-image with equal-pitched XY is created. First, the distance image is transferred from the head section 1 to the controller section 2, and the tone conversion for converting phase information to height information is performed. Here, an X-image, a Y-image and a Z-image are respectively found from the phase information, and thereafter, these XY are equalized, to acquire a Z-image with equal-pitched XY and a Z-average image with equal-pitched XY on the XY-plane. Such equal interval processing is performed in the interval equalization processing setting part 47.

Figure 129:
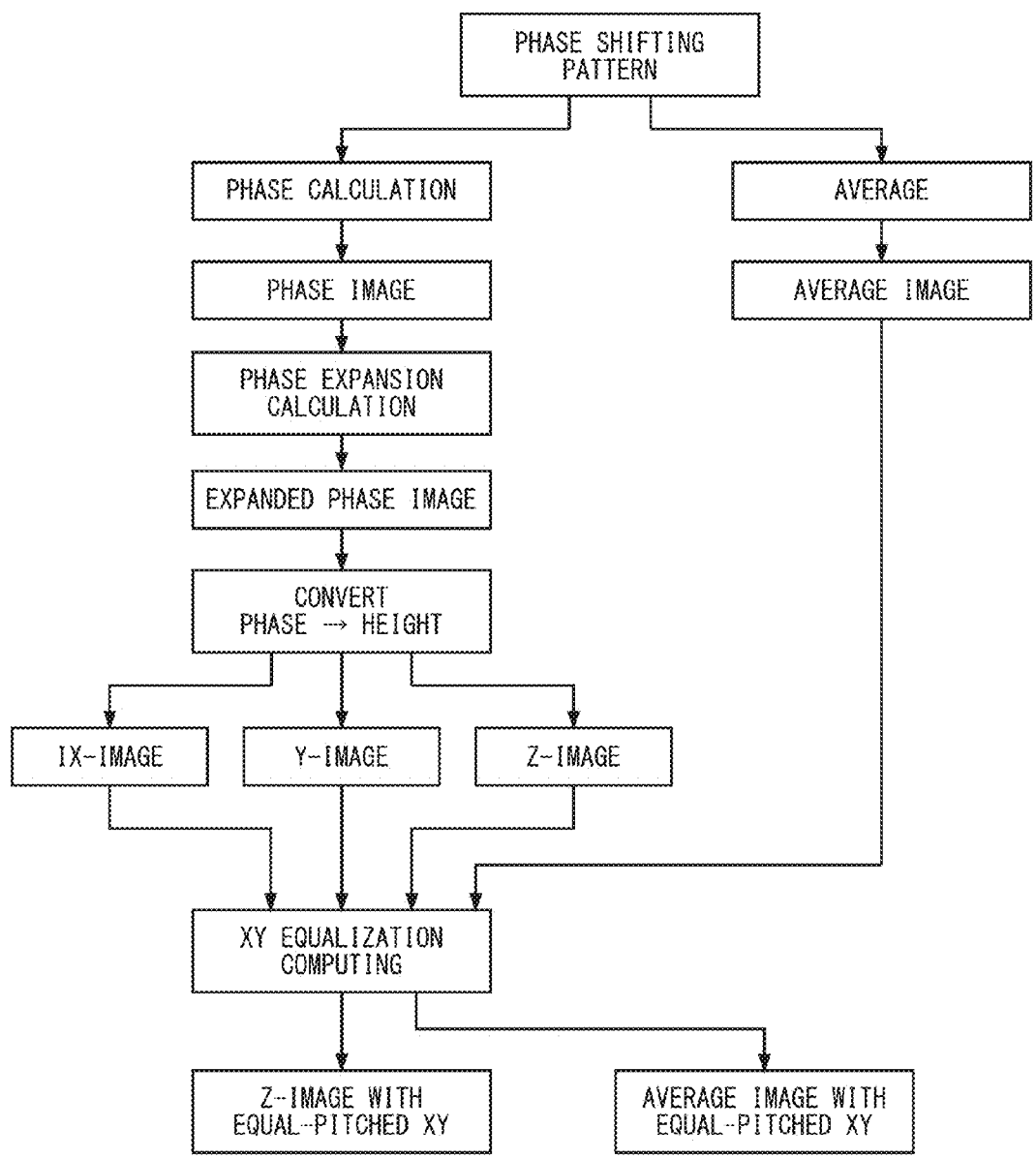

It should be noted that the example of combining the phase shift method and the spatial coding method in generation of the distance image has been described in the example of FIG. 128, but it is also possible to generate the distance image only by the phase shift method without using the spatial coding method. The spatial coding processing can be switched between ON/OFF by the spatial coding switching part 45 shown in FIG. 5. Such an example is shown in a data flow diagram of FIG. 129. As shown in this drawing, with the spatial coding method not used, the number of captured images can be reduced, so as to generate the distance image at high speed.

Figure 130:
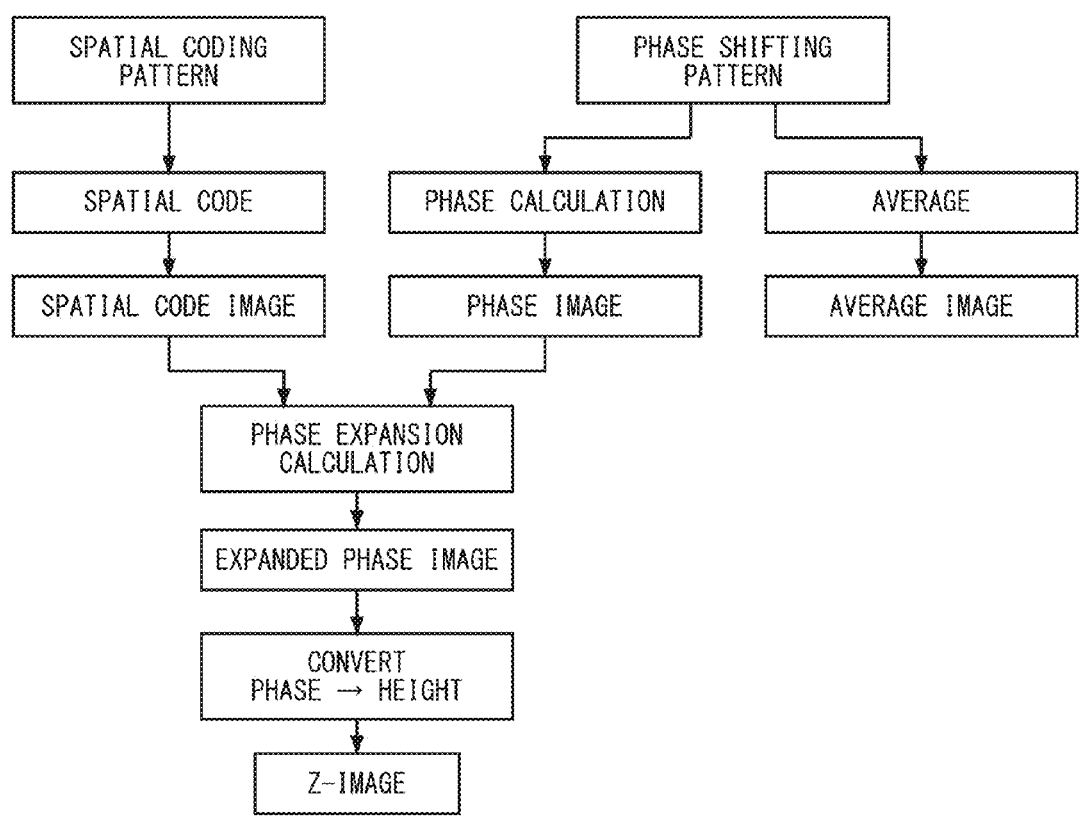

On the other hand, FIG. 130 shows a data flow diagram at the time of switching off the XY equal pitching function, to obtain the Z-image. In this example, there is no need for decomposing the image into the X-image and the Y-image at the time of tone conversion, thereby to allow simplified processing.

Figure 131:
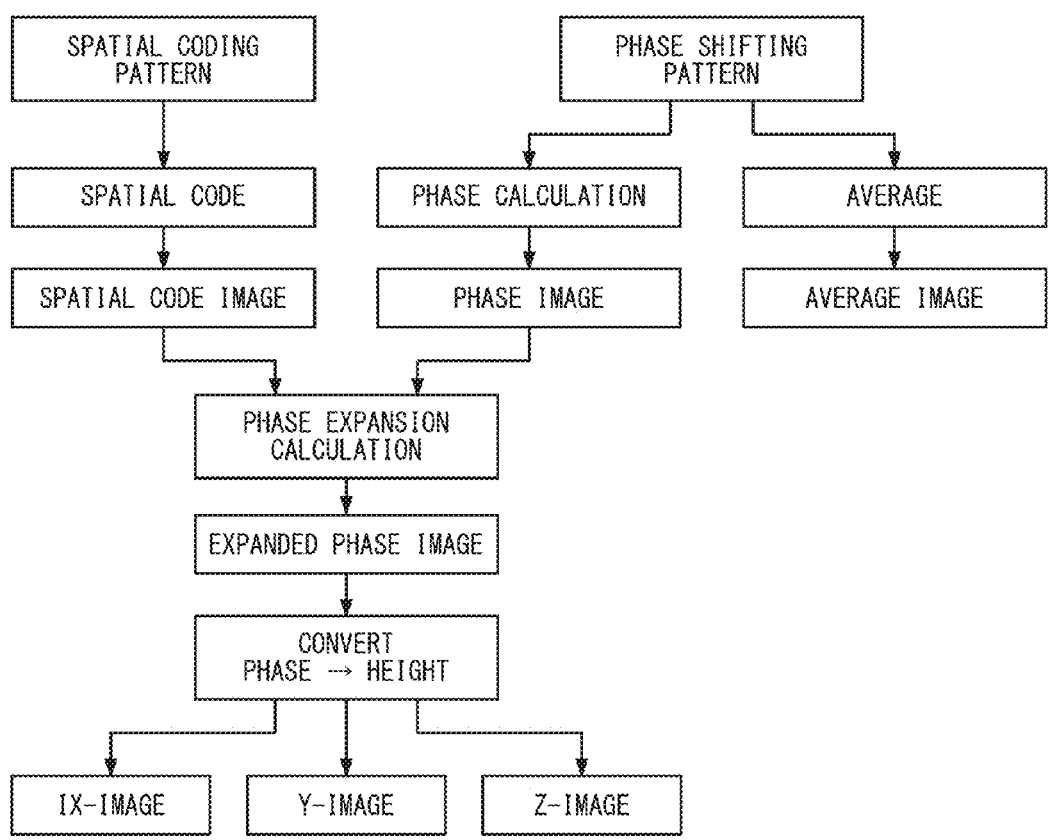

Moreover, FIG. 131 shows an example of outputting the point cloud data whose XYZ-coordinate information is outputted as it is. In this example, since the X-image, the Y-image and the Z-image can be outputted as they are after the conversion from the phase to the height, it is possible to obtain an advantage of being able to output the images with a low load.

(Tone Converting Method)

Next, a description will be given of a procedure for the tone converting part 46 of the three-dimensional image processing apparatus automatically tone-converting a high-tone distance image to a low-tone distance image based on the distance image. Here, a description will be given of a procedure for tone-converting a plurality of input images in such a use where, in an inspection apparatus installed on the production line where a plurality of workpieces are carried, successively inputted distance images (input images) are tone-converted to low-tone distance images in real time. The tone conversion processing in this case can be broadly classified into two methods: (A) a method (static conversion) for previously deciding a tone conversion parameter; and (B) a method (active conversion) for deciding a tone conversion parameter in accordance with an input image. These will be described below.

(A. Static Conversion)

First, a description will be given of the static conversion in which the tone conversion parameter is previously decided. Here, a tone conversion parameter for tone-converting an input image or a previously registered image is adjusted at the time of setting. Then at the time of operation, the distance image is tone-converted with the tone conversion parameter set at the time of setting, and the inspection is executed on the low-tone distance image after tone-conversion. The procedure at the time of setting is as described based on the foregoing flowchart of FIG. 8.

(Procedure at the Time of Operation)

When the tone conversion parameter is adjusted, with this tone conversion parameter, the input image inputted at the time of operation is tone-converted. Here, the procedure for the static conversion at the time of operation will be described based on a flowchart of FIG. 132. First, in Step S13201, a distance image is acquired. Here, the controller section 2 fetches a distance image generated by the distance image generating part 32. In next Step S13202, the tone conversion processing is performed on the inputted distance image. Here, the tone conversion processing is executed in accordance with the tone conversion parameter adjusted at the time of setting, to generate a low-tone distance image where the number of tones of the distance image, namely a dynamic range, is reduced. Finally, in Step S13203, the inspection processing is performed by the inspection executing part 50. According to this method, previously setting the tone conversion parameter eliminates the need for computing the tone conversion parameter at the time of operation, and hence the processing can be performed with a low load.

(B. Active Conversion)

Next, a description will be given of the active conversion in which the tone conversion parameter at the time of tone conversion is calculated based on the input image. First, a procedure at the time of setting is performed in accordance with the flowchart of FIG. 8 as described above. Specifically, an input image or a registered image is acquired in Step S81, and the tone converting method is selected in Step S82. Here, it is assumed that the user selects the active conversion. Then, in Step S83, the tone conversion parameter is adjusted. Here, based on the image acquired in Step S81, it is set on what condition the tone conversion parameter is computed or adjusted with respect to the input image inputted at the time of operation.

When the computing condition for the tone conversion parameter is set in such a manner, at the time of operation, the tone conversion parameter in accordance with the input image is separately computed in accordance with the set tone conversion parameter computing condition. Next, based on a flowchart of FIG. 133, a description will be given of a procedure at the time of the operation for tone-converting the distance image to the low-tone distance image by means of the active conversion. First, in Step S13301, a distance image is acquired. Here, similarly to Step S13201 described above, the controller section 2 fetches a distance image generated by the distance image generating part 32. In next Step S13302, the tone conversion parameter is decided based on the distance image as the input image. As for the method for adjusting the tone conversion parameter, the foregoing method can be employed. Further, the tone conversion is executed in Step S13303. Finally, in Step S13304, the inspection processing is executed. According to this method, since the tone conversion parameter can be changed in accordance with the input image, even a different workpiece can be tone-converted in a flexible manner, leading to an accurate inspection. For example, it is possible to perform the inspection even on the workpiece surface with height variations without deterioration in accuracy.

Here, as one example of the active conversion, based on FIG. 134, a description will be given of a method for optimally creating the low-tone distance image after tone-conversion by adjusting the tone conversion parameter. Here, there are two methods: a method for actively setting one tone conversion parameter set; and a method for previously preparing a plurality of tone conversion parameter sets and actively selecting a tone conversion parameter set.

(1A. Method for Setting One Tone Conversion Parameter Set)

First, a description will be given of the method for actively setting one tone conversion parameter set. In this method, based on image information of a plurality of distance images as input images in a predetermined region, a value of a tone conversion parameter to be used for the tone conversion is adjusted, and using this adjusted tone conversion parameter, the tone converting part 46 executes the tone conversion processing on the distance image. Here, a description will be given of an example of tone-converting a 16-tone distance image (image before tone-conversion) to an 8-tone low-tone distance image (image after tone-conversion). Further, as for the workpiece as the inspection target, as shown in a perspective view of FIG. 134, the whole measurement surface of each workpiece is vertically displaced, and its range is 5 mm. Further, a height-directional range including a thickness and distortion of the whole measurement surface is 0.5 mm. An example will be considered where, with respect to each workpiece having a different surface height as described above, an inspection as to whether or not each surface has a flaw is performed by image processing. While being used, the distance image is tone-converted to a two-dimensional shade image (low-tone distance image), thereby to allow the existing image processing apparatus for two-dimensional image to perform the inspection.

First, a region to be inspected on the workpiece is previously specified by the inspection target region setting part as an inspection target region. In addition, other than specifying a part of the distance image as the input image, it is also possible to specify the whole of the distance image. In this case, the operation of specifying the inspection target region may be omitted.

First, an average distance of the inspection target region is found. Next, a difference (distance range) between the maximum distance and the minimum distance of the inspection target region is found. Moreover, a numerical value obtained by multiplying the distance range by 1.2 is taken as a distance range of an image after conversion. For example, in a distribution of the workpiece in FIG. 134, when the distance range is 0.5 mm, 0.6 mm obtained by multiplying this by 1.2 is set as the distance range of the image after tone-conversion. Therefore, a range of ±0.3 mm centered at the average distance is a measurement range.

Furthermore, a span with respect to the distance image as the input image is found such that the range of 0.6 mm (±0.3 mm centered at the average distance) as the distance range of the image after tone-conversion has 256 tones. In addition, the span can also be a predetermined constant. Moreover, a distance image with an average distance being not longer than −0.3 mm can be set as 0, whereas a distance image with an average distance being not shorter than +0.3 mm can be set as 255.

As thus described, it is possible to set a range necessary for the inspection from a plurality of inputted distance images and appropriately set a tone conversion parameter such that height information of this range is maintained even in a low-tone distance image after tone-conversion. As a result, by use of the existing image processing apparatus, it is possible to appropriately inspect the presence or absence of a flaw, its position and the like on each of the workpieces that disperse in the height direction.

(1B. Method for Previously Preparing a Plurality of Tone Conversion Parameter Sets)

In the above example, the description has been given of the method for appropriately finding a tone conversion parameter set by use of height information of the acquired distance images such that height information necessary for detection of a flaw is not lost. Meanwhile, a description will also be given of a method for previously preparing a plurality of tone conversion parameter sets. In this method, there are created images after tone-conversion obtained by tone-converting a plurality of distance images as input images with a plurality of previously set tone conversion parameters, and based on image information of a previously specified inspection target region of the distance image, an image after tone-conversion to be used for the inspection is selected.

A specific example of this will be described based on a schematic diagram of FIG. 135 and a flowchart of FIG. 136. Also in this example, similarly to FIG. 134 described above, there will be considered a case where the whole measurement surface of each workpiece is vertically displaced in a range of 5 mm. There are created nine images after tone-conversion obtained by tone-converting the above workpiece as the conversion center is changed by 0.5 mm each. Then, each of the obtained images after tone-conversion is displayed, as preferably arrayed, on the display part and the user is allowed to select a converted image obtained by the conversion with the conversion center closest to an average value of the distance images as the input images. Subsequently, a tone conversion parameter set having been applied to the image selected by the user is set. A specific procedure is that, as shown in FIG. 136, a distance image of the workpiece is first generated (Step S13601), and thereafter, the tone conversion processing is performed a plurality of times while the tone conversion parameter is changed, as described above (Step S13602). The user is then allowed to select a desired image out of simple low-tone distance images as the obtained tone-converted images (Step S13603). The tone conversion parameter is adjusted according to the need, and the obtained low-tone distance image is subjected to the inspection (Step S13604).

(Details of Static Conversion and Active Conversion)

Next, details of the static conversion and the active conversion will be described. First, the static conversion will be described. As for the static conversion, as a specific method for correcting the reference of height information to be left at the time of tone-converting a distance image to a low-tone distance image, there can be used: (A1) one-point specification in which the correction is performed at a specified height (distance); and (A2) three-point specification in which the correction is performed on the flat surface.

(A1: One-Point Specification)

The one-point specification is a method for tone-converting a distance image to a low-tone distance image by taking as a reference a height (distance) of a point or a region specified by the user. The reference height is, for example, an intermediate height of a height range (distance range) in which the tone conversion to the low-tone distance image is performed, out of height information of the distance image. Alternatively, it can also be at the upper limit of the distance range (the highest position at which the tone conversion is performed) or the lower limit thereof (the lowest position at which the tone conversion is performed). A specific procedure for the one-point specification is as described based on FIGS. 66 to 78 above.

(A2: Three-Point Specification)

The three-point specification is a method for tone-converting a distance image to a low-tone distance image by taking as a reference plane the flat surface found by three points specified by the user. Similarly to the foregoing reference height of the one-point specification, it is assumed that the reference plane is, for example, at an intermediate height of a height range (distance range) in which tone conversion to a low-tone distance image is performed out of height information of the distance image. Alternatively, it can also be at the upper limit of the distance range (the highest position at which the tone conversion is performed) or the lower limit thereof (the lowest position at which the tone conversion is performed). A specific procedure for the three-point specification is as described based on the GUI screens of FIGS. 81 to 85 above.

Here, based on FIG. 137, a description will be given of an example where specification of the reference plane by means of the static conversion is effective. In this example, the workpieces WK7 having the same height are being carried on the same surface by a belt conveyor BC. In this case, since there is almost no variation in height among the workpieces WK7, the active conversion for changing the reference plane for each of the workpieces is unnecessary, and the static conversion can be adopted. Especially the processing of the static conversion is performed at higher speed than the active conversion, and an advantage of the static conversion can be enjoyed.

Further, FIG. 138A is an example of workpieces whose height variation itself is to be suppressed. In this example, there is targeted inspection processing for detecting as abnormal the case of "lifting" existing on a cap of a bottle as a workpiece WK10 that is carried by the belt conveyor BC. In this case, adopting the static conversion can lead to detection of height variation as in a low-tone distance image shown in FIG. 138B. In contrast, when the active conversion is adopted, an amount of variation is corrected, resulting in the impossibility to detect abnormality. Hence in such a use, the static conversion can be preferably used.

(B. Specific Example of Active Conversion)

In the above, the description has been given of the static conversion in which a tone conversion condition is previously set at the setting stage and the tone conversion is performed on the specified condition at the time of operation. Next, a description will be given of a specific example of the active conversion for adjusting the tone conversion condition in accordance with the input image as the inspection target. First, as specific methods for correcting the reference of height information which should remain at the time of tone-converting a distance image to a low-tone distance image, the active conversion includes: (B1) an average height reference where the tone conversion is performed taking as an average reference height an average height (average distance) within an average extraction region specified with respect to the input image; (B2) a flat surface reference where an estimated flat surface within a specified region of the input image is generated and the tone conversion is performed taking this plane as the reference plane; and (B3) a free curved surface reference where a free curved surface with a high-frequency component removed from the input image is generated and the tone conversion is performed taking this curved surface as the reference plane.

Figure 8:
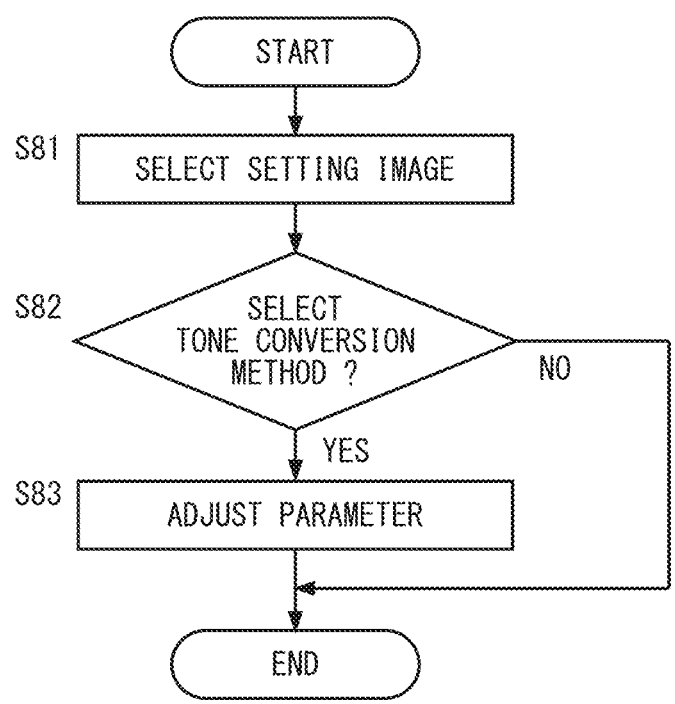
FIG. 8 is a flowchart showing a procedure for a static conversion at the time of setting.

An average extraction region for specifying an average reference height is previously set prior to the operation (Step S83 of FIG. 8 above). One example of a procedure for specifying the average extraction region in Step S83 of FIG. 8 is as described above based on the GUIs of FIGS. 88 to 92. On the other hand, at the time of operation, the active conversion described in the procedure in FIG. 133 is performed. For example, an image of the workpiece being carried on the production line is captured to generate a distance image (Step S13301), an average height of the above set average extraction region is computed (Step S13302), the tone conversion is executed based on this to generate a low-tone distance image (Step S13303), and the obtained low-tone distance image is inspected (Step S13304). With this method, even when the workpiece has variation in a height direction, the reference plane of the tone conversion can be re-set every time with respect to each workpiece, and hence it is possible to realize an accurate inspection regardless of the variations in height direction of the workpiece.

Next, similarly to the foregoing average height reference, also in the flat surface reference, the reference plane estimation region for deciding the reference plane is previously set prior to the operation (Step S83 of FIG. 8 described above). One example of a procedure for specifying the reference plane estimation region in Step S83 of FIG. 8 is as described above based on the GUIs of FIGS. 88, 92 to 95. At the time of operation, the active conversion described in the procedure in FIG. 133 is performed. For example, an image of the workpiece being carried on the production line is captured to generate a distance image (Step S13301), the reference plane estimation region having been set above is extracted to compute an estimated surface (Step S13302), the tone conversion is executed taking the obtained estimated surface as the reference to generate a low-tone distance image (Step S13303), and the obtained low-tone distance image is inspected (Step S13304). With this method, even when the surface of the workpiece has an inclination or the like, this can be cancelled and an accurate inspection can be realized regardless of the inclination of the workpiece.

Finally, a specific method for setting the free curved surface reference is as described above based on the GUIs of FIGS. 126 to 132. Similarly to the foregoing average height reference and the like, also in the free curved surface reference, a necessary condition for deciding the reference plane is previously set prior to the operation (Step S83 of FIG. 8 described above). Further, at the time of operation, the active conversion described in the procedure in FIG. 133 is performed. For example, an image of the workpiece being carried on the production line is captured to generate a distance image (Step S13301), a free curved surface is computed with respect to the free curved surface target region having been set above (Step S13302), the tone conversion is executed taking the obtained free curved surface as the reference to generate a low-tone distance image (Step S13303), and the obtained low-tone distance image is inspected (Step S13304). With this method, it is possible to obtain an advantage of being able to accurately perform even an operation in which an accurate inspection has been difficult by the conventional method, such as surface inspection for a workpiece with the curved surface.

Here, based on FIG. 139, a description will be given of an example where specification of the reference plane by means of the static conversion is effective. In this example, workpieces WK11 having different heights are being carried on the same surface by a belt conveyor BC. In this case, since the height of each of the workpieces WK11 is different, the reference plane is changed in accordance with the height of each individual by use of the average height reference or the like to perform the tone conversion, thereby to allow the optimum tone conversion to be performed even the heights of the workpieces vary.

Further, FIG. 140 shows an example of a workpiece WK12 having the minute inclined surface and a scratch on its flat surface. In this example, since the minute inclined surface exists on the front surface of the workpiece WK12 caused by a scratch DE, the accuracy in detection of the scratch might be affected by the inclination. Accordingly, the flat surface is actively found with respect to each workpiece individual by use of the flat surface reference or the like to perform the tone conversion with the obtained flat surface taken as the reference plane, thereby allowing a highly accurate inspection such as detection of a minute depression or scratch.

Further, FIG. 141 shows an example of workpieces WK13 each in the form of the curved surface with a different radius. Also in this example, the curved surface is found with respect to each workpiece by use of the free curved surface reference or the like to perform the tone conversion with this taken as the reference plane, thereby to allow an inspection where an influence exerted by variations in shape of each individual is alleviated.

(Automatic Adjustment of Tone Conversion Parameter)

In the above, the description has been given of the procedure for manually setting the tone conversion parameter based on the image after tone-conversion. On the other hand, in the case of manually setting the tone conversion parameter, when the tone conversion is performed using the first set tone conversion parameter, an image suitable for the inspection may not be obtained due to a change in workpiece, an environment, or the like. In such a case, without the user performing a fine adjustment with reference to the image, an image conversion suitable for the inspection can be performed by correcting the tone conversion parameter by use of data after tone-conversion and performing the conversion again. In this method, after an initial setting for the tone conversion has been performed, the tone conversion is first performed taking an arbitrary tone conversion parameter as an initial value, and thereafter, the tone conversion parameter is adjusted.

For example, the tone conversion condition automatic setting part is allowed to function as the tone conversion condition automatic setting part and the tone conversion condition manual setting part. That is, in the tone conversion condition automatic setting part, there is set a simple tone conversion condition at the time of the tone converting part tone-converting a distance image to a low-tone distance image. Further, in a state where the tone-converted simple low-tone distance image is displayed on the display part based on the simple tone conversion condition having been set in the tone conversion condition automatic setting part, the tone conversion condition manual setting part accepts a manual adjustment of the tone conversion condition. Herewith, the user is not suddenly prompted to set a tone conversion condition, but after a temporary simple tone conversion condition has been automatically set and the tone conversion has been performed, a desired tone conversion condition can be set with reference to one or more simple low-tone distance images being obtained. Therefore, even when the user is not familiar with meanings of tone conversion parameters or is not used to making settings for those, it is possible to make such a setting operation easy to perform by automating the operation to a certain extent.

A specific procedure will be described based on a flowchart of FIG. 142. First, in Step S14201, distance image creation processing is executed. Next, in Step S14202, initial tone conversion processing is performed using an initial value of a tone conversion parameter. Further, in Step S14203, it is determined whether the obtained tone-converted image is appropriate, and when it is not appropriate, the tone conversion parameter is adjusted again in Step S14204, and thereafter, the processing returns to Step S14202, to repeat the processing. On the other hand, when it is determined in Step S14203 that an appropriate tone-converted image has been obtained, the processing goes to Step S14205, to execute a predetermined inspection.

It is to be noted that in the above method, whether or not the tone conversion parameter is appropriate is determined in Step S14203, but this procedure may be omitted. FIG. 143 shows a procedure in this case. Each procedure is almost the same as in the example of FIG. 142. Distance image creation processing is executed in Step S14301, and initial tone conversion processing is next performed in Step S14302. Then, after the tone conversion parameter has been adjusted in Step S14303, a predetermined inspection is performed in Step S14304.

Examples of the initial tone converting method include: a method for multiplying an input image by a conversion coefficient f(x, y, z); a method for applying a shift and a span to an input image, to compress the result into n-tones; a method for taking a difference between an input image and a reference plane with an arbitrary flat surface taken as the reference plane, and applying a shift and a span thereto, to compress the result into n-tones; and a method for taking a difference between an input image and a reference image, and applying a shift and a span thereto, to compress the result into n-tones.

Next, a description will be given of a specific example of automatically adjusting a tone conversion parameter after tone-conversion. As an automatic adjustment method for a tone conversion parameter, there can be considered; (C1) a method for using a median value of a histogram of a distance image data after tone-conversion; (C2) a method for using the maximum value and the minimum value of a histogram; (C3) a combination of C1 and C2; and the like.

(C1; Method for Using Median Value of Histogram)

First, the method for using a median value of a histogram will be described based on a flowchart of FIG. 144. First, a histogram of a distance image data after conversion is calculated in Step S14401. Next, in Step S14402, a median value of the histogram is found. In Step S14403, the tone conversion parameter is changed such that the median value becomes a predetermined value. Using the tone conversion parameter changed here, the tone conversion processing is executed again. It should be noted that an average value of 2n+1, including n values before and after the median, may be taken as the median value. Further, the median value may be obtained after removing n maximum values from the top and m minimum values from the bottom.

(C2: Method for Using Maximum Value and Minimum Value of Histogram)

First, a histogram of a distance image data after conversion is calculated. Next, the maximum value and the minimum value of the histogram are found, and the tone conversion parameter is changed such that a width between the maximum value and the minimum value becomes a predetermined value. Then, with the changed tone conversion parameter, the tone conversion processing is executed again. Here, the maximum value and the minimum value may be average values of n values from the top and m values from the bottom, respectively. Further, the maximum value and the minimum value may be the maximum value and the minimum value after removing n values from the top and m values from the bottom, respectively.

(C3: Combination of C1 and C2)

C1 and C2 above may be combined. That is, after calculation of the histogram, based on the median value and the width between the maximum value and the minimum value, the tone conversion parameter is changed and the tone conversion is performed again.

In the above method, a low-pass filter may also be previously applied to the histogram. Further, the histogram may be found after the low-pass filter has been previously applied to the distance image after conversion.

By such a tone conversion, a distance image which includes height information and whose number of tones is high can be converted to a low-tone distance image. Since this low-tone distance image can be processed as a two-dimensional image, even an existing image processing apparatus corresponding to a two-dimensional image can handle the low-tone distance image. For example, height information of each pixel included in a distance image, obtained by capturing an image of the workpiece for the purpose of inspecting the presence or absence of a flaw, is expressed as a shade value by a binary number of a hexadecimal number. Here, when a difference between the distance image and a reference distance image is calculated, defect information of a slight and small flaw that appears on the surface of the workpiece is integrated into lower 8 tones. Therefore, for example, deleting the higher 8 tones by the tone converting part makes it possible to greatly compress an information amount of the difference image while preventing deterioration in detection accuracy. As thus described, the tone converting part cuts the higher half of the tones at the time of expressing a shade value of each pixel in the difference image by means of tones, and hence it is possible to greatly compress the information amount of the difference image while preventing deterioration in detection accuracy.

(Partial Execution of Tone Conversion Processing)

Further, the tone conversion processing can be performed not on the whole of a distance image but only on a part thereof. Specifically, the tone converting part executes the tone conversion processing only on a specified inspection target region within the distance image. Herewith, the tone conversion processing is alleviated, to improve alleviation of a load of the processing and acceleration of the processing. As one example, there will be considered a case as shown in FIG. 145A where there are performed a plurality of inspection processing as combinations of height inspection processing (first inspection processing) and image inspection processing (second inspection processing) by use of a work WK14 in the shape of three stacked cylinders with different diameters. Here, there is performed a visual inspection in which heights of the respective surfaces of the cylindrical shapes of this workpiece WK14 are measured as the height inspection processing and a chip or a crack is detected in the cylindrical portions from the top to the second stage of the workpiece WK14 as the image inspection processing. The inspection processing is selected in the inspection processing selecting part. Further, a specific setting on the inspection processing selected in the inspection processing selecting part is performed in the inspection processing setting part.

(Inspection Processing Selecting Part)

The inspection processing selecting part is a part for selecting a plurality of inspection processing on the distance image to be executed in the inspection executing part. Here, as shown in FIGS. 44, 56 and the like, inspection processing is selected from the initial screen 260 at the time of adding the processing unit. Specifically, desired inspection processing is selected from a list of inspection processing displayed by selecting "Measurement" processing from a submenu of "Add" of the processing unit. In this example, desired inspection processing is selected out of "Area", "Pattern search", "Shapetrax2", "Edge position", "Edge width", "Edge pitch", "Edge angle", "Pair edge", "Flaw", "Blob", "Shade blob", "Trend edge position", "Trend edge width", "Trend edge defect", "Shade inspection", "Color inspection", "OCR", "2D code reader", "1D code reader", and "Height measurement".

(Inspection Processing Setting Part)

On the other hand, the inspection processing setting part sets a detail of each inspection processing selected in the inspection processing selecting part. Here, as shown in FIGS. 46, 63, 78 and the like, a configuration is formed such that each setting item is individually selected from a corresponding button disposed in the setting item button region 112. In this example, specific setting items are arrayed as the setting item buttons which, for example, include the "Register image" button 113, the "Set image" button 114, "Set region" button 115, the "Extract height" button 116, the "Pre-processing" button 117, the "Detection condition" button 118, the "Detail setting" button 119, the "Determination condition" button, the "Set display" button, the "Save" button, and the like. As thus described, the setting item button region 112 functions as the inspection processing setting part.

(Height Inspection Processing)

FIG. 145B shows an example of the obtained distance image with respect to the workpiece as in FIG. 145A. This distance image makes an expression by 16 tones before the tone conversion. In the case of performing height measurement (height inspection processing) on such a distance image, a highly accurate inspection can be realized by using the height information with the high accuracy of 16 tones being held without performing the tone conversion. Specifically, as shown in FIG. 145C, in order to measure a height of each surface of the workpiece, an inspection target region is set on each of the three surfaces, and the height of each inspection target region is measured while 16 tones remain.

(Image Inspection Processing)

On the other hand, in the case of performing measurement (image inspection processing) not using the height information out of the inspection processing, the high-tone information is unnecessary, and a load is smaller when the processing is performed using a lower-tone distance image. For this reason, the high-tone distance image is tone-converted to obtain a low-tone distance image, and thereafter, the processing is performed. Here, it is not necessary to convert the whole of the distance image to a low-tone distance image, and the need is met when only a target that is subjected to the image inspection processing is tone-converted. That is, the tone conversion is directed to an inspection target region set for the image inspection processing without using the height information within one or more set inspection target regions. In an example shown in FIG. 145D, an inspection target region for the image inspection processing is set with respect to the high-tone distance image before tone-conversion in a similar manner to FIG. 145B. In this example, in order to detect a crack or the like from the top to the second stage of the workpiece, the inspection target region is set so as to surround the second-stage cylindrical shape. In other words, since the third-stage cylindrical shape is not a target for the visual inspection, this portion is set so as to be excluded from the inspection target region. Then, the tone conversion is performed on the target region for the image processing inspection. FIG. 145E shows a low-tone distance image obtained as a result. The low-tone distance image after tone-conversion shown in this diagram is expressed by 8 tones where, while the height information is somewhat lost as compared with the high-tone distance image, the sufficient accuracy is maintained for the visual inspection use in which the presence or absence of a crack or the like is detected, and hence no trouble occurs in the image inspection processing. On the other hand, since the region needing the tone conversion has been significantly reduced as compared with FIG. 145B and the like, it contributes to simplification and acceleration of the processing.

In such a manner, whether or not to perform the tone conversion is selected in accordance with the inspection processing. For example, in the "Height measurement" processing unit and the second "Height measurement" processing unit out of the inspection processing displayed in the flow display region 261 of FIG. 110, highly accurate height measurement is realized by use of the height information with 16 tones in the distance image without performing the tone conversion. On the other hand, in the inspection processing other than the above, such as the "Numerical value computing" processing unit, the "Area" processing unit and the "Blob" processing unit 267, the tone-converted low-tone shade image with 8 tones is used. In addition, although not shown, when the inspection processing is to be performed on a brightness image (e.g., a color inspection on a color brightness image), since the height information is unnecessary for the first place, the tone conversion is also naturally unnecessary.

(Display of Tone Conversion Condition Setting Part 43)

Further, regarding the image inspection processing that requires the tone conversion processing as thus described, a tone conversion condition for performing an appropriate tone conversion is set from the tone conversion condition setting part 43. At this time, in the tone conversion condition setting part 43, a tone conversion condition is made settable only when the tone conversion processing is necessary, and in contrast, a tone conversion condition is unsettable in inspection processing not requiring the tone conversion processing, such as the height inspection processing, whereby the user can smoothly set only a necessary item without being perplexed by an unnecessary setting operation. Accordingly, in the present embodiment, the tone conversion condition setting part 43 for setting a tone conversion parameter for tone-converting a distance image is displayed at the time of setting the inspection processing not requiring the height information of the image other than the height inspection processing, whereas the tone conversion condition setting part 43 is not displayed at the time of setting the height inspection processing.

A specific procedure at the time of setting will be described based on a flowchart of FIG. 146. First, in Step S14601, inspection processing is selected. Here, in a "Measurement" menu as the inspection processing selecting part, there is selected inspection processing to be executed in the inspection executing part. Next, in Step S14602, it is determined whether or not the inspection processing selected in Step S14601 requires the tone conversion, and when it is the inspection processing requiring the tone conversion, the processing goes to Step S14603, to make the tone conversion effective and also make a tone conversion setting part displayed in the list of setting items.

For example, at the time of performing the image inspection processing on the workpiece of FIG. 145A by means of the "Area" processing unit, as shown in FIG. 147, the "Extract height" button 116 as the tone conversion condition setting part 43 is displayed in the setting item button region 112 as the inspection processing setting part. When the "Extract height" button 116 is pressed, as shown in FIG. 148, a height extraction setting screen is displayed. From this screen, the user can set each necessary condition for the tone conversion processing.

It is to be noted that in the example of FIG. 148, a low-tone distance image tone-converted in accordance with the tone conversion condition set in the operation region on the right side is displayed on the image display region. Herewith, the user can obtain an advantage of being able to visually confirm whether or not a desired inspection result can be obtained with the current tone conversion condition and easily perform the adjustment operation for the tone conversion condition. Especially in the example of FIG. 148, the inspection target region is set as a circle, so as to surround the second cylindrical shape of the workpiece. Further, by using the active conversion (real time extraction) as a detection method and setting a flat surface reference as a calculation method, the top surface at the center of the workpiece and the two surfaces as outer peripheral surfaces thereof are detected and taken as the reference planes, to detect a flaw and a depression on the surface of the workpiece. Moreover, a parameter display of the reference plane detected in accordance with the tone conversion condition can also be switched and displayed by means of a console operation.

Furthermore, in the example of FIG. 148, a low-tone distance image obtained by tone-converting the whole of the workpiece displayed on the image display region is not displayed, but the low-tone distance image obtained by performing the tone conversion only within the set inspection target region is displayed. In other words, as for the image out of the inspection target region, the original distance image is displayed as it is. This can visually show the user that the tone conversion has been executed not on the whole of the input image but only within the inspection target region that is a part of the input image. When the setting for the tone conversion condition is completed in such a manner, the processing goes to Step S14604.

On the other hand, in the case of the inspection processing not requiring the tone conversion, the processing jumps to Step S14604 not via Step S14603. In this case, the tone conversion condition setting part is not displayed on the setting screen for the inspection processing. For example, in the case of performing the height inspection processing in the "Height measurement" processing unit, as shown in FIG. 46 and the like, the "Extract height" button as the tone conversion condition setting part 43 is not displayed in the setting item button region 112 as the inspection processing setting part. Herewith, the user can recognize that it is not necessary to perform the condition setting regarding the tone conversion which is unnecessary for the height inspection processing. Alternatively, by making the tone conversion condition regarding this inspection processing unsettable, it is possible to avoid confusion caused by an unnecessary setting.

Then, in Step S14604, a setting for the inspection processing is performed. Finally, in Step S14605, it is determined whether or not the settings for all the inspection processing have been completed. When the settings have not been completed, the processing returns to Step S14601, to repeat the processing from the selection of the inspection processing, and when the settings have been completed, then the processing is completed.

Meanwhile, a procedure at the time of operation will be described based on a flowchart of FIG. 149. First, in Step S14901, a distance image is inputted as an input image. Next, in Step S14902, initialization is performed. Here, 1 is set to n. Further, in Step S14903, n-th inspection processing is executed. Moreover, in Step S14904, it is determined whether or not n<N (N is the number of pieces of set inspection processing). In the case of YES, n is incremented by 1 in Step S14905, and thereafter, the processing returns to Step S14903, to repeat the processing for executing next inspection processing. On the other hand, in the case of not n<N, it is assumed that all the inspection processing has been completed, and the processing is completed. In such a manner, all pieces of the inspection processing are sequentially executed.

Here, the execution of the inspection processing in Step S14903 will be described in detail. First, when the tone conversion is required in the inspection processing, as shown in a flowchart of FIG. 150, the tone conversion is first performed on the inspection object region out of the distance image in Step S15001. Thereafter, in Sep S15002, the inspection processing is executed on the low-tone distance image after tone-conversion. On the other hand, in the case of the inspection processing without performing the tone conversion, as shown in a flowchart of FIG. 151, the tone conversion is not performed beforehand and the inspection processing is executed on the inspection target region while the high-tone distance image remains unchanged (Step S15101).

(Non-Display Function of Image Selection)

Further, at the time of setting, it is possible to apply limits on selection of an image as a target for performing a setting for the inspection processing in accordance with a type of inspection processing. That is, when the inspection processing selected in the inspection processing selecting part is executable on either a distance image or a brightness image, it is possible to call the distance image or the brightness image as a registered image. On the other hand, some pieces of the inspection processing are executable on the distance image, but unexecutable on the brightness image. For example, the height measurement processing is executed on a distance image having highly accurate height information. This cannot be performed on a normal brightness image not having height information. Accordingly, in such inspection processing as the height measurement processing, which is executable only on an image having height information, namely a distance image, at the time of calling a registered image in the setting, only a distance image is made selectable and in contrast, a brightness image is made unselectable. Herewith, it is possible to prohibit or eliminate a setting operation which is essentially impossible, such as an operation of erroneously performing a setting regarding the height measurement processing on a brightness image, so as to eliminate waste in the setting and improve the operability of the user.

Hereinafter, a procedure for setting the inspection processing condition will be described based on a flowchart of FIG. 152. First, in Step S15201, inspection processing is selected. Next, in Step S15202, it is determined whether the inspection processing selected in Step S15201 is inspection processing capable of specifying either a distance image or a brightness image, or inspection processing capable of specifying only a distance image. Here, in the case of the inspection processing capable of specifying either a distance image or a brightness image, the processing goes to Step S15203, to select either a distance image or a brightness image.

For example, there will be considered the case of selecting the "Area" processing unit as the inspection processing as shown in FIG. 61. In this case, either a distance image or a brightness image can be specified. Then in a case where, for example in FIG. 62, as an inspection processing setting item in the "Area" processing unit, the "Set image" button 114 is pressed to display an image setting screen 380 shown in FIG. 153, an image can be selected from the operation region 122. Here, an image that is displayed on the second image display region 121 can be selected in the "Display image" selection field 124 provided in an image selection field 382. Further, an input image and a registered image can be selected in an image setting field 384. From this image setting field 384, an input image can be specified by means of an image variable. Here, when an "Input image" selection field 386 is selected, an image variable selection screen 390 of FIG. 154 is displayed, to display a list of selectable images. On the image variable selection screen 390, there can be selected any of images captured in a plurality of image capturing parts (cameras) connected to the three-dimensional image processing apparatus. Here, a different image variable is given to each image capturing part, and the image capturing part is associated with the image variable. For example, an image variable "&Cam1Img" is given to a distance image captured in a camera 1, an image variable "&Cam2Img" is given to a distance image of a camera 2, an image variable "&Cam3Img" is given to a distance image of a camera 3, and an image variable "&Cam4Img" is given to a distance image of a camera 4. Further, an image variable "&Cam1GrayImg" is given to a brightness image captured in the camera 1. The user selects a desired image from the image variable selection screen 390. As thus described, since either a distance image or a brightness image is selectable in the "Area" processing unit, a brightness image as well as a distance image is included in candidates for options and displayed.

Further, according to the need, it is possible to sort and display image variables listed and displayed in the image variable selection screen 390, so as to facilitate the user selecting a desired image.

On the other hand, in the case of the inspection processing capable of specifying only a distance image, the processing goes to Step S15204, to select a distance image. That is, a brightness image is made unselectable. For example, as shown in FIG. 45, when the "Height measurement" processing unit 266 is selected as the inspection processing, only a distance image can be selected. Therefore, as shown in FIG. 46, when the "Set image" button 114 is selected as an inspection processing setting item in the "Height measurement" processing unit, the image setting screen 380 is displayed similarly to the above to make an image selectable. Here, similarly to the above, when the "Input image" selection field 386 is selected, the image variable selection screen 390 of FIG. 155 is displayed, to display a list of selectable images. Differently from FIG. 154, in this image variable selection screen 390, a brightness image is not displayed as an option, and only a distance image is displayed as an option. With this configuration, the user can avoid a situation of erroneously selecting a brightness image not having height information at the time of the height measurement, and is provided with an operation environment with little confusion.

When an image is selected in such a manner, the processing goes to Step S15205, and an inspection processing condition is set with respect to the selected image. As thus described, using the fact that each inspection processing has been decided to be the inspection processing capable of specifying either a distance image or a brightness image or the inspection processing capable of specifying only a distance image, a type of a selectable image is prescribed with respect to each inspection processing, thereby avoiding a setting error and contributing the convenience of the user.

(Non-Display Function of Inspection Processing)

In the above, the description has been given of the example where the user is allowed to previously select inspection processing, and thereafter, limits are applied on selection of an image as a target for performing a setting for the inspection processing in accordance with the type of the selected inspection processing. In contrast, it is also possible that an image is allowed to be previously selected, and thereafter, limits are applied on the type of the inspection processing executable on this image. That is, when a distance image or a brightness image is first selected in the image selecting part and one or more pieces of inspection processing executed in the inspection executing part are then selected in the inspection processing selecting part, only inspection processing executable on each image is made selectable in accordance with whether the selected image is the distance image or the brightness image. With this configuration, it is possible to avoid a situation where unsettable inspection processing is erroneously selected and a situation where an inspection processing condition regarding this inspection processing is set for the selected image.

Hereinafter, a procedure for setting the inspection processing condition by this method will be described based on a flowchart of FIG. 156. First, an image is selected in Step S15601. Here, a distance image or a brightness image is selected. Next, in Step S15602, it is determined which is the image selected in Step S15601, the distance image or the brightness image. In the case of the distance image, the processing goes to Step S15603, to allow the user to select inspection processing executable on the distance image by means of the inspection processing selecting part. On the other hand, in the case of the brightness image, the processing goes to Step S15604, to allow the user to select inspection processing executable on the brightness image by means of the inspection processing selecting part. When the inspection processing is selected in such a manner, the processing goes to Step S15605, and an inspection processing condition for the selected inspection processing is set from an inspection processing condition setting part.

For example, as shown in FIG. 157, there will be considered the case of acquiring a distance image and a brightness image with respect to the workpiece. As described above, when image registration is performed, the brightness image and the distance image are simultaneously registered. The user selects either image of these, then selects inspection processing on the selected image, and further sets an inspection processing condition therefor. For example, when the brightness image is selected, as shown in FIG. 158, there is added a tool corresponding to the inspection processing to be performed on the brightness image. Here, similarly to FIGS. 44, 56 and the like, when addition is selected from a submenu displayed as the image is selected, a list of inspection processing executable on the brightness image is displayed. As the "Measurement" processing, for example, the "Area" processing unit, a "Flaw" processing unit, and the "Blob" processing unit 267 are displayed as options. In this stage, the inspection processing not executable on the brightness image, such as the "Height measurement" processing unit, is not displayed. Herewith, it is possible to avoid a situation where the user erroneously selects inspection processing not settable with respect to the brightness image. In addition, it is also possible to display all the measurement processing as a list while graying out the inspection processing not settable. When the inspection processing is selected, the processing unit is confirmed, and next, a setting for an inspection processing condition necessary for this inspection processing is performed from the inspection processing condition setting part.

Further, when the distance image is selected, as shown in FIG. 159, there is added a tool corresponding to the inspection processing executable on the distance image. Also here, when addition is selected from a submenu displayed as the distance image is selected, a list of inspection processing executable on the distance image is displayed. As the "Measurement" processing, for example, the "Height measurement" processing unit is also displayed as an option on top of the "Area" processing unit, the "Flaw" processing unit and the "Blob" processing unit 267. When the user selects desired inspection processing, the processing unit is confirmed, and a setting for an inspection processing condition necessary for this inspection processing is performed from the inspection processing condition setting part.

As thus described, associating the inspection processing tool with the image can physically eliminate an unselectable combination of an image and inspection processing and facilitate the user avoiding a setting error.

The three-dimensional image processing apparatus and the three-dimensional image processing method of the present invention can be applied to an inspection apparatus and the like using the principle of triangulation.

What is claimed is:

1. A three-dimensional image processing apparatus comprising: a head section; and a controller section, and capable of acquiring a distance image that includes height information of an inspection target and also performing image processing based on the distance image, wherein
the head section includes:
a light projecting part configured to project incident light as structured illumination of a predetermined projection pattern from an oblique direction with respect to an optical axis of a below-described image capturing part;

the image capturing part configured to acquire reflected light that is projected by the light projecting part and reflected on an inspection target, to capture a plurality of pattern projected images and to obtain a brightness image by capturing the inspection target with the light projecting part set to a full illumination pattern or synthesizing the plurality of pattern projected images;

a distance image generating part capable of generating a distance image based on the plurality of pattern projected images captured in the image capturing part;

a head-side storage part configured to hold the brightness image and the distance image generated in the distance image generating part; and a head-side communication part configured to transmit the brightness image and the distance image held in the storage part to the controller section, and the controller section includes:

a controller-side communication part configured to communicate with the head-side communication part;

a display controlling part configured to transmit a control signal to a display part for displaying the brightness image and the distance image on the display part;

an image capturing condition setting part configured to set an image capturing condition based on the displayed brightness image on the display part;

an inspection target region setting part configured to set the inspection target region on the displayed distance image, wherein the displayed distance image is generated from the plurality of the pattern projected images captured under the image capturing condition set by the image capturing condition setting part; and an inspection executing part configured to execute predetermined inspection processing on the inspection target region of the distance image received in the controller-side communication part.

2. The three-dimensional image processing apparatus according to claim 1, wherein the head section further includes a filter processing section for performing predetermined filter processing on each of a plurality of fringe images captured in the image capturing part, and the distance image generating part generates a distance image based on each of pattern projected images subjected to the filter processing in the filter processing section.

3. The three-dimensional image processing apparatus according to claim 2, wherein the filter processing section is capable of executing at least any of a median filter, a Gaussian filter and an average filter.

4. The three-dimensional image processing apparatus according to claim 1, wherein the controller section further includes an image post-processing section for performing predetermined post-processing on the distance image generated in the head section.

5. The three-dimensional image processing apparatus according to claim 4, wherein the image post-processing section includes a tone conversion part configured to tone-convert the distance image to a low-tone distance image in accordance with a set tone conversion condition, the controller section includes a tone conversion condition setting part configured to set a conversion parameter that constitutes a tone conversion condition at the time of performing a tone conversion to convert the distance image received in the controller-side communication part to a low-tone distance image, and the tone converting part tone-converts the distance image to a low-tone distance image in accordance with the tone conversion condition set in the tone conversion condition setting part, and the inspection executing part executes inspection processing on the tone-converted low-tone distance image.

6. The three-dimensional image processing apparatus according to claim 5, wherein the tone-converting part is capable of converting the conversion parameter based on height information of an input image.

7. The three-dimensional image processing apparatus according to claim 1, wherein the controller section is a general-purpose personal computer installed with a controlling program.

8. The three-dimensional image processing apparatus according to claim 1, wherein the controller section is capable of receiving a trigger input and transferring a setting parameter.

9. The three-dimensional image processing apparatus according to claim 1, further comprising:

a display part configured to display an image; and an abnormal point highlight part capable of highlighting and displaying an abnormal point at which height information cannot be measured on the image displayed on the display part.

10. The three-dimensional image processing apparatus according to claim 1, wherein the image capturing part acquires a brightness image obtained by capturing the inspection target, and the brightness image is an image obtained by capturing the inspection target with the light projecting part set to a full-illumination pattern.

11. The three-dimensional image processing apparatus according to claim 1, wherein the image capturing part acquires a brightness image obtained by capturing the inspection target, and the brightness image is generated by synthesizing a plurality of pattern projected images from which the distance image is generated.

12. The three-dimensional image processing apparatus according to claim 1, wherein the distance image generating part is capable of generating a three-dimensional shade image that includes height information, in addition to the distance image.

13. The three-dimensional image processing apparatus according to claim 1, wherein the light projecting part includes:

a first projector; and a second projector arranged capable of projecting incident light to the inspection target from a position different from that of the first projector.

14. The three-dimensional image processing apparatus according to claim 1, wherein the head section further includes a post-processing part configured to specify image processing to be performed after generation of the distance image.

15. The three-dimensional image processing apparatus according to claim 1, wherein the controller section includes an image searching part configured to perform image searching by means of a model, and the inspection executing part performs predetermined inspection processing on the distance image based on positional correction data for the inspection target, acquired in the image searching part based on the brightness image.

16. The three-dimensional image processing apparatus according to claim 1, wherein
the controller section includes an image searching part configured to perform image searching by means of a model, and
the inspection executing part performs predetermined inspection processing on the brightness image based on positional correction data for the inspection target, acquired in the image searching part based on the distance image.

17. The three-dimensional image processing apparatus according to claim 1, wherein the controller section includes a spatial coding switching part capable of switching on/off of spatial coding processing for capturing a pattern projected image based on a spatial coding method to acquire height information.

18. The three-dimensional image processing apparatus according to claim 1, wherein the image capturing part comprises a camera.

19. A head section, which is connectable to a controller section for performing image processing in a three-dimensional image processing apparatus capable of acquiring a distance image that includes height information of an inspection target and also performing image processing based on the distance image or a brightness image, the head section comprising:
a light projecting part configured to project incident light as structured illumination of a predetermined projection pattern from an oblique direction with respect to an optical axis of a below-described image capturing part;
the image capturing part configured to acquire reflected light that is projected by the light projecting part and reflected on an inspection target, to capture a plurality of pattern projected images;
a distance image generating part capable of generating a distance image based on the plurality of pattern projected images captured in the image capturing part; and
a head-side communication part configured to transmit the distance image generated in the distance image generating part to the controller section,
wherein the distance image generated in the distance image generating part is capable of being transmitted to the controller side via the head-side communication part.

20. A three-dimensional image processing method using a three-dimensional image processing apparatus which comprises a head section and a controller section, and is capable of acquiring a distance image that includes height information of an inspection target and also performing image processing based on the distance image, the method including the steps of:
projecting, from an oblique direction, incident light as structured illumination of a predetermined projection pattern from the head section to an inspection target and acquiring reflected light reflected on the inspection target, to capture a plurality of pattern projected images;
generating a distance image based on the plurality of captured pattern projected images;
holding the distance image generated in a head-side storage part;
transmitting the generated distance image to the controller section; and
executing predetermined inspection processing on the distance image received in the controller section.

21. A three-dimensional image processing program stored in a non-transitory computer-readable medium, which is capable of acquiring a distance image that includes height information of an inspection target and also performing image processing based on the distance image by use of a three-dimensional image processing apparatus including a head section and a controller section,
wherein the program allows a computer to realize:
a distance image generating function capable of generating a distance image based on a plurality of pattern projected images captured by projecting incident light as structured illumination of a predetermined projection pattern from an oblique direction with respect to an optical axis of an image capturing part included in the head section and acquiring reflected light reflected on an inspection target;
a function of holding the distance image generated in a head-side storage part;
a function of transmitting the distance image generated by the distance image generating function to the controller section; and
an inspection executing function for executing predetermined inspection processing on the distance image received in the controller section.

* * * * *